(12) United States Patent
Jung et al.

(10) Patent No.: US 10,805,287 B2
(45) Date of Patent: Oct. 13, 2020

(54) APPARATUS AND METHOD FOR PROVIDING AND MANAGING SECURITY INFORMATION IN COMMUNICATION SYSTEM

(71) Applicant: Samsung Electronics Co., Ltd., Gyeonggi-do (KR)

(72) Inventors: Soo-Yeon Jung, Seoul (KR); In-Young Shin, Seoul (KR); Eun-Tae Won, Gyeonggi-do (KR); Kook-Heui Lee, Gyeonggi-do (KR); Jong-Hyu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 266 days.

(21) Appl. No.: 15/877,020

(22) Filed: Jan. 22, 2018

(65) Prior Publication Data
US 2018/0213405 A1    Jul. 26, 2018

Related U.S. Application Data

(60) Provisional application No. 62/448,551, filed on Jan. 20, 2017, provisional application No. 62/523,513, filed on Jun. 22, 2017.

(30) Foreign Application Priority Data

Sep. 18, 2017    (KR) .................. 10-2017-0119878

(51) Int. Cl.
*H04L 29/06* (2006.01)
*H04W 12/06* (2009.01)
(Continued)

(52) U.S. Cl.
CPC ........ *H04L 63/0853* (2013.01); *H04L 63/107* (2013.01); *H04W 12/0608* (2019.01);
(Continued)

(58) Field of Classification Search
CPC ... H04L 63/0853; H04L 63/107; H04L 67/12; H04L 67/18; H04W 12/04; H04W 12/06;
(Continued)

(56) References Cited

U.S. PATENT DOCUMENTS 9,185,116 B2 * 11/2015 Wong ..................... H04L 63/101
9,843,572 B2 * 12/2017 Rykowski ........... H04L 63/0823
(Continued)

FOREIGN PATENT DOCUMENTS

EP        2 337 300        6/2011
WO    WO 2010/136323    12/2010

OTHER PUBLICATIONS

International Search Report dated May 1, 2018 issued in counterpart application No. PCT/KR2018/000962, 13 pages.
European Search Report dated Aug. 22, 2019 issued in counterpart application No. 18741656.5-1213, 15 pages.

*Primary Examiner* — Kambiz Zand
*Assistant Examiner* — Benjamin A Kaplan
(74) *Attorney, Agent, or Firm* — The Farrell Law Firm, P.C.

(57) ABSTRACT

The present disclosure relates to a sensor network, machine type communication (MTC), machine-to-machine (M2M) communication, and technology for internet of things (IoT). An apparatus and method are provided for providing and managing security information in a communication system. A method of a first device includes detecting that a second device requests to share security information of the first device; registering information of the second device at a service provider; receiving, from the service provider, authentication information for the second device to share the security information of the first device; and transmitting the authentication information to the second device.

18 Claims, 65 Drawing Sheets

(51) Int. Cl.
   *H04W 84/18* (2009.01)
   *H04W 4/70* (2018.01)
   *H04L 29/08* (2006.01)

(52) U.S. Cl.
   CPC ......... *H04W 12/0609* (2019.01); *H04L 67/12* (2013.01); *H04L 67/18* (2013.01); *H04W 4/70* (2018.02); *H04W 84/18* (2013.01)

(58) Field of Classification Search
   CPC ....... H04W 12/08; H04W 84/18; H04W 4/70; H04W 12/0608; H04W 12/0609
   USPC .......................................................... 726/4
   See application file for complete search history.

(56) References Cited

U.S. PATENT DOCUMENTS

| | | |
|---|---|---|
| 2012/0102566 A1* | 4/2012 | Vrancken ............. G06F 21/335 726/20 |
| 2013/0086378 A1 | 4/2013 | Yao et al. |
| 2014/0156528 A1 | 6/2014 | Frechette |
| 2014/0365781 A1 | 12/2014 | Dmitrienko et al. |
| 2015/0363986 A1 | 12/2015 | Hoyos et al. |
| 2016/0217635 A1 | 7/2016 | Pudar et al. |
| 2016/0286384 A1 | 9/2016 | Manente |
| 2016/0318481 A1 | 11/2016 | Penilla et al. |

* cited by examiner

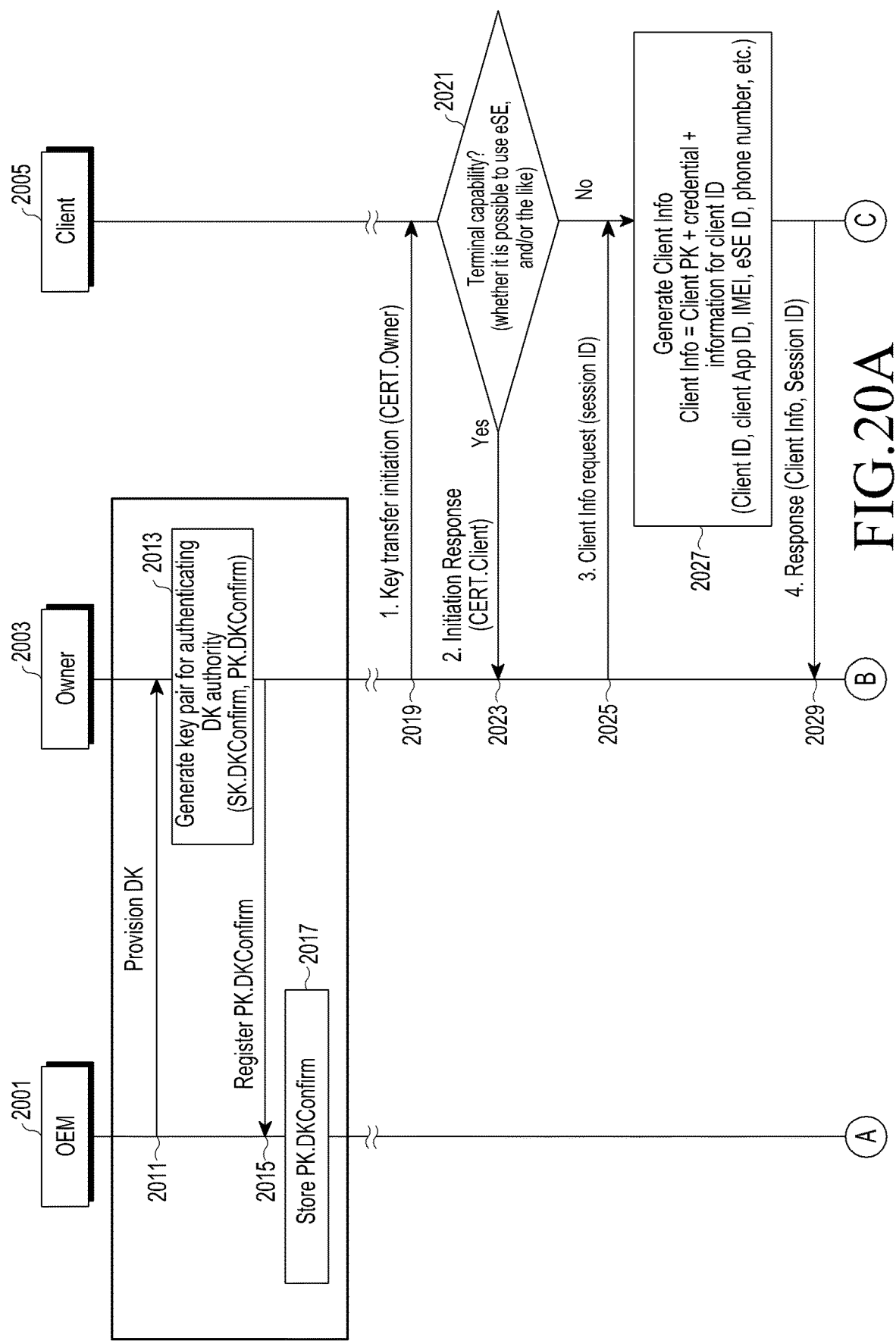

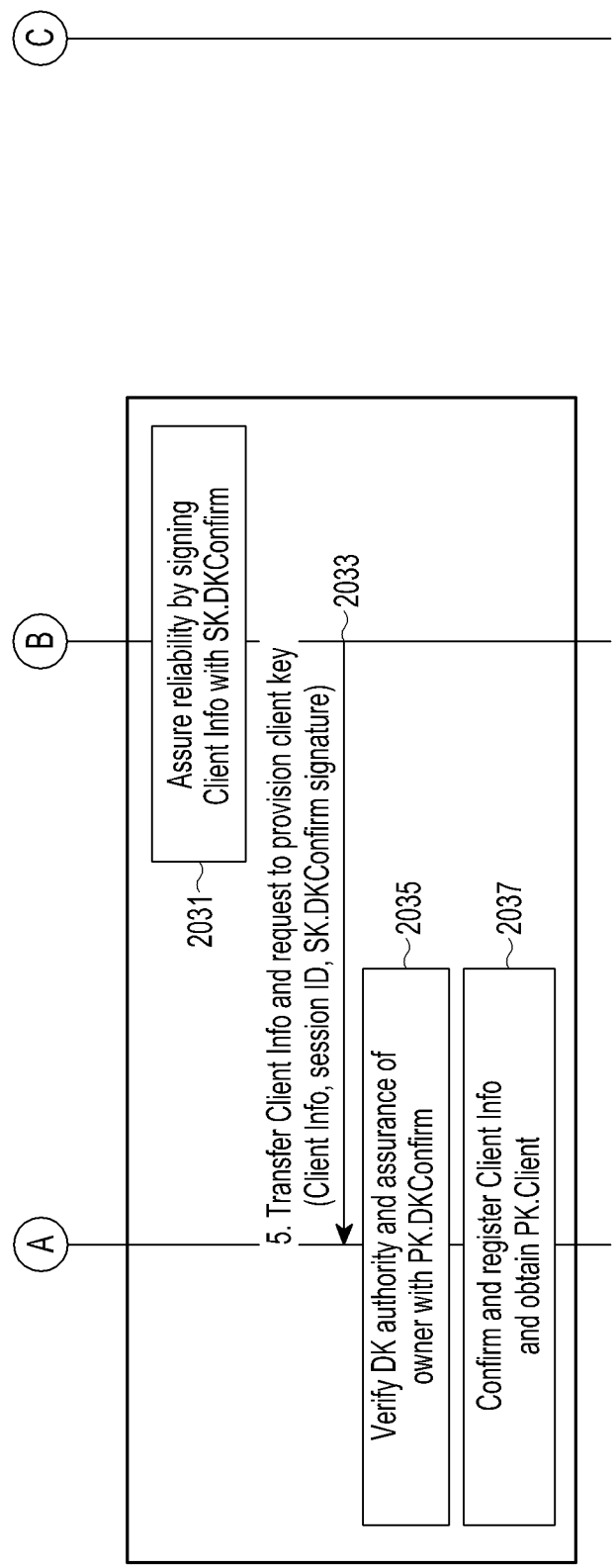

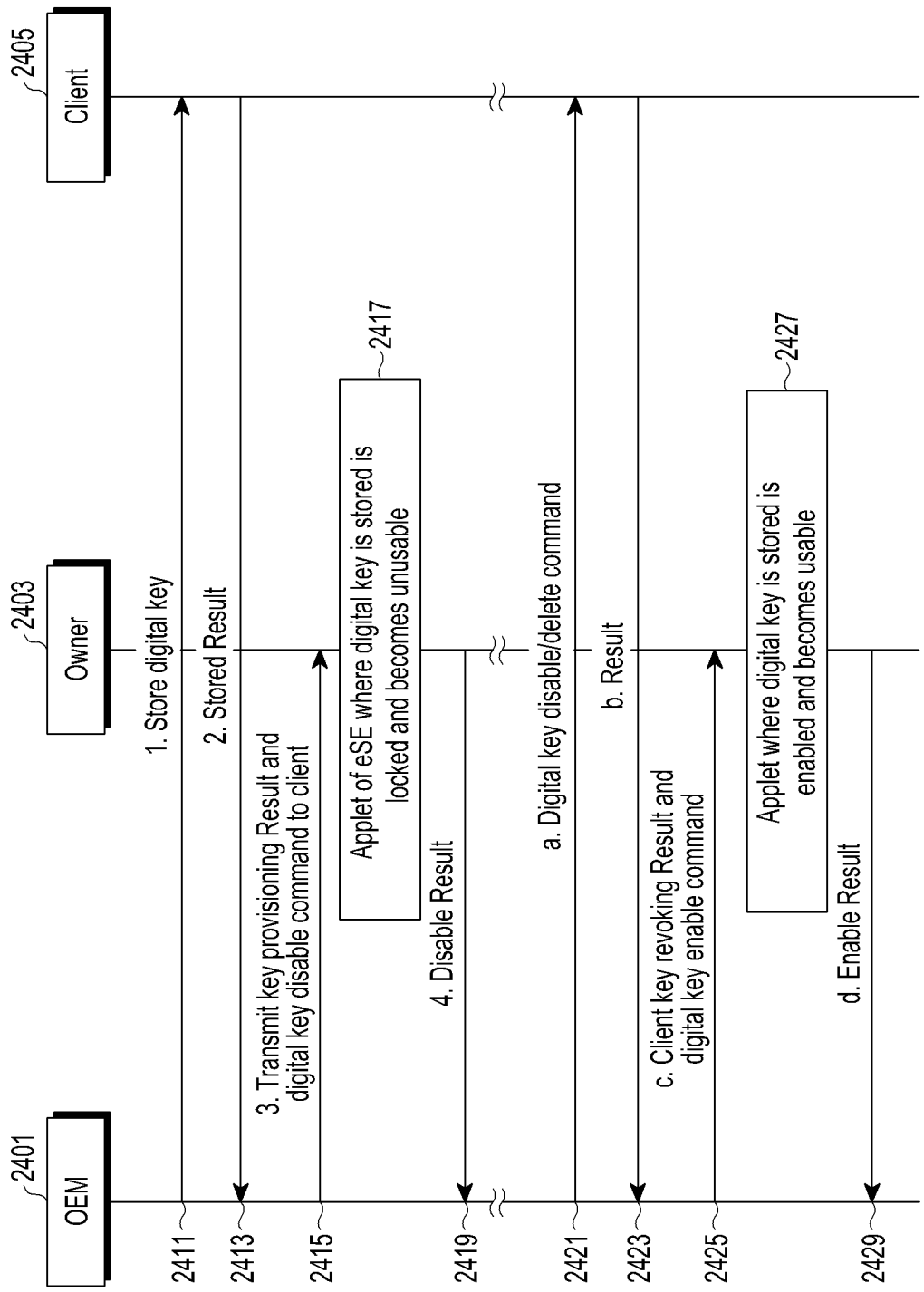

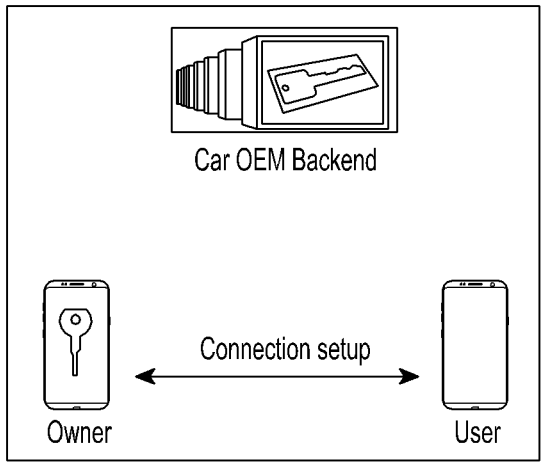
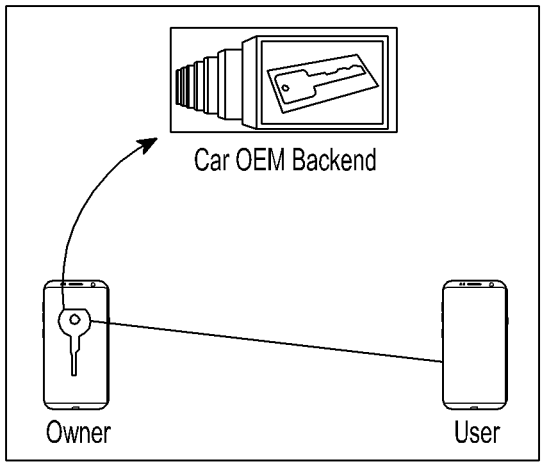
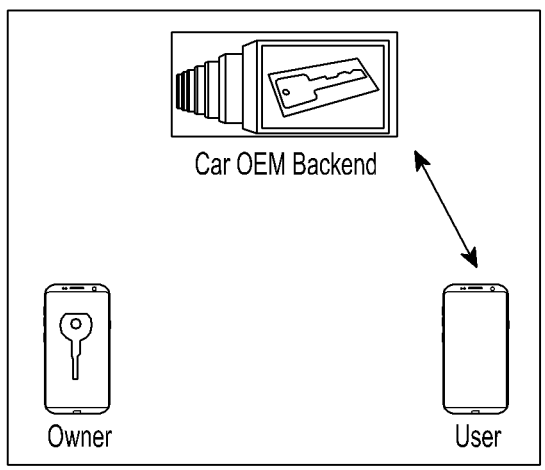
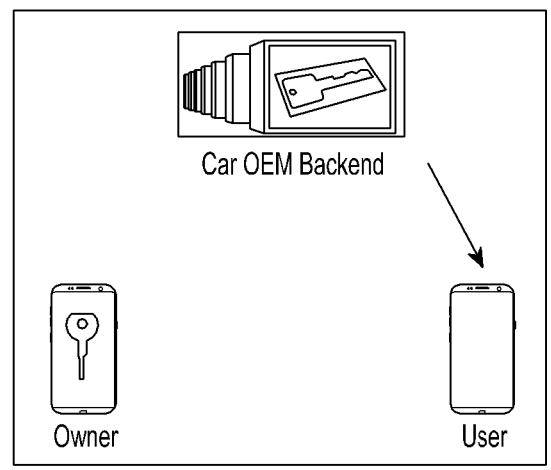
FIG.28

APPARATUS AND METHOD FOR PROVIDING AND MANAGING SECURITY INFORMATION IN COMMUNICATION SYSTEM

PRIORITY

The present application claims priority under 35 U.S.C. § 119(e) to U.S. Provisional Application No. 62/448,551, which was filed in the U.S. Patent and Trademark Office (USPTO) on Jan. 20, 2017, and U.S. Provisional Application No. 62/523,513, which was filed in the USPTO on Jun. 22, 2017, and under 35 U.S.C. § 119(a) to Korean patent Application Serial No. 10-2017-0119878, which was filed in the Korean Intellectual Property Office on Sep. 18, 2017, the entire disclosure of each of which is incorporated herein by reference.

BACKGROUND

1. Field of the Disclosure

The present disclosure relates generally to an apparatus and method for providing and managing security information in a communication system.

2. Description of the Related Art

The Internet, which is a human centered connectivity network where humans generate and consume information, is now evolving to the internet of things (IoT) in which distributed entities, i.e., things, exchange and process information without human intervention. The internet of everything (IoE), which is a combination of the IoT technology and big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched.

Such an IoT environment may provide intelligent Internet technology services that collect and analyze data generated among connected things. IoT may be applied to a variety of fields including a smart home, a smart building, a smart city, a smart car or connected cars, a smart grid, a health care system, smart appliances, and advanced medical services through convergence and combination between existing information technology (IT) and various industrial applications.

The automobile industry has also developed various types of key technologies, and has provided convenience to drivers using the developed key technologies.

For example, a turn-key starter technology of opening a vehicle door and starting an engine using a mechanical key has been developed, and then, a remote keyless entry technology of opening/closing a vehicle door and starting engine without using a mechanical key has been developed. The remote keyless entry technology is combined with an immobilizer technology, in order to start an engine only if a unique password of a key of the vehicle is identical to a unique password of the vehicle according to use of the immobilizer technology.

Recently, a passive start and entry (PASE) technology has been proposed, and applied to a smart key. Unlike conventional button-type wireless keys, which require a driver to press a button of the key after the driver has removed the key from a bag, the smart key may open a vehicle door even though the driver does not remove the smart key from the bag. Further, if the driver press a start button in the car, instead of turning the key, the engine may start. In the smart key technology, if there is no authorized key near a driver's seat, an engine does not start and a steering wheel does not unlock, to prevent vehicle theft. The smart key technology has also evolved into various forms.

A key has been developed, which is integrated into a mobile terminal, e.g., a smart phone using a wireless communication technology, such as a near field communication (NFC) technology. That is, a virtual key which is digitalized, i.e., a digital key (DK), is included in a smart phone, so that a driver does not have to carry a key.

As described above, in the automobile industry, key technology has advanced from a simple mechanical key to a remote key, from the remote key to a smart key, and from the smart key to a DK. Consequently, the requirement of carrying a separate car key may disappear based on the combination of these vehicle and smart phone technologies.

Further, the introduction of a DK plays may expand car sharing services. That is, in automobile industry, concepts are changing from car possession to car sharing along with a self-driving car age.

Use of DKs has a significant improvement in user convenience and industrial effect, however, raises a number of security concerns. For example, because a DK may be with a mobile terminal, the DK may be exposed to malicious use such as hacking, etc. Therefore, a need exists for a scheme of providing and using a trusted DK.

Further, a key server provides a DK, e.g., a service provider provides a DK to a device of an owner, who owns the DK, e.g., a smart device of a car owner. If another device other than the owner device, e.g., a client device, wants to share the DK of the owner device, the client device registers an account at the key server, subscribes to a DK service, and requests the key server to provide the DK to the client device.

In this case, the key server should separately manage an account of the client device.

Further, the client device performs a DK obtaining procedure including a plurality of processes, e.g., registering an account at the key server for sharing the DK of the owner device, subscribing to the DK service, requesting the key server to provide the DK, and receiving the DK from the key server. Accordingly, there is also a need for a scheme that decreases a number of accounts managed a key server, and that shares a DK of an owner device with a client device in a trusted scheme.

SUMMARY

Accordingly, the present disclosure is made to address at least the problems and/or disadvantages described above and to provide at least the advantages described below.

An aspect of the present disclosure is to provide an apparatus and method for providing and managing security information in a communication system.

Another aspect of the present disclosure is to provide an apparatus and method for sharing security information in a communication system.

Another aspect of the present disclosure is to provide an apparatus and method for enhancing authentication for devices sharing security information in a communication system.

Another aspect of the present disclosure is to provide an apparatus and method for obtaining security information, without registering an account at a server, in a communication system.

Another aspect of the present disclosure is to provide an apparatus and method for enhancing reliability of security information in a communication system.

In accordance with an aspect of the present disclosure, a method is provided for a first device in a communication system. The method includes detecting that a second device requests to share security information of the first device; registering information of the second device at a service provider; receiving, from the service provider, authentication information for the second device to share the security information of the first device; and transmitting the authentication information to the second device.

In accordance with another aspect of the present disclosure, a method is provided for a first device in a communication system. The method includes requesting, from a service provider, a service in which a second device shares security information of the first device; receiving, from the service provider, first authentication information for the second device to share the security information of the first device; generating second authentication information for the second device to share the security information of the first device, based on the first authentication information and the security information of the first device; and transmitting the second authentication information to the second device.

In accordance with another aspect of the present disclosure, a method is provided for a second device in a communication system. The method includes requesting a first device to share security information of the first device; receiving, from the first device, authentication information for the second device to share the security information of the first device; performing an authentication operation with a service provider, based on the authentication information; and receiving the security information of the first device from the service provider.

In accordance with another aspect of the present disclosure, a method is provided for a second device in a communication system. The method includes setting up a connection with a first device; receiving, from the first device, first authentication information for the second device to share authentication information of the first device and second authentication information for the second device to share security information of the first device, which is generated based on the security information of the first device; requesting a service provider to share the security information of the first device; and receiving the security information of the first device from the service provider.

In accordance with another aspect of the present disclosure, a method is provided for a service provider in a communication system. The method includes receiving, from a first device information of a second device; registering the information of the second device; generating authentication information for the second device to share security information of the first device; transmitting the authentication information to the first device; performing an authentication operation with the second device, based on the authentication information; and transmitting the security information of the first device to the second device.

In accordance with another aspect of the present disclosure, a method is provided for a service provider in a communication system. The method includes detecting that a second device requests a service that shares security information of a first device; generating first authentication information for the second device to share security information of the first device; transmitting the first authentication information to the first device; detecting that the second device requests to share the security information of the first device; and transmitting the security information of the first device to the second device.

In accordance with another aspect of the present disclosure, a first device is provided for use in a communication system. The first device includes a transceiver; and a processor configured to detect that a second device requests to share security information of the first device, register information of the second device at a service provider, receive, from the service provider, via the transceiver, authentication information for the second device to share the security information of the first device, and transmit, via the transceiver, the authentication information to the second device.

In accordance with another aspect of the present disclosure, a first device is provided for use in a communication system. The first device includes a transceiver; and a processor configured to request, from a service provider, a service in which a second device shares security information of the first device, receive, from the service provider, first authentication information for the second device to share the security information of the first device, generate second authentication information for the second device to share the security information of the first device, based on the first authentication information and the security information of the first device, and transmit, via the transceiver, the second authentication information to the second device.

In accordance with another aspect of the present disclosure, a second device is provided for use in a communication system. The second device includes a transceiver; and a processor configured to request a first device to share security information of the first device, receive, from the first device, via the transceiver, authentication information for the second device to share the security information of the first device, perform an authentication operation with a service provider based on the authentication information, and receive, via the transceiver, the security information of the first device from the service provider.

In accordance with another aspect of the present disclosure, a second device is provided for use in a communication system. The second device includes a transceiver; and a processor configured to set up a connection with a first device, receive, from the first device, via the transceiver, first authentication information for the second device to share authentication information of the first device and second authentication information for the second device to share security information of the first device, which is generated based on the security information of the first device, request a service provider to share the security information of the first device, and receive, via the transceiver, the security information of the first device from the service provider.

In accordance with another aspect of the present disclosure, a service provider is provided for use in a communication system. The server includes a transceiver; and a processor configured to receive, via the transceiver, information of a second device from a first device, register the information of the second device, generate authentication information for the second device to share security information of the first device, transmit, via the transceiver, the authentication information to the first device, perform an authentication operation with the second device, based on the authentication information, and transmit, via the transceiver, the security information of the first device to the second device.

In accordance with another aspect of the present disclosure, a service provider is provided for use in a communication system. The service provider includes a transceiver; and a processor configured to detect that a second device requests a service that shares security information of a first device, generate first authentication information for the second device to share security information of the first device, transmit, via the transceiver, the first authentication information to the first device, detect that the second device requests to share the security information of the first device, and transmit, via the transceiver, the security information of the first device to the second device.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 20A and 20B are signal flow diagrams illustrating a process of registering a secondary device in a communication system according to an embodiment of the present disclosure;

FIG. 24 is a signal flow diagram illustrating a process of provisioning a DK in a communication system according to an embodiment of the present disclosure;

FIG. 28 illustrates a process of providing a DK in a communication system according to an embodiment of the present disclosure;

DETAILED DESCRIPTION

Figure 1:
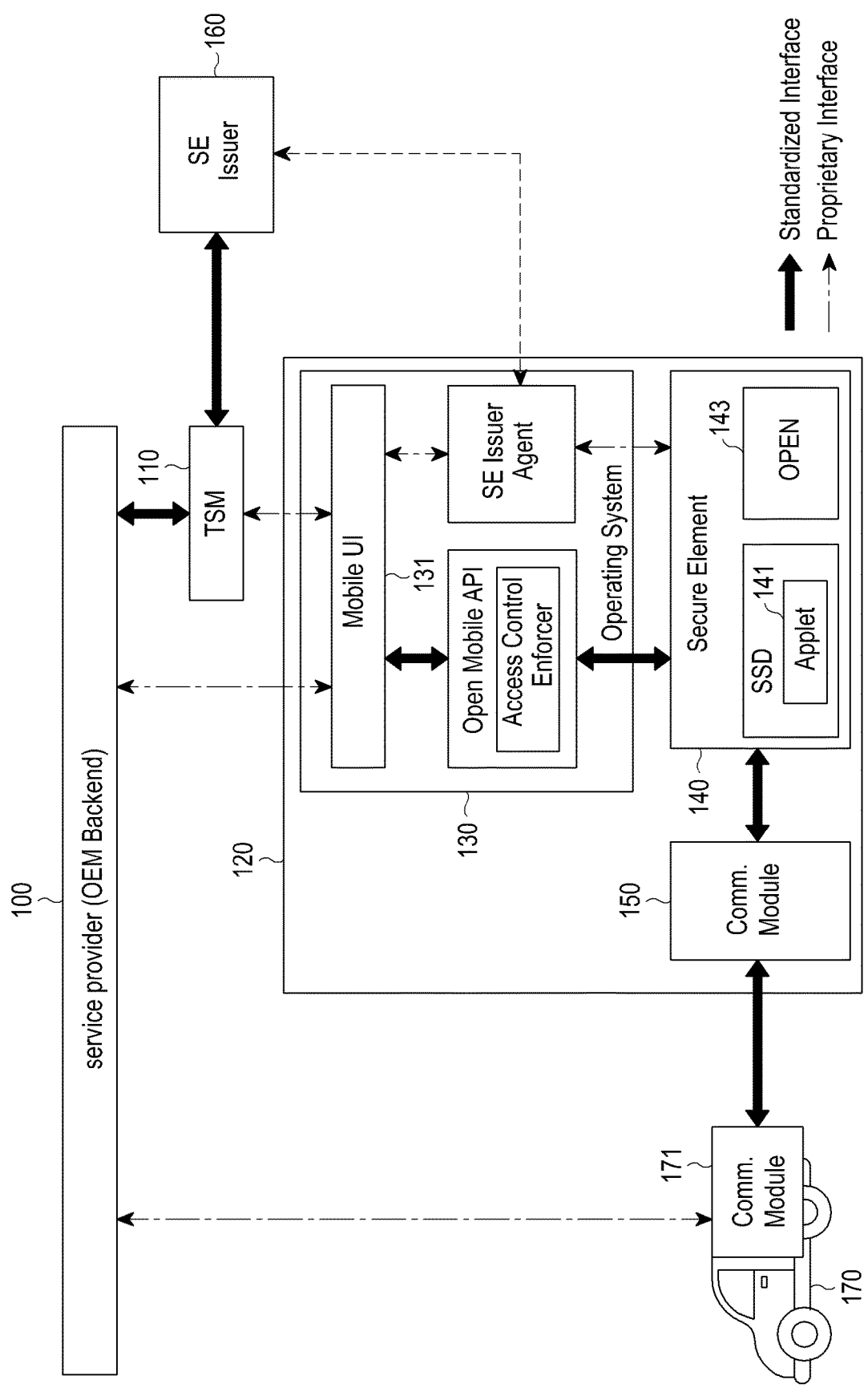
FIG. 1 illustrates an inner structure of a communication system according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are merely used by the inventor to provide a clear and consistent understanding of the present disclosure. Accordingly, the following description of various embodiments of the present disclosure is provided for illustration purpose only and not for the purpose of limiting the present disclosure as defined by the appended claims and their equivalents.

The terms used herein, including technical and scientific terms, have the same meanings as terms that are generally understood by those skilled in the art, as long as the terms are not differently defined. Further, terms defined in a generally-used dictionary have meanings that are consistent with those of terms in the related technology.

Singular forms, such as "a," "an," and "the", include plural referents unless the context clearly dictates otherwise. Thus, for example, reference to "a component surface" includes reference to one or more of such surfaces.

Although ordinal numbers, such as "first," "second," etc., may be used to describe various components, these terms are used only for distinguishing one component from another component. For example, a first component may be referred to as a second component and likewise, a second component may also be referred to as a first component, without departing from the teaching of the inventive concept.

Herein, the term "and/or" used herein includes any and all combinations of one or more of the associated listed items.

The terms such "includes," "comprises," and "has," specify the presence of a stated feature, number, step, operation, component, element, or combination thereof, but do not preclude the presence or addition of one or more other features, numbers, steps, operations, components, elements, or combinations thereof.

Herein, an "owner" may denote an owner of a target device, e.g., a vehicle, and an original owner of security information, e.g., a DK, e.g., a vehicle key. The owner's device (hereinafter, "owner device") may be a primary device.

The primary device denotes a device that has been authenticated already by a service provider which provides and manages security information, e.g., a server or an OEM, and the primary device has obtained security information of the target device already since the primary device has been authenticated already by the service provider. For example, the owner device has obtained the DK of the vehicle already.

A primary device, owner device, or owner terminal denote a device that may store security information when security information is shared. For example, the primary device may be a smart device.

A secondary device, user device, or user terminal denote a device to which security information is provisioned. For example, the secondary device may be a smart device.

A DK sharing client (SC) denotes an entity that may initiate commands, request the commands from a DK sharing server (DKSS), and receive responses, instructions, and notifications transmitted by the DKSS.

The DKSS denotes an entity that may accept commands, request the commands from the DKSC, and transmit responses, instructions, and notifications to the DKSC.

Herein, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), etc.

An electronic device may also be a smart home appliance, such as a television (TV), a digital video disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, etc.

An electronic device may also be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, etc.

An electronic device may also be furniture, part of a building/structure, an electronic board, electronic signature receiving device, a projector, various measuring devices (e.g., water, electricity, gas or electro-magnetic wave measuring devices), etc.

Additionally, an electronic device may be any combination of the foregoing devices. However, an electronic device according to various embodiments of the present disclosure is not limited to the foregoing devices.

An apparatus and method proposed in an embodiment of the present disclosure may be applied to various communication systems, such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, etc., and an internet protocol television (IPTV) system, a moving picture experts group (MPEG) media transport (MMT) system, etc.

Herein, security information includes, e.g., a DK and information related to the DK, e.g., access property information.

An apparatus for transmitting and/or receiving security information may be a smart device, a vehicle, or a key server.

An apparatus for transmitting and/or receiving security information may be a target device to which the security information is applied, e.g., a primary device that has been authenticated for using a vehicle. The primary device denotes a device that has been authenticated by a server that provides and manages the security information. Because the primary device has been authenticated by the server, it has already obtained security information for the target device. The security information may be obtained from the server that provides and manages the security information.

Further, because the primary device has already registered at the server, information about the primary device has been already registered at the server.

An apparatus for transmitting and/or receiving security information may be a secondary device, i.e., a device that is not already authenticated by the server. The secondary device may be registered and authenticated at the server through the primary device, and then share security information with the primary device.

A primary device and a secondary device may be smart devices, e.g., mobile stations (MSs).

Herein, the term MS may be interchangeably used with terms such as user equipment (UE), terminal, device, wireless device, mobile device, mobile phone, etc.

FIG. 1 illustrates an inner structure of a communication system according to an embodiment of the present disclosure.

Referring to FIG. 1, the communication system includes a service provider 100, a trusted service manager (TSM) 110, a smart device 120, a secure element (SE) issuer 160, and a target device 170.

The TSM 110 manages security information, e.g., a DK and information related to the DK. The TSM 110 allows the service provider 100 to remotely distribute and manage a contactless application of the service provider 100 by allowing access to smart devices. Herein, the term service provider may be interchangeably used with the term "server" or "OEM".

The service provider 100 may manage security information, and remotely distribute and manage a contactless application by allowing access to smart devices, e.g., a secure element included in the smart devices.

The smart device 120 includes a mobile user interface (UI) unit 130, an embedded secure element (eSE) 140, and a communication module 150. Herein, the term communication module may be interchangeably used with the term transceiver, etc.

The operating system module 130 includes a mobile user interface (UI) 131, which is an interface between the server 100 (or the TSM 110) and the smart device 120.

The eSE 140 includes an applet 141 and a controller 143, e.g., which is "OPEN". The eSE 140 is a secure storage device included in the smart device 120. Alternatively, the smart device 120 may include a universal integrated circuit card (UICC) SE instead of the eSE 140.

The applet 141 is a small application that runs within the eSE 140, and may be loaded or installed by the TSM 110 or the SE issuer 160. The controller 143 controls the overall operation related to security information.

Various elements, other than the eSE 140, may be secure storage devices. That is, the smart device 120 may include a separate secure storage device in addition or as alternative to the eSE 140, so that the security information may be stored at the separate secure storage device.

The communication module 150 may be a short range-communication device used for transmitting and/or receiving a signal between a target device 170, e.g., a vehicle, and the smart device 120. For example, the communication module 150 may transmit and/or receive (transceive) signals between the target device 170 and the smart device 120 using an NFC scheme. Alternatively, the communication module 150 may use different short range-communication schemes, such as Bluetooth, Wi-Fi, infrared ray communication, magnetic secure transmission (MST), and magnetic secure communication.

The target device 170 includes a communication module 171, which may be a short range-communication device used for transceiving signals between the smart device 120 and the target device 170, e.g., using an NFC scheme or other short range-communication scheme.

Although each entity illustrated in FIG. 1 includes a plurality of modules, the modules included in each entity may be implemented with at least one processor.

Figure 2:
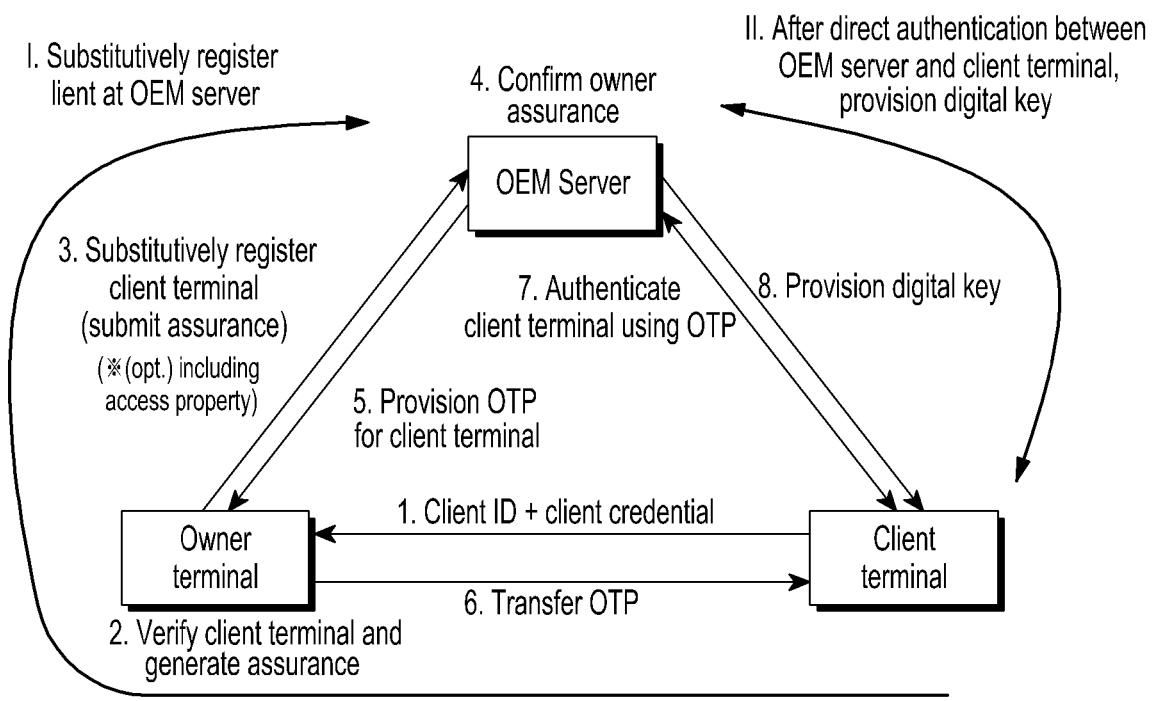
FIG. 2 illustrates a process of providing a DK in a communication system according to an embodiment of the present disclosure.

FIG. 2 illustrates a process of providing a DK in a communication system according to an embodiment of the present disclosure.

Referring to FIG. 2, it will be noted that a service provider is shown as "OEM server", a primary device is shown as "Owner terminal", and a secondary device is shown as "Client terminal". Further, it will be noted that FIG. 2 is shown as a form in which the terms "OEM server", "Owner terminal", and "Client terminal" are interchangeable with the terms "service provider", "primary device", and "secondary device".

Referring to FIG. 2, the communication system includes a service provider, a primary device, and a secondary device. It will be assumed that the secondary device is not registered at the service provider, so there is no account for the secondary device in the service provider.

If the secondary device intends to share a DK of the primary device, the secondary device transmits a message for requesting to use (share) the DK to the primary device. Here, the message requesting to share the DK will be referred to as a "key sharing request message". The key sharing request message includes an identifier (ID) of the secondary device and an assurance (1. Client ID+Client credential)

Upon receiving the key sharing request message from the secondary device, the primary device performs a verification operation for the secondary device based on the ID of the secondary device and the assurance included in the key sharing request message. If the verification result for the secondary device is successful, the primary device generates an assurance for the secondary device (2. Verify client+ generate assurance).

If the verification result for the secondary device is successful, the primary device transmits a message for requesting to register the secondary device to the service provider. Here, the message for requesting to register the secondary device will be referred to as a "secondary device registration request message". The secondary device registration request message includes the assurance for the secondary device 230, and the assurance includes a one-time password (OTP) and an access property (3. Substitutively register client (submit assurance), and (opt.) access property).

Upon receiving the secondary device registration request message from the primary device, the service provider performs a confirmation operation for the assurance included in the secondary device registration request message (4. Confirm owner assurance). If the confirmation result is successful, the service provider transmits a response message to the secondary device registration request message to the primary device 220 (5. Provision OTP for client). Here, the response message to the secondary device registration request message will be referred to as a "secondary device registration response message". The secondary device registration response message includes the OTP that the service provider provisioned for the secondary device.

Upon receiving the secondary device registration response message from the service provider, the primary device transmits, to the secondary device, a secondary device registration result notification message as a response message to the secondary device registration request message (6. Transfer OTP). Here, the secondary device registration result notification message includes the OTP for the secondary device received from the service provider.

Upon receiving the secondary device registration result notification message from the primary device, the secondary device performs an authentication operation based on the OTP included in the secondary device registration result notification message with the service provider (7. Authenticate client using OTP).

If the authentication result for the secondary device is successful, the service provider provisions a digital key to the secondary device (8. Provision digital key).

As a result, the process of providing the DK in FIG. 2 will be summarized as the following.

(1) Initially, an OEM server is not related to a client terminal, (2) an owner terminal assures the client terminal, and registers client information for the client terminal at the OEM server instead of the client terminal, (3) the owner terminal transmits secret information (e.g., an OTP) provisioned by the OEM server to the client terminal, and (4) the OEM server provisions a DK, when the client terminal requests a service based on the secret information.

Figure 3:
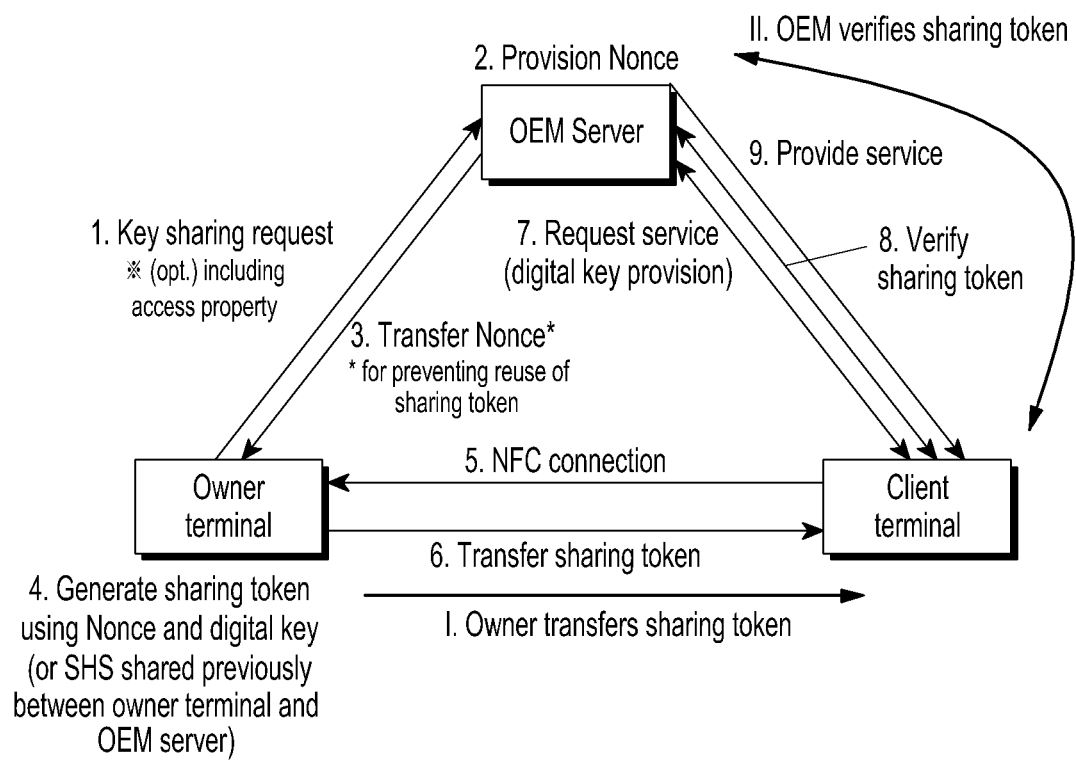
FIG. 3 illustrates a process of providing a DK in a communication system according to an embodiment of the present disclosure.

FIG. 3 illustrates a process of providing a DK in a communication system according to an embodiment of the present disclosure.

Referring to FIG. 3, it will be noted that a service provider is shown as "OEM server", a primary device is shown as "Owner terminal", and a secondary device is shown as "Client terminal". Further, it will be noted that FIG. 3 is shown as a form in which the terms "OEM server", "Owner terminal", and "Client terminal" are interchangeable with the terms "service provider", "primary device", and "secondary device".

It will be noted that a digital key providing process in FIG. 3 is a digital key providing process in a case that a primary device firstly requests key sharing with a secondary device, and a service provider verifies a sharing token which the primary device provisions.

Referring to FIG. 3, If the primary device requests key sharing from a service provider (1. Key Sharing Request), the service provider provisions a nonce (2. Provision nonce). Here, a key sharing request message used for requesting the key sharing may include, for example, an access property.

The service provider transmits the provisioned nonce to the primary device (3. Transfer nonce), and the primary device generates a sharing token based on the nonce and a DK (4. Generate sharing token based on nonce and digital key (or shared secret (SHS) which has already been shared between the primary device and the service provider)). Here, the nonce is used for preventing reuse of the sharing token.

The primary device establishes an NFC connection with the secondary device (5. NFC connection), and transmits the sharing token to the secondary device (6. Transfer sharing token). Upon receiving the sharing token from the primary device, the secondary device requests a service from the service provider, that is, the secondary device requests DK provisioning (7. Request service (e.g., digital key provisioning)), in order to perform a verification operation for the sharing token between the secondary device and the service provider (8. Verify sharing token).

If the verification result for the sharing token is successful, the service provider provides the service to the secondary device (9. Provide service). That is, if the verification result for the sharing token is successful, the service provider provisions a DK to the secondary device.

Figure 4:
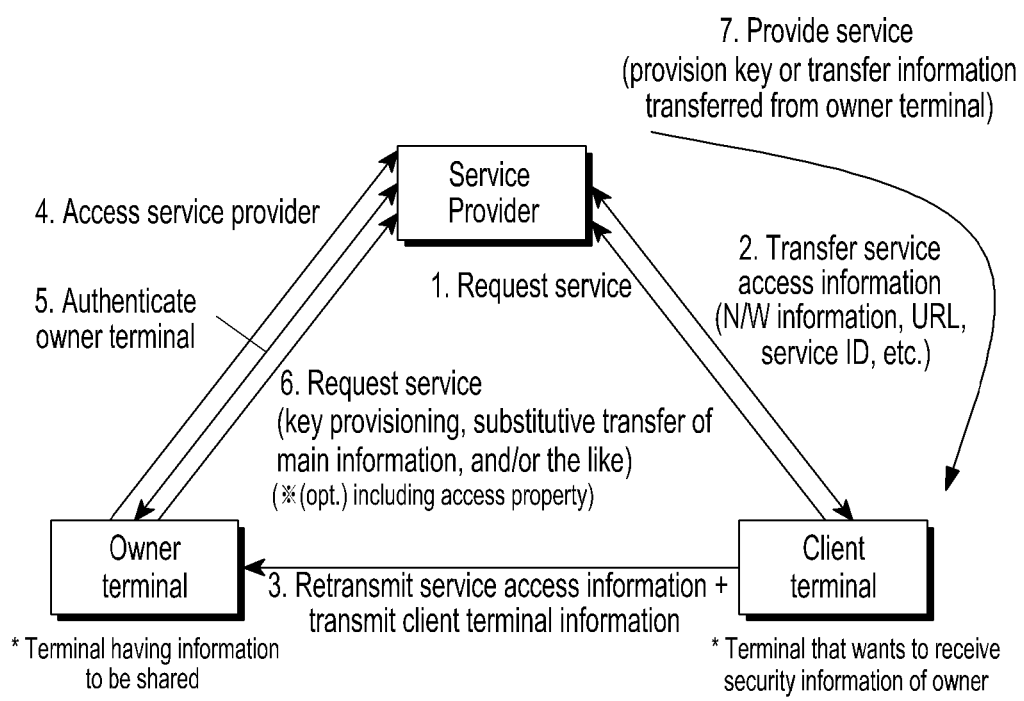
FIG. 4 illustrates a process of providing a DK in a communication system according to an embodiment of the present disclosure.

FIG. 4 illustrates a process of providing a DK in a communication system according to an embodiment of the present disclosure.

Referring to FIG. 4, it will be noted that a service provider is shown as "Service provider", a primary device is shown as "Owner terminal", and a secondary device is shown as "Client terminal". Further, it will be noted that FIG. 4 is shown as a form in which the terms "Service provider", "Owner terminal", and "Client terminal" are interchangeable with the terms "service provider", "primary device", and "secondary device".

It will be noted that a digital key providing process in FIG. 4 is a digital DK providing process, wherein a secondary device accesses a service provider, requests a service from the service provider, and obtains service access information from the service provider, and a primary device accesses the service provider based on the service access information obtained by the secondary device and performs a confirmation operation for authentication and main information transfer.

The secondary device requests a service from the service provider (1. Request service), so service access information to be transmitted between the service provider and the secondary device (2. Transfer service access information (network (N/W) information, a uniform resource locator (URL), a service ID, and/or the like)). Here, the service access information may include, for example, network (N/W) information, uniform resource locator (URL) information, a service ID, etc.

The secondary device transmits the service access information and information of the secondary device to the primary device (3. Service access information retransmission+client information). Upon receiving the service access information and the information of the secondary device from the secondary device, the primary device accesses the service provider (4. Access server), and an owner authentication procedure, i.e., a primary device authentication procedure, is performed between the service provider and the primary device (5. Authenticate owner).

If the primary device authentication procedure is successful, the primary device requests a service form the service provider (Request service (key provisioning, main information substitute transfer, and/or the like), and (opt) access property is included). Here, the service request may be, for example, service request which requests to provision a DK for the secondary device.

Upon receiving the service request from the primary device, the service provider provides a service to the secondary device (7. Provide service (provision key or transfer information received from owner). Here, providing the service from the service provider to the secondary device may include provisioning the DK from the service provider to the secondary device or transmitting the information received from the primary device from the service provider to the secondary device.

Figure 5:
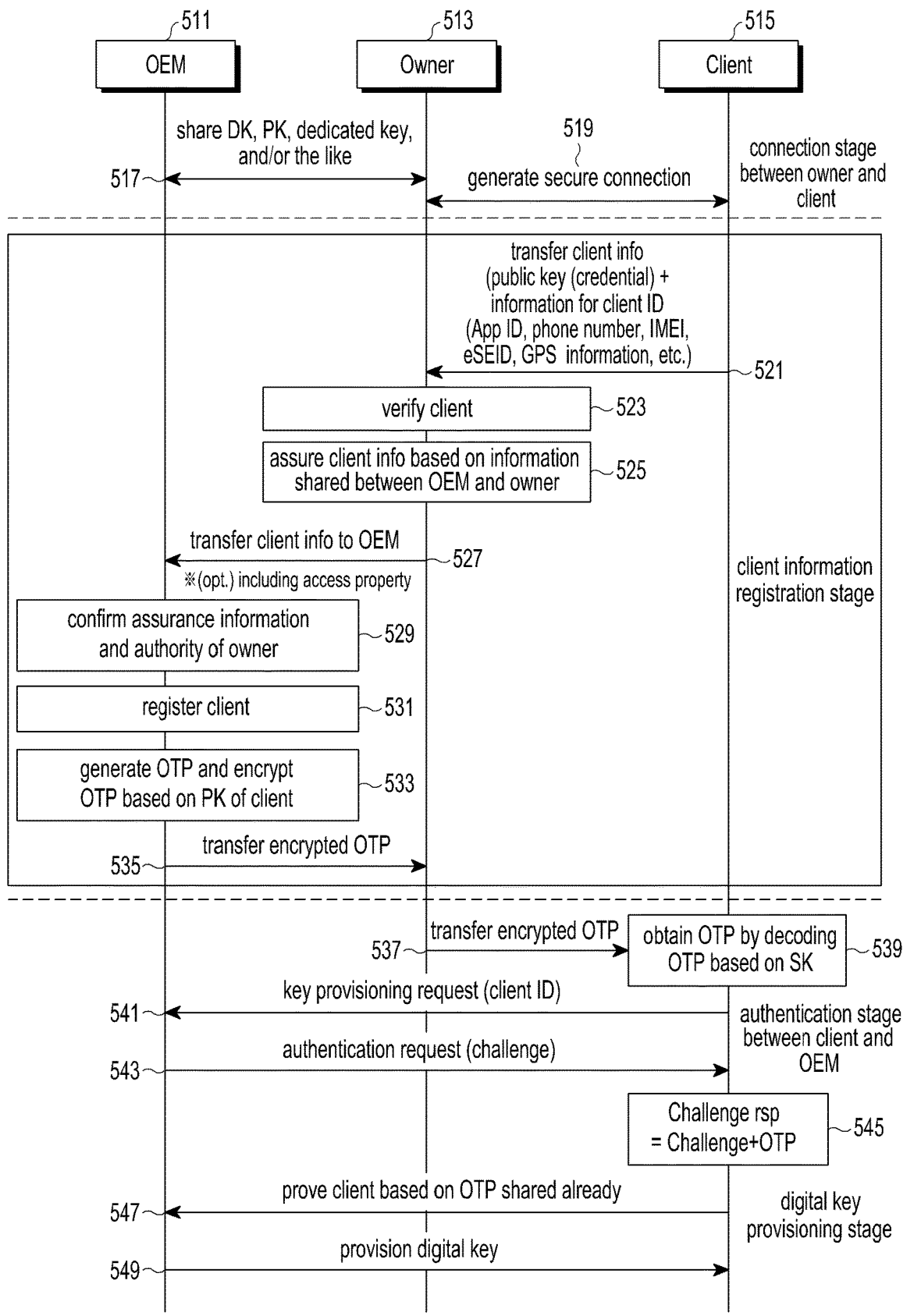
FIG. 5 is a signal flow diagram illustrating a process of providing a DK in a communication system according to an embodiment of the present disclosure.

FIG. 5 is a signal flow diagram illustrating a process of providing a DK in a communication system according to an embodiment of the present disclosure.

Referring to FIG. 5, it will be noted that a service provider is shown as "OEM", a primary device is shown as "Owner", and a secondary device is shown as "Client". Further, it will be noted that FIG. 5 is shown as a form in which the terms "OEM", "Owner", and "Client" are interchangeable with the terms "service provider", "primary device", and "secondary device".

It will be noted that a process of providing a digital key in FIG. 5 is a process of sharing a digital key based on a primary device.

It will be noted that a process of providing a digital key in FIG. 5 is a signal transmitting/receiving operation among a service provider 511, a primary device 513, and a secondary device 515 according to a digital key providing process as described in FIG. 2.

Referring to FIG. 5, various keys such as a DK, a public key (PK) of the primary device 513, a dedicated key, etc., are shared between the service provider 511 and the primary device 513 (517). Further, a secure connection is generated between the primary device 513 and the secondary device 515 (519).

The secondary device 515 transmits a secondary device information (e.g., Client Info) to the primary device 513 (521). Here, the secondary device information may include a PK, e.g., a credential, and information about a secondary device ID, e.g., an application ID, a phone number, an international mobile equipment identity (IMEI), an eSID, GPS information, etc.

Upon receiving the secondary device information from the secondary device 515, the primary device 513 performs a verification operation for the secondary device 515, based on the secondary device information (523), and, if the result of the verification operation is successful, the primary device 513 assures information that has already been shared between the primary device 513 and the service provider 511 (525). Here, the assuring operation may include a signing operation, an encrypting operation, etc.

The primary device 513 transmits the assured secondary device information to the service provider 511 (527). Here, the assured secondary device information may optionally include an access property, etc.

Upon receiving the assured secondary device information from the primary device 513, the service provider 511 confirms assurance information and authority of the primary device 513 (529), and registers the secondary device 515 (531). The service provider 511 generates an OTP, and encrypts the OTP using a PK of the secondary device 515 (533). The service provider 511 transmits the encrypted OTP to the primary device 513 (535). The primary device 513 transmits the encrypted OTP received from the service provider 511 to the secondary device 515 (537). Upon receiving the encrypted OTP from the primary device 513 decodes the encrypted OTP using a secret key (SK) to acquire the OTP generated by the service provider 511 (539).

The secondary device 515 transmits a key provisioning request for requesting to provision a DK to the service provider 511 (541). Here, the key provisioning request includes a secondary device ID, i.e., a client ID of the secondary device 515.

Upon receiving the key provisioning request from the secondary device 515, the service provider 511 transmits an authentication request to the secondary device 515 (543). Here, the authentication request may include challenge for authenticating the secondary device 515.

Upon receiving the authentication request from the service provider 511, the secondary device 515 generates a challenge response (challenge rsp) for authenticating the secondary device 515, based on the challenge included in the authentication request and the acquired OTP (challenge rsp=challenge+OTP)(545).

The secondary device 515 transmits an authentication response including the challenge rsp to the service provider 511 (547).

Upon receiving the challenge rsp, the service provider 511 provisions a DK for the secondary device 515, and transmits the provisioned DK to the secondary device 515 (549).

As described in FIG. 5, the process includes a primary device-secondary device connection phase (517 and 519) for establishing a connection between the primary device 513 and the secondary device 515, a secondary device information registration phase (521 to 535) for registering the information of the secondary device 515, and a secondary device-service provider authentication phase (537 to 545) in which an authentication procedure between the secondary device 515 and the service provider 511 is performed, and a DK provision phase (547 and 549) for provisioning a DK to the secondary device 515.

Although each step of FIG. 5 is illustrated as part of a series of operations, various steps in FIG. 5 could overlap, occur in parallel, occur in a different order, or occur multiple times.

Figure 6A:
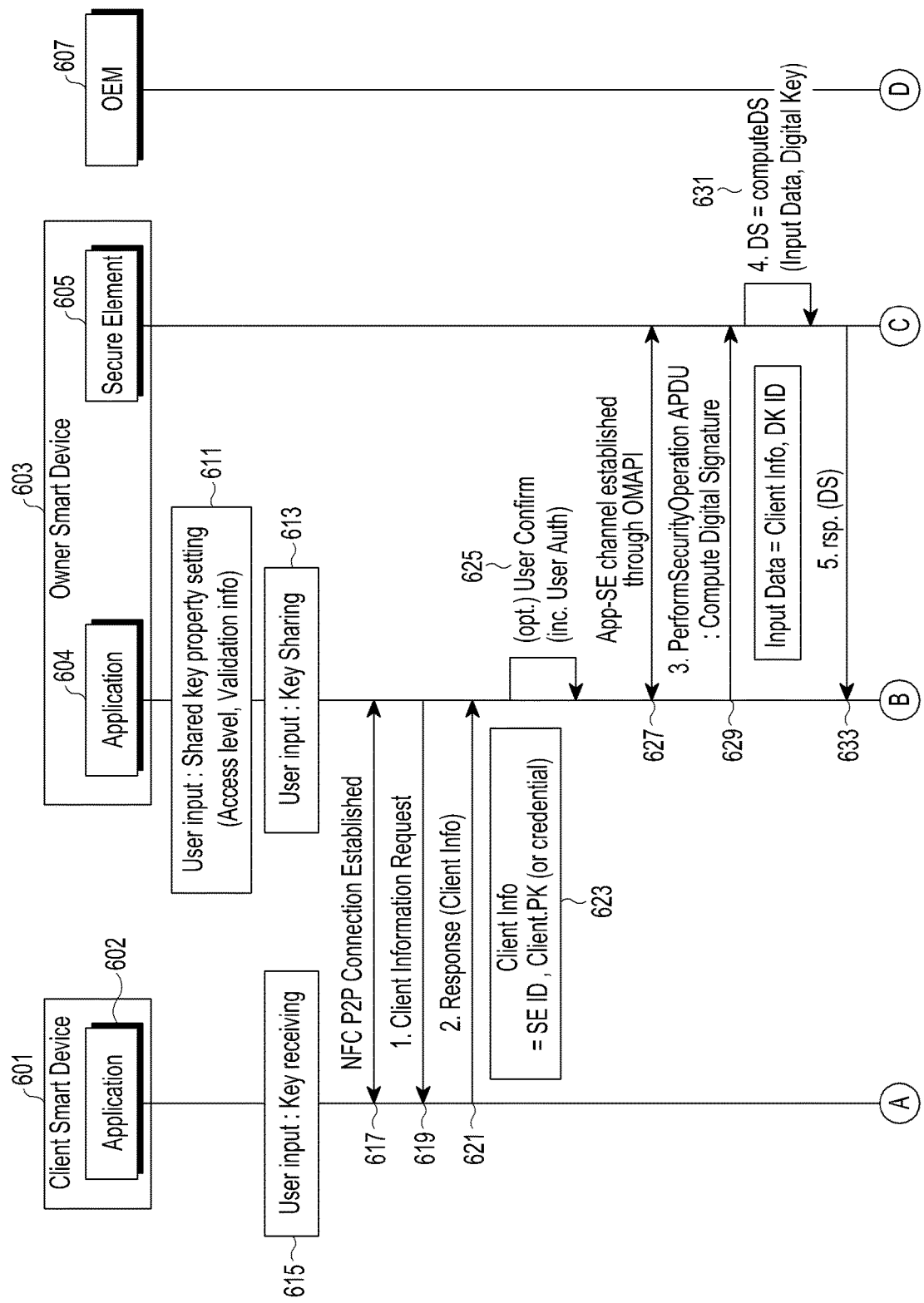
FIGS. 6A and 6B are signal flow diagrams illustrating a process of providing a DK in a communication system according to an embodiment of the present disclosure.
Figure 6B:
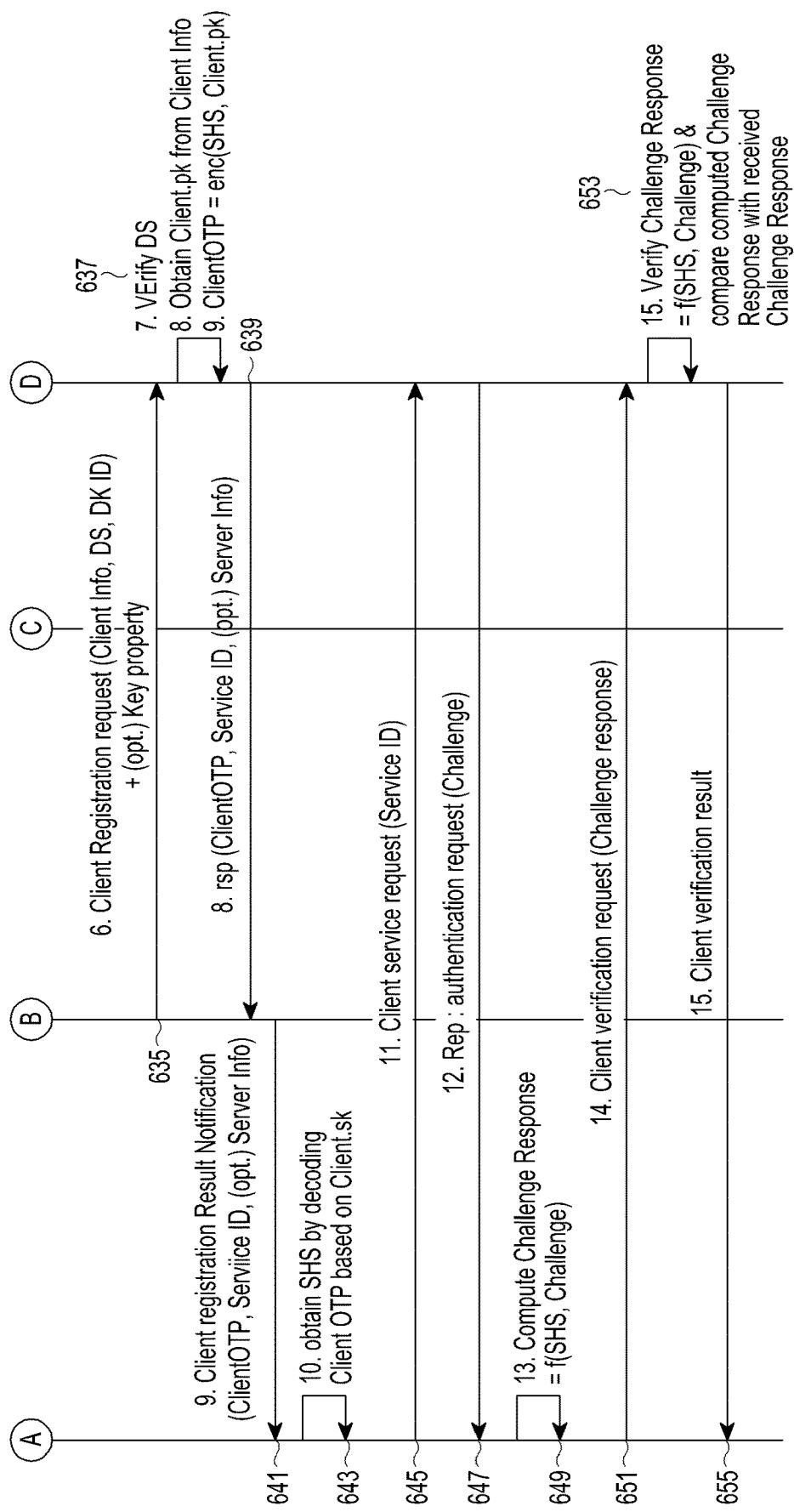

FIGS. 6A and 6B are signal flow diagrams illustrating a process of providing a DK in a communication system according to an embodiment of the present disclosure.

Referring to FIGS. 6A and 6B, it will be noted that a service provider is shown as "OEM", a primary device is shown as "Owner Smart Device", and a secondary device is shown as "Client Smart Device". Further, it will be noted that FIGS. 6A and 6B are shown as a form in which the terms "OEM", "Owner Smart Device", and "Client Smart Device" are interchangeable with the terms "service provider", "primary device", and "secondary device".

It will be noted that a process of providing a digital key in FIGS. 6A and 6B is a process of sharing a digital key based on a primary device.

It will be noted that a process of providing a digital key in FIGS. 6A and 6B is a signal transmitting/receiving operation among a service provider, a primary device, and a secondary device according to a digital key providing process as described in FIG. 2.

The primary device 603 includes an application 604 and a secure element 605, and the secondary device 601 includes an application 602.

The application 604 of the primary device 603 detects a user input, i.e., shared key property setting (611). Here, the shared key property setting may include, for example, an access level, verification information, etc.

The application 604 of the primary device 603 detects a user input, i.e., key sharing initiation request (613). The application 602 of the secondary device 601 detects a user input, i.e., key reception initiation request (615). So, an NFC peer to peer (P2P) connection is established between the primary device 603 and the secondary device 601 (617).

The application 604 of the primary device 603 transmits, to the application 602 of the secondary device 601, a secondary device information request requesting information of the secondary device 601(619).

Upon receiving the secondary device information request from the application 604 of the primary device 603, the application 602 of the secondary device 601 transmits a response including the information of the secondary device 601, i.e., secondary device information, to the application 604 of the primary device 603 (621). Here, the secondary device information may include an SE ID, and a PK or credential of the secondary device 601.

Upon receiving the response from the application 602 of the secondary device 601, the application 604 of the primary device 603 performs a user confirming operation on the secondary device information included in the response (User Confirm) (625). Here, The user confirming operation may include a user authenticating operation.

A channel is established between the application 604 of the primary device 603 and the secure element 605 of the primary device 603 through an open mobile application programming interface (API) (OMAPI) (627). The application 604 of the primary device 603 transmits, to the secure element 605 of the primary device 603, an application protocol data unit (APDU) command for commanding to perform a security operation (e.g., PerformSecurityOperationAPDU command) (629). Here, the PerformSecurityOperationAPDU command may be an APDU command for requesting to compute a digital signature (DS).

Upon receiving the PerformSecurityOperationAPDU command from the application 604 of the primary device 603, the secure element 605 of the primary device 603 computes a DS (631). For example, the secure element 605 of the primary device 603 computes the DS based on input data and a DK, and the input data may be the secondary device information and a DK ID.

The secure element 605 of the primary device 603 transmits a response including the computed DS to the application 604 of the primary device 603 (633).

Upon receiving the response including the DS from the secure element 605 of the primary device 603, the application 604 of the primary device 603 transmits a secondary device registration request to the service provider 607 (635). Here, the secondary device registration request may include secondary device information, a DS and a DK ID, and may optionally include a key property.

Upon receiving the secondary device registration request from the application 604 of the primary device 603, the service provider 607 verifies the DS (637). Here, the service provider 607 detects a PK (e.g., "Client.pk" as illustrated in FIG. 6B) of the secondary device 601 from the secondary device information, and computes an OTP (e.g., ClientOTP as shown in FIG. 6B) of the secondary device 601 by performing an encryption operation, based on SHS of the primary device 603 and the PK of the secondary device 601.

The service provider 607 transmits a response to the secondary device registration request to the application 604 of the primary device 603 (639). The response to the secondary device registration request may include the OTP of the secondary device 601 and a service ID, and may optionally include server information, i.e., information of the service provider 607.

Upon receiving the response to the secondary device registration request from the service provider 607, the application 604 of the primary device 603 transmits secondary device registration result notification to the application 602 of the secondary device 601 (641). The secondary device registration result notification may include the OTP of the secondary device 601 and the service ID, and may optionally include the server information.

Upon receiving the secondary device registration result notification from the application 604 of the primary device 603, the application 602 of the secondary device 601 obtains the SHS of the primary device 603 by decoding the OTP of the secondary device 601, based on the PK of the secondary device 601 (643). The application 602 of the secondary device 601 transmits a secondary device service request to the service provider 607 (645). The secondary device service request includes a service ID of a service to be requested.

Upon receiving the secondary device service request from the application 602 of the secondary device 601, the service provider 607 transmits a response including an authentication request to the application 602 of the secondary device 601. The response may also include challenge.

Upon receiving the secondary device service request from the service provider 607, the application 602 of the secondary device 601 computes a challenge response (649). For example, the application 602 of the secondary device 601 computes the challenge response based on the challenge and SHS.

The application 602 of the secondary device 601 transmits a secondary device verification request to the service provider 607 (651). The secondary device verification request includes the challenge response.

Upon receiving the secondary device verification request from the application 602 of the secondary device 601, the service provider 607 verifies the challenge response (653). That is, the service provider 607 computes challenge response based on the challenge and SHS, and verifies the challenge response, based on whether the computed challenge response is identical to the challenge response included in the secondary device verification request.

The service provider 607 transmits a secondary device verification result including the verification result to the application 602 of the secondary device 601 (655).

Although FIGS. 6A and 6B illustrate a process of providing a DK as a series of operations, various operations in FIGS. 6A and 6B could overlap, occur in parallel, occur in a different order, or occur multiple times.

Figure 7:
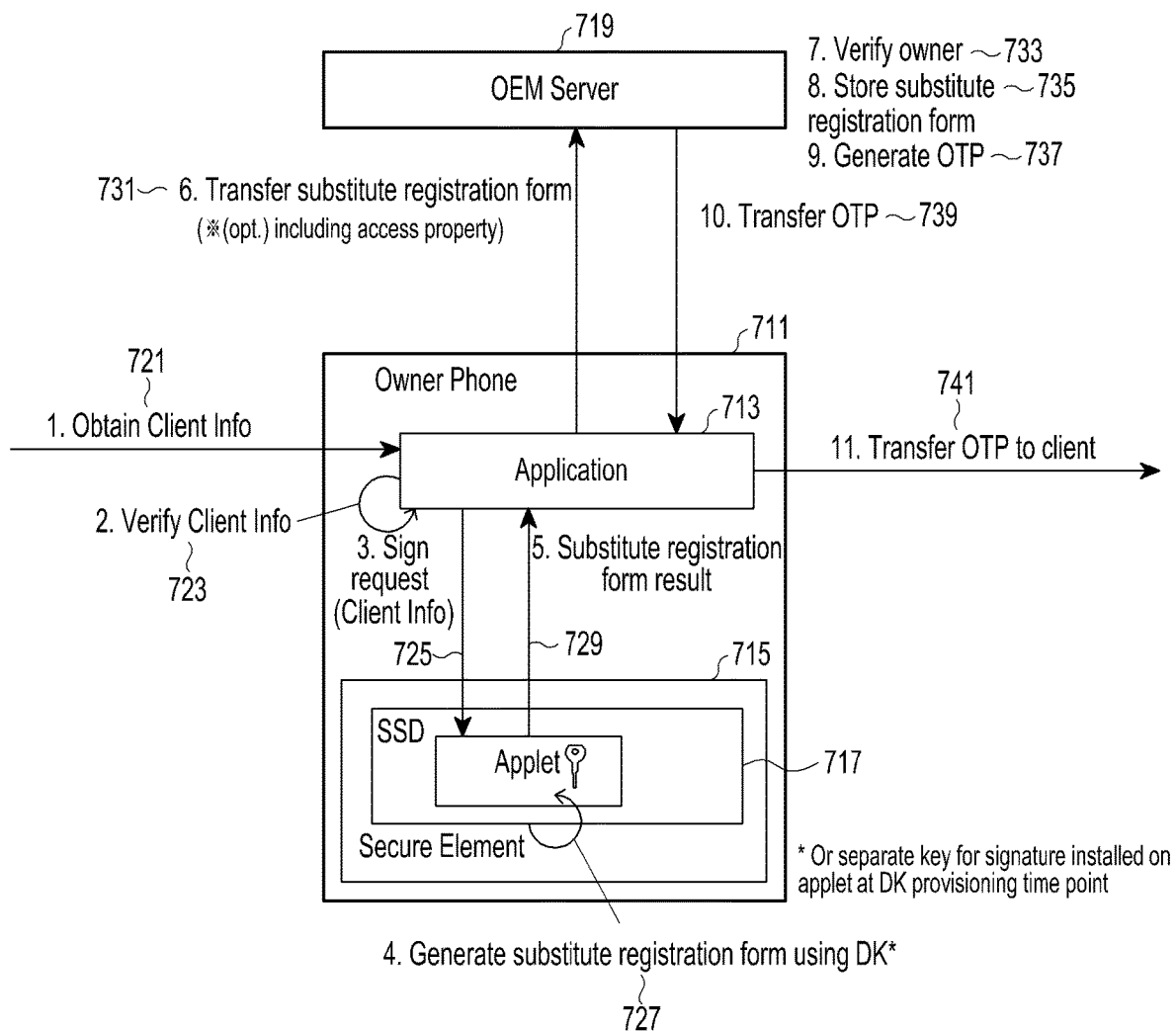
FIG. 7 illustrates an operating process of a primary device in a communication system according to an embodiment of the present disclosure.

FIG. 7 illustrates an operating process of a primary device in a communication system according to an embodiment of the present disclosure.

Referring to FIG. 7, it will be noted that a service provider is shown as "OEM Server", a primary device is shown as "Owner Phone", and a secondary device is shown as "Client". Further, it will be noted that FIG. 7 is shown as a form in which the terms "OEM Server", "Owner Phone", and "Client" are interchangeable with the terms "service provider", "primary device", and "secondary device". It will be noted that an operating process of a primary device in FIG. 7 is an operating process of a primary device in a case of sharing a digital key based on the primary device.

It will be noted that an operating process of a primary device in FIG. 7 is an operating process of a primary device according to a digital key providing process as described in FIG. 2.

An application 713 of a primary device 711 obtains secondary device information from a secondary device (721).

The application 713 of the primary device 711 verifies the secondary device information (723), and transmits a signature request to an applet of a supplementary security domain (SSD) 717 of the primary device 711 (725). The signature request may include the secondary device information.

The applet of the primary device 711 generates a substitutive registration form based on a DK (727). Alternatively, the applet may generate the substitutive registration form based on a separate key installed on the applet of the primary device 711, not the DK. The separate key is for a signature, and may be installed when a DK for the primary device 711 is provisioned.

The applet of the primary device 711 transmits the generated substitutive registration form to the application 713 of the primary device 711 (729).

The application 713 of the primary device 711 transmits the substitutive registration form received from the applet of the primary device 711 to the service provider 719 (731).

The application 713 of the primary device 711 may transmit an access property with the substitutive registration form to the service provider 719.

Upon receiving the substitutive registration form received from the application 713 of the primary device 711, the service provider 719 verifies the primary device 711 based on the substitutive registration form (733). If the verification result for primary device 711 is successful, the service provider 719 stores the substitutive registration form (735), and generates an OTP for the secondary device (737). The service provider 719 transmits the generated OTP to the application 713 of the primary device 711 (739). Upon receiving the OTP from the service provider 719, the application 713 of the primary device 711 transmits the received OTP to the secondary device (741).

Figure 8:
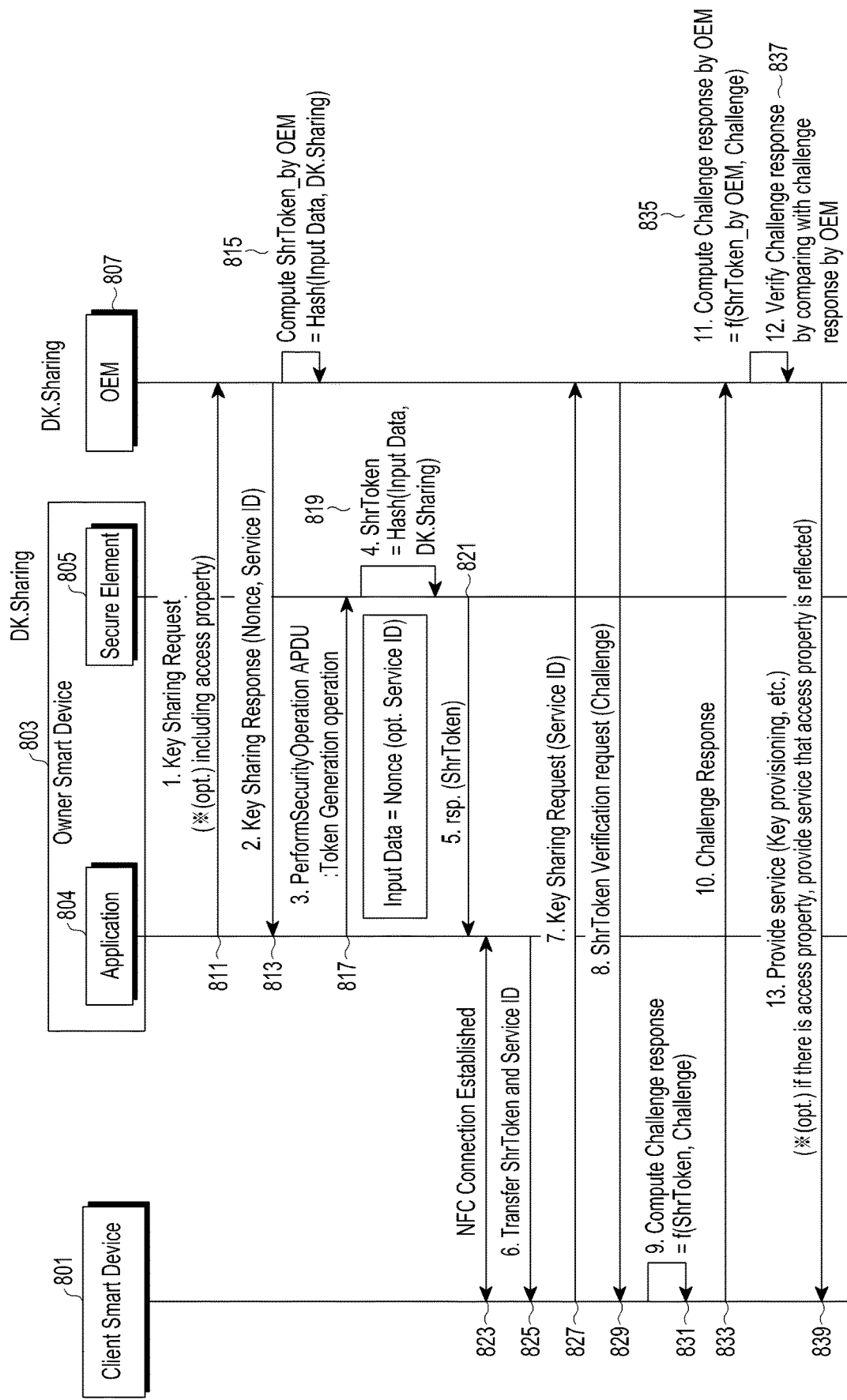
FIG. 8 is a signal flow diagram illustrating a process of providing a DK in a communication system according to an embodiment of the present disclosure.

FIG. 8 is a signal flow diagram illustrating a process of providing a DK in a communication system according to an embodiment of the present disclosure.

Referring to FIG. 8, it will be noted that a service provider is shown as "OEM", a primary device is shown as "Owner Smart Device", and a secondary device is shown as "Client Smart Device". Further, it will be noted that FIG. 8 is shown as a form in which the terms "OEM", "Owner Smart Device", and "Client Smart Device" are interchangeable with the terms "service provider", "primary device", and "secondary device".

An application 804 of a primary device 803 transmits a message for requesting a key sharing service to a service provider 807 (811) (1. Key Sharing Request (Owner ID), (opt.) access property). The message for requesting the key sharing service may include an ID such as an identifier of a primary device, e.g., an owner ID, and/or the like. The message for requesting the key sharing service may optionally include information such as an access property, and/or the like. The access property may include a key lifetime, an automatic driving distance, information related to an area where it is possible to drive a vehicle, e.g., Geo fencing, e.g., information indicating that it is possible to drive a vehicle at a specific area, a vehicle property, e.g., a maximum speed, and a vehicle use authority, e.g., door open, trunk open, start vehicle, the number of times a vehicle has been used, e.g., the number of times a door has been opened, the number of a trunk has been opened, etc.

The service provider 807 transmits a response to the key sharing request, a nonce, and a service ID to the application 804 of the primary device 803 (813) (2. Key Sharing Response (Nonce, Service ID)). The nonce may be used for preventing reuse of a token to be generated in the primary device 803.

The service ID may be used for matching service sync-up among the service provider 807, the primary device 803, and a secondary device 801, when the secondary device 801 requests key provisioning (i.e., "7" operation). The service provider 807 computes a sharing token, and the sharing token is computed based on input data and a shared DK (DK.Sharing) (e.g., Compute Shr. Token by OEM=Hash (Input Data, DK.sharing)).

The application 804 of the primary device 803 transmits, to a secure element 805 of the primary device 803, a PerformSecurityOperationAPDU command for commanding to perform a security operation. The security operation may be a token generating operation.

Upon receiving the PerformSecurityOperationAPDU command from the application 804 of the primary device 803, the secure element 805 of the primary device 803 generates a sharing token using a DK stored at the secure element 805 of the primary device 803 or a key which has authority equivalent to the DK (819). For example, the sharing token may be generated based on the DK, or the key which has the authority equivalent to the DK and the nonce provided from the service provider 807.

The secure element 805 of the primary device 803 transmits a response including the generated sharing token to the application 804 of the primary device 803(821). (3. Perform Security Operation APDU: Token Generation operation; 4. Shr. Token=Hash (Input Data, DK.sharing); 5. rsp. (Shr. Token))

Then, a communication environment which is based on a short-range communication scheme such as NFC, Bluetooth (BT), etc., is established between the secondary device 801 and the primary device 803. In FIG. 8, it will be assumed that a communication environment which is based on the NFC scheme is established between the secondary device 801 and the primary device 803. That is, in FIG. 8, it will be assumed that an NFC connection is established between the secondary device 801 and the primary device 803 (NFC connection Established). So, it will be assumed that a secure channel is generated between the secondary device 801 and the primary device 803.

The primary device 804 transfers the sharing token and the service ID to the application of the secondary device 801 (825) (6. Transfer ShrToken and Service ID).

The secondary device 801 requests DK sharing from the service provider 807 (827) (7. Key Sharing Request (Service ID)). The DK sharing request may include a service ID, from which the service provider 807 may recognize that the secondary device 801 has been connected to which primary device.

The service provider 807 transmits, to the secondary device 801, a sharing token verification request requesting to verify the sharing token (829) (8. ShrToken Verification request (Challenge)). Here, the sharing token verification request may include a challenge.

The service provider 807 requests to verify the sharing token in order to check whether the secondary device 801 has the sharing token generated by the primary device 803.

Upon receiving the sharing token verification request from the service provider 807, the secondary device 801 computes challenge response (831), and transmits the computed challenge response to the service provider 807 (833) (9. Compute Challenge response=f (ShrToken, Challenge); 10. Challenge Response). The challenge response may be generated based on the sharing token (provided by the primary device 803) and the challenge (provided by the service provider 807).

The service provider 807 computes a sharing token (nonce+DK) based on the values, and computes challenge response (sharing token+challenge) (835) (11. Compute Challenge response by OEM=f (ShrToken_by OEM, Challenge). The service provider 807 verifies the challenge response received from the secondary device 801 (837) (12. Verify Challenge response by comparing with challenge response by OEM).

The service provider 807 knows a value of nonce and a value of challenge, and may know a DK used by the primary device 803 through an owner ID.

So, the service provider 807 computes a sharing token (nonce+digital key) based on the values, and computes challenge response (sharing token+challenge) (835).

The service provider 807 verifies the secondary device 801 based on whether the challenge response transmitted from the secondary device 801 is identical to the challenge response computed by the service provider 807 (837).

For example, a sharing token computation function and a challenge response computation function may be synchronized or predetermined among the service provider 807, the primary device 803, and the secondary device 801.

If the verification result for the secondary device 801 is successful, the service provider 807 provisions a DK to the secondary device 801 (839) (13. Provide a service (key provisioning, and/or the like), (opt) if there is an access property, provides a service on which the access property is reflected).

Here, if access property is set at "1" operation, the service provider 807 provisions a DK on which a characteristic corresponding to the set access property is reflected.

Meanwhile, the DK and the access property may be stored at different devices or different areas within a device. For example, the DK may be stored at an SE, and the access property may be stored at a separate device or area, such as a TEE, and/or the like.

It will be noted that a digital key providing process in FIG. 8 is a digital key providing process in a case of sharing a digital key which based on a secondary device.

It will be noted that a digital key providing process in FIG. 8 is a signal transmitting/receiving operation among a service provider, a primary device, and a secondary device according to a digital key providing process as described in FIG. 3.

Although FIG. 8 illustrates a process of providing a DK in a series of operations, various operations in FIG. 8 could overlap, occur in parallel, occur in a different order, or occur multiple times.

Figure 9A:
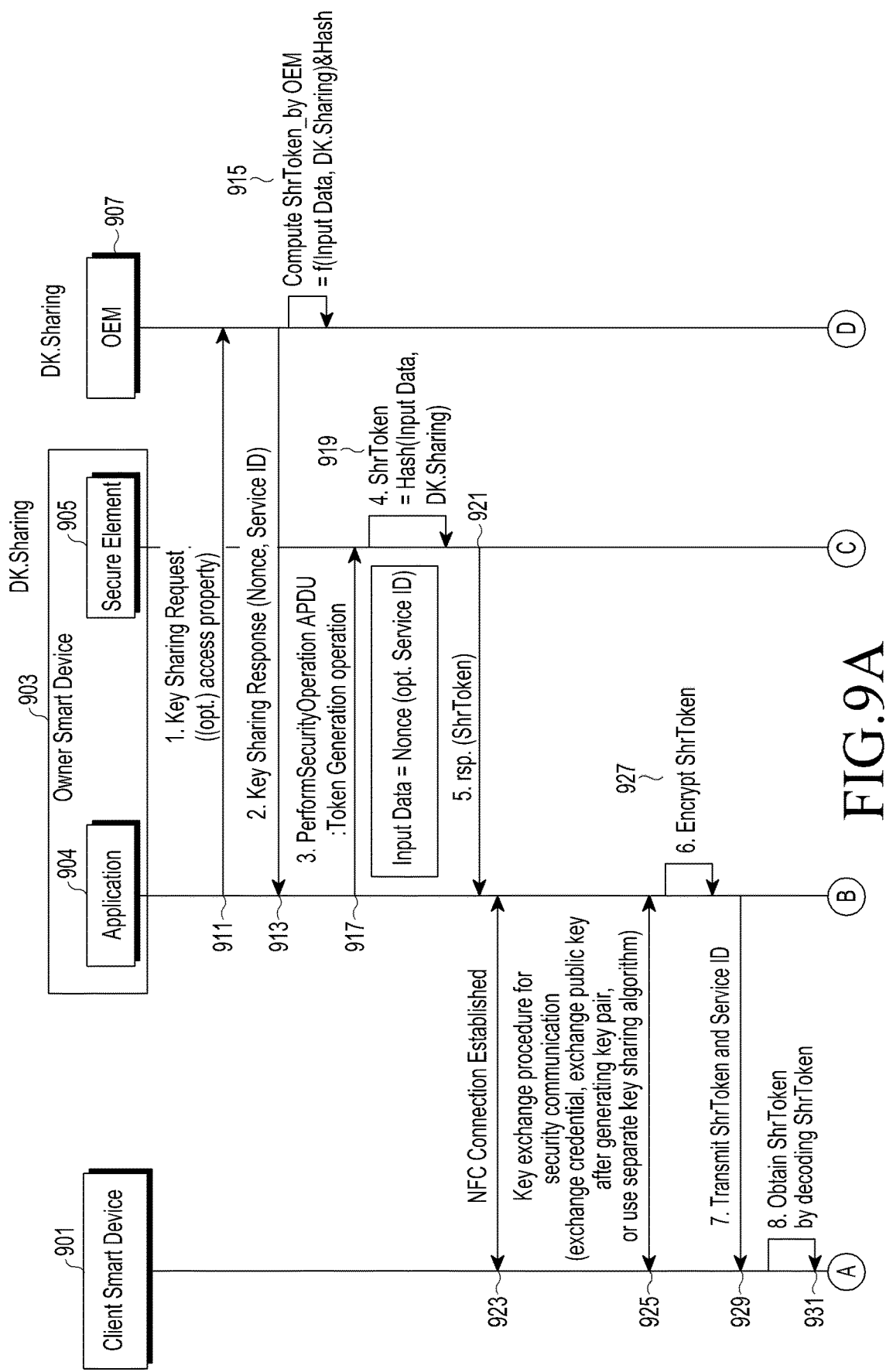
FIGS. 9A and 9B are signal flow diagrams illustrating a process of providing a DK in a communication system according to an embodiment of the present disclosure.
Figure 9B:
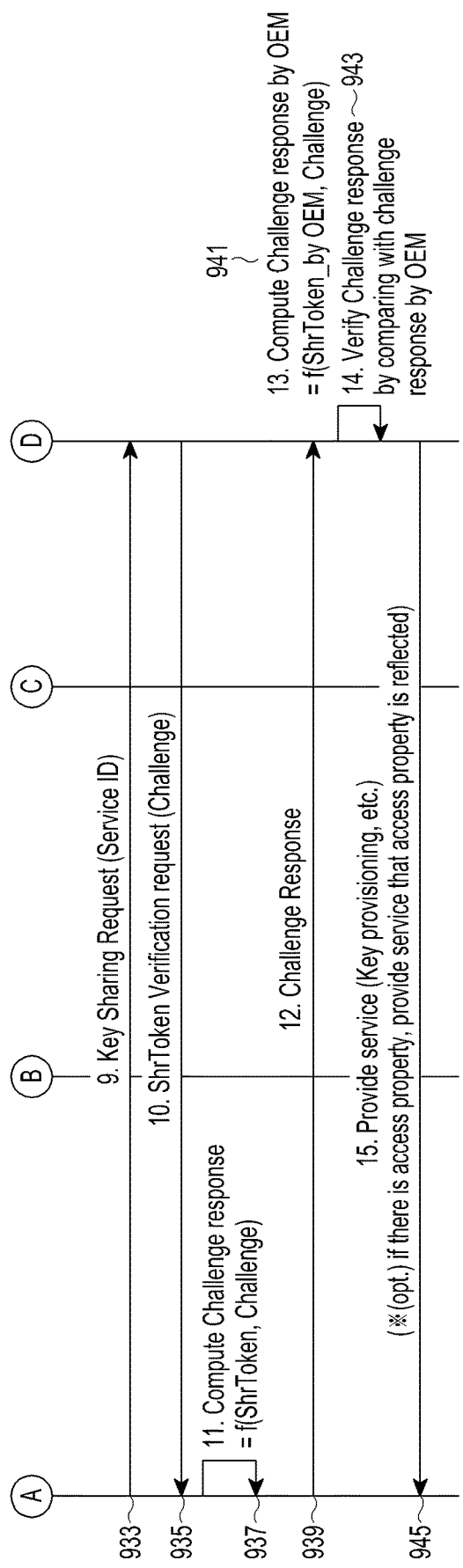

FIGS. 9A and 9B are signal flow diagrams illustrating a process of providing a DK in a communication system according to an embodiment of the present disclosure.

Referring to FIGS. 9A and 9B, it will be noted that a service provider is shown as "OEM", a primary device is shown as "Owner Smart Device", and a secondary device is shown as "Client Smart Device". Further, it will be noted that FIGS. 9A and 9B are shown as a form in which the terms "OEM", "Owner Smart Device", and "Client Smart Device" are interchangeable with the terms "service provider", "primary device", and "secondary device".

It will be noted that a process of providing a digital key in FIGS. 9A and 9B is a process of sharing a digital key based on a secondary device.

It will be noted that a process of providing a digital key in FIGS. 9A and 9B is a digital key providing process in which security between a primary device and a secondary device is enhanced.

It will be noted that a process of providing a digital key in FIGS. 9A and 9B is a signal transmitting/receiving operation among a service provider, a primary device, and a secondary device according to a digital key providing process as described in FIG. 3.

An application 904 of a primary device 903 transmits a message requesting a key sharing service to a service provider 907 (911) (1. Key sharing request (Owner ID), (opt.) access property). The message requesting the key sharing service may include an ID, such as an identifier of a primary device, i.e., an owner ID, and/or the like. The message for requesting the key sharing service may optionally include information such as an access property, and/or the like.

Here, the access property may include key life time, an automatic driving distance, information related to an area where it is possible to drive a vehicle, e.g., Geo fencing, e.g., information indicating that it is possible to drive a vehicle at a specific area, a vehicle property, e.g., a maximum speed, and/or the like, and a vehicle use authority, e.g., door open, trunk open, start vehicle, and/or the like.

The service provider 907 transmits a response to the key sharing request, a nonce, and a service ID to the application 904 of the primary device 903 (913) (2. Key Sharing Response (Nonce, Service ID)). The nonce may be used for preventing reuse of a token to be generated in the primary device 903. The service ID may be used for matching service sync-up among the service provider 907, the primary device 903, and a secondary device 901, when the secondary device 901 requests key provisioning (i.e., "7" operation).

The service provider 907 computes a sharing token, and the sharing token is computed based on input data and a shared DK (DK.Sharing as shown in FIG. 9) (915)(Compute Shr. Token by OEM=f(Input Data, DK.sharing) & Hash).

The application 904 of the primary device 903 transmits, to a secure element 905 of the primary device 903, a PerformSecurityOperationAPDU command for commanding to perform a security operation (917). The security operation may be a token generating operation.

Upon receiving the PerformSecurityOperationAPDU command from the application 904 of the primary device 903, the secure element 905 of the primary device 903 generates a sharing token using a DK stored at the secure element 905 of the primary device 903 or a key which has authority equivalent to the DK (919). The sharing token may be generated based on the DK, or the key which has the authority equivalent to the DK and the nonce provided from the service provider 907.

The secure element 905 of the primary device 903 transmits a response including the generated sharing token to the application 904 of the primary device 903(921). (3. Perform Security Operation APDU: Token Generation operation; 4. Shr. Token=Hash (Input Data, DK.sharing); 5. rsp. (Shr. Token))

Then, a communication environment which is based on a short-range communication scheme such as NFC, Bluetooth, and/or the like is established between the secondary device 901 and the primary device 903 (923). In FIGS. 9A and 9B, it will be assumed that a communication environment which is based on the NFC scheme is established between the secondary device 901 and the primary device 903. That is, in FIGS. 9A and 9B, it will be assumed that an NFC connection is established between the secondary device 901 and the primary device 903 (NFC connection Established). So, it will be assumed that a secure channel is generated between the secondary device 901 and the primary device 903.

A key exchange procedure for security communication is performed between the secondary device 901 and the application 904 of the primary device 903 (925). The key exchange procedure for the security communication may include a credential exchange procedure, a PK exchange procedure, a key exchange procedure which is based on a key sharing algorithm, and/or the like. The application 904 of the primary device 903 encrypts the sharing token (927). The application 904 of the primary device 903, and transmits the encrypted sharing token and the service ID to the secondary device 901 (929) (7. Transmit ShrToken and Service ID).

Upon receiving the sharing token and the service ID from the application 904 of the primary device 903, the secondary device 901 obtains a sharing token by decoding the encrypted sharing token (931).

The secondary device 901 requests DK sharing from the service provider 907 (933) (9. Key Sharing Request (Service ID)).

The service provider 907 may recognize that the secondary device 901 has been connected to which primary device, and/or the like through the service ID.

The service provider 907 transmits, to the secondary device 901, a sharing token verification request requesting to verify the sharing token (935) (10. ShrToken Verification request (Challenge)). Here, the sharing token verification request may include challenge.

The service provider 907 requests to verify the sharing token in order to check whether the secondary device 901 has the sharing token generated by the primary device 903.

Upon receiving the sharing token verification request from the service provider 907, the secondary device 901 computes challenge response (937), and transmits the computed challenge response to the service provider 907 (939) (11. Compute Challenge response=f (ShrToken, Challenge); 12. Challenge Response). The challenge response may be generated based on the sharing token (provided by the primary device 903) and the challenge (provided by the service provider 907).

The service provider 907 knows a value of nonce and a value of challenge, and may know which DK that the primary device 903 uses through an owner ID.

The service provider 907 computes a sharing token (nonce+DK) based on the values (941), and computes challenge response (sharing token+challenge) (943). The service provider 907 verifies the challenge response received from the secondary device 901 (941 and 943) (13. Compute Challenge response by OEM=f (ShrToken_by OEM, Challenge); 14. Verify Challenge response by comparing with challenge response by OEM).

The service provider 907 knows a value of nonce and a value of challenge, and may know that the primary device 903 uses which digital key through an owner ID.

So, the service provider 907 computes a sharing token (nonce+digital key) based on the values, and computes challenge response (sharing token+challenge) (941).

The service provider 907 verifies the secondary device 901 based on whether the challenge response transmitted from the secondary device 901 is identical to the challenge response computed by the service provider 907 (943).

For example, a sharing token computation function and a challenge response computation function may be synchronized or predetermined among the service provider 907, the primary device 903, and the secondary device 901.

If the verification result for the secondary device 901 is successful, the service provider 907 provisions a DK to the secondary device 901 (945) (15. Provide a service (key provisioning, and/or the like), (opt) if there is an access property, provides a service on which the access property is reflected).

Here, if access property is set at "1" operation, the service provider 907 provisions a DK on which a characteristic corresponding to the set access property is reflected.

The DK and the access property may be stored at different devices or different areas within a device. For example, the DK may be stored at an SE, and the access property may be stored at a separate device or area, such as a TEE.

Although FIGS. 9A and 9B illustrate a process of providing a DK as a series of operations, various operations in FIGS. 9A and 9B could overlap, occur in parallel, occur in a different order, or occur multiple times.

Figure 10A:
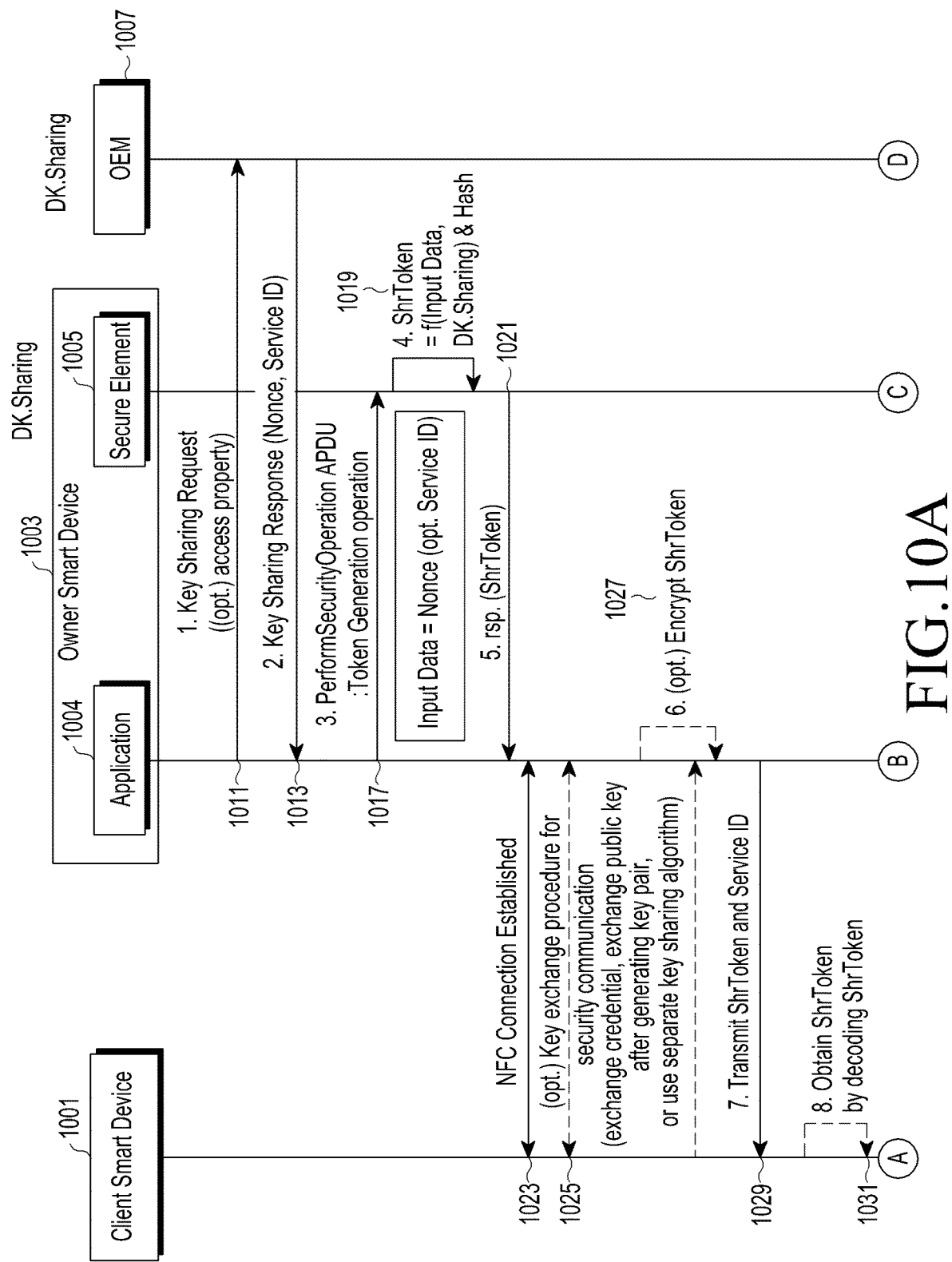
FIGS. 10A and 10B are signal flow diagrams illustrating a process of providing a DK in a communication system according to an embodiment of the present disclosure.
Figure 10B:
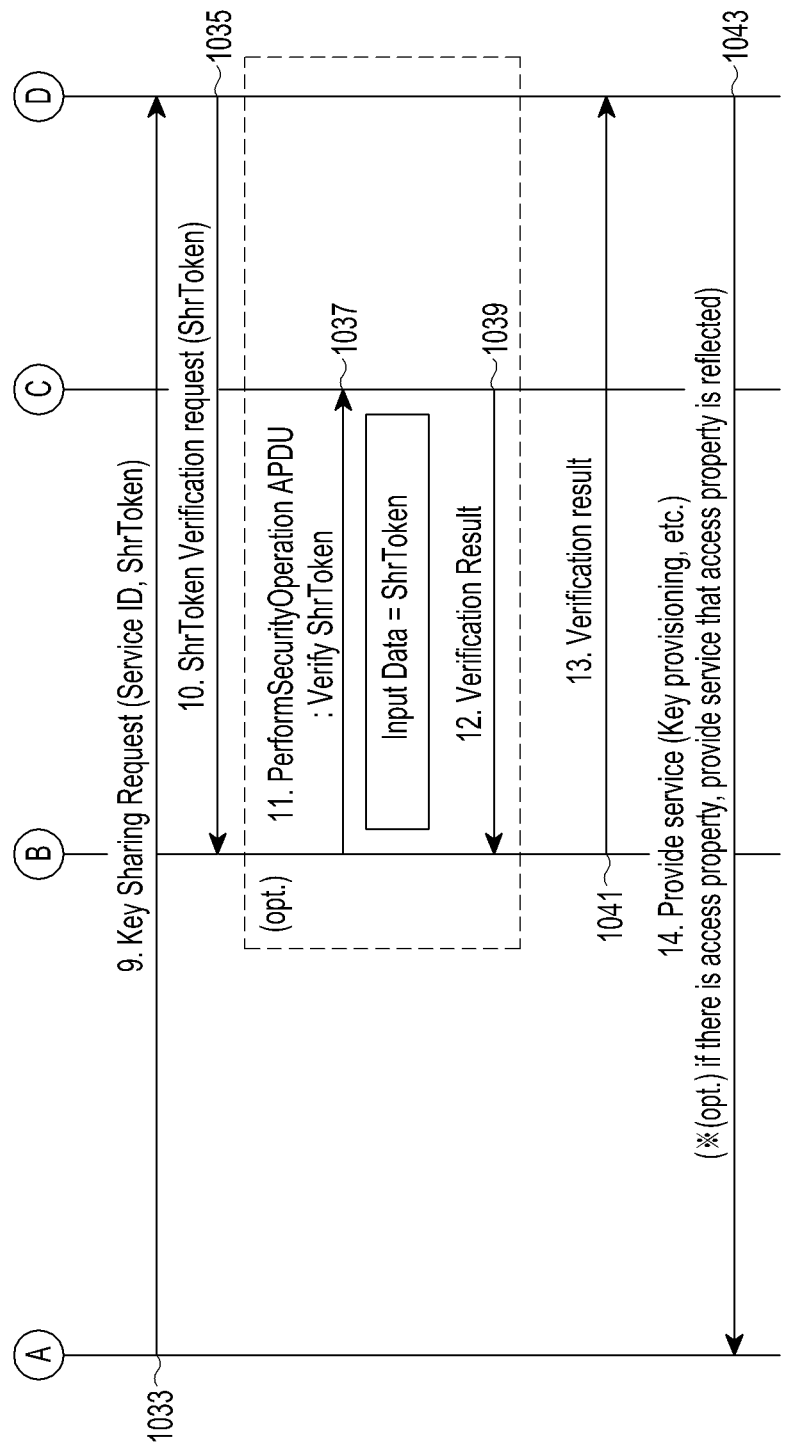

FIGS. 10A and 10B are signal flow diagrams illustrating a process of providing a DK in a communication system according to an embodiment of the present disclosure.

Referring to FIGS. 10A and 10B, it will be noted that a service provider is shown as "OEM", a primary device is shown as "Owner Smart Device", and a secondary device is shown as "Client Smart Device". Further, it will be noted that FIGS. 10A and 10B are shown as a form in which the terms "OEM", "Owner Smart Device", and "Client Smart Device" are interchangeable with the terms "service provider", "primary device", and "secondary device".

It will be noted that a process of providing a digital key in FIGS. 10A and 10B is a process of sharing a digital key based on a secondary device.

It will be noted that a process of providing a digital key in FIGS. 10A and 10B is a digital key providing process to which a reconfirmation procedure through a primary device is added.

It will be noted that a process of providing a digital key in FIGS. 10A and 10B is a signal transmitting/receiving operation among a service provider, a primary device, and a secondary device according to a digital key providing process as described in FIG. 3.

An application 1004 of a primary device 1003 transmits a message for requesting a key sharing service to a service provider 1007 (1011) (1. Key Sharing Request (Owner ID), (opt.) access property). The message requesting the key sharing service may include an ID, such as an identifier of a primary device, i.e., an owner ID, and/or the like. The message for requesting the key sharing service may optionally include information such as an access property, and/or the like.

Here, the access property may include key life time, an automatic driving distance, information related to an area where it is possible to drive a vehicle, e.g., Geo fencing, e.g., information indicating that it is possible to drive a vehicle at a specific area, a vehicle property, e.g., a maximum speed, and/or the like, and a vehicle use authority, e.g., door open, trunk open, start vehicle, and/or the like.

The service provider 1007 transmits a response to the key sharing request, a nonce, and a service ID to the application 1004 of the primary device 1003 (1013) (2. Key Sharing Response (Nonce, Service ID)). The nonce may be used for preventing reuse of a token to be generated in the primary device 1003. The service ID may be used for matching service sync-up among the service provider 1007, the primary device 1003, and a secondary device 1001 when the secondary device 1001 requests key provisioning (i.e., "7" operation).

The application 1004 of the primary device 1003 transmits, to a secure element 1005 of the primary device 1003, a PerformSecurityOperationAPDU command for commanding to perform a security operation (1017). The security operation may include a token generating operation.

Upon receiving the PerformSecurityOperationAPDU command from the application 1004 of the primary device 1003, the secure element 1005 of the primary device 1003 generates a sharing token using a DK stored at the secure element 1005 of the primary device 1003 or a key that has authority equivalent to the DK (1019). The sharing token may be generated based on the DK, or the key which has the authority equivalent to the DK and the nonce provided from the service provider 1007.

The secure element 1005 of the primary device 1003 transmits a response including the generated sharing token to the application 1004 of the primary device 1003 (1021). (3. Perform Security Operation APDU: Token Generation operation; 4. Shr. Token=f (Input Data, DK.sharing) & Hash; 5. rsp. (Shr. Token))

Then, a communication environment which is based on a short-range communication scheme such as NFC, Bluetooth, and/or the like is established between the secondary device 1001 and the primary device 1003 (1023). In FIGS. 10A and 10B, it will be assumed that a communication environment which is based on the NFC scheme is established between the secondary device 1001 and the primary device 1003. That is, in FIGS. 10A and 10B, it will be assumed that an NFC connection is established between the secondary device 1001 and the primary device 1003 (NFC connection Established). That is, a secure channel is generated between the secondary device 1001 and the primary device 1003.

A key exchange procedure for a security communication is performed between the secondary device 1001 and the application 1004 of the primary device 1003 (1025). The key exchange procedure for the security communication may include a credential exchange procedure, a PK exchange procedure, a key exchange procedure based on a key sharing algorithm, etc. The key exchange procedure for the security communication may be optionally performed.

The application 1004 of the primary device 1003 encrypts the sharing token (1027). Here, the encryption of the sharing token may also be optionally performed.

The application 1004 of the primary device 1003 transmits the encrypted sharing token and the service ID to the secondary device 1001 (1029) (7. Transmit ShrToken and Service ID).

Upon receiving the sharing token and the service ID from the application 1004 of the primary device 1003, the secondary device 1001 obtains a sharing token by decoding the encrypted sharing token (1031). Here, the operation of decoding the encrypted sharing token may be optionally performed.

The secondary device 1001 requests digital key sharing from the service provider 1007 (1033) (9. Key Sharing Request (Service ID and Sharing Token)).

The service provider 1007 may recognize that the secondary device 1001 has been connected to which primary device, and/or the like through the service ID.

The service provider 1007 transmits, to the application 1004 of the primary device 1003, a sharing token verification request requesting to verify the sharing token (1035) (10. ShrToken Verification request (ShrToken)). Here, the sharing token verification request includes the sharing token.

Upon receiving the sharing token verification request from the service provider 1007, the application 1004 of the primary device 1003 transmits, to a secure element 1005 of the primary device 1003, an APDU command (e.g., a PerformSecurityOperationAPDU command) for commanding to perform a security operation (1037). Here, the PerformSecurityOperationAPDU command is an APDU command for requests to verify a sharing token.

Upon receiving the PerformSecurityOperationAPDU command from the application 1004 of the primary device 1003, the secure element 1005 of the primary device 1003 performs a verification operation on the sharing token, and transmits a verification result including the result thereof to the application 1004 of the primary device 1003 (1039). Here, the operation of transmitted the PerformSecurityOperationAPDU command and the operation of transmitted the verification result may be optionally performed.

The application 1004 of the primary device 1003 transmits the verification result of the sharing token to the service provider 1007 (1041).

If the verification result for the secondary device 1001 is successful, the service provider 1007 provisions a DK to the secondary device 1001 (1043) (15. Provide a service (key provisioning, and/or the like), (opt) if there is an access property, provides a service on which the access property is reflected). Here, if the access property is set at "1" operation, the service provider 1007 provisions a DK on which a characteristic corresponding to the set access property is reflected.

The DK and the access property may be stored at different devices or different areas within a device. For example, the DK may be stored at an SE, and the access property may be stored at a separate device or area, such as a TEE.

Although FIGS. 10A and 10B illustrate a process of providing a DK as a series of operations, various operations in FIGS. 10A and 10B could overlap, occur in parallel, occur in a different order, or occur multiple times.

Figure 11:
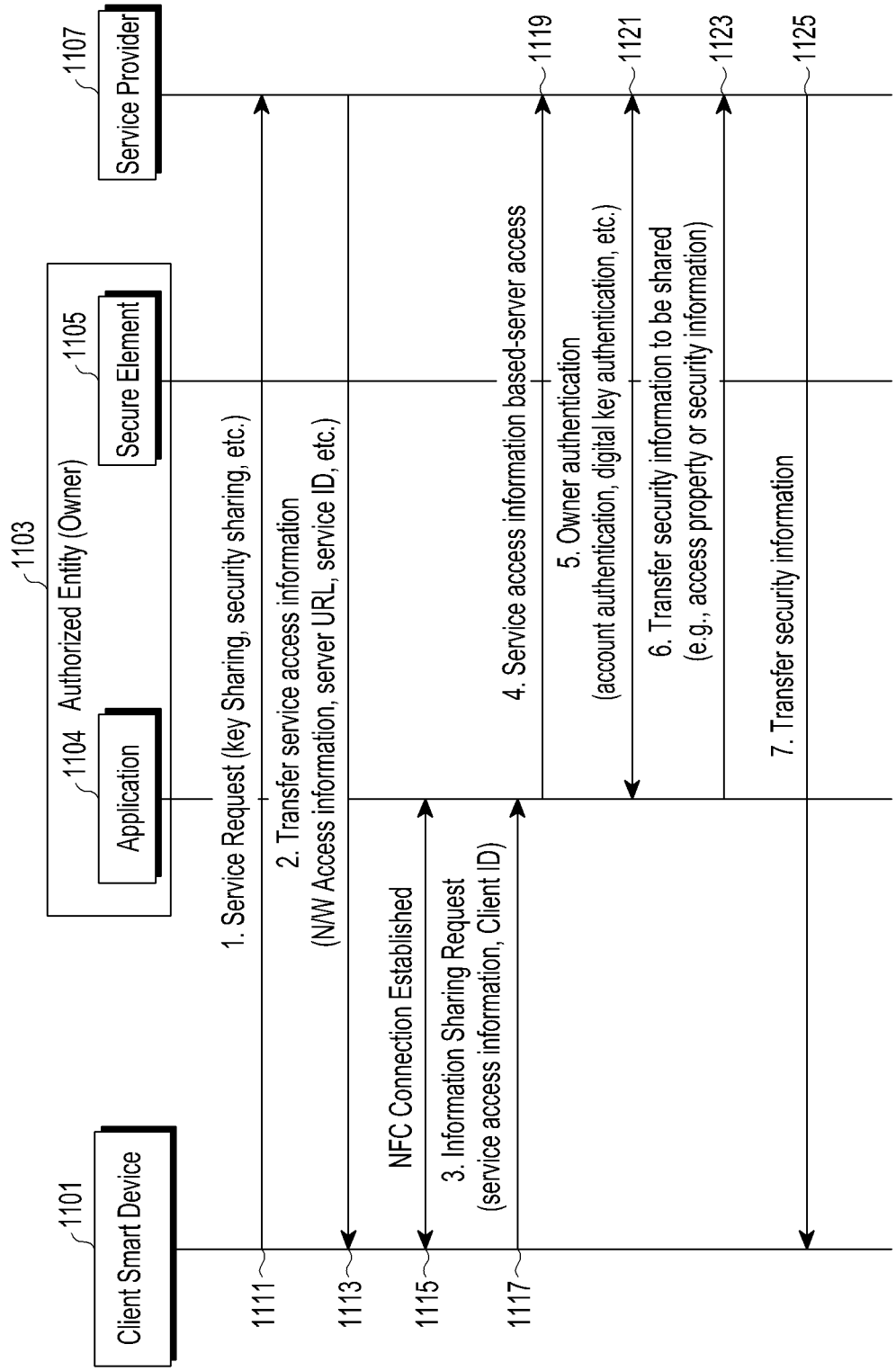
FIG. 11 is a signal flow diagram illustrating a process of providing a DK in a communication system according to an embodiment of the present disclosure.

FIG. 11 schematically illustrates a process of providing a DK in a communication system according to still another embodiment of the present disclosure.

Referring to FIG. 11, it will be noted that a service provider is shown as "Service Provider", a primary device is shown as "Authorized Entity (Owner)", and a secondary device is shown as "Client Smart Device". Further, it will be noted that FIG. 11 is shown as a form in which the terms "Service Provider", "Authorized Entity (Owner)", and "Client Smart Device" are interchangeable with the terms "service provider", "primary device", and "secondary device".

A secondary device 1101 requests a service from a service provider 1107 (1111) (1. Service Request (key Sharing, security sharing, etc.)). Here, kinds of the service will be described below.

The kinds of the service may include services such as (1) a service which receives main information of other device, such as key sharing, and/or the like, for example, a service which receives main information for sharing a key in various embodiments of the present disclosure, (2) a service that uses a service to which the secondary device does not directly subscribe under permission of the primary device 1103, and (3) a service that wants to securely receive main information of the primary device 1103, e.g., a credential, an ID, a password (PW), etc., through the service provider.

The service provider 1107 transfers secure service access information to the secondary device 1101 (1113) (2. Transfer service access information (N/W Access information, server URL, service ID, etc.)). Here, the service access information may include N/W access information that is temporaly usable, a service related-service URL, a service ID, etc.

The service provider 1107 may perform an operation of performing a check, such as whether rooting is made on the secondary device 1101, whether an application is a trusted application, etc., in advance.

When an NFC connection is established between the primary device 1103 and the secondary device 1101 (NFC Connection Established), the secondary device 1101 requests service permission (e.g., key sharing, information sharing, log-in permission, etc.) from the primary device 1103 (1117) (3. Information Sharing Request (service access information, Client ID)).

The secondary device 1101 may transmit the service access information received from the service provider 1107. That is, the secondary device 1101 may transmit service permission request including service access information and an ID of the secondary device 1101, i.e., a client ID.

The primary device 1103 accesses the service provider 1107 based on the service access information received from the secondary device 1101 (1119) (4. Service access information based-server access)

A procedure for authenticating the primary device 1103 is performed between the primary device 1103 and the service provider 1107. That is, the service provider 1107 verifies the primary device 1103 in order to verifying whether the service provider 1107 may permit the service (1121) (5. Owner authentication (account authentication, digital key authentication, etc.). For example, the service provider 1107 may verify the primary device 1103 by checking whether a DK is stored at the primary device 1103. This is possible in a case of assuming that the service provider 1107 and the primary device 1103 share the DK.

Alternatively, the service provider 1107 may verify the primary device 1103 by checking whether the primary device 1103 is a user who has subscribed to, or registered at the service of the service provider 1107. This is possible in a case of assuming that information is transmitted and the service is permitted.

The service provider 1107 and the primary device 1103 may additionally perform an operation of requiring consent of a user of the primary device 1103, such as an operation of inputting confirmation button by a user, an operation of authenticating a fingerprint, etc.

If there is information to be shared with the secondary device 1101, the primary device 1103 transmits the information to the service provider 1107 (1123) (6. Transfer security information to be shared (e.g., access property or security information)). The service provider 1107 provides the information and service which the secondary device 1101 requests and the primary device 1103 confirms to the secondary device 1101 (1125) (7. Transfer security information)

Case 1: If main information, such as a credential, is stored at the primary device 1103, the primary device 1103 uploads the main information to the service provider 1107.

Case 2: When DK sharing, the primary device 1103 transmits a key ID, key property, etc., to the service provider 1107, which provisions a DK corresponding to a criterion to the secondary device 1101.

Case 3. If the service provider 1107 only has to provide a specific service, e.g., a music listening service, and/or the like, the operation "6" may be omitted, and a service is provided immediately after authentication for the secondary device 1101 as described in the operation "5".

It will be noted that a digital key providing process in FIG. 11 is a signal transmitting/receiving operation between a service provider, a primary device, and a secondary device according to a digital key providing process as described in FIG. 4.

The information for identifying a secondary device, such as a phone number, an IMEI, an SE ID, etc., is unique, but anyone may generate and obtain it. Accordingly, even though a primary device receives secondary device identification information of the secondary device, there is no comparison target for the secondary device identification information, so it may be difficult to verify the secondary device identification information.

Therefore, in accordance with an embodiment of the present disclosure, GPS information of a primary device is compared with GPS information of a secondary device. The GPS information of the primary device and the GPS information of the secondary device are verified, and the secondary device is authenticated based on a simultaneity between the primary device and the secondary device, e.g., a simultaneity such as time and location.

Further, secondary device IDs are obtained through two different paths, and the secondary device IDs obtained through the two different paths are compared, so verification for the secondary device may be enhanced.

Figure 12:
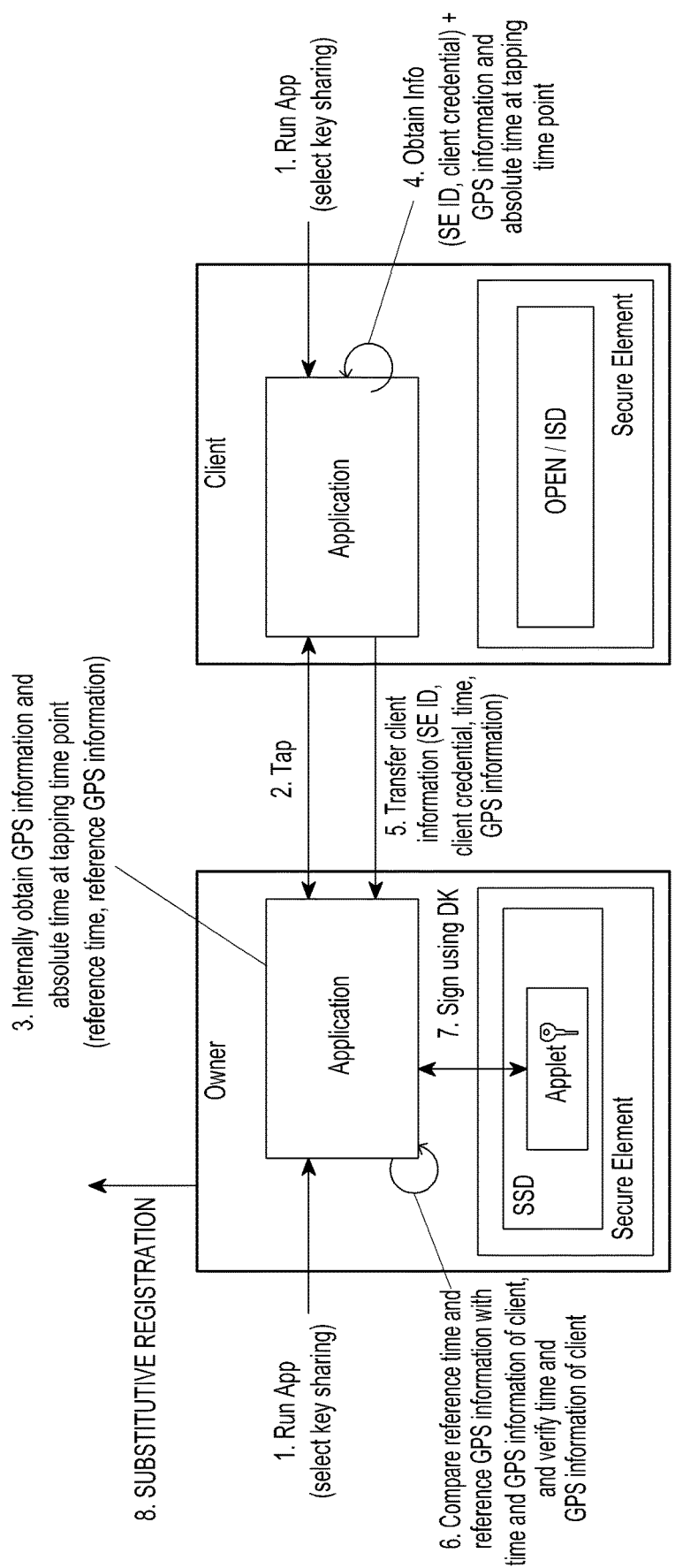
FIG. 12 illustrates a process of verifying a location of a secondary device in a communication system according to an embodiment of the present disclosure.

FIG. 12 illustrates a process of verifying a location of a secondary device in a communication system according to an embodiment of the present disclosure.

In verifying a location of a secondary device in FIG. 12, additional information, such as GPS information, a time stamp, etc., as well as a secondary device are registered during a DK sharing process, a primary device and the secondary device check whether the primary device and the secondary device exist in the same area and share a DK, so it is possible to provide a DK sharing service that is more robust against a security attack, such as man in the middle attack, etc.

Referring to FIG. 12, when a primary device and a secondary device select a key sharing service (1. Run App (select key sharing)), a tap procedure is performed (2. Tap), and the primary device internally obtains GPS information and absolute time at a tapping time point (3. Internally obtain GPS information and absolute time at tapping time point (reference time, reference GPS information))

The secondary device obtains user information of the secondary device, and absolute time and GPS information of the tapping time point (4. Obtain Info (SE ID, client credential)+GPS information and absolute time at tapping time point). The secondary device transmits the user information of the secondary device to the primary device, and the absolute time and GPS information are transmitted together (5. Transfer client information (SE ID, client credential, time, GPS information)).

The primary device compares the reference time and reference GPS information of the primary device with the time and GPS information received from the secondary device (6. Compare reference time and reference GPS information with time and GPS information of client, and verify time and GPS information of client). If the secondary device and the primary device exist in the same area, the primary device signs the user information of the primary device using a DK of the primary device (7. Sign using DK), and registers the signed user information at a service provider (8. Substitutive Registration).

Figure 13:
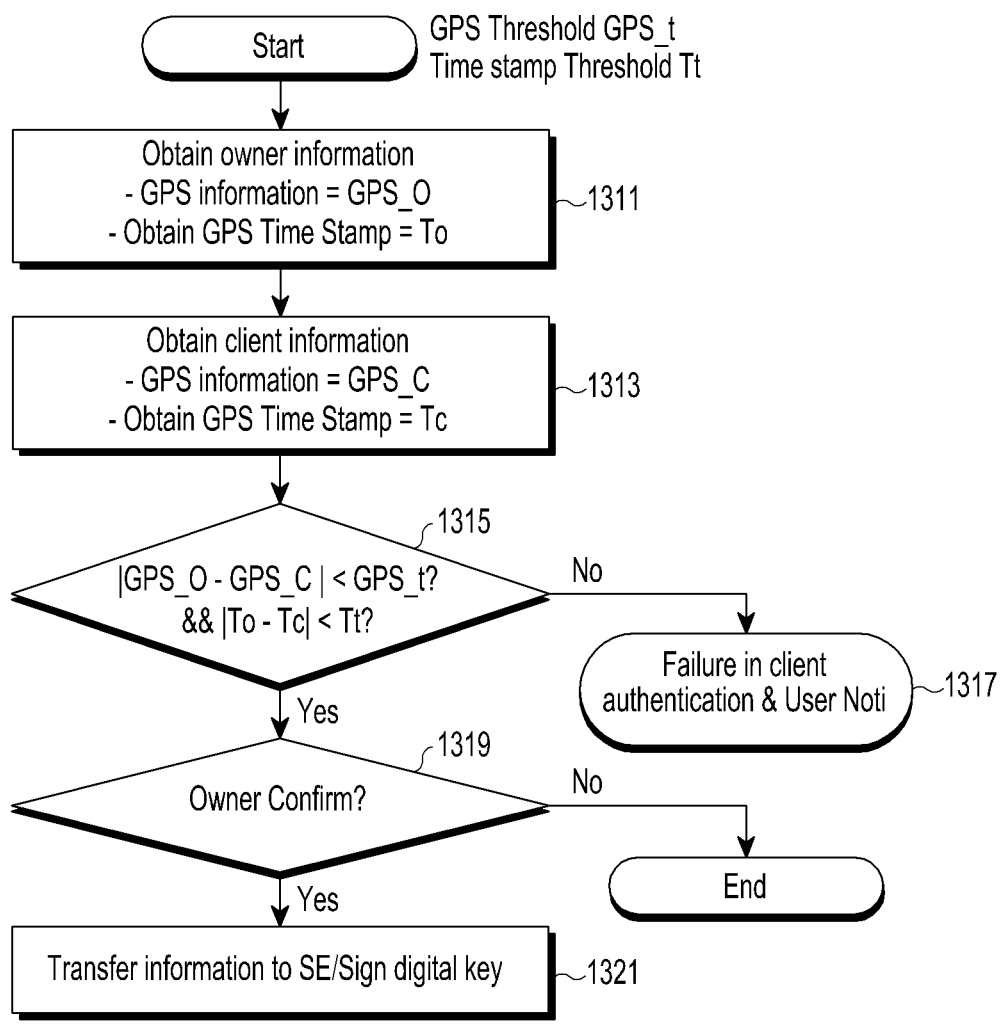
FIG. 13 is a flowchart illustrating an operating process of a primary device in a communication system according to an embodiment of the present disclosure.

FIG. 13 is a flowchart illustrating an operating process of a primary device in a communication system according to an embodiment of the present disclosure.

Referring to FIG. 13, it will be noted that a primary device is shown as "Owner", a secondary device is shown as "Client", and absolute time of a time point when tapping is performed is shown as "Time Stamp". Further, it will be noted that FIG. 13 is shown as a form in which the terms "Owner" and "Client" are interchangeable with the terms "primary device" and "secondary device". In FIG. 13, an operation of verifying GPS information and a time stamp may be performed, e.g., at an owner pre-confirmation operation in a secondary device registration process performed in a DK providing process.

The primary device obtains information of the primary device, e.g., GPS information and a GPS time stamp at operation 1311, and proceeds to operation 1313. Here, it will be assumed that the GPS information of the primary device is "GPS_O", and the GPS time stamp of the primary device is "To". The primary device obtains information of a secondary device, e.g., GPS information and a GPS time stamp at operation 1313, and proceeds to operation 1315. Here, it will be assumed that the GPS information of the secondary device is "GPS_C", and the GPS time stamp of the primary device is "Tc".

The primary device determines whether a difference between the GPS information of the primary device and the GPS information of the secondary device is less than a threshold difference value, e.g., GSP_t, and whether a difference between the GPS time stamp of the primary device and the GPS time stamp of the secondary device is less than another threshold difference value, e.g., Tt at operation 1315.

If the difference between the GPS information of the primary device and the GPS information of the secondary device is not less than GSP_t or the difference between the GPS time stamp of the primary device and the GPS time stamp of the secondary device is not less than Tt, the primary device proceeds to operation 1317. The primary device determines that authentication for the secondary device has failed at operation 1317.

However, if the difference between the GPS information of the primary device and the GPS information of the secondary device is less than GSP_t, and the difference between the GPS time stamp of the primary device and the GPS time stamp of the secondary device is less than Tt, the primary device proceeds to operation 1319. The primary device determines whether the primary device confirmation was performed at operation 1319.

If the primary device confirmation was performed, the primary device proceeds to operation 1321. The primary device transfers the information of the secondary device to a secure element, and signs the information of the secondary device using a DK to operation 1321.

Figure 14:
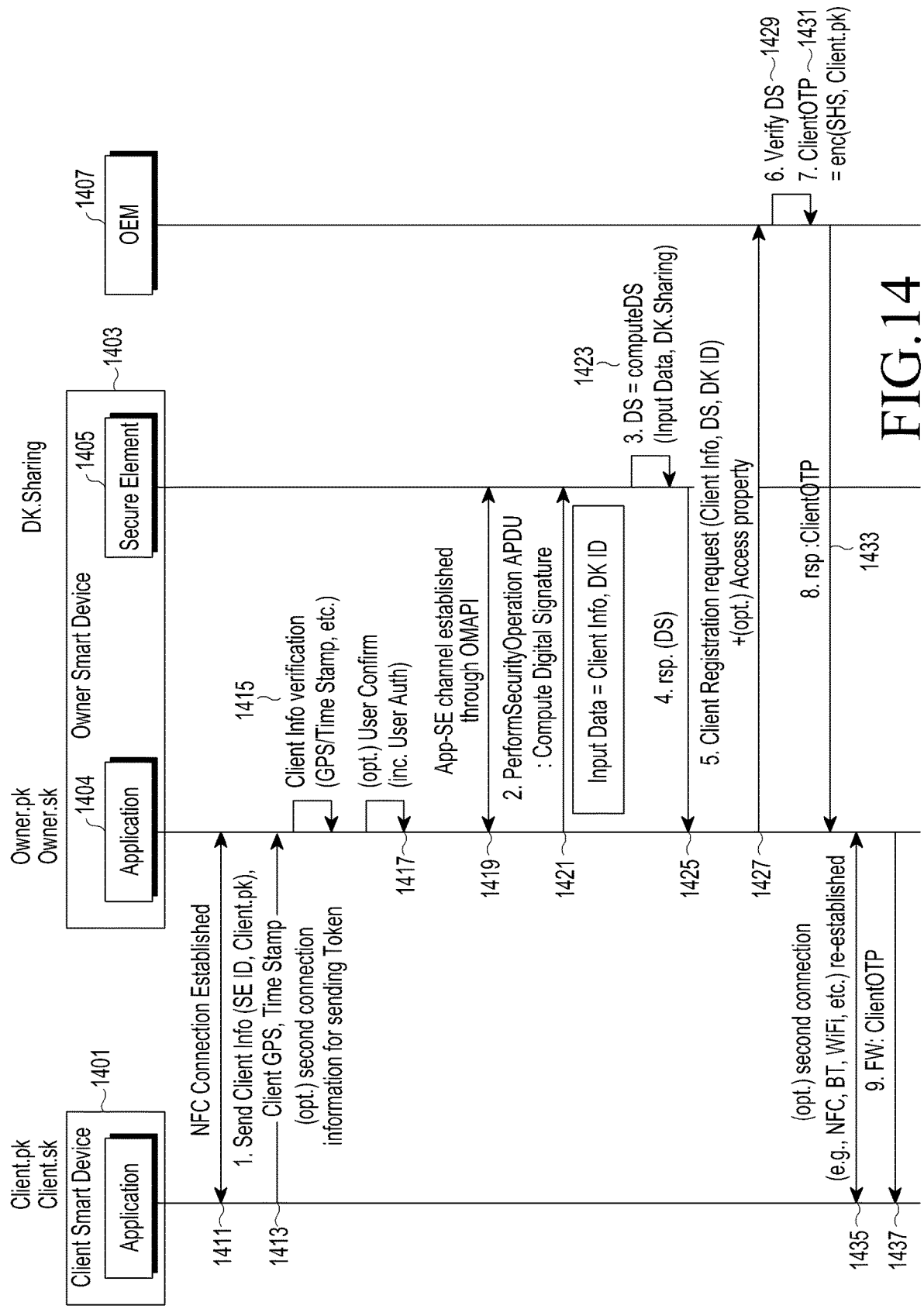
FIG. 14 is a signal flow diagram illustrating a process of providing a DK in a communication system according to an embodiment of the present disclosure.

FIG. 14 is a signal flow diagram illustrating a process of providing a DK in a communication system according to an embodiment of the present disclosure.

Referring to FIG. 14, it will be noted that a service provider is shown as "OEM", a primary device is shown as "Owner Smart Device", and a secondary device is shown as "Client Smart Device". Further, it will be noted that FIG. 14 is shown as a form in which the terms "OEM", "Owner Smart Device", and "Client Smart Device" are interchangeable with the terms "service provider", "primary device", and "secondary device".

It will be noted that a digital key providing process in FIG. 14 includes a process of generating and transferring information related to authentication in a primary device.

Firstly, for example, an NFC connection is established between a secondary device 1401 and a primary device 1403 (1411). The secondary device 1401 transmits information of the secondary device 1401, e.g., an SE ID, a PK of the secondary device 1401, (Client.pk), GPS information, and a time stamp to an application 1404 of the primary device 1403 (1413). The secondary device 1401 may optionally transmit, to the application 1404 of the primary device 1403, information about the second connection used for transmitting a token.

The application 1404 of the primary device 1403 performs a verification operation on the secondary device information, GPS information, and time stamp transmitted from the secondary device 1401 (1415), and performs a user confirmation operation in the primary device 1403 (1417). The user confirmation operation may be optionally performed.

Then a channel is established between the application 1404 of the primary device 1403 and a secure element 1405 of the primary device 1403 through an OMAPI (1419), and the application 1404 of the primary device 1403 transmits a PerformSecurityOperationAPDU command to the secure element 1405 of the primary device 1403 (1421). The PerformSecurityOperationAPDU command may include a command for requesting to compute a digital signature.

The secure element 1405 of the primary device 1403 computes a DS based on input data and a shared DK (DK.Sharing) (1423). The input data may include information of the secondary device 1401 and a DK ID.

The secure element 1405 of the primary device 1403 transmits a response including the computed digital signature to the application 1404 of the primary device 1403 (1425). The application 1404 of the primary device 1403 transmits a secondary device registration request to the service provider 1407 (1427). The secondary device registration request includes secondary device information, a digital signature, and a DK identifier, and may optionally include an access property.

The service provider 1407 verifies the digital signature (1429), and computes an OPT of the secondary device 1401, i.e., ClientOTP (1431). The OPT of the primary device 1401 may be generated based on SHS and a PK of the secondary device 1401 (ClientOTP=enc(SHS, Client.pk).

The service provider 1407 transmits a response including the OTP of the primary device 1401 to the application 1404 of the primary device 1403 (1433). The application 1404 of the primary device 1403 reestablishes the second connection with the secondary device 1401 (1435), and transmits the OTP of the primary device 1401 to the primary device 1401 (1437).

Although FIG. 14 illustrates a process of providing a DK as a series of operations, various operations in FIG. 14 could overlap, occur in parallel, occur in a different order, or occur multiple times.

As described above, authentication of a secondary device is performed in order to obtain reliability for an information source and verify integrity of an application.

There may be various schemes of verifying integrity of an application. For example, integrity of an application may be verified through a service provider. In this case, the service provider separately operates a server for application authentication, which may increase service operation and management cost.

In another scheme, integrity of an application may be verified between devices, without a service provider. In this case, operating systems (OSs) and versions of applications of the devices, i.e., a primary device and a secondary device, should be the same. For example, the primary device may verify the integrity of an application by comparing a hash value of the secondary device with a hash value of the primary device, after receiving the hash value of the secondary device. In this scheme, various parameters such as a device manufacturer, an OS, a device type, etc., should be considered, which may be difficult to implement.

Therefore, in accordance with an embodiment of the present disclosure, a scheme is provided for directly verifying the reliability of information. That is, a primary device may enhance reliability of information by directly obtaining and verifying information stored at an SE. For convenience, this verification scheme will be referred to as 2-way verification scheme.

Figure 15:
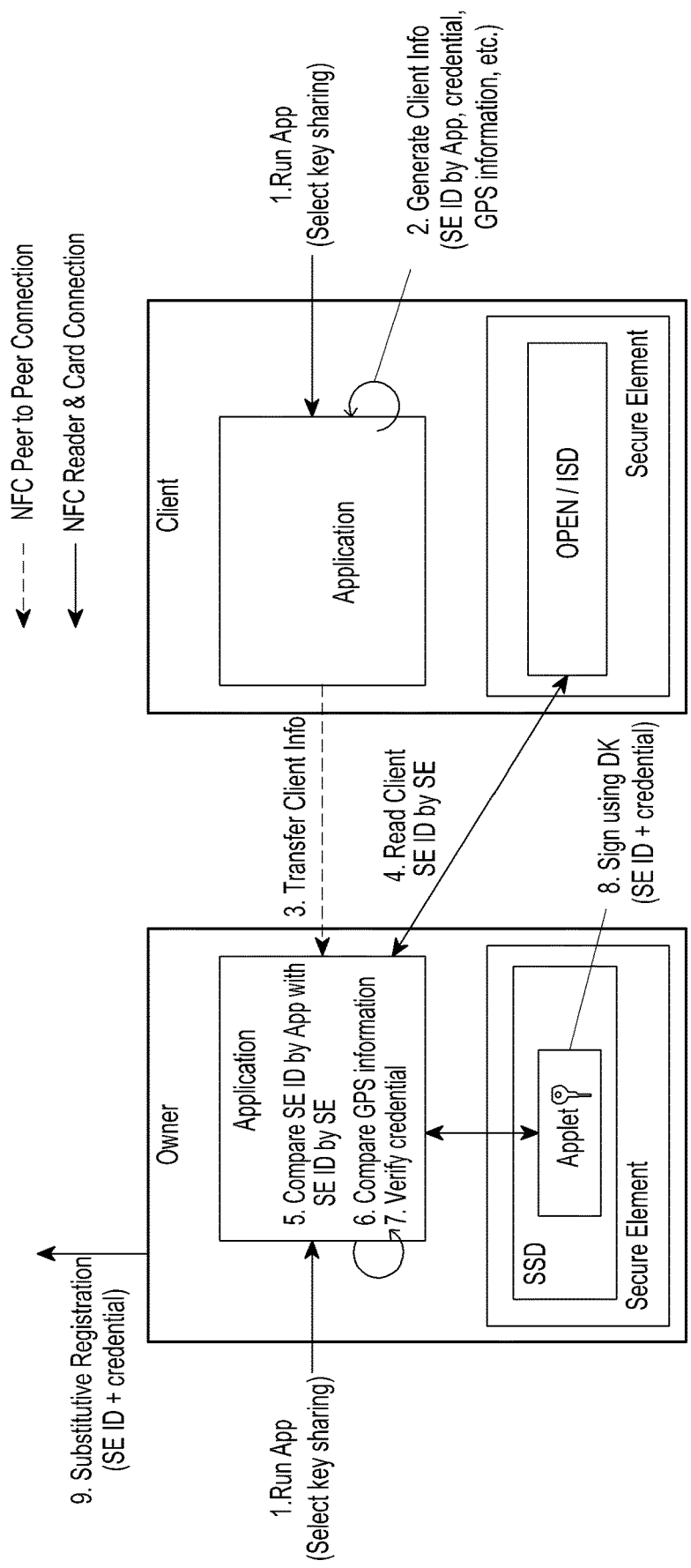
FIG. 15 illustrates a process of verifying a secondary device in a communication system according to an embodiment of the present disclosure.

FIG. 15 illustrates a process of verifying a secondary device in a communication system according to an embodiment of the present disclosure.

Referring to FIG. 15, it will be noted that a primary device is shown as "Owner", and a secondary device is shown as "Client". Further, it will be noted that FIG. 15 is shown as a form in which the terms "Owner" and "Client" are interchangeable with the terms "primary device" and "secondary device".

If a 2-way verification scheme is implemented, a primary device may obtain an SE ID from each of an application of a secondary device and an SE of the secondary device, compare the SE IDs, bind the application of the secondary device and the SE of the secondary device in order to register the bound application and SE at a service provider.

More specifically, user information may be obtained through a mobile UI(=application) which exists in an OS area during a DK sharing process. Consequently, if rooting is made on an OS or the OS is infected by hacking attack, etc., reliability of the user information transmitted from the application may be low. Accordingly, a user secure element directly obtains main information, which is not passed through a mobile UI, and compares the obtained main information with information obtained through a user application in order to use this result for additional verification for the user application.

The primary device and a secondary device run an application to select key sharing (1. Run App (Select key sharing)), and the secondary device generates secondary device information (Generate Client Info (SE ID by App, credential, GPS information, etc.)) The secondary device transmits the generated secondary device information to the primary device (3. Transfer Client Info), and the primary device reads an SE ID of the secondary device stored at a secure element of the secondary device (4. Read Client SE ID by SE).

The application of the primary device compares an SE ID by the primary device with the SE ID by the secure element (5. Compare SE ID by App with SE ID by SE), and compares GPS information of the primary device with GPS information of the secondary device (7. Compare GPS information). The application of the primary device verifies a credential of the secondary device (6. Verify credential), and the secure element of the primary device signs the SE ID and the credential based on a digital key (8. Sign using DK (SE ID+credential)).

The primary device registers the SE ID and the credential of the secondary device at a service provider (not shown in FIG. 15) instead of the secondary device.

Figure 16A:
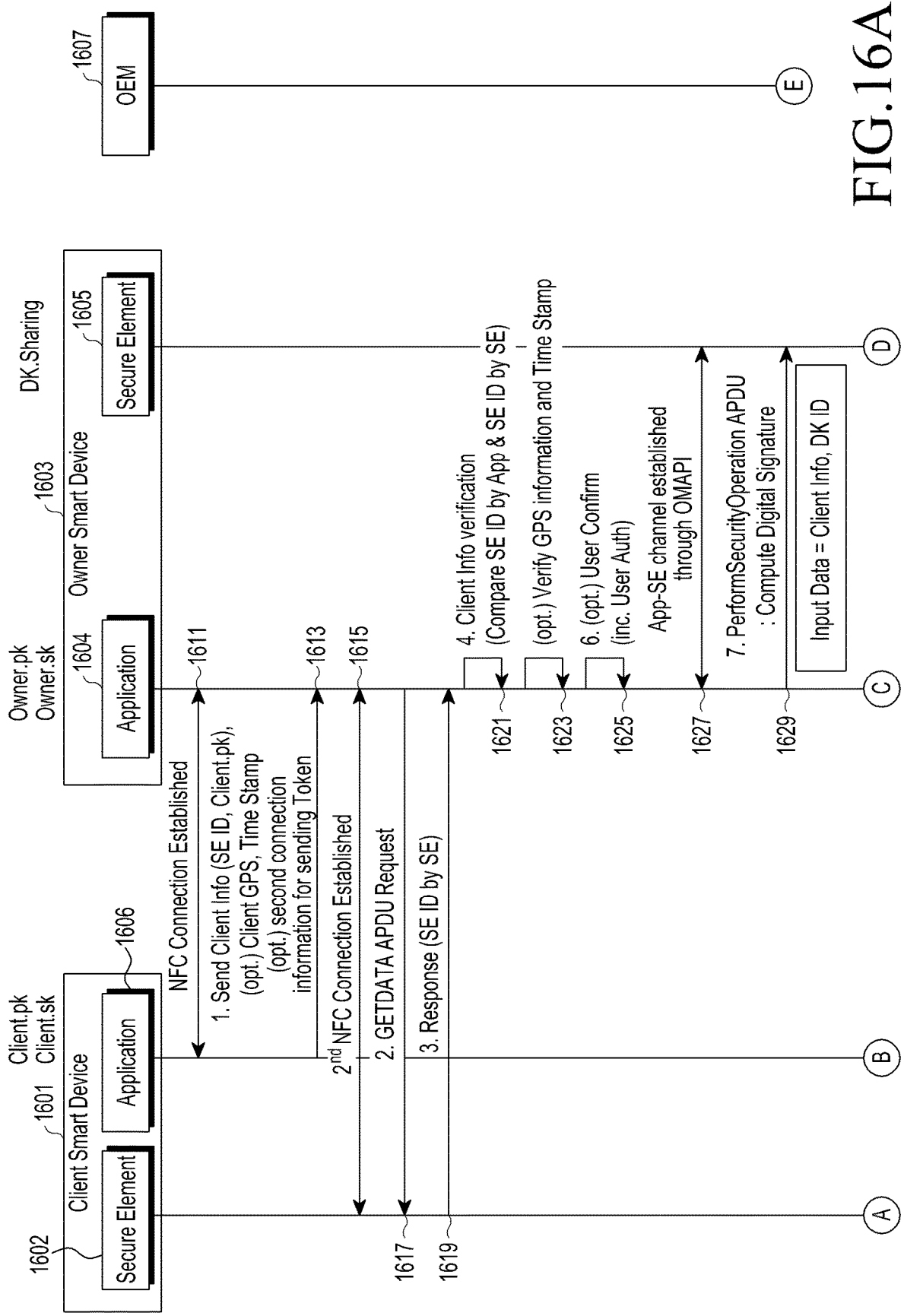
FIGS. 16A and 16B are signal flow diagrams illustrating a signal transmitting/receiving process according to a process of verifying a secondary device in a communication system according to an embodiment of the present disclosure.
Figure 16B:
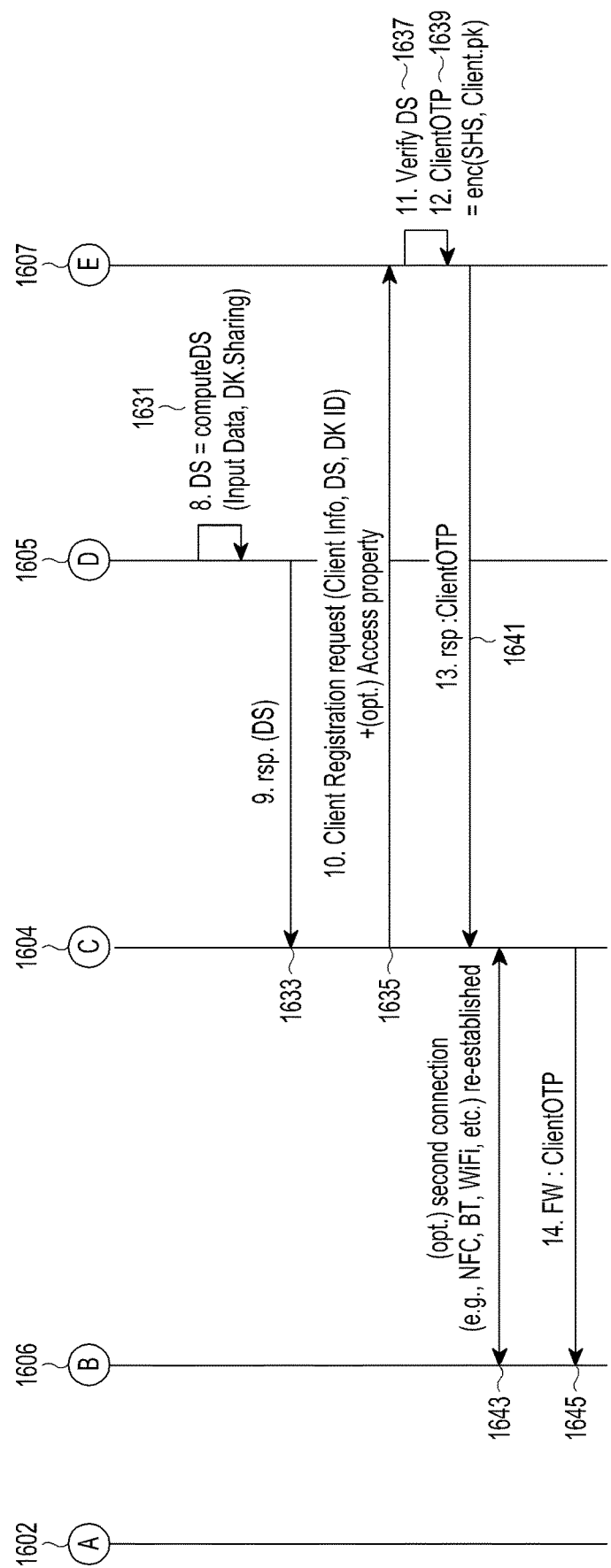

FIGS. 16A and 16B are signal flow diagrams illustrating a signal transmitting/receiving process according to a process of verifying a secondary device in a communication system according to an embodiment of the present disclosure.

Referring to FIGS. 16A and 16B, it will be noted that a service provider is shown as "OEM", a primary device is shown as "Owner Smart Device", and a secondary device is shown as "Client Smart Device". Further, it will be noted that FIGS. 16A and 16B are shown as a form in which the terms "OEM", "Owner Smart Device", and "Client Smart Device" are interchangeable with the terms "service provider", "primary device", and "secondary device".

Firstly, for example, an NFC connection is established between a secondary device 1601 and a primary device 1603 (1611). An application 1606 of the secondary device 1601 transmits information of the secondary device 1601, e.g., an SE ID and a PK of the secondary device 1601 (Client.pk), to an application 1604 of the primary device 1603 (1613). The application 1606 of the secondary device 1601 may optionally transmit, to the application 1604 of the primary device 1603, GPS information, a time stamp, and information about the second connection used for transmitting a token.

The second connection is established between a secure element 1602 of the secondary device 1601 and the application 1604 of the primary device 1603 (1615), and the application 1604 of the primary device 1603 transmits a GETDATA APDU request to the secure element 1602 of the secondary device 1601 (1617).

The secure element 1602 of the secondary device 1601 transmits a response to the GETDATA APDU request to the application 1604 of the primary device 1603 (1619). The response may include an SE ID of the secure element 1602 of the secondary device 1601.

The application 1604 of the primary device 1603 performs a verification operation on the secondary device information and the SE ID transmitted from the secure element 1602 of the secondary device 1601 (1621), and performs a verification operation on the GPS information and time stamp information (1623). The verification operation for the GPS information and time stamp information may be optionally performed. The application 1604 of the primary device 1603 performs a user confirmation operation (1625). Then a channel is established between the application 1604 of the primary device 1603 and a secure element 1605 of the primary device 1603 through an OMAPI (1627), and the application 1604 of the primary device 1603 transmits a PerformSecurityOperationAPDU command to the secure element 1605 of the primary device 1603 (1629). The PerformSecurityOperationAPDU command may include a command for requesting to compute a digital signature.

The secure element 1605 of the primary device 1603 computes a DS based on input data and a shared DK (DK.Sharing) (1631). The input data may include information of the secondary device 1601 and a DK ID.

The secure element 1605 of the primary device 1603 transmits a response including the computed digital signature to the application 1604 of the primary device 1603 (1633). The application 1604 of the primary device 1603 transmits a secondary device registration request to the service provider 1607 (1635). Here, the secondary device registration request includes secondary device information, a digital signature, and a DK ID, and may optionally include an access property.

The service provider 1607 verifies the digital signature (1637), and computes an OTP for the secondary device 1601, i.e., ClientOTP (1639). The OTP for the secondary device 1601 may be generated based on an SHS and a PK of the secondary device 1601 (ClientOTP=enc(SHS, Client.pk).

The service provider 1607 transmits a response including the OTP of the secondary device 1601 to the application 1604 of the primary device 1603 (1641). The application 1604 of the primary device 1603 reestablishes the second connection with the secondary device 1601 (1643), and transmits the OTP of the primary device 1601 to an application 1606 of the primary device 1601 (1645).

Although FIGS. 16A and 16B illustrate a signal transmitting/receiving process as a series of operations, various operations in FIGS. 16A and 16B could overlap, occur in parallel, occur in a different order, or occur multiple times.

An APDU command used for calculating a digital signature during a DK providing process may be expressed as shown in Table 1 below.

TABLE 1

| Code | Value | Meaning | Presence |
|---|---|---|---|
| CLA | '00'-'03', '40'-'4F' '10'-'13', or '50'-'5F' | Global Platform | Mandatory |
| INS | '2A' | PerformSecurityOperation | Mandatory |
| P1 | '9E' | Reference Control Parameter P1: Compute Digital Signature | Mandatory |
| P2 | 'xx' | Reference Control Parameter P2: Data to be signed with specific keys within SE (inc. info) | Mandatory |

TABLE 1-continued

| Code | Value | Meaning | Presence |
|---|---|---|---|
| Lc | 'xx' | Length of Data field | Mandatory |
| Data | 'xxxx' | Data objects | Mandatory |

(1) CLA: Class byte of the command message
(2) INS: Instruction byte
(3) P: Reference Control Parameter
(4) Lc: length of data field In the APDU command used for calculating the digital signature, the Data field may be expressed as shown in Table 2 below.

TABLE 2

| Tag | Length | Data/Description | Presence |
|---|---|---|---|
| 'XXXX' | Variable | Data object for Digital Key system | Mandatory |
| 'XX' | 0-n | Digital Key object ID to be used for signature (ID of DK to be shared) (Authorized entity ID) | Conditional |
| 'XX' | 0-n | Client ID (SE ID) | Mandatory |
| 'XX' | 0-n | Client Certificate | Mandatory |
| 'XX' | 0-n | Nonce value | Optional |

* CLA: Class byte of the command message
INS. Instruction byte
P: Reference Control Parameter
Lc length of data field A Data field included in a response message to the APDU command used for calculating the digital signature, i.e., an APDU response, may be expressed as the shown in Table 3 below.

TABLE 3

| Response Data field | |
|---|---|
| Data/Description | Presence |
| Digital Signature | Mandatory |

Error conditions when calculating the digital signature may be expressed as shown in Table 4 below.

TABLE 4

| SW1 | SW2 | Meaning |
|---|---|---|
| '6A' | '80' | Incorrect values in command data |
| '6A' | '81' | Function not supported |
| '6A' | 'XX' | Digital Key object not found |

In a DK providing process, an APDU command used for generating a token may be expressed as shown in Table 5 below.

TABLE 5

| Code | Value | Meaning | Presence |
|---|---|---|---|
| CLA | '00'-'03', '40'-'4F', '10'-'13', or '50'-'5F' | Global Platform | Mandatory |
| INS | '2A' | PerformSecurityOperation | Mandatory |
| P1 | 'xx' | Reference Control Parameter P1: Generate Token | Mandatory |

TABLE 5-continued

| Code | Value | Meaning | Presence |
|------|-------|---------|----------|
| P2 | 'xx' | Reference Control Parameter P2: Data to be used for token | Mandatory |
| Lc | 'xx' | Length of Data field | Mandatory |
| Data | 'xxxx' | Data objects | Mandatory |

(1) CLA: Class byte of the command message
(2) INS: Instruction byte
(3) P: Reference Control Parameter
(4) Lc: length of data field In the APDU command used for generating the token, the Data field may be expressed as shown in Table 6 below.

TABLE 6

| Tag | Length | Data/Description | Presence |
|-----|--------|------------------|----------|
| 'XXXX' | Variable | Data object for Digital Key system | Mandatory |
| 'XX' | 0-n | Digital Key object ID to be used for signature (ID of DK to be shared) (Authorized entity ID) | Conditional |
| 'XX' | 0-n | Nonce | Mandatory |
| 'XX' | 0-n | Service ID | Optional |

* CLA Class byte of the command message
INS: Instruction byte
P: Reference Control Parameter
Lc: length of data field A Data field included in a response message to the APDU command used for generating the token, i.e., an APDU response, may be expressed as shown in Table 7 below.

TABLE 7

| Response Data field | |
|---|---|
| Data/Description | Presence |
| Sharing Token | Mandatory |

Error conditions when generating the token may be expressed as shown in Table 8 below.

TABLE 8

| SW1 | SW2 | Meaning |
|-----|-----|---------|
| '6A' | '80' | Incorrect values in command data |
| '6A' | '81' | Function not supported |
| '6A' | 'XX' | Digital Key object (Authorized entity) not found |

In a DK providing process, an APDU command used for verifying a token may be expressed as shown in Table 9.

TABLE 9

| Code | Value | Meaning | Presence |
|------|-------|---------|----------|
| CLA | '00'-'03', '40'-'4F', '10'-'13', or '50'-'5F' | Global Platform | Mandatory |
| INS | '2A' | PerformSecurityOperation | Mandatory |
| P1 | 'xx' | Reference Control Parameter P1: Verify Token | Mandatory |

TABLE 9-continued

| Code | Value | Meaning | Presence |
|------|-------|---------|----------|
| P2 | 'xx' | Reference Control Parameter P2: Token value to be verified | Mandatory |
| Lc | 'xx' | Length of Data field | Mandatory |
| Data | 'xxxx' | Data objects | Mandatory |

(1) CLA: Class byte of the command message
(2) INS: Instruction byte
(3) P: Reference Control Parameter
(4) Lc: length of data field In the APDU command used for verifying the token, the Data field may be expressed as shown in Table 10 below.

TABLE 10

| Tag | Length | Data/Description | Presence |
|-----|--------|------------------|----------|
| 'XXXX' | Variable | Data object for Digital Key system | Mandatory |
| 'XX' | 0-n | Digital Key object ID to be used for signature (ID of DK to be shared) (Authorized entity ID) | Conditional |
| 'XX' | 0-n | Sharing Token | Mandatory |

* CLA: Class byte of the command message
INS: Instruction byte
P: Reference Control Parameter
Lc: length of data field Error conditions when verifying the token may be expressed as shown in Table 11 below.

TABLE 11

| SW1 | SW2 | Meaning |
|-----|-----|---------|
| '6A' | '80' | Incorrect values in command data |
| '6A' | '81' | Function not supported |
| '6A' | 'XX' | Digital Key object (Authorized entity) not found |

Figure 17:
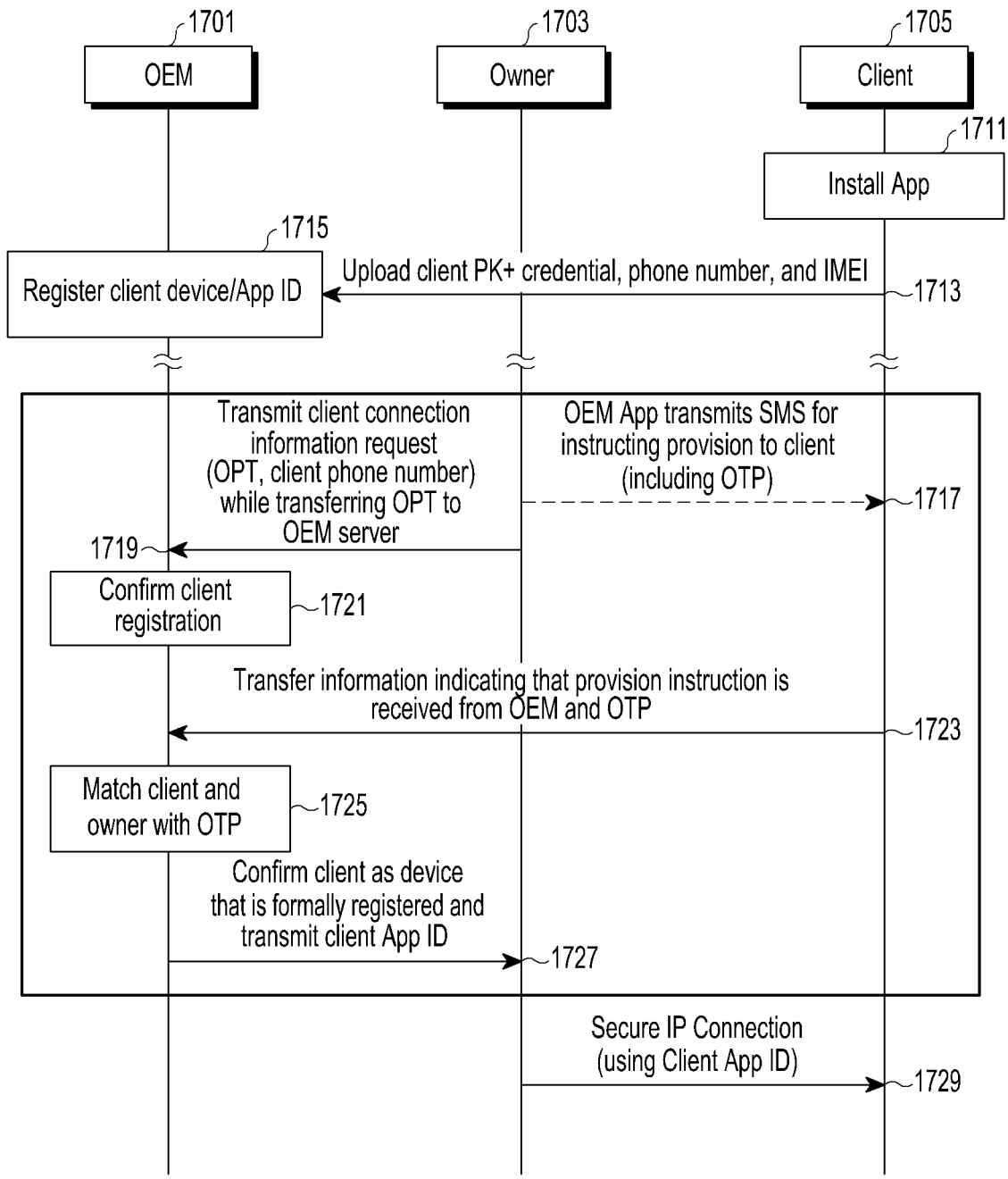
FIG. 17 is a signal flow diagram illustrating a connecting process between a primary device and a secondary device in a communication system according to an embodiment of the present disclosure.

FIG. 17 is a signal flow diagram illustrating a connecting process between a primary device and a secondary device in a communication system according to an embodiment of the present disclosure.

Referring to FIG. 17, it will be noted that a service provider is shown as "OEM", a primary device is shown as "Owner", and a secondary device is shown as "Client". Further, it will be noted that FIG. 17 is shown as a form in which the terms "OEM", "Owner", and "Client" are interchangeable with the terms "service provider", "primary device", and "secondary device".

Firstly, if a distance between a primary device and a secondary device is relatively short, for example, if the distance is shorter than a preset first distance, a secure connection may be set up through an NFC.

If the distance between the primary device and the secondary device is relatively long, e.g., if the distance is greater than or equal to the preset first distance, mutual discovery may be performed using an OTP and a secure connection may be set up through an application identifier (App ID). Various connection schemes other than the NFC may be used, such as Bluetooth, Wi-Fi, etc.

A secondary device 1705 installs an application (1711), and transmits a PK, a credential, a phone number, and an IMEI of the secondary device 1705 to a service provider 1701 (1713). The service provider 1701 registers the secondary device 1705 and an application ID (1715).

A primary device 1703 transmits, to the secondary device 1705, a short message service (SMS) indicating that the service provider 1701 instructs the secondary device 1705 to provision a DK (1717). The SMS includes an OTP of the secondary device 1705. The primary device 1703 requests connection information for the secondary device 1705 from the service provider 1701 (1719). The connection information request for the secondary device 1705 may include the OTP and a phone number of the secondary device 1705.

Upon receiving the connection information request for the secondary device 1705, the service provider 1701 confirms registration of the secondary device 1705 (1721). The secondary device 1705 transmits information indicating that the service provider 1701 receives the SMS indicating that the service provider 1701 instructs to provision the DK and the OTP of the secondary device 1705 (1723). The service provider 1701 matches the primary device 1703 and the secondary device 1705 based on the OTP (1725), and transmits, to the primary device 1703, a confirmation message indicating that the secondary device 1705 is normally registered and a secondary device application ID (1727). The primary device 1703 establishes a secure IP connection with the secondary device 1705 (1729). Here, the secure IP connection is established based on the secondary device application ID.

Although FIG. 17 illustrates a connecting process between a primary device and a secondary device as a series of operations, various operations in FIG. 17 could overlap, occur in parallel, occur in a different order, or occur multiple times.

Figure 18:
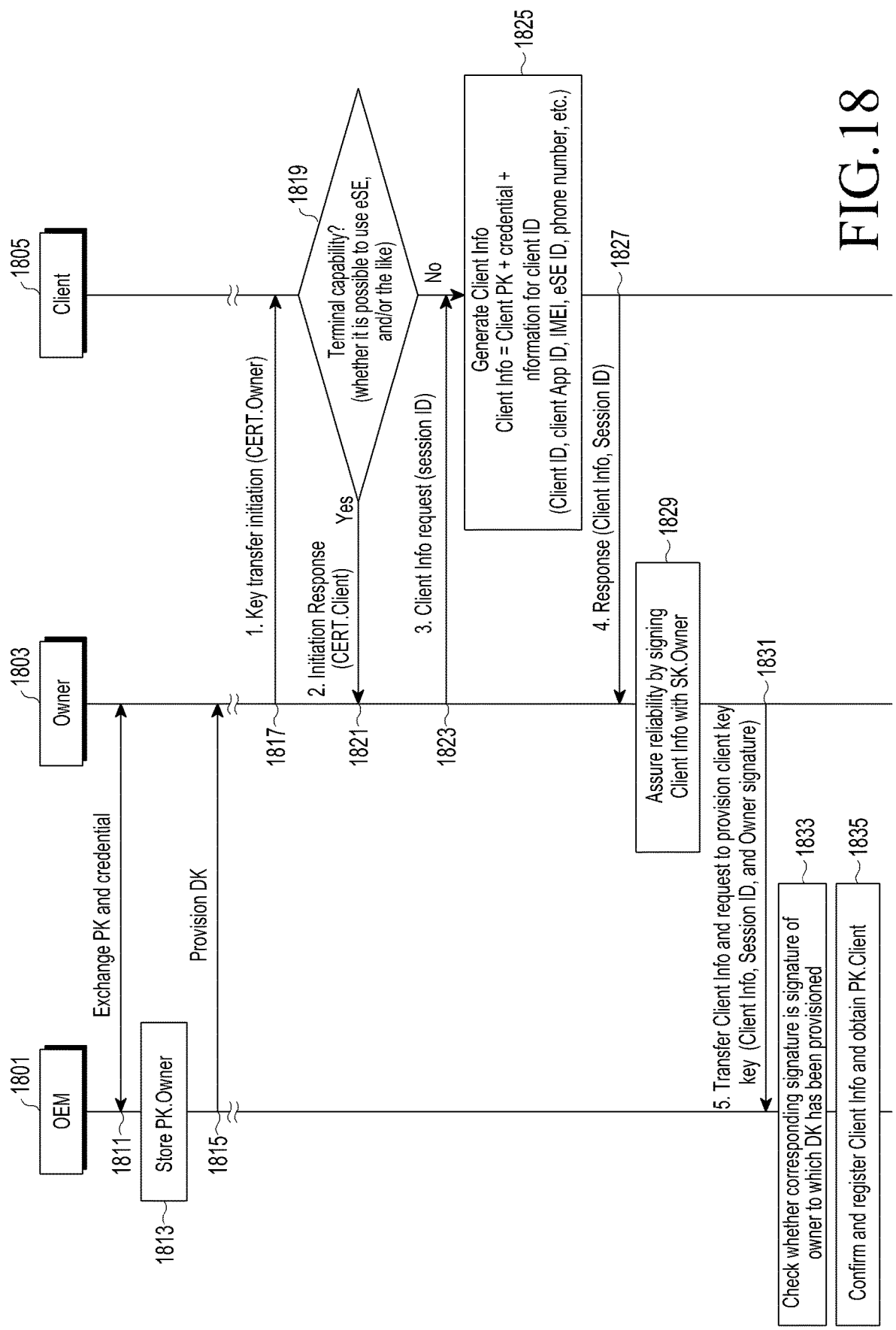
FIG. 18 is a signal flow diagram illustrating a process of registering a secondary device in a communication system according to an embodiment of the present disclosure.

FIG. 18 is a signal flow diagram illustrating a process of registering a secondary device in a communication system according to an embodiment of the present disclosure.

Referring to FIG. 18, it will be noted that a service provider is shown as "OEM", a primary device is shown as "Owner", and a secondary device is shown as "Client". Further, it will be noted that FIG. 18 is shown as a form in which the terms "OEM", "Owner", and "Client" are interchangeable with the terms "service provider", "primary device", and "secondary device". In FIG. 18, PK denotes a public key, and SK denotes a secrete key, i.e., a private key.

It will be noted that a secondary device registration process in FIG. 18 is a secondary device registration process in a case of assuring a primary device based on a client application (CA) credential if there is a CA.

A PK exchange procedure and a credential exchange procedure are performed between a service provider 1801 and a primary device 1803 (1811). The service provider 1801 stores a PK of the primary device 1803, i.e., PK.Owner (1813), and provisions a DK for the primary device 1803 (1815). The primary device 1803 transmits, to a secondary device 1805, a key transfer initiation message indicating that it is going to initiate transmitting a DK. Here, the key transfer initiation message may include a certificate of the primary device 1803, e.g., CERT.Owner.

Upon receiving the key transfer initiation message, the secondary device 1805 determines whether to use an eSE by checking a capability of the secondary device 1805 (1819). If it is possible to use the eSE, the secondary device 1805 transmits an initiation response message to the primary device 1803 (1821). The initiation response message may include a certificate of the secondary device 1805, e.g., CERT.Client.

Upon receiving the initiation response message from the secondary device 1805, the primary device 1803 requests information of the secondary device 1805 from the secondary device 1805 (1823). That is, the primary device 1803 transmits secondary device information request to the secondary device 1805. Here, the secondary device information request may include a session ID.

Upon receiving the secondary device information request from the primary device 1803, the secondary device 1805 generates secondary device information for the secondary device 1805 (1825). The secondary device information may include a secondary device PK, i.e., Client. PK for the secondary device 1805, a credential, and information for a secondary device ID. The information for the secondary device ID may include the secondary device ID, a secondary device application ID, an IEMI, an eSE ID, a phone number, etc.

The secondary device 1805 transmits a response to the secondary device information request to the primary device 1803 (1827). Here, the response includes the secondary device information and the session ID.

Upon receiving the response, the primary device 1803 assures reliability for the secondary device information by signing the secondary device information using an SK of the primary device 1803, i.e., SK.Owner (1829). The primary device 1803 transmits the secondary device information to the service provider 1801, and requests to provision a secondary device key (1831). Here, the secondary device key provision request includes the session ID and a signature of the primary device 1803. Upon receiving the secondary device information and the secondary device key provision request from the primary device 1803, the service provider 1801 checks whether the signature of the primary device 1803 is a signature of a primary device to which the service provider 1801 has provisioned a DK (1833). If the signature of the primary device 1803 is identical to the signature of the primary device to which the service provider 1801 has provisioned the DK, the service provider 1801 confirms and registers the secondary device information, and obtains the PK of the secondary device 1805, i.e., PK.Client (1835).

Although FIG. 18 illustrates a process of registering a secondary device as a series of operations, various operations in FIG. 18 could overlap, occur in parallel, occur in a different order, or occur multiple times.

Figure 19:
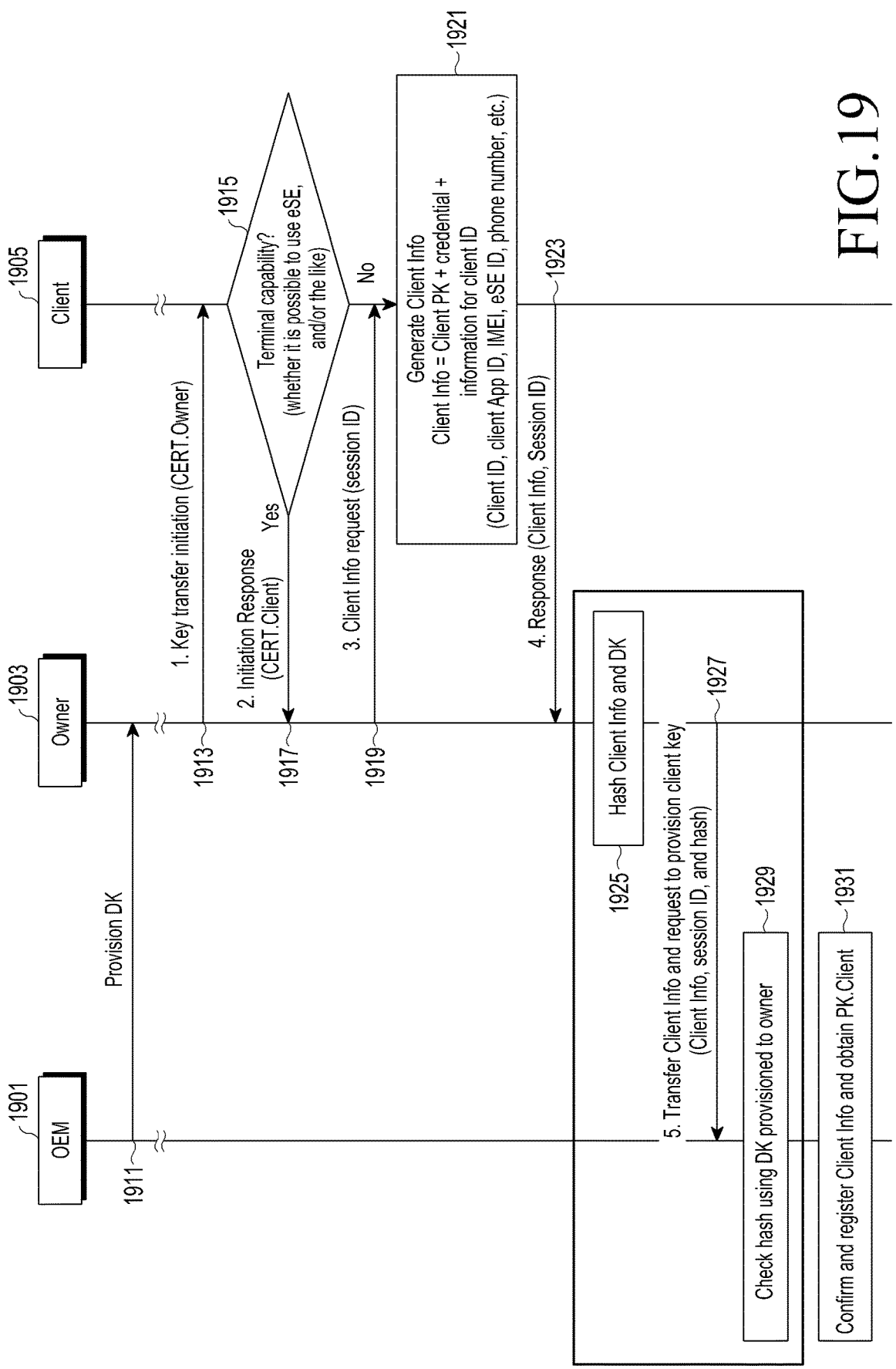
FIG. 19 is a signal flow diagram illustrating a process of registering a secondary device in a communication system according to an embodiment of the present disclosure.

FIG. 19 is a signal flow diagram illustrating a process of registering a secondary device in a communication system according to an embodiment of the present disclosure.

Referring to FIG. 19, it will be noted that a service provider is shown as "OEM", a primary device is shown as "Owner", and a secondary device is shown as "Client". Further, it will be noted that FIG. 19 is shown as a form in which the terms "OEM", "Owner", and "Client" are interchangeable with the terms "service provider", "primary device", and "secondary device". In FIG. 19, PK denotes a public key, and SK denotes a secrete key, i.e., a private key.

It will be noted that a secondary device registration process in FIG. 19 is a process of registering a secondary device based on a digital key (DK) in a case that there is a CA.

The service provider 1901 provisions a DK to a primary device 1903 (1911). The primary device 1903 transmits, to a secondary device 1905, a key transfer initiation message indicating that it is going to initiate transmitting a DK. The key transfer initiation message may include a certificate of the primary device 1903, e.g., CERT.Owner.

Upon receiving the key transfer initiation message, the secondary device 1905 determines whether to use an eSE, by checking a capability of the secondary device 1905 (1915). If it is possible to use the eSE, the secondary device 1905 transmits an initiation response message to the primary device 1903 (1917). The initiation response message may include a certificate of the secondary device 1905, e.g., CERT.Client.

Upon receiving the initiation response message from the secondary device 1905, the primary device 1903 requests information of the secondary device 1905 from the secondary device 1905 (1919). That is, the primary device 1903 transmits secondary device information request to the secondary device 1905. The secondary device information request may include a session ID.

Upon receiving the secondary device information request from the primary device 1903, the secondary device 1905 generates secondary device information for the secondary device 1905 (1921). The secondary device information may include a secondary device PK, i.e., Client.PK for the secondary device 1905, a credential, and information for a secondary device ID. The information for the secondary device ID may include the secondary device ID, a secondary device application ID, an IEMI, an eSE ID, a phone number, etc.

The secondary device 1905 transmits a response to the secondary device information request to the primary device 1903 (1923). The response may include the secondary device information and the session ID.

Upon receiving the response, the primary device 1903 hashes the secondary device information and the DK (1925), transmits the secondary device information to the service provider 1901, and requests to provision a secondary device key (1927). The secondary device key provision request may include the session ID and a signature of the primary device 1903.

Upon receiving the secondary device information and the secondary device key provision request from the primary device 1903, the service provider 1901 checks whether the signature of the primary device 1903 is a signature of a primary device to which the service provider 1901 has provisioned a DK (1929). If the signature of the primary device 1903 is identical to the signature of the primary device to which the service provider 1901 has provisioned the DK, the service provider 1901 confirms and registers the secondary device information, and obtains the PK of the secondary device 1905, i.e., PK.Client (1931).

Although FIG. 19 illustrates a process of registering a secondary device as a series of operations, various operations in FIG. 19 could overlap, occur in parallel, occur in a different order, or occur multiple times.

FIGS. 20A and 20B are signal flow diagrams illustrating a process of registering a secondary device in a communication system according to an embodiment of the present disclosure.

Referring to FIGS. 20A and 20B, it will be noted that a service provider is shown as "OEM", a primary device is shown as "Owner", and a secondary device is shown as "Client". Further, it will be noted that FIGS. 20A and 20B are shown as a form in which the terms "OEM", "Owner", and "Client" are interchangeable with the terms "service provider", "primary device", and "secondary device". In FIGS. 20A and 20B, PK denotes a public key, and SK denotes a secrete key, i.e., a private key.

It will be noted that a secondary device registration process in FIGS. 20A and 20B is a process of registering a secondary device based on a separate key for authenticating a digital key authority. Here, the key for authenticating the digital key authority is a key used for authenticating authority for the digital key.

The service provider 2001 provisions a DK to a primary device 2003 in step 2011.

Upon receiving the DK, the primary device 2003 generates a key pair for authenticating authority of the DK (2013).

It will be assumed that the key pair for authenticating the authority of the digital key is SK.DKConfirm and PK.DK-Confirm.

The primary device 2003 requests the service provider 2001 to register the PK.DKConfirm (2015), and the service provider 2001 stores the PK.DKConfirm (2017).

The primary device 2003 transmits, to a secondary device 2005, a key transfer initiation message indicating that the primary device 2003 is going to initiate transmitting a DK (2019). The key transfer initiation message may include a certificate of the primary device 2003, e.g., CERT.Owner.

Upon receiving the key transfer initiation message, the secondary device 2005 determines whether to use an eSE, by checking a capability of the secondary device 2005 (2021). If it is possible to use the eSE, the secondary device 2005 transmits an initiation response message to the primary device 2003 (2023). The initiation response message may include a certificate of the secondary device 2005, e.g., CERT.Client.

Upon receiving the initiation response message from the secondary device 2005, the primary device 2003 requests information of the secondary device 2005 from the secondary device 2005 in step 2025. That is, the primary device 2003 transmits secondary device information request to the secondary device 2005. The secondary device information request may include a session ID.

Upon receiving the secondary device information request from the primary device 2003, the secondary device 2005 generates secondary device information for the secondary device 2005 (2027). The secondary device information includes a secondary device PK, i.e., Client.PK, for the secondary device 2005, a credential, and information for a secondary device ID. The information for the secondary device ID may include the secondary device ID, a secondary device application ID, an IEMI, an eSE ID, a phone number, etc.

The secondary device 2005 transmits a response to the secondary device information request to the primary device 2003 (2029). The response may include the secondary device information and the session ID.

Upon receiving the response, the primary device 2003 assures reliability for the secondary device information by signing the secondary device information using the SK.D-KConfirm (2031). The primary device 2003 transmits the secondary device information to the service provider 2001, and requests to provision a secondary device key (2033). The secondary device key provision request may include the session ID and a signature of the primary device 2003.

Upon receiving the secondary device information and the secondary device key provision request from the primary device 2003, the service provider 2001 checks authority and assurance of the DK of the primary device 2003 using the PK.DKConfirm (2035).

After the authority and assurance of the DK of the primary device 2003 are checked, the service provider 2001 confirms and registers the secondary device information, and obtains the PK of the secondary device 2005, i.e., PK.Client, in step 2037.

Although FIGS. 20A and 20B illustrate a process of registering a secondary device as a series of operations, various operations in FIGS. 20A and 20B could overlap, occur in parallel, occur in a different order, or occur multiple times.

Figure 21:
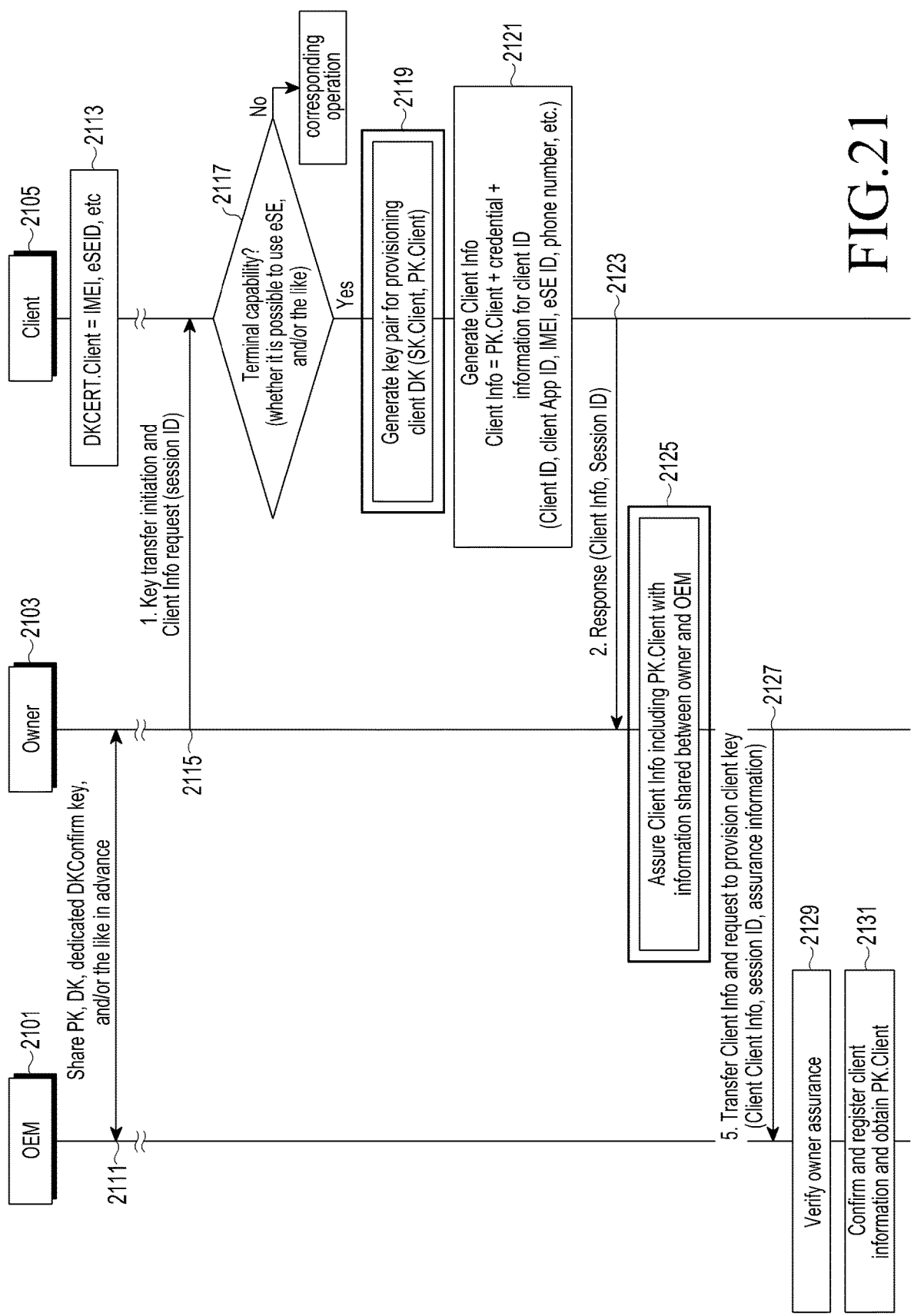
FIG. 21 is a signal flow diagram illustrating a process of registering a secondary device in a communication system according to an embodiment of the present disclosure.

FIG. 21 is a signal flow diagram illustrating a process of registering a secondary device in a communication system according to an embodiment of the present disclosure.

Referring to FIG. 21, it will be noted that a service provider is shown as "OEM", a primary device is shown as "Owner", and a secondary device is shown as "Client". Further, it will be noted that FIG. 21 is shown as a form in which the terms "OEM", "Owner", and "Client" are interchangeable with the terms "service provider", "primary device", and "secondary device". In FIG. 21, PK denotes a public key, and SK denotes a secrete key, i.e., a private key.

It will be noted that a secondary device registration process in FIG. 21 is a process of registering a secondary device based on a key used for a secondary device to receive a digital key in a case that there is no CA. Here, the key used for the secondary device to receive the digital key may be implemented with a key pair form.

Firstly, a PK, a DK, and/or a dedicated DKConfirm is shared between a service provider 2101 and a primary device 2103 (2111). The DKConfirm is a key for authenticating DK authority. A secondary device 2105 has a DK certificate of the secondary device 2105, i.e., DKCERT.Client. For example, the DKCERT.Client may include an IMEI, an eSEID, etc. (2113).

The primary device 2103 transmits, to the secondary device 2105, a key transfer initiation message indicating that the primary device 2103 is going to initiate transferring a DK and a secondary device information request (2115). The secondary device information request includes a session ID.

Upon receiving the key transfer initiation message and the secondary device information request, the secondary device 2105 determines whether to use an eSE, by checking a capability of the secondary device 2105 (2117). If it is possible to use the eSE, the secondary device 2105 generates a key pair, e.g., SK.Client and PK.Client, for provisioning a DK of the secondary device 2105, i.e., Client DK, (2119).

The secondary device 2105 generates secondary device information for the secondary device 2105 (2121). The secondary device information includes a secondary device PK, i.e., PK. Client, for the secondary device 2105, a credential, and information for a secondary device ID. The information for the secondary device ID may include the secondary device ID, a secondary device application ID, an IEMI, an eSE ID, a phone number, etc.

The secondary device 2105 transmits an initiation response message to the primary device 2103 (2123). The initiation response message includes the secondary device information of the secondary device 2105 and the session ID. Upon receiving the initiation response message from the secondary device 2105, the primary device 2103 assures the secondary device information based on the information shared between the primary device 2103 and the service provider 2101 (2125). The secondary device information includes a PK of the secondary device 2105, i.e., PK.Client.

The primary device 2103 transmits, to the service provider 2101, the secondary device information and secondary device key provision request (2127). The secondary device key provision request includes the session ID and the assurance information of the primary device 2103. Upon receiving the secondary device information and secondary device key provision request from the primary device 2103, the service provider 2101 checks the assurance information received from the primary device 2103 (2129). If the assurance information is normal, the service provider 2101 confirms and registers the secondary device information, and obtains the PK.Client of the secondary device 2105 (2131).

Although FIG. 21 illustrates a process of registering a secondary device as a series of operations, various operations in FIG. 21 could overlap, occur in parallel, occur in a different order, or occur multiple times.

Figure 22:
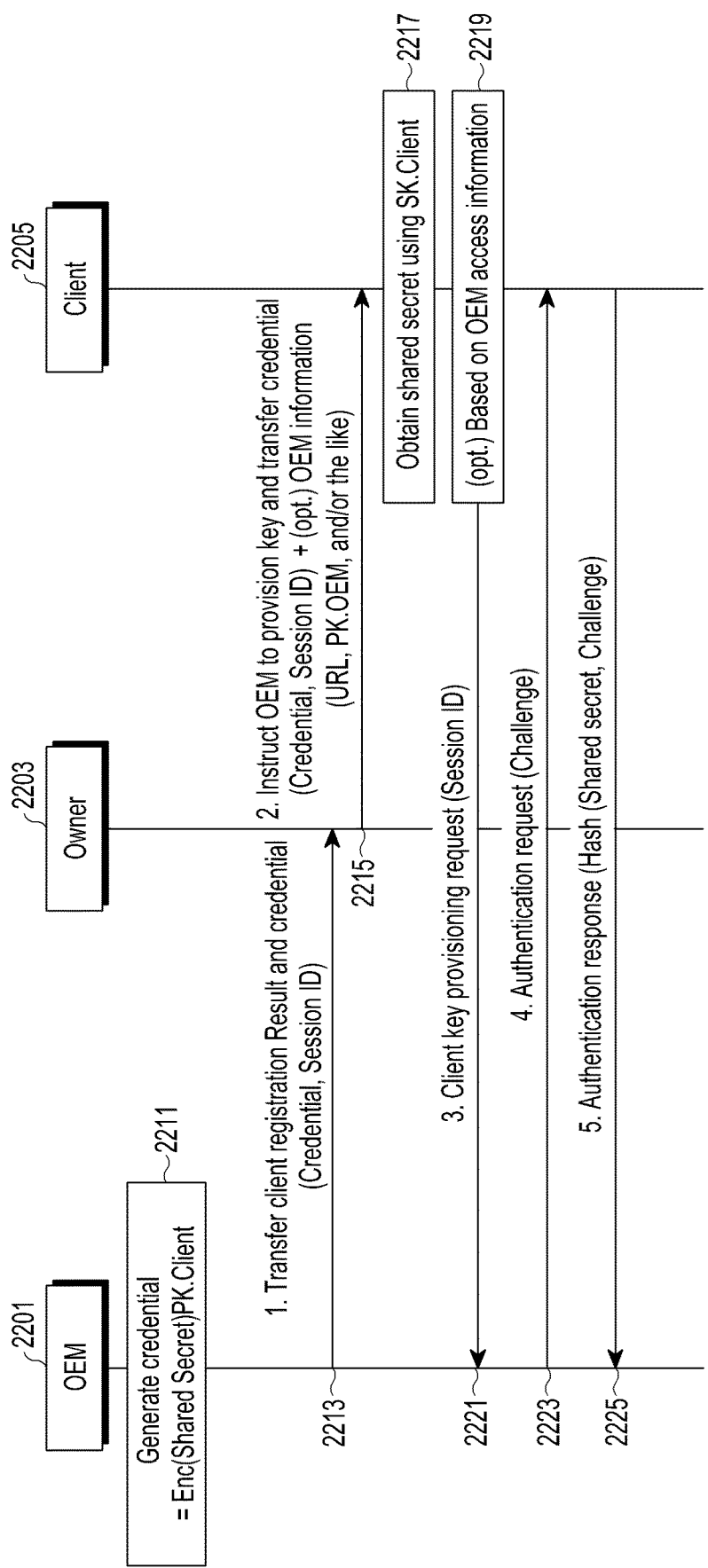
FIG. 22 is a signal flow diagram illustrating a process of authenticating a secondary device in a communication system according to an embodiment of the present disclosure.

FIG. 22 is a signal flow diagram illustrating a process of authenticating a secondary device in a communication system according to an embodiment of the present disclosure.

Referring to FIG. 22, it will be noted that a service provider is shown as "OEM", a primary device is shown as "Owner", and a secondary device is shown as "Client". Further, it will be noted that FIG. 22 is shown as a form in which the terms "OEM", "Owner", and "Client" are interchangeable with the terms "service provider", "primary device", and "secondary device".

It will be noted that a process of authenticating a secondary device in FIG. 22 is a process of authenticating a secondary device based on a shared secret key which a secondary device and a service provider may own.

Firstly, a service provider 2201 generates a credential (2211). The credential may be generated by encrypting PK.Client, or by encrypting an SHS and the PK.Client.

The service provider 2201 transmits a registration result for a secondary device 2205 and the credential to a primary device 2203 (2213). A session ID may be transmitted along with the credential. The primary device 2203 instructs the secondary device 2205 to request key provision from the service provider 2201 and transmits the credential (2215). For example, the primary device 2203 transmits the session ID to the secondary device 2205, and may optionally transmit information of the service provider 2201, e.g., a URL and PK.OEM, which denotes a PK of the service provider 2201.

The secondary device 2205 obtains an SHS based on an SK of the secondary device 2205, i.e., SK.Client (2217). The secondary device 2205 requests secondary device key provisioning from the service provider 2201 based on access information for the service provider 2201 (2219 and 2221). The secondary device key provisioning request may include the session ID.

Upon receiving the secondary device key provisioning request from the secondary device 2205, the service provider 2201 transmits an authentication request to the secondary device 2205 (2223). The authentication request includes a challenge.

Upon receiving the authentication request from the service provider 2201, the secondary device 2205 transmits an authentication response to the authentication request to the service provider 2201 (2225). The authentication response may be generated by hashing the SHS and the challenge.

Although FIG. 22 illustrates a process of authenticating a secondary device as a series of operations, various operations in FIG. 22 could overlap, occur in parallel, occur in a different order, or occur multiple times.

Figure 23:
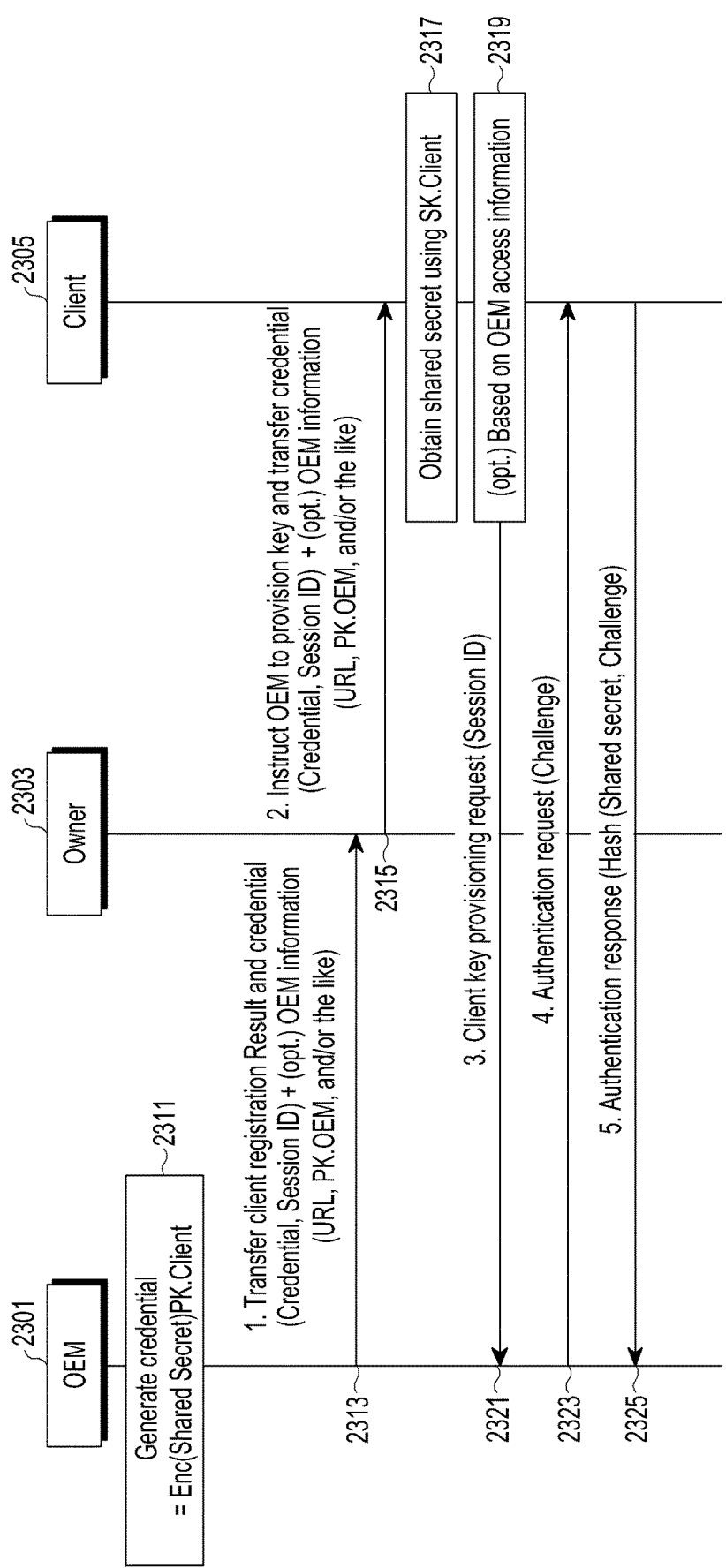
FIG. 23 is a signal flow diagram illustrating a process of authenticating a secondary device in a communication system according to an embodiment of the present disclosure.

FIG. 23 is a signal flow diagram illustrating a process of authenticating a secondary device in a communication system according to an embodiment of the present disclosure. Specifically, FIG. 23 illustrates a process of authenticating a secondary device, based on a shared secret key that the secondary device and a service provider may own.

Referring to FIG. 23, it will be noted that a service provider is shown as "OEM", a primary device is shown as "Owner", and a secondary device is shown as "Client". Further, it will be noted that FIG. 23 is shown as a form in which the terms "OEM", "Owner", and "Client" are interchangeable with the terms "service provider", "primary device", and "secondary device".

Firstly, a service provider 2301 generates a credential (2311). The credential may be generated by encrypting PK.Client, or by encrypting an SHS and the PK.Client.

The service provider 2301 transmits a registration result for a secondary device 2305 and the credential to a primary device 2303 (2313). A session ID may be transmitted along with the credential. Optionally, information of the service provider 2301, e.g., a URL and a PK.OEM, may be additionally transmitted to a primary device 2303. The PK.OEM denotes a PK of the service provider 2301.

The primary device 2303 instructs the secondary device 2305 to request key provision from the service provider 2301 and transmits the credential (2315). The primary device 2303 transmits the session ID to the secondary device 2305, and may optionally transmit information of the service provider 2301, e.g., a URL and PK.OEM.

The secondary device 2305 obtains an SHS based on an SK of the secondary device 2305, i.e., SK.Client (2317). The secondary device 2305 requests secondary device key provisioning from the service provider 2301 based on access information for the service provider 2301 (2319 and 2321). The secondary device key provisioning request may include the session ID.

Upon receiving the secondary device key provisioning request from the secondary device 2305, the service provider 2301 transmits an authentication request to the secondary device 2305 (2323). The authentication request may include a challenge.

Upon receiving the authentication request from the service provider 2301, the secondary device 2305 transmits an authentication response to the authentication request to the service provider 2301 (2325). The authentication response may be generated by hashing the SHS and the challenge.

Although FIG. 23 illustrates a process of authenticating a secondary device as a series of operations, various operations in FIG. 23 could overlap, occur in parallel, occur in a different order, or occur multiple times.

FIG. 24 is a signal flow diagram illustrating a process of provisioning a DK in a communication system according to an embodiment of the present disclosure.

Referring to FIG. 24, it will be noted that a service provider is shown as "OEM", a primary device is shown as "Owner", and a secondary device is shown as "Client". Further, it will be noted that FIG. 24 is shown as a form in which the terms "OEM", "Owner", and "Client" are interchangeable with the terms "service provider", "primary device", and "secondary device".

Firstly, a service provider 2401 may directly provision a DK to a secondary device 2405.

Alternatively, the service provider 2401 may temporally stop using a DK of a primary device 2403 while provisioning a DK to a secondary device 2405 as illustrated in FIG. 24, which may have the same effect as transmitting a physical key from the service provider 2401 to the secondary device 2405.

The service provider 2401 requests the secondary device 2405 to store a DK (2411), and the secondary device 2405 stores the DK according to the DK storage request and transmits the storage result to the service provider 2401 (2413). The service provider 2401 transmits a DK provisioning result for the secondary device 2405 and a DK disable command to a primary device 2403 (2415). An applet of an eSE where the DK is stored is locked and becomes unusable (2417). The primary device 2403 transmits a disable result of the DK to the service provider 2401 (2419).

The service provider 2401 transmits a DK disable/delete command to the secondary device 2405 (2421).

Upon receiving the DK disable/delete command from the service provider 2401, the secondary device 2405 transmits a result for the DK disable/delete command to the service provider 2401 (2423). The service provider 2401 transmits, to the primary device 2403, a DK enable command along with a DK revoking result for the secondary device 2405, based on the result received from the secondary device 2405 (2425).

Upon receiving the DK revoking result and the DK enable command from the service provider 2401, the primary device 2403 enables the applet of the eSE where the DK is stored, so the applet of the eSE becomes usable (2427). The primary device 2403 transmits an enable result to the service provider 2401 (2429).

Although FIG. 24 illustrates a process of provisioning a DK in a communication system as a series of operations, various operations in FIG. 24 could overlap, occur in parallel, occur in a different order, or occur multiple times.

Figure 25A:
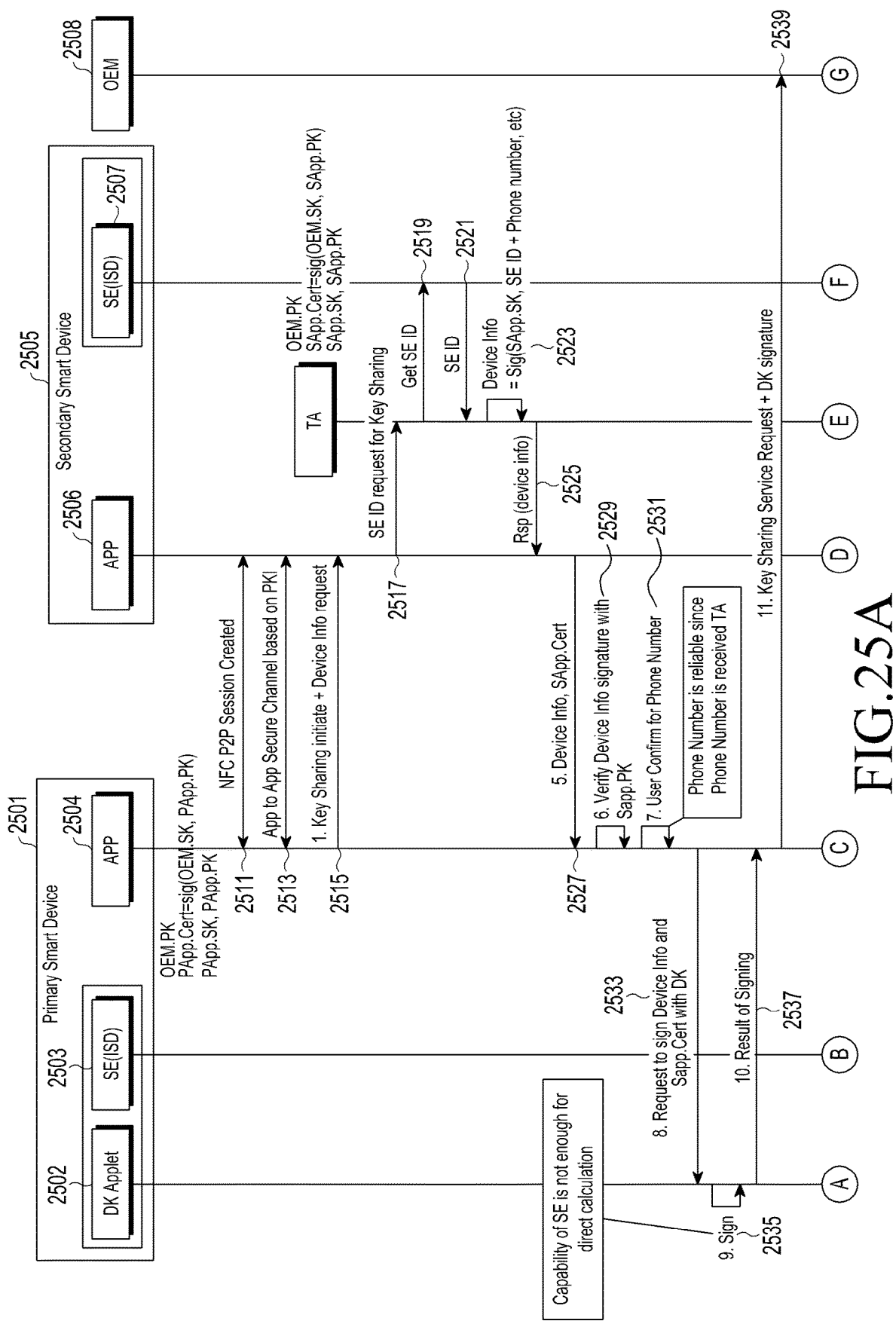
FIGS. 25A and 25B are signal flow diagrams illustrating a process of obtaining information of a secondary device in a communication system according to an embodiment of the present disclosure.
Figure 25B:
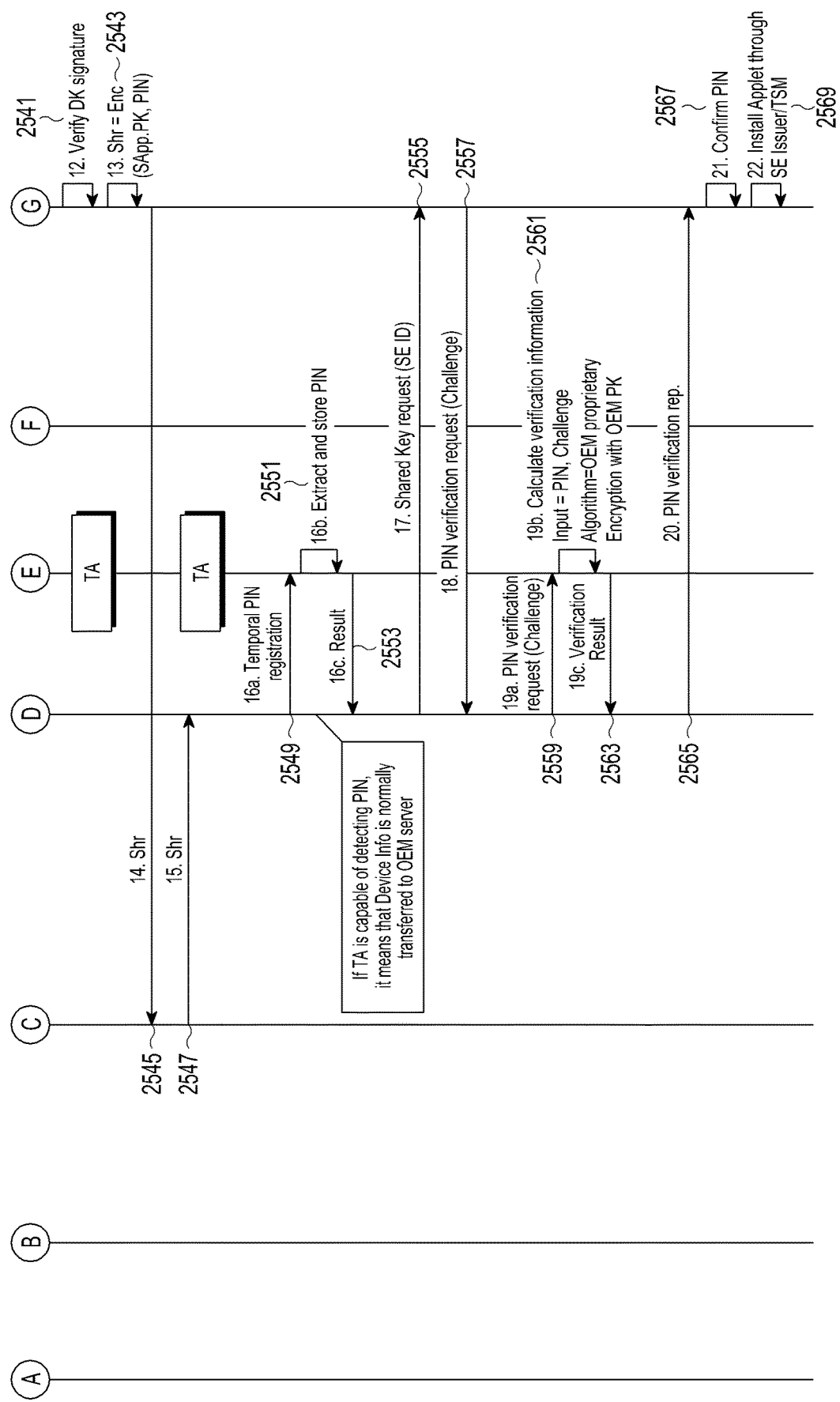

FIGS. 25A and 25B are signal flow diagrams illustrating a process of obtaining information of a secondary device in a communication system according to an embodiment of the present disclosure. Specifically, FIGS. 25A and 25B illustrate a process of obtaining information of a secondary device through a TEE included in the secondary device.

Referring to FIGS. 25A and 25B, it will be noted that a service provider is shown as "OEM", a primary device is shown as "Primary Smart Device", and a secondary device is shown as "Secondary Smart Device". Further, it will be noted that FIGS. 25A and 25B are shown as a form in which the terms "OEM", "Primary Smart Device", and "Secondary Smart Device" are interchangeable with the terms "service provider", "primary device", and "secondary device".

It will be noted that a process of obtaining information of a secondary device in FIGS. 25A and 25B is a process of obtaining information of a secondary device through a trusted execution environment (TEE) included in the secondary device. Further, a trusted application (TA) denotes an application installed at a TEE.

Firstly, an NFC P2P session is generated between an application 2504 of a primary device 2501 and an application 2506 of a secondary device 2505 (2511), and App to App secure channel has been established based on a public key infrastructure (PKI) (2513). The application 2504 of the primary device 2501 requests key sharing initiation and secondary device information from the application 2506 of the secondary device 2505 (2515).

The application 2506 of the secondary device 2505 requests a TA of the secondary device 2505 to obtain an SE ID (2517). The TA of the secondary device 2505 requests the SE ID from the SE 2507 of the secondary device 2505 (2519), and the SE 2507 of the secondary device 2505 transfers the SE ID to the TA (2521). The TA signs the secondary device information (2523), and transfers response including the signed secondary device information to the application 2506 of the secondary device 2505 (2525). The secondary device information includes a secret key of the application 2506 of the secondary device 2505, i.e., SApp.SK, the SE ID, and a phone number. The application 2506 of the secondary device 2505 transmits, to the application 2504 of the primary device 2501, the secondary device information and a certificate of the application 2506 of the secondary device 2505, i.e., SApp.Cert (2527). The SApp.Cert is generated based on an SK of a service provider 2508, i.e., OEM. SK and an SApp.PK.

The application 2504 of the primary device 2501 verifies a signature for the secondary device information using the SApp.PK (2529), and performs a user confirmation on the received phone number (2531). The phone number is obtained through the TA, to ensure that the phone number is trustable.

The application 2504 of the primary device 2501 requests a DK signature for the secondary device information and the SApp.Cert from a DK applet 2502 of the primary device 2501 (2533). The DK applet 2502 of the primary device 2501 signs the secondary device information and the SApp.Cert using the DK (2535), and transmits the signed result to the application 2504 of the primary device 2501 (2537).

The application 2504 of the primary device 2501 requests a key sharing service from the service provider 2508, and transmits the DK signature (2539).

The service provider 2508 verifies the DK signature (2541), and if the verification result is successful, the service provider 2508 generates a shared key, i.e., Shr, by encrypting the SApp.PK and a personal identification number (PIN) (2543). The service provider 2508 transmits the Shr to the application 2504 of the primary device 2501 (2545). The application 2504 of the primary device 2501 transmits the Shr to the application 2506 of the secondary device 2505 (2547). The application 2506 of the secondary device 2505 requests the TA to register a temporal PIN (2549). The TA extracts and stores the PIN (2551), and transmits the PIN registration result to the application 2506 of the secondary device 2505 (2553). The PIN extraction of the TA may indicate that the secondary device information has been normally transmitted to the service provider 2508.

The application 2506 of the secondary device 2505 requests a shared key from the service provider 2508 (2555). The shared key request may include an SE ID.

Upon receiving the shared key request, the service provider 2508 transmits, to the application 2506 of the secondary device 2505, a PIN verification request for requesting to verify a PIN (2557). The PIN verification request may include a challenge.

The application 2506 of the secondary device 2505 requests the TA to verify the PIN (2559). The PIN verification request may include the challenge.

The TA verifies the PIN by computing verification information (2561), and transmits the verification result to the application 2506 of the secondary device 2505 (2563). The PIN verification may be performed based on the PIN and the challenge, and an algorithm used for PIN verification may be based on a property of the service provider 2508.

The application 2506 of the secondary device 2505 transmits, to the service provider 2508, a PIN verification report for reporting that the PIN has been verified (2565). The service provider 2508 confirms the PIN (2567), and installs an applet through an SE Issuer/TSM (2569).

Although FIGS. 25A and 25B illustrate a process of obtaining information of a secondary device in a communication system as a series of operations, various operations in FIGS. 25A and 25B could overlap, occur in parallel, occur in a different order, or occur multiple times.

Figure 26A:
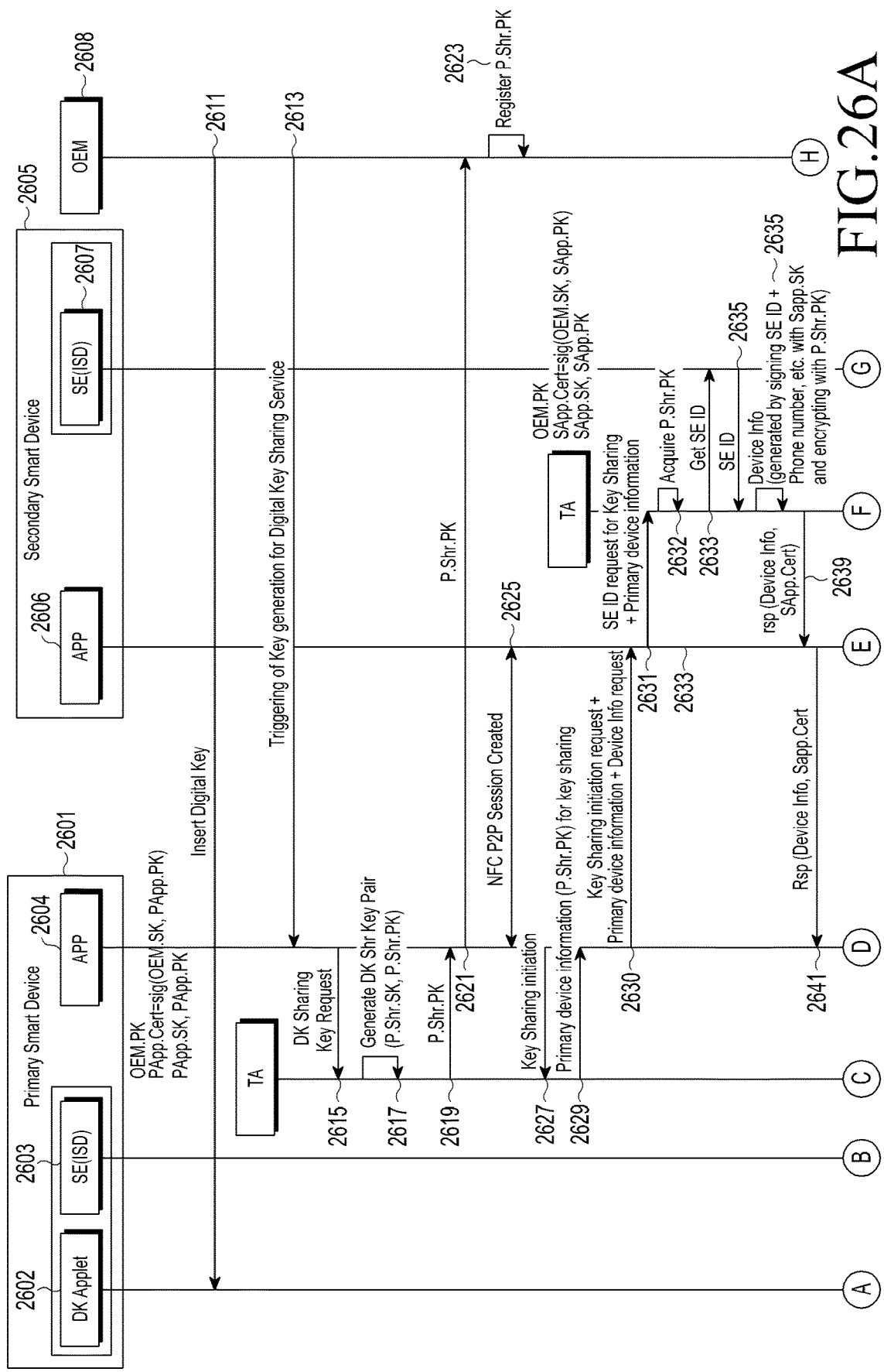
FIGS. 26A and 26B are signal flow diagrams illustrating a process of obtaining information of a secondary device in a communication system according to an embodiment of the present disclosure.
Figure 26B:
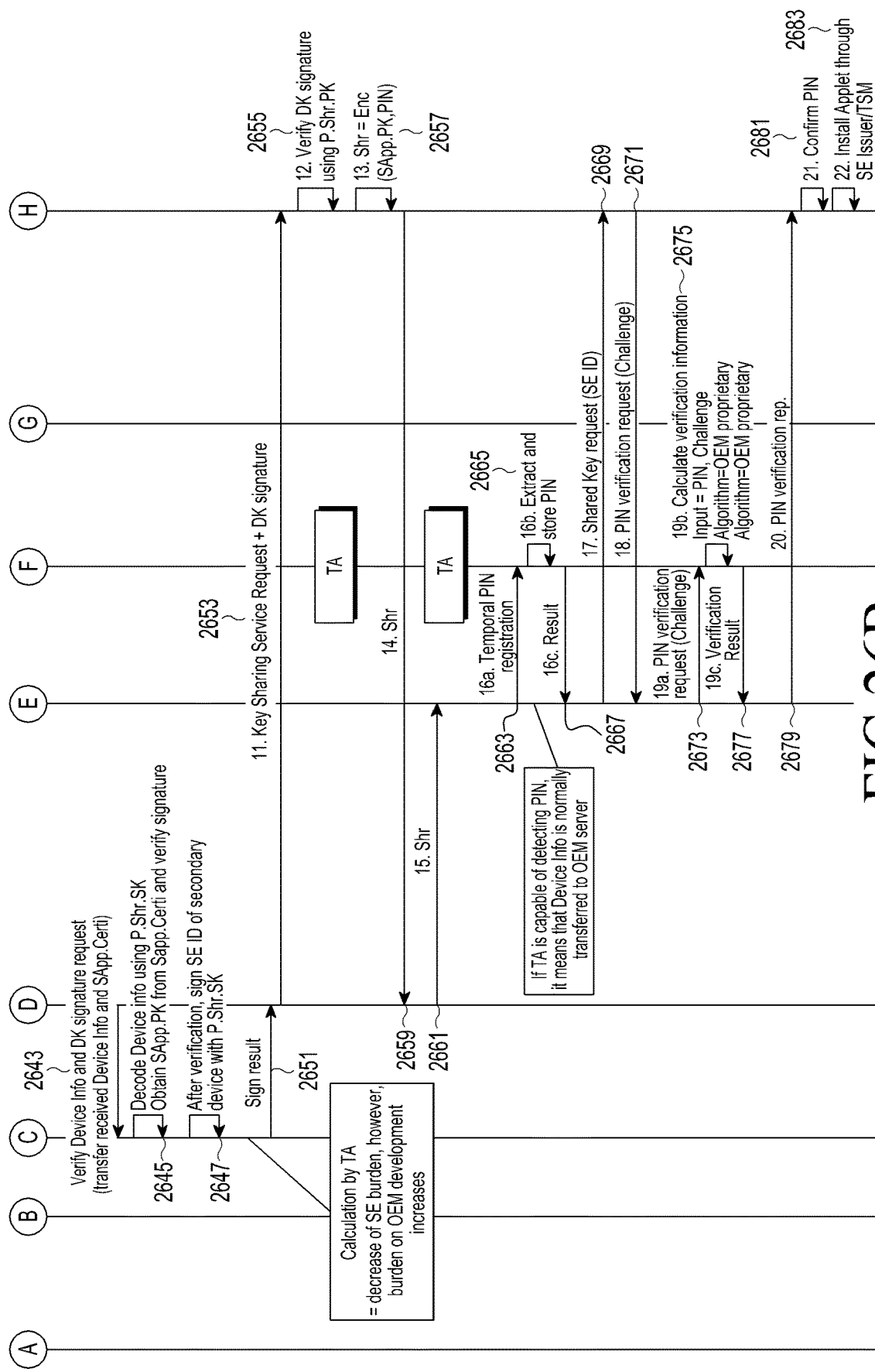

FIGS. 26A and 26B are signal flow diagrams illustrating a process of obtaining information of a secondary device in a communication system according to an embodiment of the present disclosure. Specifically, FIGS. 26A and 26B illustrate a process of obtaining information of a secondary device through a TEE and assuring the information of the secondary device for DK sharing.

Referring to FIGS. 26A and 26B, it will be noted that a service provider is shown as "OEM", a primary device is shown as "Primary Smart Device", and a secondary device is shown as "Secondary Smart Device". Further, it will be noted that FIGS. 26A and 26B are shown as a form in which the terms "OEM", "Primary Smart Device", and "Secondary Smart Device" are interchangeable with the terms "service provider", "primary device", and "secondary device".

It will be noted that a process of obtaining information of a secondary device in FIGS. 26A and 26B is a process of obtaining information of a secondary device through a TEE and assuring the information of the secondary device for digital key sharing.

Firstly, a service provider 2608 inserts a DK into a DK applet 2602 of a primary device 2601 (2611).

The service provider 2608 triggers key generation for a DK sharing service to an application 2604 of the primary device 2601 (2613). The application 2604 of the primary device 2601 requests a TA of the primary device 2601 to generate a key pair for digital key sharing (2615).

The TA generates a DK sharing key pair, i.e., P.Shr.SK and P.Shr.PK (2617), and transmits the P.Shr.SK to the application 2604 of the primary device 2601 (2619).

The application 2604 of the primary device 2601 transmits the P.Shr.PK to the service provider 2608 (2621).

An NFC P2P session is generated between the application 2604 of the primary device 2601 and an application 2606 of a secondary device 2605 (2625), and the application 2604 of the primary device 2601 informs a TA of the primary device 2601 of key sharing initiation (2627). The TA of the primary device 2601 transfers, to the application 2604 of the primary device 2601, information required for key sharing, i.e., primary device information including P.Shr.PK (2629).

The application 2606 of the secondary device 2605 transmits, to a TA of the secondary device 2605, received primary device information and SE ID obtainment request (2630). The TA of the secondary device 2605 extracts P.Shr.PK from the received primary device information (2632), and requests the SE ID from the SE 2607 of the secondary device 2605 (2633). The SE 2607 of the secondary device 2605 transfers the SE ID to the TA (2635). The TA signs the secondary device information, encrypts the signed secondary device information with P.Shr.PK (2637), and transmits a response including the signed secondary device information to the application 2606 of the secondary device 2605 (2639). The secondary device information includes a secret key of the application 2606 of the secondary device 2605, i.e., SApp.SK, the SE ID, and a phone number.

The application 2606 of the secondary device 2605 transmits, to the application 2604 of the primary device 2601, the secondary device information and a certificate of the application 2606 of the secondary device 2605, i.e., SApp.Cert (2641). The SApp.Cert may be generated based on an SK of a service provider 2608, i.e., an OEM.SK and an SApp.PK.

The application 2604 of the primary device 2601 transmits the received secondary device information to the TA of the primary device 2601 (2643). The TA of the primary device 2601 decodes the secondary device information using P.Shr.SK, obtains SApp.PK from the SApp.Certi, and verifies the signature for the secondary device using SApp.PK (2645). If the verification result is successful, the TA of the primary device 2601 signs the secondary device information and the SApp.Cert using the SApp.PK (2647), and transmits the signed result to the application 2604 of the primary device 2601 (2651).

The application 2604 of the primary device 2601 requests a key sharing service from the service provider 2608, and transmits the DK signature (2653).

The service provider 2608 verifies the DK signature (2655), and if the verification result is successful, generates a shared key, i.e., Shr, by encrypting the SApp.PK and a PIN (2657). The DK signature verification may be performed using a P.Shr.PK.

The service provider 2608 transmits the Shr to the application 2604 of the primary device 2601 (2659). The application 2604 of the primary device 2601 transmits the Shr to the application 2606 of the secondary device 2605 (2661).

The application 2606 of the secondary device 2605 requests the TA to register a temporal PIN (2663). The TA extracts and stores the PIN (2665), and transmits the PIN registration result to the application 2606 of the secondary device 2605 (2667). The PIN extraction of the TA indicates that the secondary device information has been normally transmitted to the service provider 2608.

The application 2606 of the secondary device 2605 requests a shared key from the service provider 2608 in step 2669. The shared key request may include an SE ID.

Upon receiving the shared key request, the service provider 2608 transmits a PIN verification request for requesting to verify a PIN to the application 2606 of the secondary device 2605 (2671). The PIN verification request may include a challenge.

The application 2606 of the secondary device 2605 requests the TA to verify the PIN (2673). The PIN verification request may include the challenge.

The TA verifies the PIN by computing verification information (2675), and transmits the verification result to the application 2606 of the secondary device 2605 (2677). The PIN verification may be performed based on the PIN and challenge, and an algorithm used for PIN verification may be based on a property of the service provider 2608.

The application 2606 of the secondary device 2605 transmits, to the service provider 2608, a PIN verification report for reporting that the PIN has been verified (2679). The service provider 2608 confirms the PIN (2681), and installs an applet through an SE Issuer/TSM (2683).

Although FIGS. 26A and 26B illustrate a process of obtaining information of a secondary device in a communication system as a series of operations, various operations in FIGS. 26A and 26B could overlap, occur in parallel, occur in a different order, or occur multiple times.

Figure 27:
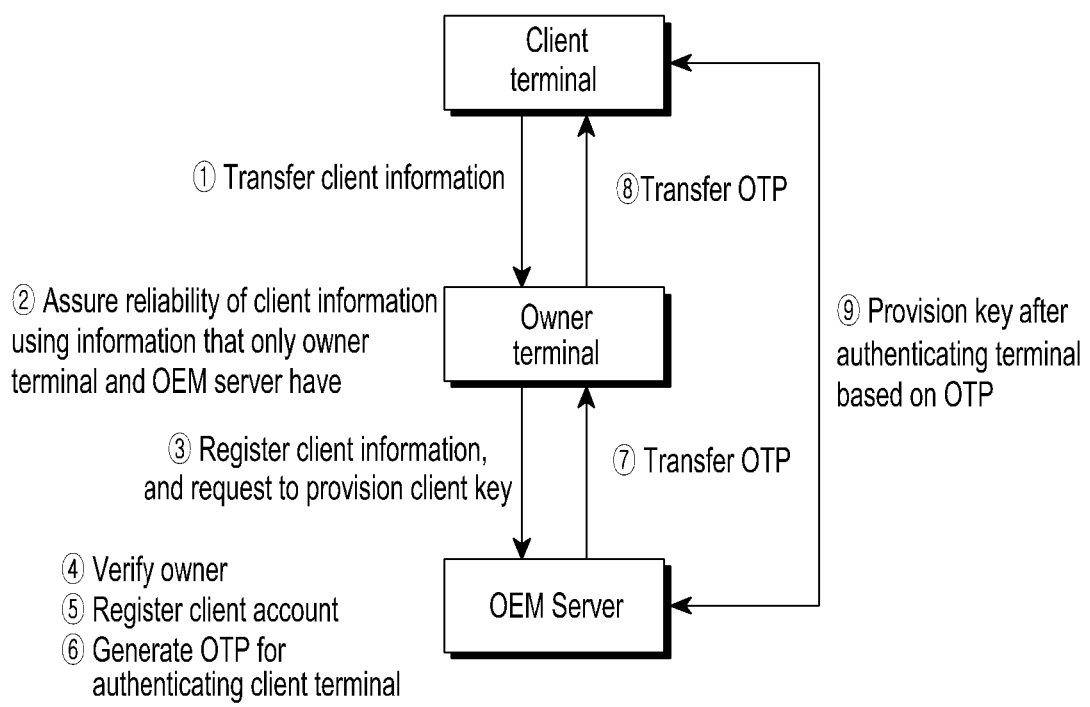
FIG. 27 illustrates a process of providing a DK in a communication system according to an embodiment of the present disclosure.

FIG. 27 illustrates a process of providing a DK in a communication system according to an embodiment of the present disclosure.

Referring to FIG. 27, it will be noted that a service provider is shown as "OEM Server", a primary device is shown as "Owner terminal", and a secondary device is shown as "Client terminal". Further, it will be noted that FIG. 27 is shown as a form in which the terms "OEM Server", "Owner terminal", and "Client terminal" are interchangeable with the terms "service provider", "primary device", and "secondary device".

Firstly, a secondary device transmits secondary device information of the secondary device to a primary device ([1]).

The primary device assures reliability of the secondary device through credential information shared between a service provider and the primary device, and registers the secondary device information at the service provider ([2] and [3]).

The service provider verifies the primary device, registers an account of the secondary device, and generates an OPT for authenticating the secondary device ([4], [5], and [6]).

The information for authentication, i.e., the OTP generated by the service provider is transmitted to the secondary device through the primary device ([7] and [8]), so that an authentication operation is performed between the service provider 2701 and the secondary device, and the service provider provisions a key to the secondary device ([9]).

FIG. 28 illustrates a process of providing a DK in a communication system according to an embodiment of the present disclosure.

Specifically FIG. 28, illustrates a process of sharing a DK that a primary device (or an owner device) owns with another device, e.g., a secondary device. A format of a DK that a primary device owns and a format of a DK that is provisioned to a secondary device may be changed according to a service provider, e.g., an OEM.

A format of a DK may also be unique per service provider, or may be the same for all service providers.

The DK providing process in FIG. 28 may be a proximity triggered remote key sharing process through a service provider, which may be referred to as a "proximity triggered remote key sharing via OEM Backend".

In FIG. 28, it will be noted that a service provider is shown as "Car OEM Backend", a primary device is shown as "Owner", and a secondary device is shown as "User". Further, it will be noted that FIG. 28 is shown as a form in which the terms "Car OEM Backend", "Owner", and "User" are interchangeable with the terms "service provider", "primary device", and "secondary device".

Referring to FIG. 28, when a secondary device, i.e., the User, is located near a primary device, i.e., the Owner, security information, e.g., a DK, may be transmitted to the secondary device or may be shared with the secondary device even though the secondary device is not registered at a service provider or a service provided by the service provider.

The primary device and the secondary device are connected based on a proximity connectivity such as an NFC, Bluetooth, and/or the like. That is, a connection is set up between the primary device and the secondary device (1. Connection Setup).

After the connection is set up, user information of the secondary device is temporally registered at the service provider through the primary device (2. User Registration).

After the user information of the secondary device is registered at the service provider through the primary device, the service provider verifies the secondary device when the secondary device requests provisioning of a shared key (3. User Verification).

If the verification for the secondary device is successful, the service provider transfers the digital key to the secondary device based on a digital key service deployment and a key provisioning process. The digital key service deployment and the key provisioning process may be, for example, a car connectivity consortium (CCC) digital key service deployment and key provisioning process, and a detailed description of the digital key service deployment and the key provisioning process will be omitted herein (4. Key Provisioning).

Figure 29A:
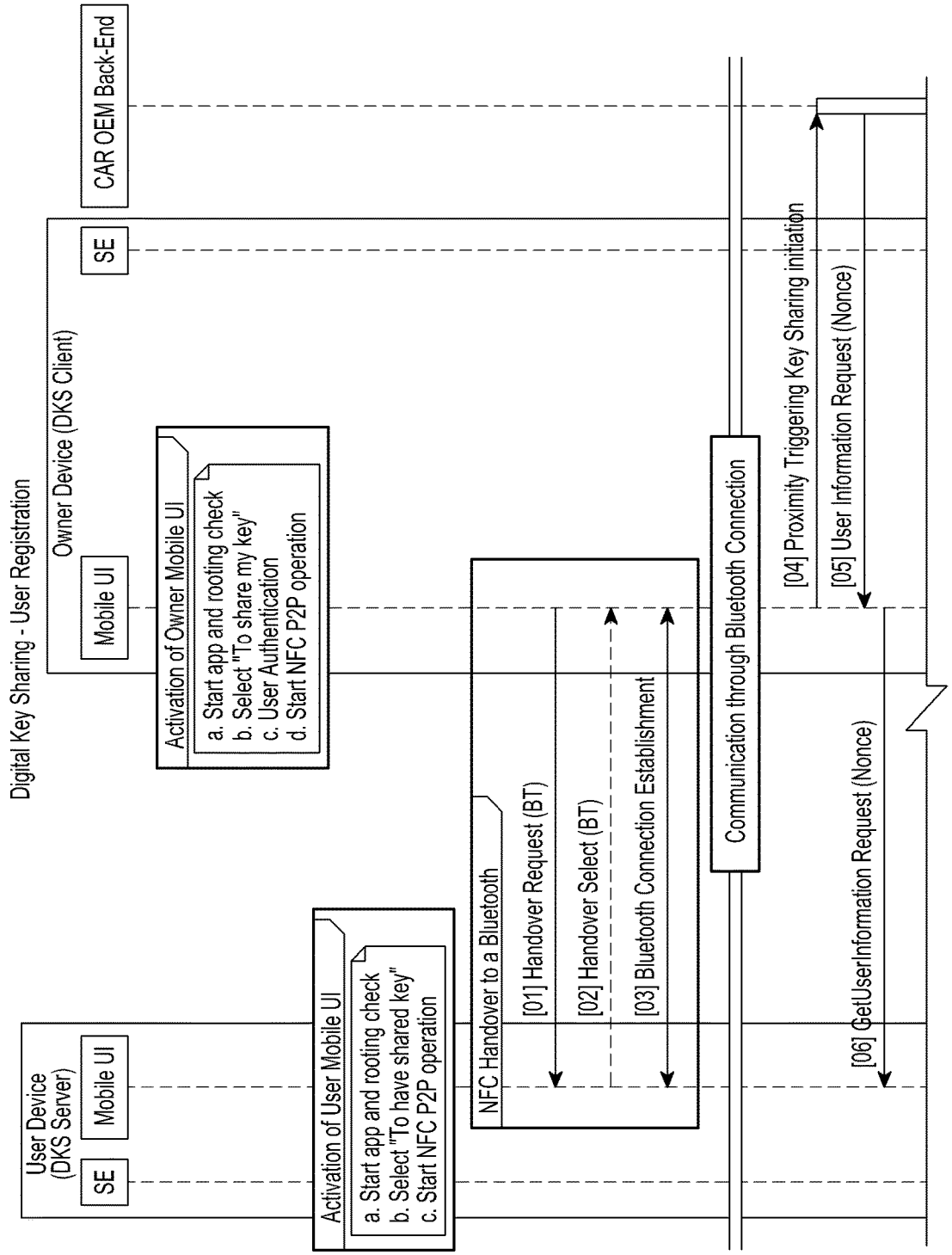
FIGS. 29A to 29C are signal flow diagrams illustrating a secondary device registration process included in a process of providing a DK in a communication system according to an embodiment of the present disclosure.
Figure 29B:
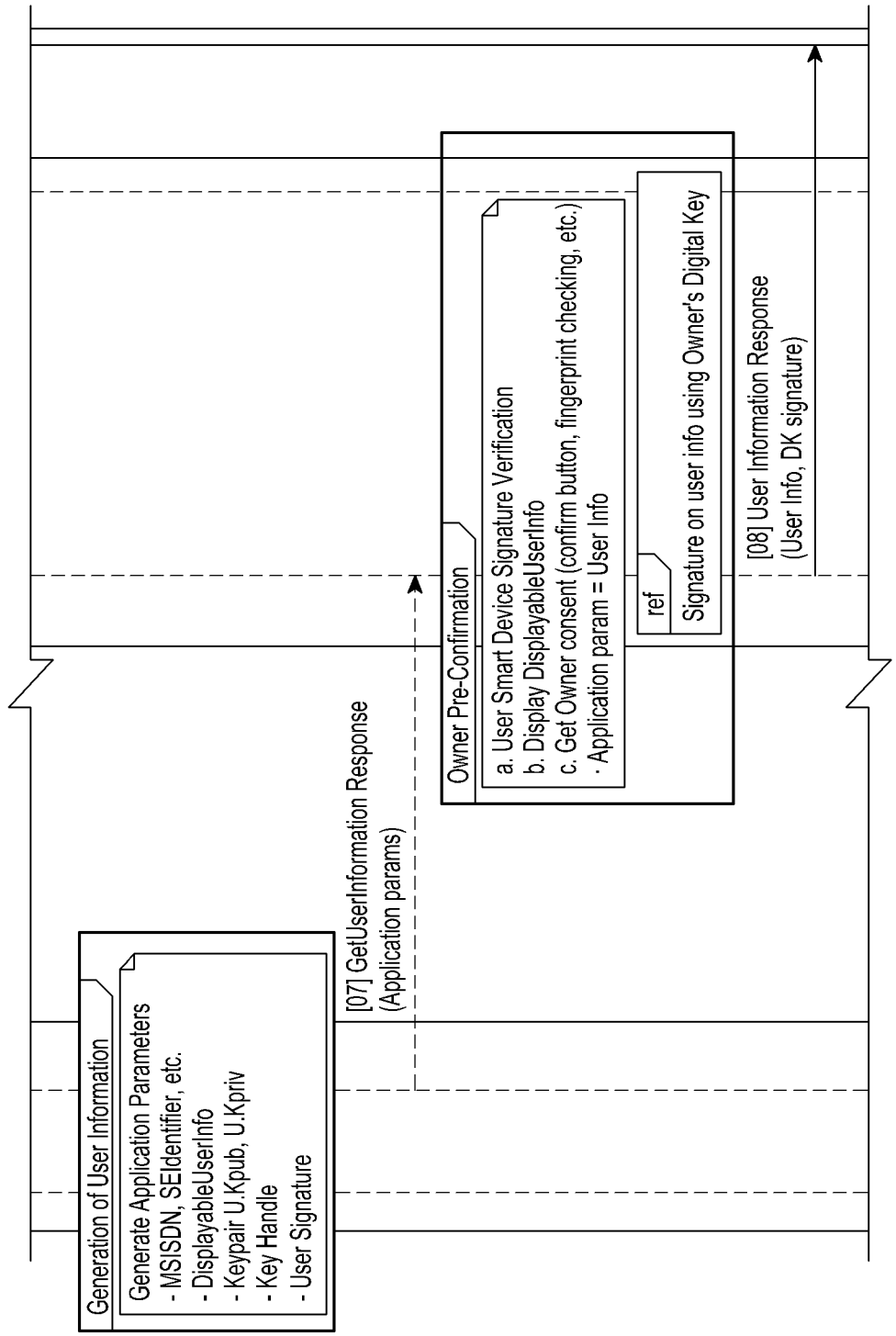
Figure 29C:
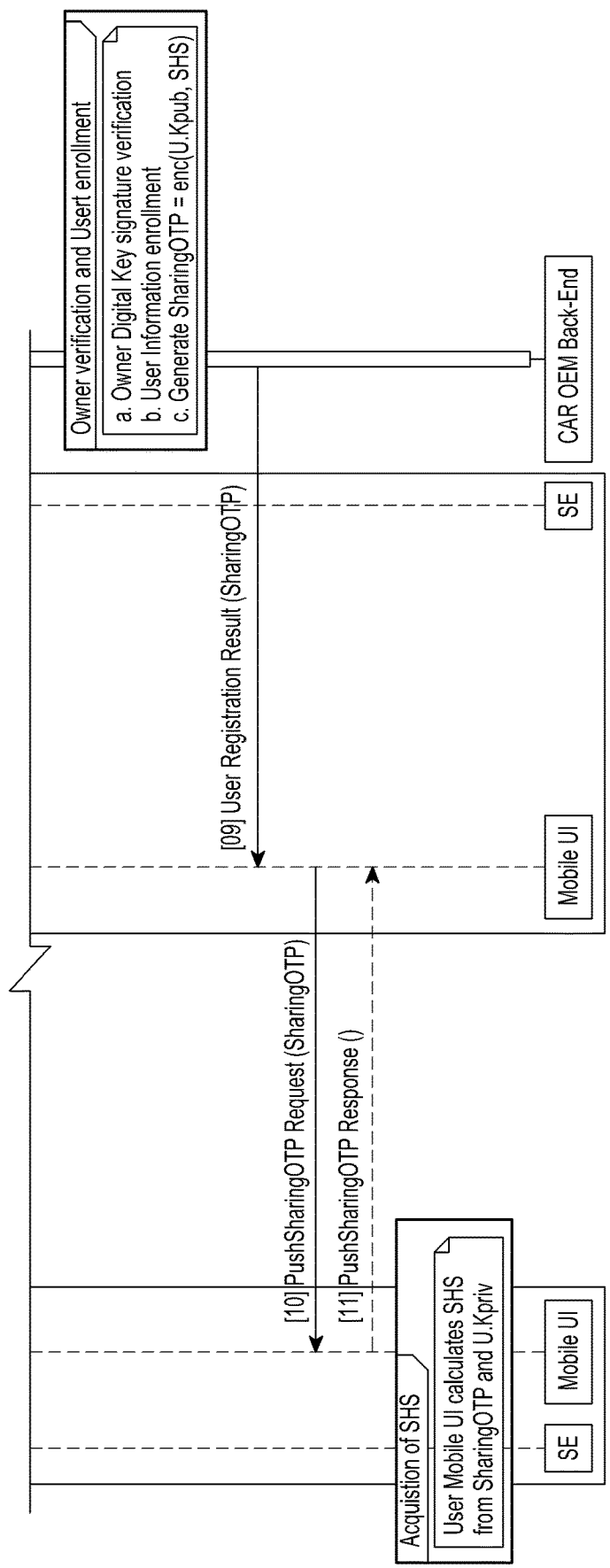

FIGS. 29A to 29C are signal flow diagrams illustrating a secondary device registration process included in a process of providing a DK in a communication system according to an embodiment of the present disclosure. Specifically, FIGS. 29A to 29C indicate how the secondary device and user information of the secondary device are registered at a service provider.

In FIGS. 29A to 29C, it will be noted that a service provider is shown as "Car OEM Back-End", a primary device is shown as "Owner Device (DKS Client)", and a secondary device is shown as "User Device (DKS Server)". Further, it will be noted that FIGS. 29A to 29C are shown as a form in which the terms "Car OEM Back-End", "Owner Device (DKS Client)", and "User Device (DKS Server)" are interchangeable with the terms "service provider", "primary device", and "secondary device".

The secondary device includes an SE and a Mobile UI, and the primary device includes a Mobile UI and an SE. In FIGS. 29A to 29C, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively. The Mobile UI-A and the Mobile UI-B may access the SE-A and the SE-B, respectively. That is, a Mobile UI denotes an entity which enables a P2P communication with other device, and may access an SE.

Firstly, the Mobile UI-B is activated (Activation of Owner Mobile UI), and this will be described below.

The Mobile UI-B is run according to application start, rooting check, and/or the like (a. Start app and rooting check), and a menu such as key transferring, key sharing, and/or the like is selected (b. Select "To share my Key"). The application rooting check may be performed when the application is run or when a specific function is required according to service development.

A user authentication process may be performed if necessary according to a service policy of a provider of the Mobile UI-B or a service provider (c. User Authentication), and the user authentication process may be performed based on a PIN which has been registered at the primary device in advance, biometrics, and/or the like. The Mobile UI-B starts operating in an NFC P2P mode (d. Start NFC P2P operation).

In the activation process of the Mobile UI-B, remaining operations except for the rooting check may be optional, so the remaining operations may be performed or omitted according to implementation of the provider of the Mobile UI-B. The Mobile UI-B supports one or more application rooting check mechanisms (Mobile UI shall support one or more app rooting check mechanism).

Further, the Mobile UI-A is activated (Activation of User Mobile UI), this will be described below. In FIGS. 29A to 29C, it will be noted that it is assumed that the secondary device installs at least one Mobile UI.

The Mobile UI-A is run according to application start, rooting check, and/or the like (a. Start app and rooting check), and a menu such as key receiving, and/or the like is selected (b. Select "to have shared key"). The application rooting check may be performed when the application is run or when a specific function is required according to service development.

The Mobile UI-A starts operating in an NFC P2P mode (c. Start NFC P2P operation).

In the activation process of the Mobile UI-A, remaining operations except for the rooting check may be optional, so the remaining operations may be performed or omitted according to implementation of the provider of the Mobile UI-A. The Mobile UI-A supports one or more application rooting check mechanisms (Mobile UI shall support one or more app rooting check mechanism).

A handover from the NFC to Bluetooth or Wi-Fi of which a coverage is relatively wider than the NFC is performed between the secondary device and the primary device (NFC Handover to a Bluetooth). This will be described below.

The Mobile UI-B transmits, to the Mobile UI-A, a message for requesting handover from the NFC to Bluetooth, e.g., a handover request message ([01] Handover Request (BT)). Upon receiving the handover request message from the Mobile UI-B, the Mobile UI-A selects handover to Bluetooth, and transmits, to the Mobile UI-B, a message indicating that the Mobile UI-A selects handover to Bluetooth, e.g., a handover select message ([02]Handover Select (BT)). That is, the primary device becomes a handover requester, and the secondary device becomes a handover selector. It will be noted that the more specific parameters and situations for the handover from the NFC to Bluetooth are the same as described in an NFC Connection Handover Technical Specification [xx] and Bluetooth Secure Simple Pairing specification [xx].

For example, "3cbb4363-dd09-4856-94e4-416605fa8fcb" will be used as a universally unique identifier (UUID) upon handover.

According to the exchange of the handover request message and the handover select message, a Bluetooth connection is established between the Mobile UI-B and the Mobile UI-A ([03] Bluetooth Connection Establishment).

According that the Bluetooth connection is established between the Mobile UI-B and the Mobile UI-A, a communication is performed among the secondary device, the primary device, and the service provider through the Bluetooth connection (Communication through Bluetooth Connection).

The Mobile UI-B transmits, to the service provider, a message indicating that proximity triggering key sharing will be initiated, that is, indicating that a key sharing process which is a proximity touch will be initiated, for example, a proximity triggering key sharing initiation message ([04] Proximity Triggering Key Sharing initiation). An interface between the Mobile UI-B and the service provider may be implemented with various forms, and a detailed description thereof will be omitted herein.

Upon receiving the proximity triggering key sharing initiation message from the Mobile UI-B, the service provider generates a nonce as a random variable. The nonce is used for receiving and verifying information of the secondary device, this is for preventing reuse of the information of the secondary device by using the nonce when generating the information of the secondary device. The nonce is newly generated whenever a key sharing process is started, so unique information for the secondary device may be generated.

In FIGS. 29A to 29C, it is assumed that the nonce is generated in the service provider, however, the nonce may be generated in the primary device. If the nonce is generated in the primary device, the nonce generated in the primary device will be generated to the service provider at operation [8] to be described, so the service provider may verify the secondary device based on the nonce generated in the primary device.

The service provider transmits, to the primary device, a message for requesting user information of the secondary device to be registered at the service provider, e.g., a user information request message ([05] User Information Request(Nonce)). Here, the user information request message includes the nonce generated by the service provider.

Upon receiving the user information request message from the service provider, the Mobile UI-B of the primary device transmits, to the Mobile UI-A of the secondary device, a message for requesting the information of the secondary device to be registered at the service provider, e.g., a get user information request message ([06] Get User Information Request (Nonce)). The get user information request message includes the nonce included in the user information request message.

Upon receiving the get user information request message from the Mobile UI-B, the Mobile UI-A performs a user information generating operation of generating the information of the secondary device to be registered at the service provider, e.g., application parameters (Generation of User Information). Here, the user information may include the following application parameters.

(1) ID Information

The ID information may include an MSISDN, an SE ID, and/or the like. Further, the ID information may include SE Issuer information, an App version, an IMEI, a credential for an SE included in the secondary device, a device model name of the secondary device, a device manufacturer name, a device serial number (S/N), and/or the like.

(2) Information to be Output on an Output Device, e.g., a Screen of a Primary Device The information to be output on the output device may include, for example, a phone number of the secondary device, a device model of the secondary device, a name of the secondary device, an account registered at an operating system (OS), a nickname of the secondary device, and/or the like.

(3) Public/Private Key Pair (U.Kpub, U.Kpriv)

The U.Kpub denotes a public key generated by the secondary device, i.e., a user device, and the U.Kpriv denotes a private key generated by the secondary device, i.e., the user device.

(4) Key Handle

The key handle denotes an ID for the public/private key pair.

(5) User Signature Uinfo.Signature

Input parameters of the user signature Uinfo.Signature are ID information, information to be output on an output device of a primary device, a public key U.Kpub, a key handle, and a nonce value, and is generated using a private key U.Kpriv. A scheme of generating the user signature Uinfo.Signature based on the ID information, the information to be output on the output device of the primary device, the public key U.Kpub, the key handle, the nonce value, and the private key U.Kpriv may be implemented with various forms, and a detailed description thereof will be omitted herein.

After performing the user information generating operation, the Mobile UI-A transmits, to the Mobile UI-B, a response message to the get user information request message, e.g., a get user information response message ([07] Get User Information Response(Application params)). Here, the get user information response includes the user information of the secondary device generated by the Mobile UI-A, i.e., the application parameters.

Upon receiving the get user information response message from the Mobile UI-A, the Mobile UI-B performs a pre-confirmation operation (Owner Pre-Confirmation). The pre-confirmation operation will be described below.

The Mobile UI-B verifies Uinfo.Signature using the public key U.Kpub received from the Mobile UI-A (a. User Smart Device Signature Verification).

If the verification for the Uinfo.Signature is successful, the Mobile UI-B outputs the user information of the secondary device on an output device, e.g. a screen included in the primary device (b. Display Displayable UserInfo). The reason why the Mobile UI-B outputs the user information of the secondary device on the output device is for confirming the user information of the secondary device. For example, this confirmation may be made according to event occurrence according to intervention of a user of the primary device, e.g., a touch of a confirmation button, a fingerprint check, and/or the like. Upon detecting that the user information output on the output device is confirmed (c. Get Owner consent (confirm button, fingerprint checking, etc.)), the Mobile UI-B signs the user information of the secondary device using a digital key stored at the primary device or a key which has authority equivalent to the digital key (Signature on User Info using Owner's Digital Key). If the Mobile UI-B directly uses a digital key stored at the SE-B, the Mobile UI-B uses an APDU for digital key signature. The APDU for the digital key signature will be described with reference to FIG. 32, and a detailed description thereof will be omitted herein.

After performing the pre-confirmation operation, the Mobile UI-B transmits, to the service provider, a response message to the user information request message, e.g., a user information response message ([08] User Information Response (User Info, DK signature). The user information response message includes the user information received from the secondary device and the digital key signature of the primary device. Upon receiving the user information response message from the Mobile UI-B, the service provider performs a user device verification operation and a secondary device registration operation (Owner Verification and User enrollment). The user device verification operation and the secondary device registration operation will be described below.

The service provider performs a verification operation on the digital key signature of the primary device (a. Owner Digital Key signature verification). That is, the service provider determines whether the primary device is an owner device which owns a digital key, or whether the primary device owns appropriate authority by performing the verification operation on the digital key signature of the primary device.

If the verification result for the digital key signature of the primary device is successful, the service provider registers, i.e., stores the user information of the secondary device which is received from the primary device and is signed with the digital key (b. User Information enrollment).

The user information of the secondary device includes an SE ID of an SE included in the secondary device, i.e., the SE-A, an MSISDN, a U.Kpub, a key handle, and/or the like.

The service provider generates shared secret (SHS) which the service provider and the secondary device will share, and generates an OTP by encrypting the SHS based on a public key of the secondary device (c. Generate sharing OTP=enc (U.Kpub, SHS).

The SHS is a value used for verifying the secondary device in the subsequent procedure. That is, the service provider checks whether the secondary device owns the SHS.

The reason why the service provider generates an OTP is for preventing another device other than the secondary device from obtaining SHS by decrypting the OTP when the service provider transfers corresponding information, e.g., a digital key through the primary device.

After performing the user device verification operation and the secondary device registration operation, the service provider transmits, to the Mobile UI-B, a user registration result through a user registration result message ([09] User Registration Result (Sharing OTP). If the user information of the secondary device is normally registered, the user registration result message includes a sharingOTP. The sharingOTP denotes the OTP generated by the service provider.

Upon receiving the user registration result message from the service provider, the Mobile UI-B transfers the SharingOTP received from the service provider to the Mobile UI-A ([10] Push SharingOTP Request(SharingOTP)). That is, the Mobile UI-B transfers, to the Mobile UI-A, the SharingOTP through a push SharingOTP request message. Upon receiving the push SharingOTP request message from the Mobile UI-B, the Mobile UI-A stores the SharingOTP, and transmits, to the Mobile UI-A, a response message to the push SharingOTP request message, e.g., a push SharingOTP response message ([11] Push SharingOTP Response( )). After transmitting the Push SharingOTP Response message, the Mobile UI-A performs an SHS acquisition operation (Acquisition of SHS). Here, the SHS acquisition-operation will be described below.

The Mobile UI-A decodes the SharingOTP using the U.KPriv as the private key of the secondary device, and obtains the SHS using the SharingOTP (User Mobile UI calculates SHS from Sharing OTP and U.Kpriv).

Although FIGS. 29A to 29C illustrate a secondary device registration process as a series of operations, various operations in FIGS. 29A to 29C could overlap, occur in parallel, occur in a different order, or occur multiple times.

Figure 30A:
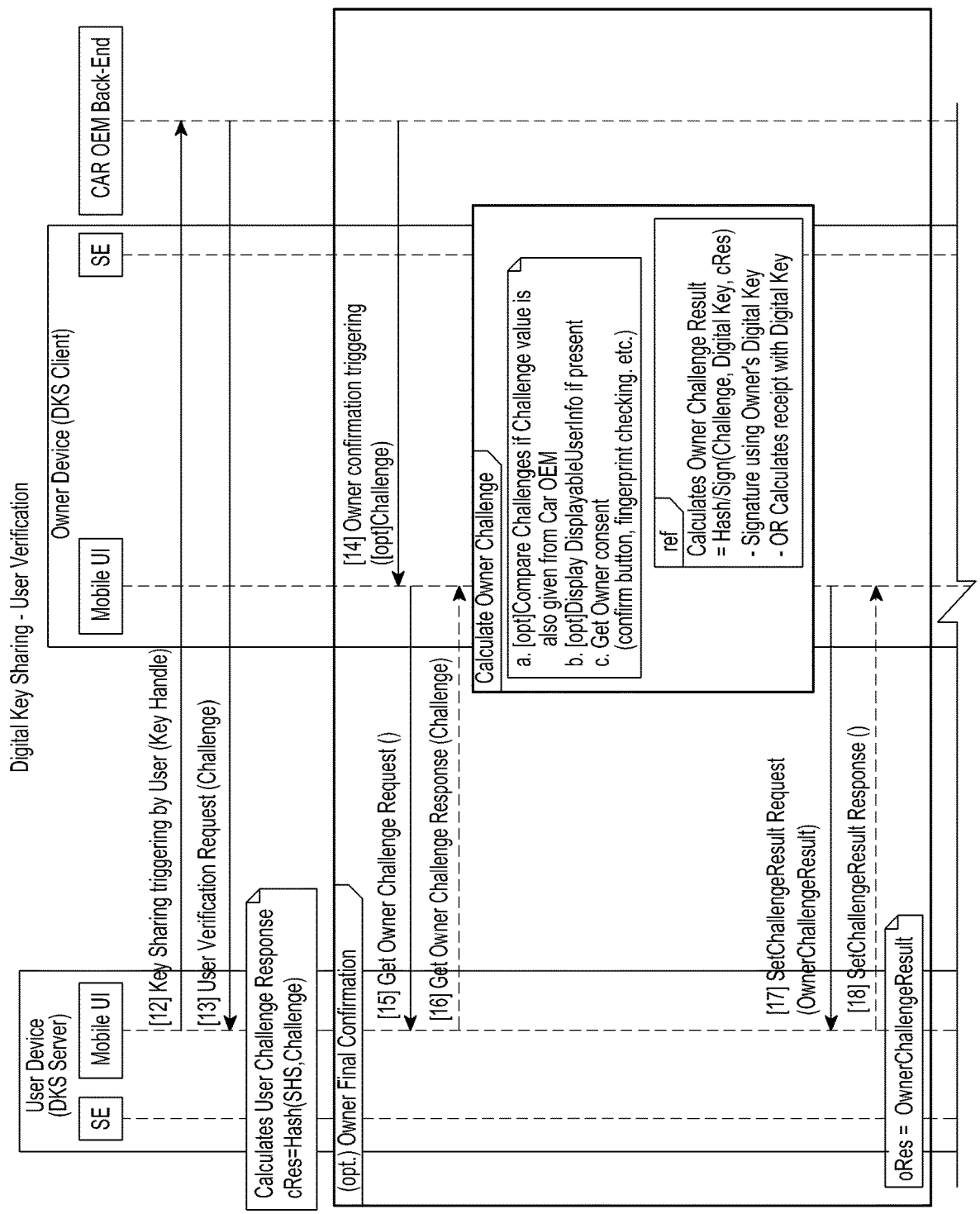
FIGS. 30A and 30B are signal flow diagrams illustrating a secondary device verification process included in a process of providing a DK in a communication system according to an embodiment of the present disclosure.
Figure 30B:
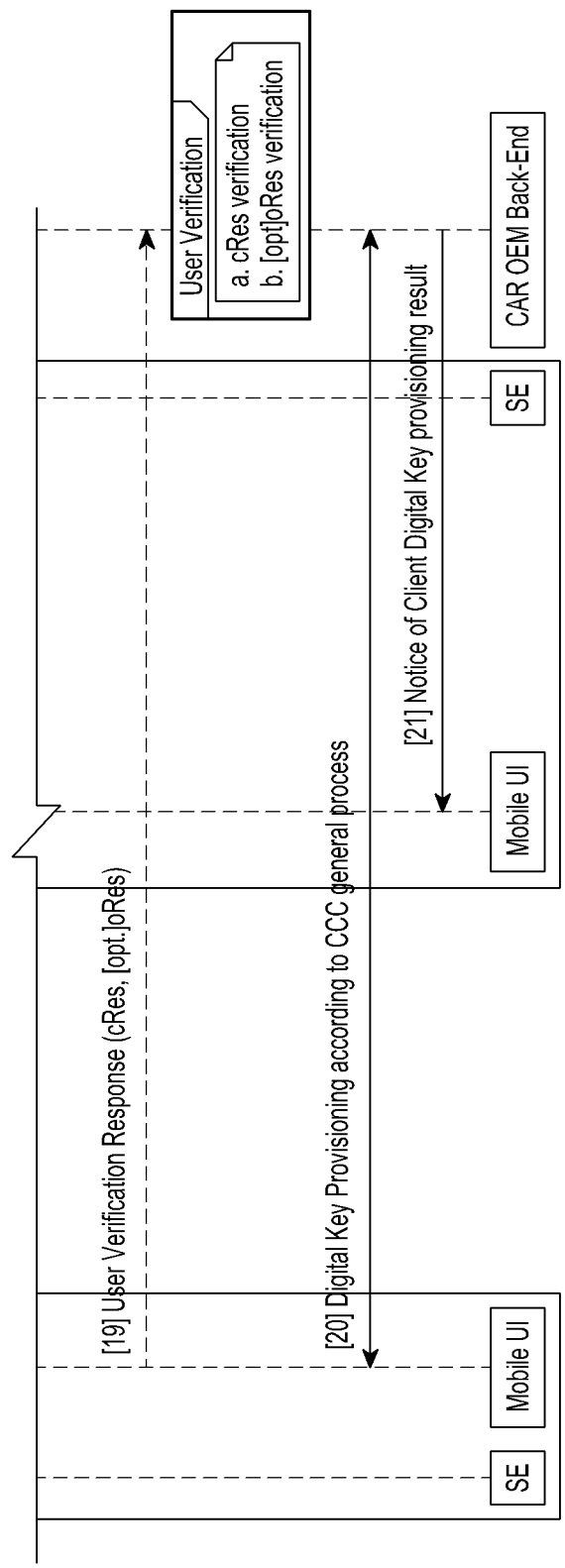

FIGS. 30A and 30B are signal flow diagrams illustrating a secondary device verification process included in a process of providing a DK in a communication system according to an embodiment of the present disclosure. Specifically, FIGS. 30A and 30B illustrate a secondary device verification process for checking whether a secondary device owns an SHS, confirming the secondary device through a primary device, and sharing a DK with the secondary device before provisioning the DK to the secondary device.

In FIGS. 30A and 30B, it will be noted that a service provider is shown as "Car OEM Back-End", a primary device is shown as "Owner Device (DKS Client)", and a secondary device is shown as "User Device (DKS Server)". Further, it will be noted that FIGS. 30A and 30B are shown as a form in which the terms "Car OEM Back-End", "Owner Device (DKS Client)", and "User Device (DKS Server)" are interchangeable with the terms "service provider", "primary device", and "secondary device".

The secondary device includes an SE and a Mobile UI, and the primary device includes a Mobile UI and an SE. In FIGS. 30A and 30B, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively.

A Mobile UI-A included in a secondary device which obtains SHS requests a key sharing service as a service which shares a digital key from a service provider ([12] Key Sharing triggering by User (Key Handle)). That is, the Mobile UI-A transmits, to the service provider, a key sharing triggering message for requesting the key sharing service. Here, the key sharing triggering message includes a key handle.

The service provider may know which secondary device requests the key sharing service through the key handle included in the key sharing triggering message.

For clearing identifying the secondary device which requests the key sharing service, the key sharing triggering message may further include an MSISDN, an SE ID, an IMEI, and/or the like.

Upon receiving the key sharing triggering message from the Mobile UI-A, the service provider requests the Mobile UI-A to verify a user ([13] User Verification Request (Challenge). For example, the service provider may request user verification by transmitting a user verification request message, and the user verification request message includes challenge.

If the secondary device generates response which the service provider predicts, i.e., challenge response to transmit the challenge response to the service provider, the service provider may determine that the secondary device is normally verified. In FIGS. 30A and 30B, one challenge has been considered, however, challenge for the primary device and challenge for the secondary device may be implemented separately.

In FIGS. 30A and 30B, it will be assumed that one challenge is used, and each of the user device and the primary device generates challenge response to the one challenge.

Upon receiving the user verification request message from the service provider, the Mobile UI-A calculates challenge response (Calculates User Challenge Response). Here, the challenge response generated by the secondary device will be referred to as user challenge response.

The challenge response is calculated based on SHS and challenge. In various embodiment of the present disclosure, challenge response may be also referred to as cRes.

The Mobile UI-A may generate a signature by signing the challenge response with a private key of the secondary device U.Kpriv.

Then, a primary device final confirmation operation is performed among the secondary device, the primary device, and the service provider (Owner final Confirmation). The primary device final confirmation operation will be described below.

The service provider triggers the primary device final confirmation operation ([14] Owner confirmation triggering ((opt) Challenge)). The service provider triggers the primary device final confirmation operation by transmitting an owner confirmation triggering message.

The owner confirmation triggering message may include the challenge transmitted from the service provider to the primary device.

The challenge included in the owner confirmation triggering message is compared with a challenge to be received through the secondary device at operation [16], and a security may be enhanced through this comparison operation.

Upon receiving the owner confirmation triggering message from the service provider, the Mobile UI-B requests a challenge value from the Mobile UI-A ([15] Get Owner Challenge Request). For example, the Mobile UI-B may request the challenge value from the Mobile UI-A through a get owner challenge request message.

Upon receiving the get owner challenge request message from the Mobile UI-B, the Mobile UI-A transmits, to the Mobile UI-B, a response message to the get owner challenge request message, e.g., a get owner challenge response message ([16] Get Owner Challenge Response(Challenge)). Here, the get owner challenge response includes the following parameters.

1) challenge response (cRes) generated by the Mobile UI-A, 2) challenge received from the service provider (if there is separate challenge for the primary device at operation [13], the Mobile UI-A includes the challenge for the primary device, not the challenge received from the service provider into the get owner challenge response).

Upon receiving the get owner challenge response message from the Mobile UI-A, the Mobile UI-B performs an owner challenge calculating operation of calculating the challenge of the primary device (Calculate Owner Challenge). Here, the owner challenge calculating operation will be described below.

If the Mobile UI-B receives a challenge from the service provider, the Mobile UI-B compares the challenge received from the service provider with the challenge included in the get owner challenge response message (a. [opt] Compare Challenges if Challenge value is also given form Car OEM).

If the user information of the secondary device is stored, the Mobile UI-B outputs the user information on an output device, e.g., a screen of the primary device for final confirmation (b. [opt] Display Displayable UserInfo If present).

If the user information is encrypted, the Mobile UI-B decodes the user information based on a private key of the primary device, and outputs the decoded user information on the output device, e.g., a screen.

If the user information output on the screen, i.e., the user information displayed on the screen is different from user information at a pre-confirmation operation, it is expected that a security attack such as man in the middle attack, and/or the like occurs, so sharing key provisioning for the secondary device may be prevented.

Upon detecting final confirmation, the Mobile UI-B finally confirms the user information of the secondary device using a digital key stored at the primary device or a key which owns authority equivalent to the digital key.

Here, the final confirmation is generated as a form of a challenge response (oRes) of the primary device and transferred to the service provider through the secondary device, and the service provider verifies the challenge response (oRes).

The oRes, i.e., the challenge response of the primary device is generated using challenge, cRes, and a digital key (or key which owns authority equivalent to the digital key.

In a case that the Mobile UI-B directly uses a digital key stored at an SE-B, the Mobile UI-B generates a challenge response (oRes) of the primary device by signing the challenge and the user information using an APDU for a digital key signature (Sign(Challenge, Digital Key, cRes)). The digital key signature will be described with reference to FIG. 32, and a detailed description thereof will be omitted herein.

The challenge response (oRes) may be generated using a hash function, and/or the like, not the signature. At this time, an owner challenge result (OwnerChallengeResult) is generated by considering all of the challenge, the user information, and the digital key as input parameters of a hash function (Hash(Challenge, Digital Key, cRes)).

The Mobile UI-B transmits the generated OwnerChallengeResult to the Mobile UI-A ([17] Set Challenge Result Request (OwnerChallengeResult)). For example, the Mobile UI-B transmits the generated OwnerChallengeResult to the Mobile UI-A through a set challenge result request message.

Upon receiving the set challenge result request message from the Mobile UI-B, the Mobile UI-A transmits, to the Mobile UI-B, a response message to the set challenge result request message, e.g., a set challenge result response message ([18] Set Challenge Result Response( )). The set challenge result response message include the challenge response (cRes) which the Mobile UI-A directly generates and the challenge response (oRes) received from the Mobile UI-B. If the challenge response (oRes) is not stored at the secondary device, the set challenge result response message does not the challenge response (oRes).

The Mobile UI-A sets the challenge response (oRes) to the OwnerChallengeResult received through the set challenge result request message (oRes=OwnerChallengeResult).

As described above, after the primary device final confirmation operation is performed, the Mobile UI-A transmits a response message to the user verification request message, e.g., a user verification response message ([19] User Verification Response(cRes, [opt] oRes)). Here, the user verification response message includes the challenge response (cRes) generated by the Mobile UI-A and the challenge response(oRes) received from the Mobile UI-B. If there is no challenge response(oRes), the user verification response may include only the challenge response(cRes) generated by the Mobile UI-A.

Upon receiving the user verification response message from the Mobile UI-A, the service provider performs a verification operation on the secondary device (User Verification). The verification operation on the secondary device will be described below.

Upon receiving the user verification response message from the Mobile UI-A, the service provider performs a verification operation on challenge responses included in the user verification response message, i.e., the cRes and the oRes (a. cRes verification; b. [opt] oRes verification). If the verification result for the cRes and the oRes is successful, the service provider provisions a digital key to the secondary device. That is, a digital key provisioning process is performed between the service provider and the secondary device ([20] Digital Key Provisioning according to CCC general process).

If the verification result for the secondary device, the service provider provisions a digital key to the secondary device. That is, a digital key provisioning process is performed between the service provider and the secondary device ([20] Digital Key Provisioning according to CCC general process).

The service provider may cause the primary device to recognize that the digital key is provisioned to the secondary device by transmitting a message indicating the digital key provisioning result for the secondary device to the primary device ([21] Notice of Client Digital Key provisioning result).

Although FIGS. 30A and 30B illustrate an example of a secondary device verification process included in a process of providing a digital key in a communication system according to still another embodiment of the present disclosure, various changes could be made to FIGS. 30A and 30B. For example, although shown as a series of operations, various operations in FIGS. 30A and 30B could overlap, occur in parallel, occur in a different order, or occur multiple times.

Figure 31:
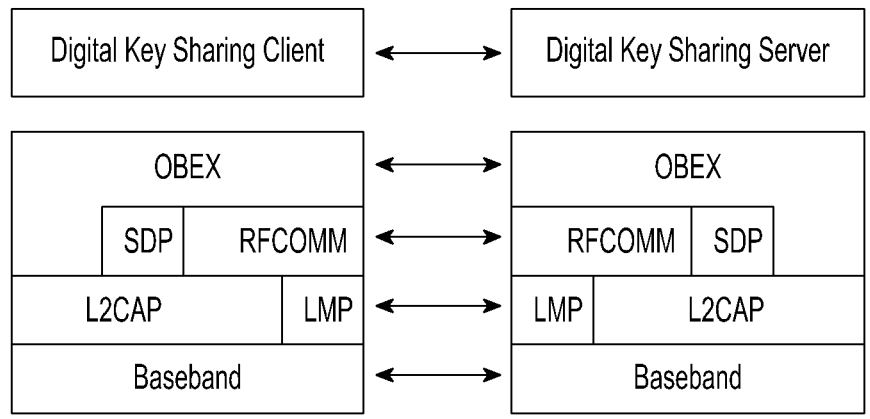
FIG. 31 illustrates a protocol stack for a DK sharing service in a communication system according to an embodiment of the present disclosure.

FIG. 31 illustrates a structure of a protocol stack for a DK sharing service in a communication system according to an embodiment of the present disclosure.

Referring to FIG. 31, a baseband layer, a link manager protocol (LMP) layer, and a logical link control and adaptation protocol (L2CAP) layer are physical and data link layers of a Bluetooth protocol. A radio frequency communication (RFCOMM) layer is a Bluetooth serial port emulation entity. A service discovery protocol (SDP) layer is a Bluetooth service discovery protocol layer.

Further, a DK sharing service may be defined as an underlying objection exchange (OBEX) session between a client and a server, which is open using a DK sharing service UUID.

A DKSC initiates an operation of pushing and pulling objects to a DKSS and an operation of pushing and pulling objects from the DKSS. For example, a primary device may act as the DKSC.

The DKSS is a target Bluetooth device, which provides an object exchange server. For example, a secondary device may act as the DKSS.

A DK sharing service UUID, i.e., a UUID used for DK sharing service may be "3 cbb4363-dd09-4856-94e4-416605fa8fcb".

The DK sharing service UUID may consider obtaining a 16-bit unique UUID from a Bluetooth special interest group (BT SIG).

Bluetooth security will be described below.

Two devices may generate a secure connection using an authentication procedure as described in a generic access profile. The DK sharing service may assign the following Bluetooth security features. The two devices shall create a secure connection using the authentication procedure described in the Generic Access Profile. The DK Sharing service mandates the use of several Bluetooth security features.

(1) Bonding

A DKSC and a DKSS may be bonded before setting up a DK service connection. A security mode 4 may be used if both of the DKSC and the DKSS support the security mode 4. A secure simple pairing, which uses an out-of-band (NFC) model may be applied.

(2) Encryption

A link between the DKSC and the DKSS may be encrypted using Bluetooth encryption.

(3) Link Keys

Combination keys may be used for DK sharing service connections.

(4) Encryption Key Length

Length of an encryption key is at least 64 bits. For enhancing security, an encryption key of a maximum length may be used, and the maximum length follows a given regional regulation.

DK sharing service functions may be expressed as shown in Table 12 below.

TABLE 12

| | Function | Support by DKSSE(User) | Support by DKSCE(Owner) |
| --- | --- | --- | --- |
| User Registration | GetUserInformation | M | M |
| | PushSharingOTP | M | M |
| User Verification | GetOwnerChallenge | M | M |
| | SetChallengeResult | M | M |

In Table 12, functions related to user registration includes a GetUserInformation function and a PushSharingOTP function, and functions related to user verification includes a GetOwnerChallenge function and a SetChallengeResult function.

A GetUserInformation function may be expressed as shown in Table 13 below.

TABLE 13

| Field/Header | Name | Value | Status |
| --- | --- | --- | --- |
| Field | Opcode | GET(0x03 or 0x83) | M |
| Field | Packet Length | Varies | M |
| Header | Connection ID | Varies | M |
| Header | Single Response Mode | 0x01 | C1 |
| Header | Single Response Mode Param | 0x01 | C2 |
| Header | Type | "x-bt/DKS-UserInformation" | M |
| Header | Application Parameters | | |
| | Nonce | Varies | M |

C1: The Single Response Mode header is mandatory in the first packet if GOEP 2.0 or later is used, otherwise excluded (X)
C2: The Single Response Mode Param header is optional if Single Response is used, otherwise excluded (X)

In Table 13, GET is described in a BT generic object exchange profile (GOEP), and a value of GET is determined according to whether a final bit is set. In the GetUserInformation function, a response may be formed as shown in Table 14 below.

TABLE 14

| Field/Header | Name | Value | Status |
| --- | --- | --- | --- |
| Field | Response Code | 0x90 or 0xA0 or Error Code | M |
| Field | Packet Length | Varies | M |
| Header | Single Response Mode | 0x01 | C1 |
| Header | Single Response Mode Param | 0x01 | C2 |
| Header | Application Parameters | | |
| | MSISDN | Varies | C3 |
| | SEIdentifier | Varies | C3 |
| | IMEI | Varies | C4 |
| | DeviceSerialNumber | Varies | C4 |
| | DisplayableUserInfo | Varies | C3 |
| | UserPublicKey | Varies | C3 |
| | KeyHandle | Varies | C3 |
| | UserSignature | varies | C3 |

C1: The Single Response Mode header is mandatory (M) if: GOEP 2.0 or later is used AND an SRM header has been received in the previous GET request AND the response code is success (0x90 or 0xA0) otherwise excluded(X).
C2: The Single Response Mode Param header is optional if Single Response Mode is used, otherwise excluded (X).
C3: Mandatory if the response code is success (0x90 or 0xA0).
C4: The DKSS may support parameters of the C4-labelled parameters if the response code is success(0x90 or 0xA0)

Fields/headers in Tables 13 and 14 will be described below.

(1) Connection ID

The Connection ID header shall be used to indicate the connection ID received during the connection establishment, in order to signal to the recipient of the request which OBEX connection the request belongs to.

(2) Type

The Type header shall be used to indicate the type of object to be transmitted:

<x-bt/DKS-UserInformation>

(3) Application Parameters

Nonce

This header shall be used by the DKSC to send the DKSS a nonce value received from a service provider, e.g., a car OEM server.

MSISDN/SEIdentifier/IMEI/DeviceSerialNumber

These headers are used to identify the User to be shared the DK. The MSISDN and SEIdentifier parameters shall be sent by DKSS. The others (IMEI, DeviceSerialNumber) may be included if required.

DisplayableUserInfo

This header shall contain the text regarding user information to be shown on the screen of Owner Smart Device display.

UserPublicKey

This header shall contain the public key newly created by a secondary device, e.g., a User Smart Device, for the current DK Sharing service session. The User Smart Device shall create a key pair of public and private keys when the DKSS is requested to provide user information through GetUserInformation Function.

UserKeyHandle

This header shall contain the identification of the key pair. This handle is used by DKSS and Car OEM server to identify the key to be used for generating and calculating the sharing OTP.

UserSignature

This header shall contain the resulting signature. The DKSS shall generate a Signature including the UserKeyHandle value, UserPublicKey value, DisplaybleUserInfo value, MSISDN, SEIdentifier and Nonce. If IMEI and/or DeviceSerialNumber are presence in the GetUserInformation Response, their value also shall be composed to the Signature.

The PushSharingOTP function allows a DKSC to transmit a sharing OTP generated by a service provider, e.g., a car OEM server.

Common fields and headers of the PushSharingOTP function will be described below, and an application service may include additional headers.

A request in the PushSharingOTP function may be formed as shown in Table 15 below.

TABLE 15

| Field/Header | Name | Value | Status |
| --- | --- | --- | --- |
| Field | Opcode | PUT(0x02 or 0x82) | M |
| Field | Packet Length | Varies | M |
| Header | Connection ID | Varies | M |
| Header | Type | "x-bt/DKS-SharingOTP" | M |
| Header | Application Parameters | | |
| | SharingOTP | Varies | M |

A response in the PushSharingOTP function may be formed as shown in Table 16 below.

TABLE 16

| Field/Header | Name | Value | Status |
| --- | --- | --- | --- |
| Field | Response Code | 0x90 or 0xA0 or Error Code | M |
| Field | Packet Length | Varies | M |

Fields/headers in Tables 15 and 16 will be described below.

(1) Connection ID

The Connection ID header shall be used to indicate the connection ID received during the connection establishment, in order to signal to the recipient of the request which OBEX connection the request belongs to.

(2) Type

The Type header shall be used to indicate the type of object to be transmitted:

<x-bt/DKS-SharingOTP>

(3) Application Parameters

SharingOTP

This header shall contain the SharingOTP, which is received from the Car OEM Server, by the DKSC.

The GetOwnerChallenge function is used for a DKSC to obtain owner challenge from a DKSS. The owner challenge is generated by a service provider, e.g., a car OEM Server, and is received from a secondary device, e.g., a user device.

Common fields and headers of the GetOwnerChallenge function will be described below, and an application service may include additional headers.

In the GetOwnerChallenge function, a request may be may be formed as shown in Table 17 below.

TABLE 17

| Field/Header | Name | Value | Status |
| --- | --- | --- | --- |
| Field | Opcode | GET(0x03 or 0x83) | M |
| Field | Packet Length | Varies | M |
| Header | Connection ID | Varies | M |
| Header | Single Response Mode | 0x01 | C1 |

TABLE 17-continued

| Field/Header | Name | Value | Status |
| --- | --- | --- | --- |
| Header | Single Response Mode Param | 0x01 | C2 |
| Header | Type | "x-bt/DKS-OwnerChallenge" | M |

C1: The Single Response Mode header is mandatory in the first packet if GOEP 2.0 or later is used, otherwise excluded (X)
C2: The Single Response Mode Param header is optional if Single Response is used, otherwise excluded (X)

In the GetOwnerChallenge function, a response may be formed as shown in Table 18.

TABLE 18

| Field/Header | Name | Value | Status |
| --- | --- | --- | --- |
| Field | Response Code | 0x90 or 0xA0 or Error Code | M |
| Field | Packet Length | Varies | M |
| Header | Single Response Mode | 0x01 | C1 |
| Header | Single Response Mode Param | 0x01 | C2 |
| Header | Application Parameters | | |
| | Challenge | Varies | C3 |
| | DisplayableUserInfo | Varies | O |

C1: The Single Response Mode header is mandatory (M) if: GOEP 2.0 or later is used AND an SRM header has been received in the previous GET request AND the response code is success (0x90 or 0xA0) otherwise excluded(X).
C2: The Single Response Mode Param header is optional if Single Response Mode is used, otherwise excluded (X).
C3: Mandatory if the response code is success (0x90 or 0xA0).

Fields/headers in Tables 17 and 18 will be described below.

(1) Connection ID

The Connection ID header shall be used to indicate the connection ID received during the connection establishment, in order to signal to the recipient of the request which OBEX connection the request belongs to.

(2) Type

The Type header shall be used to indicate the type of object to be transmitted:

<x-bt/DKS-OwnerChallenge>

(3) Application Parameters

Challenge

This header shall include the challenge, which is received from the Car OEM Server, by the DKSS.

DisplayableUserInfo

The DisplayableUserInfo header shall contain the text regarding user information to be shown on the screen of an Owner Smart Device display.

The SetChallengeResult function allows a DKSC to transmit a calculation result of owner challenge to a DKSS.

Common fields and headers of the SetChallengeResult function will be described below, and an application service may include additional headers.

In the SetChallengeResult function, a request may be formed as shown in Table 19.

TABLE 19

| Field/Header | Name | Value | Status |
| --- | --- | --- | --- |
| Field | Opcode | PUT(0x02 or 0x82) | M |
| Field | Packet Length | Varies | M |

TABLE 19-continued

| Field/Header | Name | Value | Status |
|---|---|---|---|
| Header | Connection ID | Varies | M |
| Header | Type | "x-bt/DKS-OwnerChallengeResult" | M |
| Header | Application Parameters | | |
| | OwnerChallengeResult | Varies | M |

In the SetChallengeResult function, a response may be formed as shown in Table 20.

TABLE 20

| Field/Header | Name | Value | Status |
|---|---|---|---|
| Field | Response Code | 0x90 or 0xA0 or Error Code | M |
| Field | Packet Length | Varies | M |

Fields/headers in Tables 19 and 20 will be described below.

(1) Connection ID

The Connection ID header shall be used to indicate the connection ID received during the connection establishment, in order to signal to the recipient of the request which OBEX connection the request belongs to.

(2) Type

The Type header shall be used to indicate the type of object to be transmitted:

<x-bt/DKS-OwnerChallengeResult>

(3) Application Parameters

OwnerChallengeResult

This header shall contain the resulting of owner challenge response calculated using DK stored in the Owner Smart Device.

Tag IDs used in the Application Parameter Header may be formed as shown Table 21.

TABLE 21

| Value | Tag ID | Length | Possible Values |
|---|---|---|---|
| Nonce | 0x01 | 1 byte | 0x00 to 0xFF |
| MSISDN | 0x02 | Variable | Text String Up to 15 decimal digits, as defined in ITU E.164[xx] |
| SEIdentifier | 0x03 | variable (max 32 bytes) | 128-bit value in hex string format |
| IMEI | 0x04 | Variable | Text UTF-8 |
| DeviceSerialNumber | 0x05 | Variable | Text UTF-8 |
| DisplayableUserInfo | 0x06 | Variable | Text UTF-8 |
| UserPublicKey | 0x07 | variable (max 1024 bits) | |
| UserKeyHandle | 0x08 | 8 bytes | 64-bit value n hex string format |
| UserSignature | 0x09 | variable (max 256 bytes) | |
| SharingOTP | 0x0A | Variable | |
| Challenge | 0x0B | 1 byte | 0x00 to 0xFF |
| OwnerChallengeResult | 0x0C | variable (max 256 bytes) | |

Figure 32:
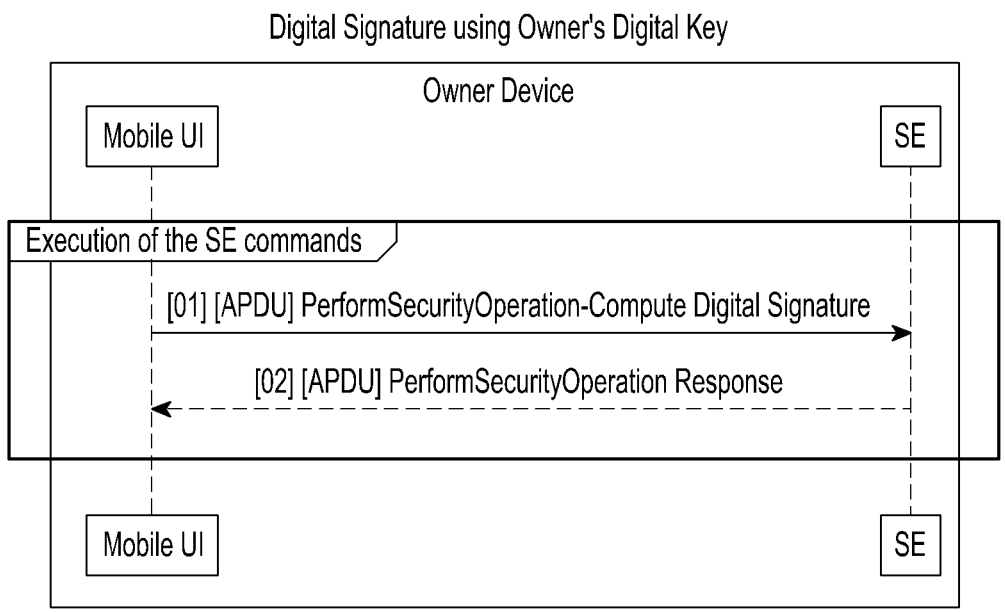
FIG. 32 is a signal flow diagram illustrating an operating process of a primary device in a communication system according to an embodiment of the present disclosure.

FIG. 32 is a signal flow diagram illustrating an operating process of a primary device in a communication system according to an embodiment of the present disclosure. Specifically, FIG. 32 illustrates a process of generating a digital signature using a DK of the primary device.

A DK generating process proposed in accordance with an embodiment of the present disclosure may be implemented by modifying a COMPUTE DIGITAL SIGNATURE operation among PerformSecurityOperation commands described in ISO 7816-8.

ISO 7816-8 uses an APDU described in ISO 7816-4, the APDU is a general data form used for transmitting a command to an SE, and the format of the APDU may be expressed as shown in Table 22 below.

TABLE 22

| Field | Description | Number of bytes |
|---|---|---|
| Command header | Class byte denoted CLA | 1 |
| | Instruction byte denoted INS | 1 |
| | Parameter bytes denoted P1-P2 | 2 |
| $L_c$ field | Absent for encoding $N_c = 0$, present for encoding $N_c > 0$ | 0, 1 or 3 |
| Command data field | Absent if $N_c = 0$, present as a string of $N_c$ bytes if $N_c > 0$ | $N_c$ |
| $L_e$ field | Absent for encoding $N_e = 0$, present for encoding $N_e > 0$ | 0, 1, 2 or 3 |
| Response data field | Absent if $N_r = 0$, present as a string of $N_r$ bytes if $N_r > 0$ | $N_r$ (at most $N_e$) |
| Response trailer | Status bytes denoted SW1-SW2 | 2 |

The first portion of Table 22 indicates a command, and the second portion of Table 22 indicates a response to the command. The commands include a Command header, $L_c$, Data Field, and $L_e$ field. The Command header field indicates a CLA as a class byte code, and indicates whether a transmitted command is a secure message or a message follows a format defined in a specific association. In the Command header field, INS denotes an instruction field, and the INS specifies a command (e.g., Store, Get, PerformSecurityOperation, etc.), which corresponds to a corresponding message. The meaning of P1-P2 may be changed based on INS. In the present disclosure, when applying INS=PerformSecurityOperation, P1 and P2 indicate the following.

P1=define security operation to be performed (e.g.: digital signature (P1=9E)).

P2=The meaning is varied according to P1, and specifies a command determined based on INS and P1. In the present disclosure, P2 is used for identifying a digital signing is performed 1) when secondary device is registered at a service provider (P2='xx'), or 2) for performing a final confirmation when authentication between the secondary device and the service provider is performed (P2='yy').

The second portion of Table 22 indicates a response APDU to a Command, and the response APDU is divided into a Data field and a Response trailer field. According to a kind of response, the Data field may be present or not be present. The Response trailer field includes two Status Byte (SW) values. The Status Bytes express a result of a Command APDU.

A Status Byte defined in ISO 7816-4 may be used, or it is possible for each standard association to newly define a Status Byte.

A primary device, i.e., an owner device, includes a Mobile UI and an SE, and SE commands are run between the Mobile UI and the SE.

Referring to FIG. 32, The COMPUTE DIGITAL SIGNATURE operation initiates computation of a digital signature. That is, the Mobile UI transmits, to the SE, a message for requesting to perform a digital signature computation, e.g., a Perform Security Operation-Compute Digital Signature ADPU ([01][APDU] Perform Security Operation-Compute Digital Signature).

The computation of the digital signature may be performed by a digital signature algorithm or a combination of a hash algorithm and the digital signature algorithm.

For computation of a digital signature, data which will be signed or integrated in a signing process is included in a command data field, and a digital signature is specified as a tag 'XX' in P2.

For example, codes that may be used in a digital signature computing operation may be expressed as shown in Table 23.

TABLE 23

| Code | Value | Meaning | Presence |
| --- | --- | --- | --- |
| CLA | '00'-'03', '40'-'4F', '10'-'13', or '50'-'5F' | Global Platform | Mandatory |
| INS | '2A' | PerformSecurityOperation | Mandatory |
| P1 | '9E' | Reference Control Parameter P1: Compute Digital Signature | Mandatory |
| P2 | 'xx', 'yy' | Reference Control Parameter P2: xx: Data to be signed with specific keys within SE (inc. info) for Pre confirmation yy: Data to be signed with specific keys within SE for post confirmation (challenge response) | Mandatory |
| Lc | 'xx' | Length of Data field | Mandatory |
| Data | 'xxxx' | Data objects | Mandatory |

Although the Presence of each code is expressed a "Mandatory" in Table 23, the Presence of each code may be "Mandatory", "Conditional", or "Optional" according to a situation.

In Table 23, the Data field may be expressed as shown in Table 24 below.

TABLE 24

| Tag | Length | Data/Description | Presence |
| --- | --- | --- | --- |
| 'XXXX' | Variable | Data object for Digital Key system | Mandatory |
| 'XX' | 0-n | Digital Key object ID to be used for signature (Authorized entity ID) | Conditional |
| 'XX' | 0-n | User Secure Indentifier | Mandatory, or Conditional for P2 = xx |
| 'XX' | 0-n | User Certificate | Mandatory for P2 = xx |
| 'XX' | 0-n | User MSISDN | Conditional for P2 = xx |
| 'XX' | 0-n | User Challenge Response | Mandatory for P2 = yy |
| 'XX' | 0-n | Challenge (received from Car OEM Backend through the User) | Mandatory for P2 = yy |
| 'XX' | 0-n | Nonce value | Optional |

In Table 24, User Secure Identifier, User Certificate, and User MSISDN are data formats used in a pre-confirmation operation, and User Challenge Response and Challenge (received from a Car OEM Backend through the User) are data formats used in a post-confirmation operation.

Further, Presence for each data format in Table 24 may be changed according to a situation. For example, in Table 24, Presence of User Secure Identifier is set to Mandatory or Conditional for P2=xx, however, Presence of User Secure Identifier is set to Optional according to a situation. In Table 24, Presence of User MSISDN is set to Conditional for P2=xx, however, Presence of User MSISDN may be set to Mandatory or Optional according to a situation.

The Data field is defined as a Type-Length-Value (TLV) form, and the Type is expressed as "xx", or "yy", however, these values may be replaced with values defined in a standard association.

Upon receiving the Perform Security Operation-Compute Digital Signature APDU from the Mobile UI, in step 3202, the SE transmits a Perform Security Operation Response APDU including a digital signature as shown in Table 25 below. Here, an error code "DK object not found" is added to the Status Byte. This error code is used for informing that there is no DK to be used for signature or a key equivalent to the DK within the SE.

TABLE 25

| | Data/Description | Presence |
| --- | --- | --- |
| Response Data Field | Digital Signature | Mandatory |
| SW1 | SW2 | Meaning |
| '6A' | '80' | Incorrect values in command data |
| '6A' | '81' | Function not supported |
| '6A' | 'XX' | Digital Key object not found |

Figure 33A:
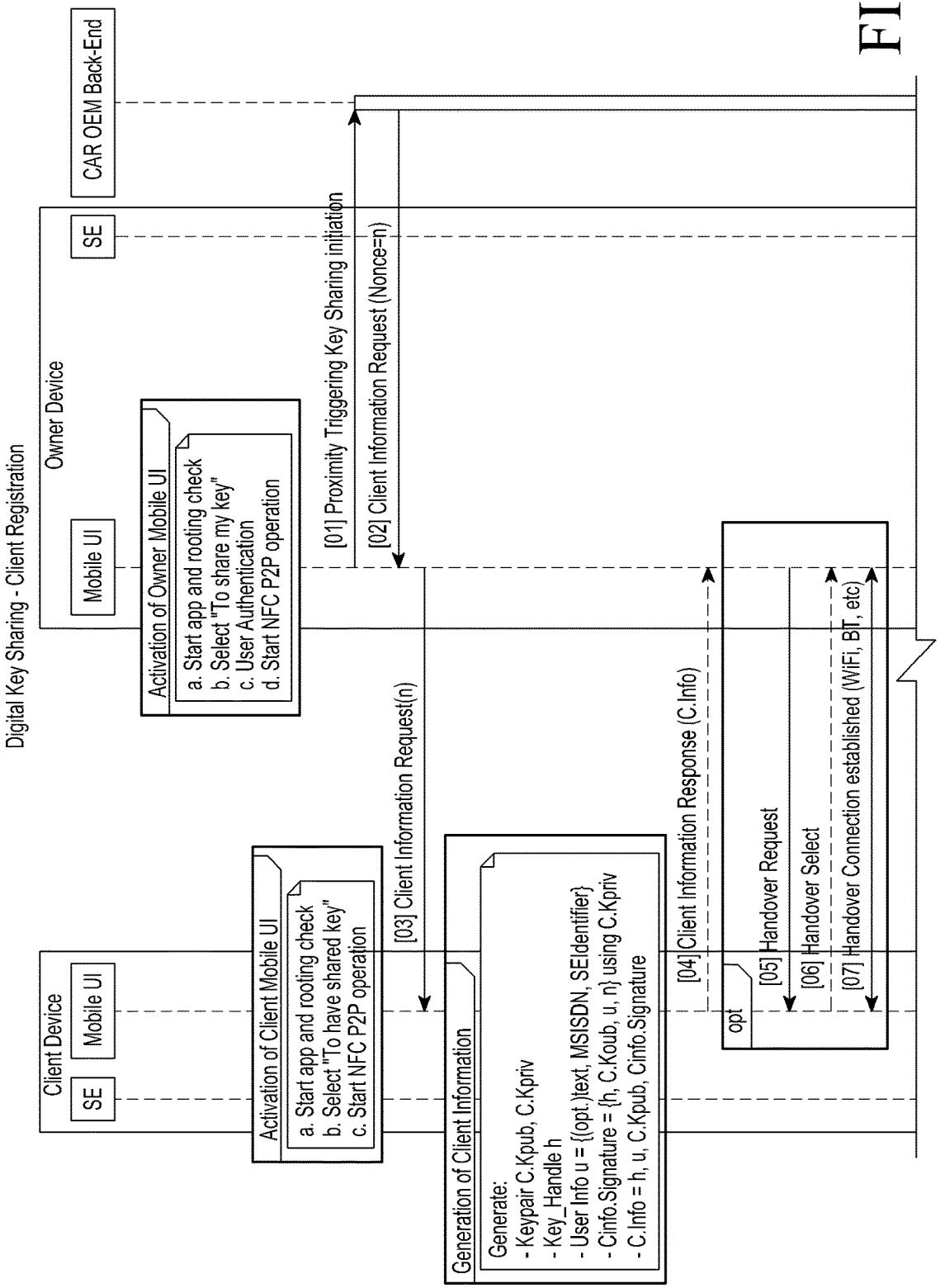
FIGS. 33A and 33B are signal flow diagrams illustrating a secondary device registration process included in a process of providing a DK in a communication system according to an embodiment of the present disclosure.
Figure 33B:
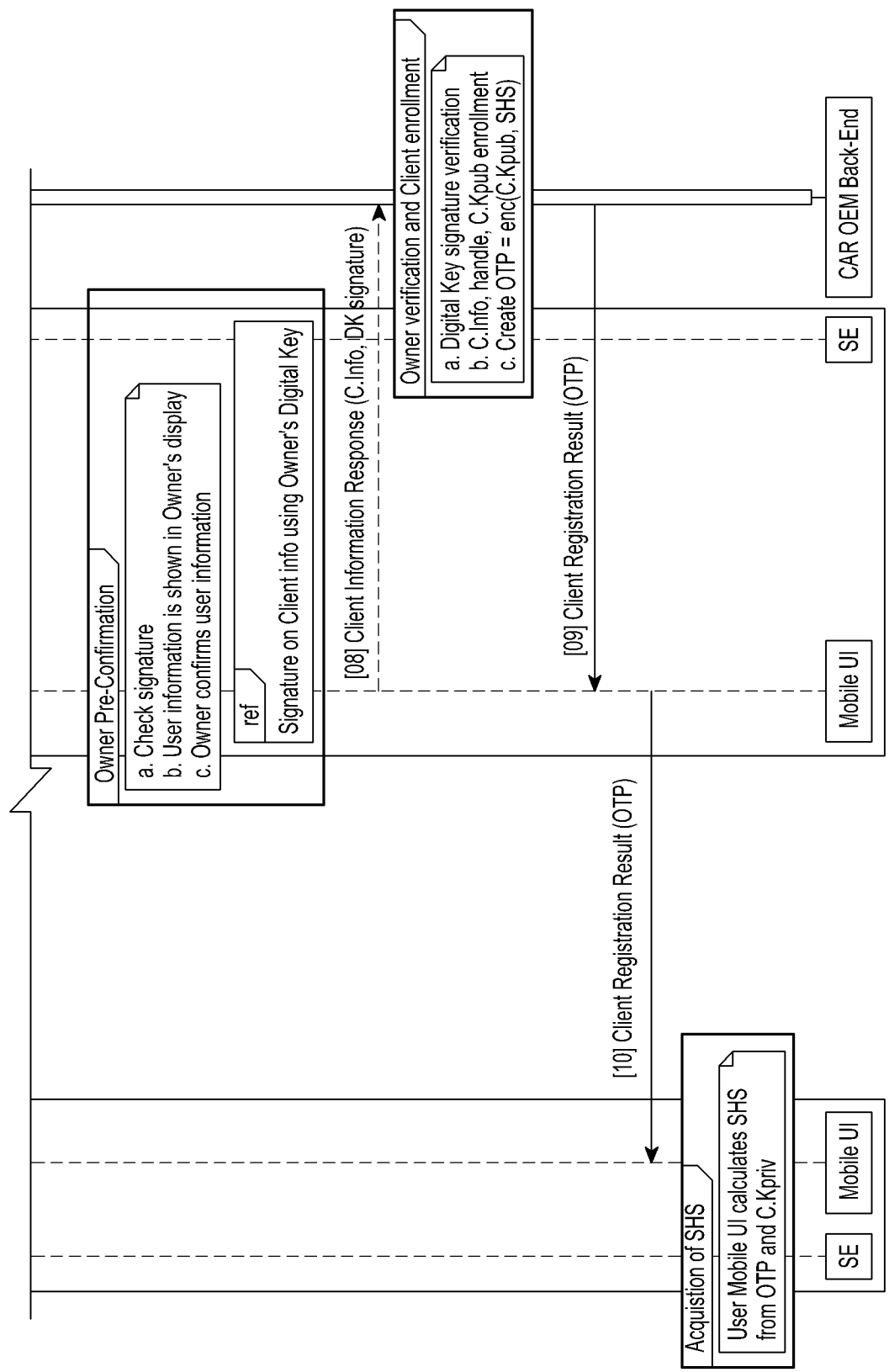

FIGS. 33A and 33B are signal flow diagrams illustrating a secondary device registration process included in a process of providing a DK in a communication system according to an embodiment of the present disclosure. Specifically, FIGS. 33A and 33B illustrate how a secondary device and user information of the secondary device are registered at a service provider.

In FIGS. 33A and 33B, it will be noted that a service provider is shown as "Car OEM Back-End", a primary device is shown as "Owner Device", and a secondary device is shown as "Client Device". Further, it will be noted that FIGS. 33A and 33B are shown as a form in which the terms "Car OEM Back-End", "Owner Device", and "Client Device" are interchangeable with the terms "service provider", "primary device", and "secondary device".

The secondary device includes an SE and a Mobile UI, and the primary device includes a Mobile UI and an SE. In FIGS. 33A and 33B, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively. The Mobile UI-A and the Mobile UI-B may access the SE-A and the SE-B, respectively. That is, a Mobile UI denotes an entity which enables a P2P communication with other device, and may access an SE.

Firstly, the Mobile UI-B is activated (Activation of Owner Mobile UI), and this will be described below.

The Mobile UI-B is run according to application start, rooting check, and/or the like (a. Start app and rooting check), and a menu such as key transferring, key sharing, and/or the like is selected (b. Select "To share my Key"). The application rooting check may be performed when the application is run or when a specific function is required according to service development.

A user authentication process may be performed if necessary according to a service policy of a provider of the Mobile UI-B or a service provider (c. User Authentication), and the user authentication process may be performed based on a PIN which has been registered at the primary device in advance, biometrics, and/or the like. The Mobile UI-B starts operating in an NFC P2P mode (d. Start NFC P2P operation).

In the activation process of the Mobile UI-B, remaining operations except for the rooting check may be optional, so the remaining operations may be performed or omitted according to implementation of the provider of the Mobile UI-B. The Mobile UI-B supports one or more application rooting check mechanisms (Mobile UI shall support one or more app rooting check mechanism).

Further, the Mobile UI-A is activated (Activation of User Mobile UI), this will be described below. In FIGS. 33A and 33B, it will be noted that it is assumed that the secondary device installs at least one Mobile UI.

The Mobile UI-A is run according to application start, rooting check, and/or the like (a. Start app and rooting check), and a menu such as key receiving, and/or the like is selected (b. Select "to have shared key"). The application rooting check may be performed when the application is run or when a specific function is required according to service development.

The Mobile UI-A starts operating in an NFC P2P mode (c. Start NFC P2P operation).

In the activation process of the Mobile UI-A, remaining operations except for the rooting check may be optional, so the remaining operations may be performed or omitted according to implementation of the provider of the Mobile UI-A. The Mobile UI-A supports one or more application rooting check mechanisms (Mobile UI shall support one or more app rooting check mechanism).

The Mobile UI-B transmits, to the service provider, a message indicating that proximity triggering key sharing will be initiated, that is, indicating that a key sharing process which is a proximity touch will be initiated, for example, a proximity triggering key sharing initiation message ([01] Proximity Triggering Key Sharing initiation). An interface between the Mobile UI-B and the service provider may be implemented with various forms, and a detailed description thereof will be omitted herein.

Upon receiving the proximity triggering key sharing initiation message from the Mobile UI-B, the service provider generates a nonce as a random variable. The nonce is used for receiving and verifying information of the secondary device, this is for preventing reuse of the information of the secondary device by using the nonce when generating the information of the secondary device. The nonce is newly generated whenever a key sharing process is started, so unique information for the secondary device may be generated.

The service provider transmits, to the primary device, a message for requesting user information of the secondary device to be registered at the service provider, e.g., a client information request message ([02] Client Information Request(Nonce=n)). Here, the client information request message includes a nonce generated by the service provider. In FIGS. 33A and 33B, it will be assumed that the nonce generated by the service provider is "n" (nonce=n).

Upon receiving the client information request message from the service provider, the Mobile UI-B of the primary device transmits, to the Mobile UI-A of the secondary device, a message for requesting user information to be registered at the service provider, e.g., a client information request message ([03] Client Information Request(n)). The client information request message transmitted at operation [03] includes the nonce included in the client information request message transmitted at operation [02].

Upon receiving the client information request message from the Mobile UI-B, the Mobile UI-A performs a user information generating operation of generating the user information to be registered at the service provider ([Generation of User Information]). The user information generating operation will be described below.

The Mobile UI-A generates Public/Private Key pair(C.Kpub, C.Kpriv), generates a handle h as an ID for the Public/Private Key pair(C.Kpub, C.Kpriv), and generates the user information. The user information includes the following parameters.

(1) SE ID and MSISDN (2) If necessary, the user information may further include SE Issuer information, App version, IMEI, a credential of a secondary device SE, i.e., an SE-A, a secondary device model name, a secondary device manufacture name, a secondary device S/N, and/or the like.

The SE ID, the IMEI, and/or the like included in the user information are used for identifying the secondary device, and the MSISDN is used for identifying a user of the secondary device.

The Mobile UI-A generates a user information signature (Cinfo.Signature) by signing the user information, handle h, public key C.Kpub, and nonce value with the private key C.Kpriv. The Cinfo.Signature denotes a user information signature generated by a client device, i.e., a secondary device.

After performing the user information generating operation, the Mobile UI-A transmits, to the Mobile UI-B, a response message to the client information request message, e.g., a client information response message ([04] Client Information Response(C Info)). The client information response message includes the user information generated by the Mobile UI-A, the public key of the secondary device C.Kpub, the handle h, and the Cinfo.Signature.

If a connection between the secondary device and the primary device is based on an NFC scheme, a handover from the NFC scheme to another scheme, e.g., Wi-Fi, Bluetooth, and/or the like may be performed for improving a user experience (UX). This will be described below.

In FIGS. 33A and 33B, it will be assumed that a handover is performed from an NFC to other connectivity. In this case, the Mobile UI-B transmits, to the Mobile UI-A, a message for requesting handover from the NFC to other connectivity, e.g., a handover request message ([01] Handover Request). Upon receiving the handover request message from the Mobile UI-B, the Mobile UI-A selects handover to the other connectivity, and transmits, to the Mobile UI-B, a message indicating that the Mobile UI-A selects handover to the other connectivity, e.g., a handover select message ([02]Handover Select). That is, the primary device becomes a handover requester, and the secondary device becomes a handover selector. It will be noted that the more specific parameters and situations for the handover from the NFC to the other connectivity are the same as described in an NFC Connection Handover Technical Specification [xx].

According to the exchange of the handover request message and the handover select message, a connection which is based on other connectivity is established between the Mobile UI-B and the Mobile UI-A ([07] Handover connection established (WiFi, BT, etc.)).

The Mobile UI-B performs a pre-confirmation operation (Owner Pre-Confirmation). The pre-confirmation operation will be described below.

The Mobile UI-B verifies Cinfo.Signature using the public key C.Kpub received from the Mobile UI-A (a. Check signature).

If the verification for the Cinfo.Signature is successful, the Mobile UI-B outputs the user information of the secondary device on an output device, e.g. a screen included in the primary device (b. User information is shown in Owner's display). The reason why the Mobile UI-B outputs the user information of the secondary device on the output device is for confirming the user information of the secondary device. For example, this confirmation may be made according to event occurrence according to intervention of a user of the primary device, e.g., a touch of a confirmation button, a fingerprint check, and/or the like. Upon detecting that the user information output on the output device is confirmed (c. Owner confirms user information), the Mobile UI-B signs the user information of the secondary device using a digital key stored at the primary device or a key which has authority equivalent to the digital key (Signature on Client Info using Owner's Digital Key). If the Mobile UI-B directly uses a digital key stored at the SE-B, the Mobile UI-B uses an APDU for digital key signature. The APDU for the digital key signature has been described with reference to FIG. 32, and a detailed description thereof will be omitted herein.

After performing the pre-confirmation operation, the Mobile UI-B transmits, to the service provider, a response message to the client information request message, e.g., a client information response message ([08] Client Information Response (C Info, DK signature). The client information response message includes the client information received from the secondary device and the digital key signature of the primary device.

Upon receiving the client information response message from the Mobile UI-B, the service provider performs a user device verification operation and a secondary device registration operation (Owner Verification and User enrollment). The user device verification operation and the secondary device registration operation will be described below.

The service provider performs a verification operation on the digital key signature of the primary device (a. Digital Key signature verification). That is, the service provider determines whether the primary device is an owner device which owns a digital key, or whether the primary device owns appropriate authority by performing the verification operation on the digital key signature of the primary device.

If the verification result for the digital key signature of the primary device is successful, the service provider registers, i.e., stores the user information of the secondary device which is received from the primary device and is signed with the digital key (b. C. Infor, handle, C.Kpub enrollment).

The user information of the secondary device includes an SE ID of an SE included in the secondary device, i.e., the SE-A, an MSISDN, C.Kpub, handle h, and/or the like.

The service provider generates shared secret (SHS) which the service provider and the secondary device will share, and generates an OTP by encrypting the SHS based on a public key of the secondary device (c. Create OTP=enc (C.Kpub, SHS).

The SHS is a value used for verifying the secondary device in the subsequent procedure. That is, the service provider checks whether the secondary device owns the SHS.

The reason why the service provider generates an OTP is for preventing another device other than the secondary device from obtaining SHS by decrypting the OTP when the service provider transfers corresponding information, e.g., a digital key through the primary device.

After performing the user device verification operation and the secondary device registration operation, the service provider transmits, to the Mobile UI-B, a client registration result through a user registration result message ([09] Client Registration Result (OTP)). If the user information of the secondary device is normally registered, the user registration result message includes an OTP. The OTP denotes the OTP generated by the service provider.

Upon receiving the user registration result message from the service provider, the Mobile UI-B transfers the OTP received from the service provider to the Mobile UI-A ([10] Client Registration Result (OTP)). That is, the Mobile UI-B transfers, to the Mobile UI-A, the OTP through a client registration result message.

The Mobile UI-A performs an SHS acquisition operation (Acquisition of SHS). Here, the SHS acquisition operation will be described below.

The Mobile UI-A decodes the OTP using the C.KPriv as the private key of the secondary device, and obtains the SHS using the OTP (Client Mobile UI calculates SHS from OTP and C.Kpriv).

Although FIGS. 33A and 33B illustrate a secondary device registration process as a series of operations, various operations in FIGS. 33A and 33B could overlap, occur in parallel, occur in a different order, or occur multiple times.

Figure 34A:
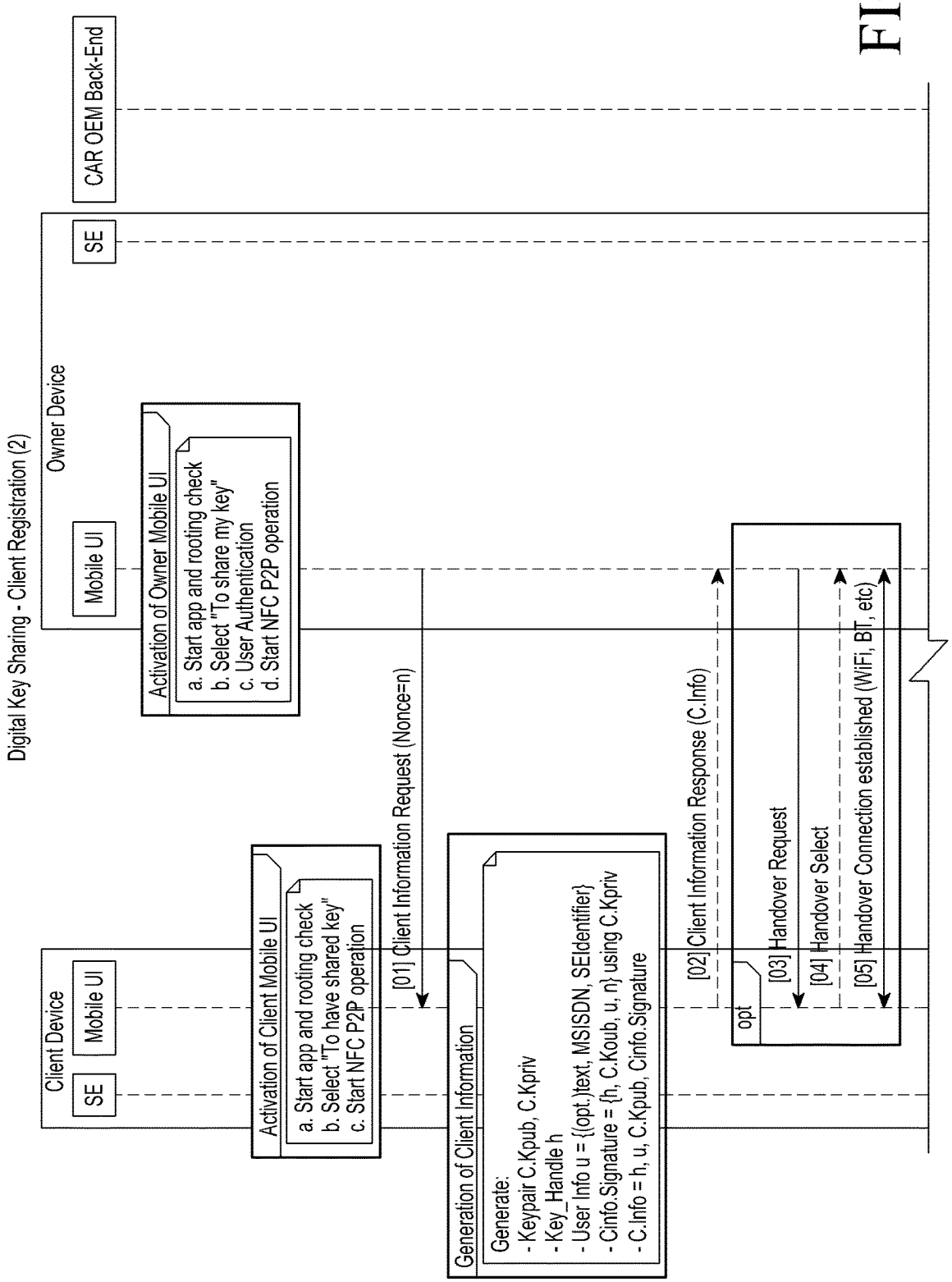
FIGS. 34A and 34B are signal flow diagrams illustrating a secondary device registration process included in a process of providing a DK in a communication system according to an embodiment of the present disclosure.
Figure 34B:
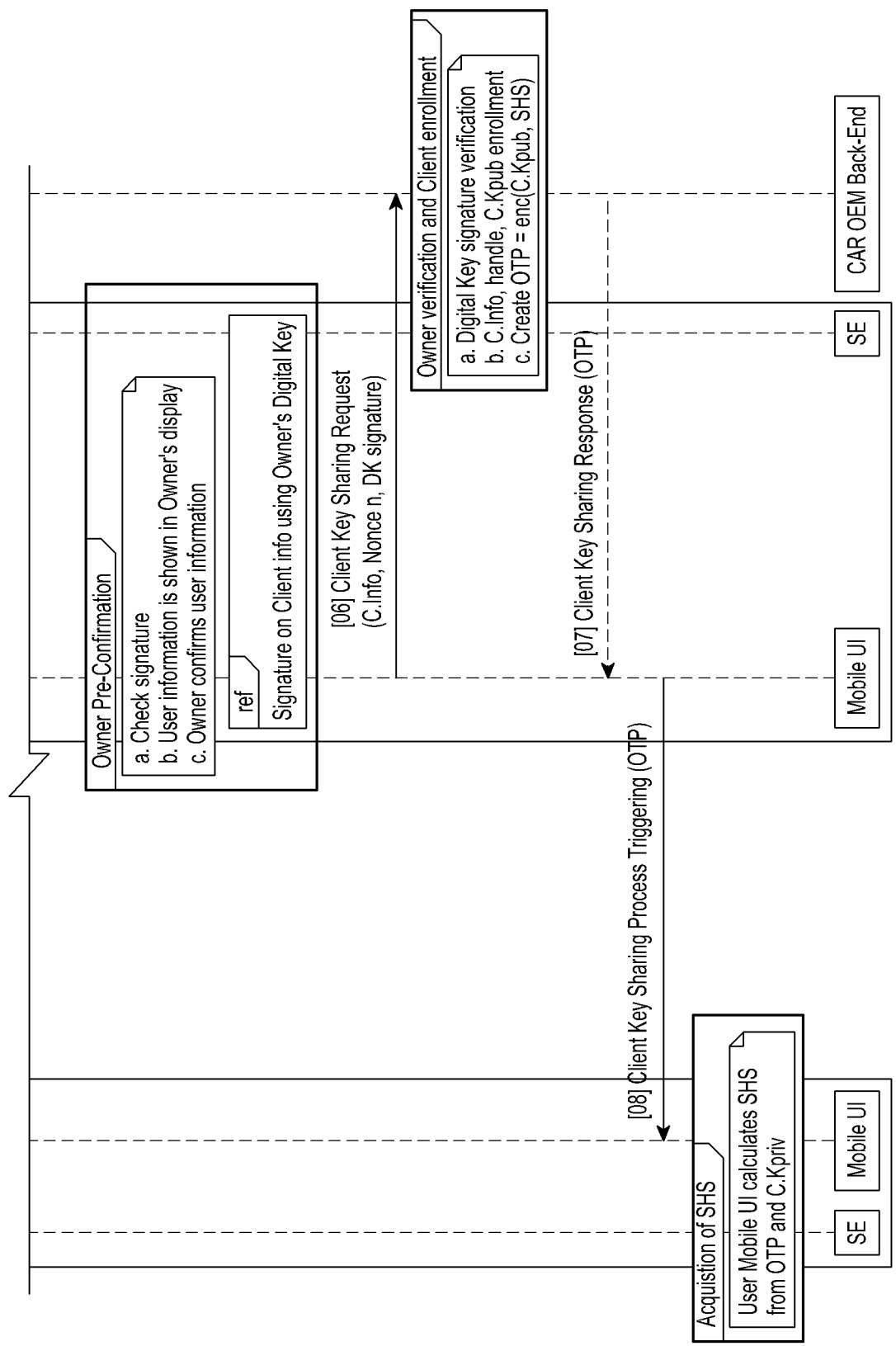

FIGS. 34A and 34B are signal flow diagrams illustrating a secondary device registration process included in a process of providing a DK in a communication system according to an embodiment of the present disclosure. Specifically, FIGS. 34A and 34B illustrate how a secondary device and user information of the secondary device are registered at a service provider.

In FIGS. 34A and 34B, it will be noted that a service provider is shown as "Car OEM Back-End", a primary device is shown as "Owner Device", and a secondary device is shown as "Client Device". Further, it will be noted that FIGS. 34A and 34B are shown as a form in which the terms "Car OEM Back-End", "Owner Device", and "Client Device" are interchangeable with the terms "service provider", "primary device", and "secondary device".

The secondary device includes an SE and a Mobile UI, and the primary device includes a Mobile UI and an SE. In FIGS. 34A and 34B, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively. The Mobile UI-A and the Mobile UI-B may access the SE-A and the SE-B, respectively. That is, a Mobile UI denotes an entity which enables a P2P communication with other device, and may access an SE.

It will be noted that the secondary device registering process in FIGS. 34A and 34B is similar to a secondary device registering process in FIGS. 33A and 33B, however, the secondary device registering process in FIGS. 34A and 34B is different from the secondary device registering process in FIGS. 33A and 33B in the following aspects.

Firstly, a primary device does not perform a communication with a service provider until obtaining user information of a secondary device.

Secondly, the primary device has not performed the communication with the service provider previously, a Mobile UI-B included in the primary device generates a nonce value to transfer the nonce value to a Mobile UI-A included in the primary device, and transfers the nonce value along with user information of the secondary device to the service provider when transferring the user information to the service provider thereby the service provider may verify the user information.

Further, it will be noted that operations [06] to [08] in FIGS. 34A and 34B are similar to operations [08] to [10] in FIGS. 33A and 33B, however, only names of functions in a Req-Res mechanism are different.

Although FIGS. 34A and 34B illustrate a secondary device registration process as a series of operations, various operations in FIGS. 34A and 34B could overlap, occur in parallel, occur in a different order, or occur multiple times.

Figure 35:
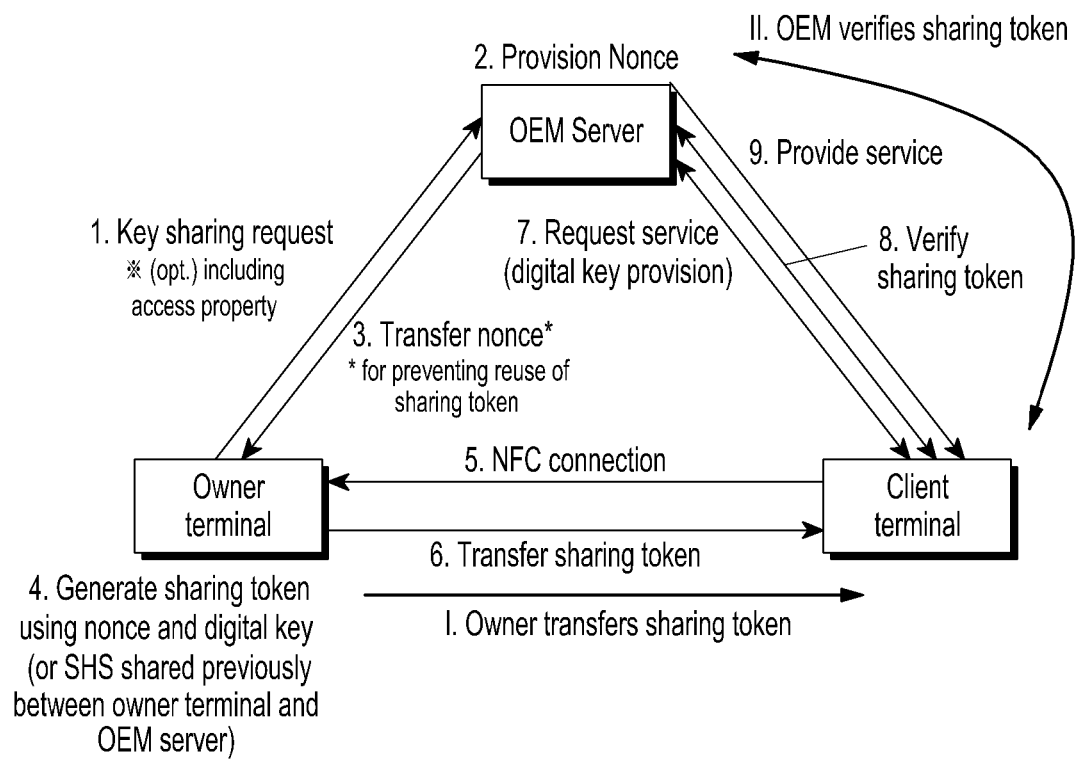
FIG. 35 illustrates a process of providing a DK in a communication system according to an embodiment of the present disclosure.

FIG. 35 illustrates a process of providing a DK in a communication system according to an embodiment of the present disclosure. Specifically, FIG. 35 illustrates a DK providing process in which a primary device first requests key sharing with a secondary device, and a service provider verifies a sharing token, which the primary device provisions.

Referring to FIG. 35, it will be noted that a service provider is shown "OEM Server", a primary device is shown as "Owner Entity", and a secondary device is shown as "Client terminal". Further, it will be noted that FIG. 35 is shown as a form in which the terms "OEM Server", "Owner Entity", and "Client terminal" are interchangeable with the terms "service provider", "primary device", and "secondary device".

It will be noted that a digital key providing process in FIG. 35 is a digital key providing process in a case that a primary device firstly requests key sharing with a secondary device, and a service provider verifies a sharing token which the primary device provisions.

If the primary device requests key sharing from a service provider (1. Key Sharing Request), the service provider provisions a nonce (2. Provision nonce). The service provider transfers the provisioned none to the primary device (3. Transfer nonce), and the primary device generates a sharing token based on the nonce and a digital key (4. Generate sharing token based on nonce and digital key (or SHS which has been already shared between the primary device and the service provider)).

The primary device establishes an NFC connection with the secondary device (5. NFC connection), and transmits the sharing token to the secondary device (6. Transfer sharing token). Upon receiving the sharing token from the primary device, the secondary device requests a service from the service provider, that is, the secondary device requests digital key provisioning (7. Request service (e.g., digital key provisioning)), so a verification operation for the sharing token is performed between the secondary device and the service provider (8. Verify sharing token). If the verification result for the sharing token is successful, the service provider provides the service to the secondary device (9. Provide service). That is, if the verification result for the sharing token is successful, the service provider provisions a digital key to the secondary device.

Figure 36:
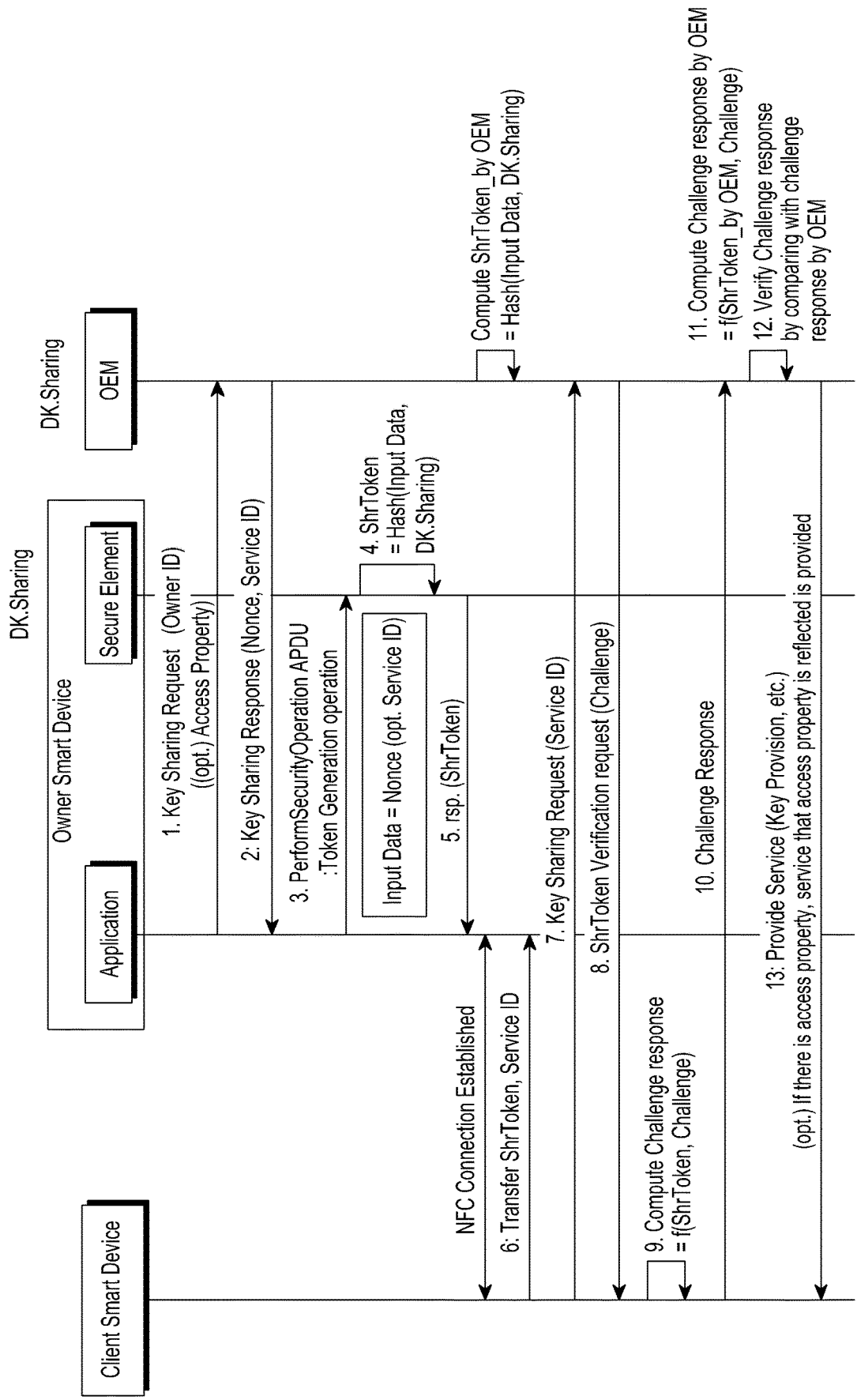
FIG. 36 is a signal flow diagram illustrating a process of providing a DK in a communication system according to an embodiment of the present disclosure.

FIG. 36 is a signal flow diagram illustrating a process of providing a DK in a communication system according to an embodiment of the present disclosure.

Referring to FIG. 36, it will be noted that a service provider is shown "OEM", a primary device is shown as "Owner Smart Device", and a secondary device is shown as "Client Smart Device". Further, it will be noted that FIG. 36 is shown as a form in which the terms "OEM", "Owner Smart Device", and "Client Smart Device" are interchangeable with the terms "service provider", "primary device", and "secondary device".

A primary device transmits a message for requesting a key sharing service to a service provider (1. Key Sharing Request (Owner ID), (opt.) access property). The message for requesting the key sharing service may include an ID such as an identifier of a primary device, i.e., an owner ID, and/or the like. The message for requesting the key sharing service may optionally include information such as an access property, and/or the like.

Here, the access property may include key life time, an automatic driving distance, information related to an area where it is possible to drive a vehicle, e.g., Geo fencing, e.g., information indicating that it is possible to drive a vehicle at a specific area, a vehicle property, e.g., a maximum speed, and/or the like, and a vehicle use authority, e.g., door open, trunk open, start vehicle, and/or the like.

The service provider transmits response to the key sharing request, a nonce, and a service ID to the primary device (2. Key Sharing Response (Nonce, Service ID)). The nonce may be, for example, used for preventing reuse of a token to be generated in the primary device.

The service ID may be used for matching service sync-up among the service provider, the primary device, and a secondary device when the secondary device requests key provisioning (i.e., "7" operation).

The primary device generates a sharing token using a digital key stored at the primary device or a key which has authority equivalent to the digital key. The sharing token may be generated based on the digital key, or the key which has the authority equivalent to the digital key and the nonce provided from the service provider. (3. Perform Security Operation APDU: Token Generation operation; 4. Shr. Token=Hash (Input Data, DK.sharing); 5. rsp. (Shr. Token); Compute Shr. Token by OEM=Hash(Input Data, DK.sharing)

Then, a communication environment which is based on a short-range communication scheme such as NFC, BT, and/or the like is established between the secondary device and the primary device. In FIG. 36, it will be assumed that a communication environment which is based on the NFC scheme is established between the secondary device and the primary device. That is, in FIG. 36, it will be assumed that an NFC connection is established between the secondary device and the primary device (NFC connection Established). So, it will be assumed that a secure channel is generated between the secondary device and the primary device.

The secondary device transfers the sharing token and the service ID to the primary device (6. Transfer ShrToken and Service ID).

The secondary device requests digital key sharing from the service provider (7. Key Sharing Request (Service ID)).

The service provider may recognize that the secondary device has been connected to which primary device, and/or the like through the service ID.

The service provider transmits a verification request along with challenge (8. Shr.Token Verification request (Challenge)).

The reason why that the service provider requests verification is to check whether the secondary device has the sharing token generated by the primary device.

The secondary device generate challenge response, and transmits the challenge response to the service provider (9. Compute Challenge response=f (ShrToken, Challenge); 10. Challenge Response).

The challenge response may be generated based on the sharing token (provided by the primary device) and the challenge (provided by the service provider).

The service provider verifies the challenge response received from the secondary device (11. Compute Challenge response by OEM=f (ShrToken_by OEM, Challenge); 12. Verify Challenge response by comparing with challenge response by OEM).

The service provider knows a value of nonce and a value of challenge, and may know that the primary device uses which digital key through an owner ID.

So, the service provider computes a sharing token (nonce+digital key) based on the values, and computes challenge response (sharing token+challenge).

The service provider verifies the primary device based on whether the challenge response transferred from the secondary device is identical to the challenge response computed by the service provider.

For example, it will be assumed that use of a sharing token computation function and a challenge response computation function is synchronized or predetermined among the service provider, the primary device, and the secondary device.

If the verification result for the secondary device is successful, the service provider provisions a digital key to the secondary device (13. Provide a service (key provisioning, and/or the like), (opt) if there is an access property, provides a service on which the access property is reflected).

Here, if access property is set at "1" operation, the service provider provisions a digital key on which a characteristic corresponding to the set access property is reflected.

Meanwhile, the digital key and the access property may be stored at different devices or different areas within a device. For example, the digital key may be stored at an SE, and the access property may be stored at a separate device or area such as a TEE, and/or the like.

Although FIG. 36 illustrates a signal transmitting/receiving operation shown as a series of operations, various operations in FIG. 36 could overlap, occur in parallel, occur in a different order, or occur multiple times.

Figure 37:
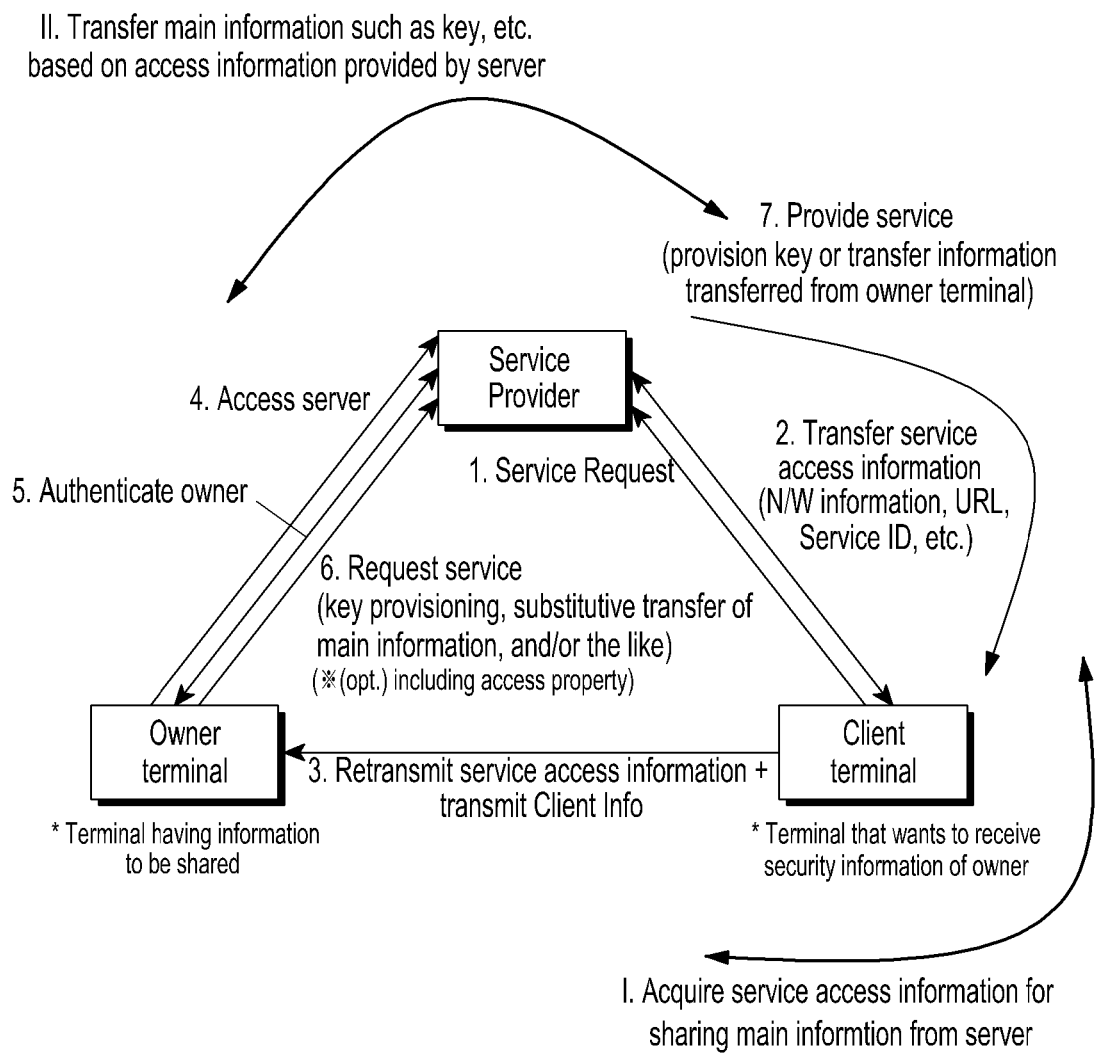
FIG. 37 illustrates a process of providing a DK in a communication system according to an embodiment of the present disclosure.

FIG. 37 illustrates a process of providing a DK in a communication system according to an embodiment of the present disclosure. Specifically, FIG. 37 illustrates a DK providing process in which a secondary device accesses a service provider, requests a service from the service provider, and obtains service access information from the service provider, and a primary device accesses the service provider based on the service access information obtained by the secondary device and performs a confirmation operation for authentication and main information transfer.

Referring to FIG. 37, it will be noted that a service provider is shown "Service provider", a primary device is shown as "Owner", and a secondary device is shown as "Client". Further, it will be noted that FIG. 37 is shown as a form in which the terms "Service provider", "Owner", and "Client" are interchangeable with the terms "service provider", "primary device", and "secondary device".

It will be noted that a digital key providing process in FIG. 37 is a digital key providing process in a case that a secondary device accesses a service provider, requests a service from the service provider, and obtains service access information from the service provider, and a primary device accesses the service provider based on the service access information obtained by the secondary device and performs a confirmation operation for authentication and main information transfer.

The secondary device requests a service from the service provider (1. Request service), so service access information is transferred between the service provider and the secondary device (2. Transfer service access information (network (N/W) information, a uniform resource locator (URL), a service ID, and/or the like)). Here, the service access information may include, for example, N/W information, URL information, a service ID, and/or the like.

The secondary device transmits the service access information and information of the secondary device to the primary device (3. Service access information retransmission+client information). Upon receiving the service access information and the information of the secondary device from the secondary device, the primary device accesses the service provider (4. Access server), and an owner authentication procedure, i.e., a primary device authentication procedure is progressed between the service provider and the primary device (5. Authenticate owner). If the primary device authentication procedure is successful, the primary device requests a service form the service provider (Request service (key provisioning, main information substitute transfer, and/or the like), and (opt) access property is included). Here, the service request may be, for example, service request which requests to provision a digital key for the secondary device.

Upon receiving the service request from the primary device, the service provider provides a service to the secondary device (7. Provide service (provision key or transfer information received from owner).

Figure 38:
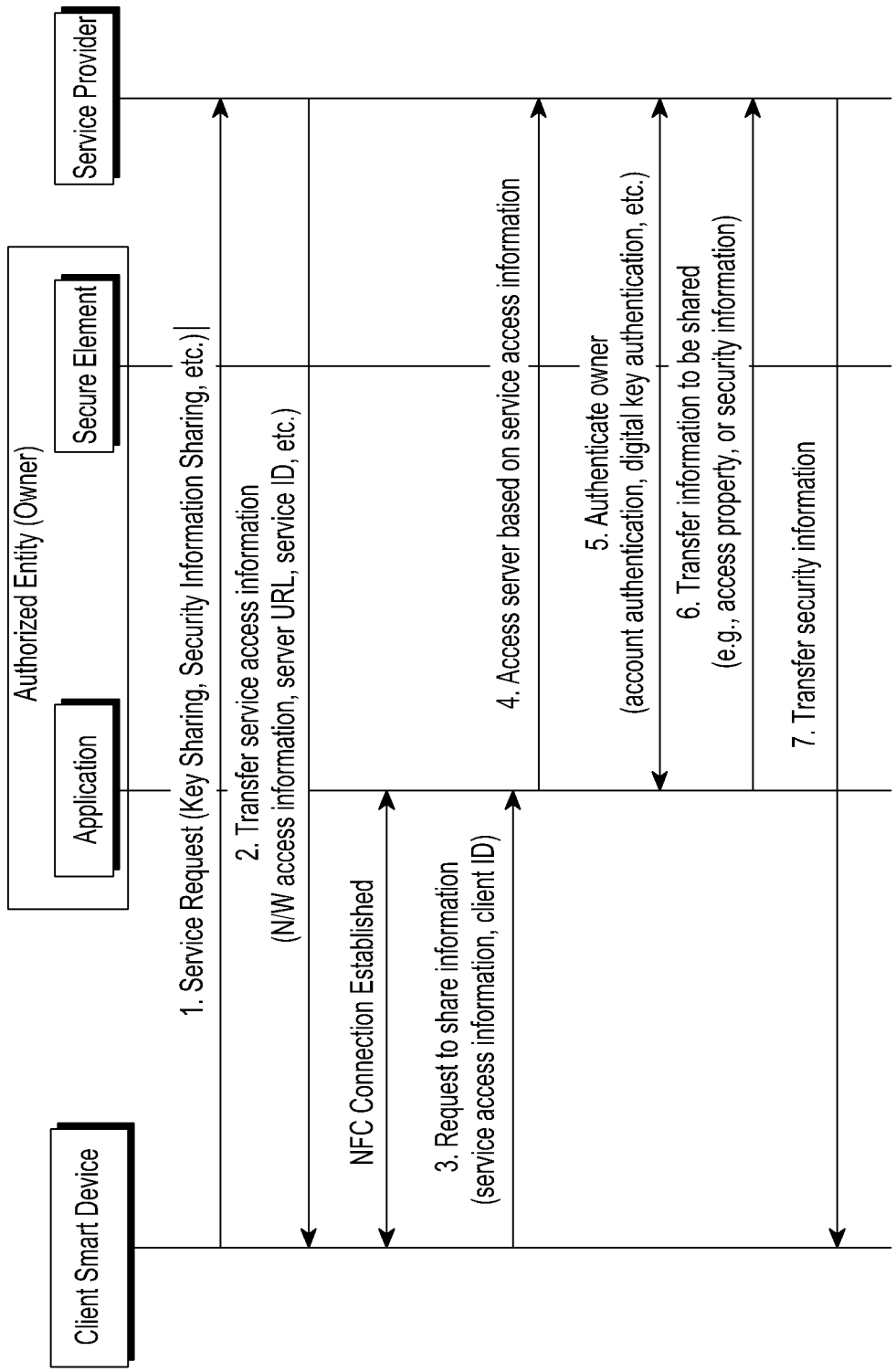
FIG. 38 is a signal flow diagram illustrating a process of providing a DK in a communication system according to an embodiment of the present disclosure.

FIG. 38 is a signal flow diagram illustrating a process of providing a DK in a communication system according to an embodiment of the present disclosure.

Referring to FIG. 38, it will be noted that a service provider is shown "Service Provider", a primary device is shown as "Authorized Entity (Owner)", and a secondary device is shown as "Client Smart Device". Further, it will be noted that FIG. 38 is shown as a form in which the terms "Service provider", "Authorized Entity(Owner)", and "Client Smart Device" are interchangeable with the terms "service provider", "primary device", and "secondary device".

A secondary device requests a service from a service provider (1. Service Request (key Sharing, security sharing, etc.)). Here, kinds of the service will be described below.

The kinds of the service may include services such as a service which receives main information of other device, such as key sharing, and/or the like, for example, a service which receives main information for sharing a key in various embodiments of the present disclosure, a service which uses a service to which the secondary device does not directly subscribe under permission of the primary device, and a service which wants to securely receive main information of the primary device, e.g., a credential, an ID, a password (PW), and/or the like through the service provider.

The service provider transfers secure service access information to the secondary device (2. Transfer service access information (N/W Access information, server URL, service ID, etc.)). Here, the service access information may include network access information which is temporally usable, service related-service URL, a service ID, and/or the like.

If necessary, the service provider may perform an operation of performing a check such as whether rooting is made on the secondary device, whether an application is a trusted application, and/or the like in advance. In a state where an NFC connection is established between the primary device and the secondary device (NFC Connection Established), the secondary device requests service permission (e.g., key sharing, information sharing, log-in permission, and/or the like) from the primary device (3. Information Sharing Request (service access information, Client ID)). The secondary device may transfer the service access information received from the service provider. That is, the secondary device may transmit service permission request including service access information and an ID of the secondary device, i.e., a client ID.

The primary device access the service provider based on the service access information received from the secondary device (4. Service access information based-server access)

A procedure for authenticating the primary device is performed between the primary device and the service provider. That is, the service provider verifies the primary device for verifying whether the service provider may permit the service (5. Owner authentication (account authentication, digital key authentication, etc.). The service provider may verify the primary device by checking whether a digital key is stored at the primary device. This is possible in a case of assuming that the service provider and the primary device share the digital key.

Alternatively, the service provider may verify the primary device by checking whether the primary device is a user who has subscribed to, or registered at the service of the service provider. This is possible in a case of assuming that information is transferred and the service is permitted.

The service provider and the primary device may additionally perform an operation of clearly requiring consent of a user of the primary device such as an operation of inputting confirmation button by a user, an operation of authenticating a fingerprint, and/or the like.

If there is information to be shared with the secondary device, the primary device transfers the information to the service provider (6. Transfer security information to be shared (e.g., access property or security information)).

The service provider provides the information and service which the secondary device requests and the primary device confirms to the secondary device (7. Transfer security information)

Case 1: If main information such as a credential, and/or the like is stored at the primary device, the primary device uploads the main information to the service provider.

Case 2: In a case of digital key sharing, the primary device transfers a key ID, key property, and/or the like to the service provider, and the service provider provisions a digital key which corresponds to a criterion to the secondary device.

Case 3. If the service provider only has to provide a specific service, e.g., a music listening service, and/or the like, the operation "6" may be omitted, and a service is provided immediately after authentication for the secondary device as described in the operation "5".

Although FIG. 38 illustrates a signal transmitting/receiving operation among a secondary device, a primary device, and a service provider according to a digital key providing process in FIG. 37, various changes could be made to FIG. 38. For example, although shown as a series of operations, various operations in FIG. 38 could overlap, occur in parallel, occur in a different order, or occur multiple times.

An attribute protocol (ATT) is a protocol that supports reading and writing the attributes. The ATT denotes a protocol for transmitting and receiving attributes. A GATT is a standard that specifies how an attribute to be transmitted is configured and defined. A nonce, a public key, etc., may be defined using an attribute, and a service may be implemented by transmitting and receiving a specific attribute. In accordance with an embodiment of the present disclosure, a logical format of attributes to be defined in the CCC may be expressed as illustrated in FIG. 39.

Figure 39:
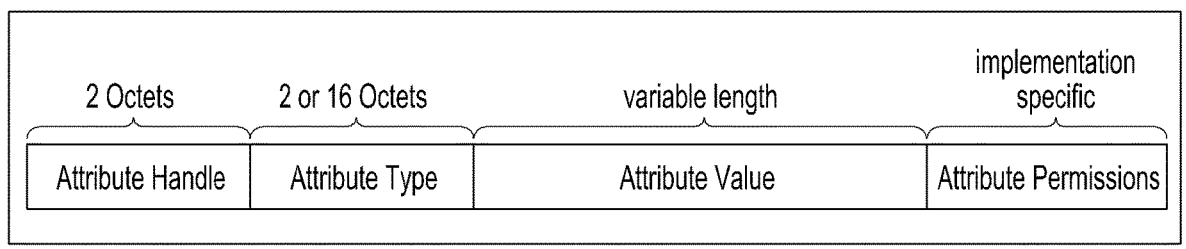
FIG. 39 illustrates a format of an Attribute in a communication system according to an embodiment of the present disclosure.

FIG. 39 illustrates a format of an attribute in a communication system according to an embodiment of the present disclosure.

Referring to FIG. 39, Attribute Handle indicates an index indicating a specific attribute, and is implemented, for example, with a 2-octet length. Attribute Type indicates a UUID, and describes the contents that a specific attribute value defines.

Attribute value is Attribute Type+Attribute Handle, and indicates a practical value of an attribute that may be identified. For example, if Attribute Handle=0 and Attribute Type=Nonce, then Attribute Value=1234.

Figure 40:
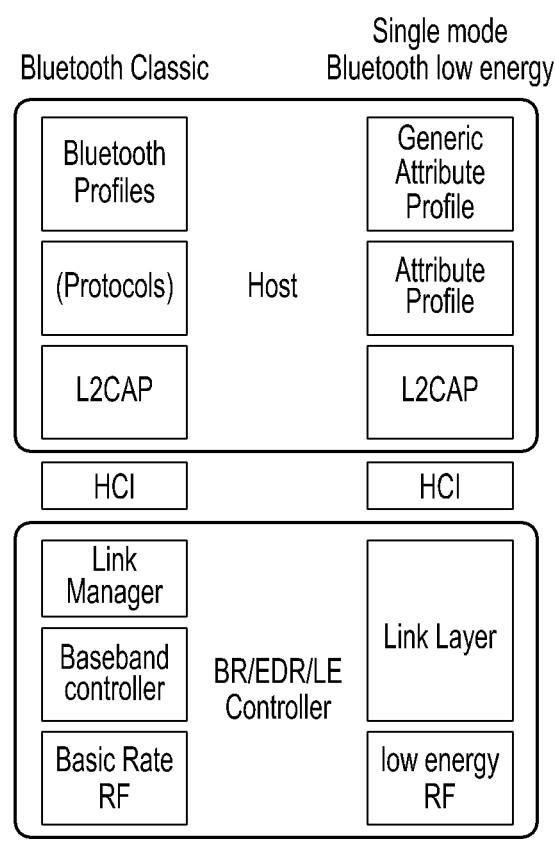
FIG. 40 illustrates a generic attribute profile (GATT) Profile Stack in a communication system according to an embodiment of the present disclosure.

FIG. 40 illustrates a structure of a GATT Profile Stack in a communication system according to an embodiment of the present disclosure.

Referring to FIG. 40, a GATT Profile Stack according to an embodiment of the present disclosure is based on a Bluetooth low energy (BLE) as illustrated on the a right side thereof.

Figure 41A:
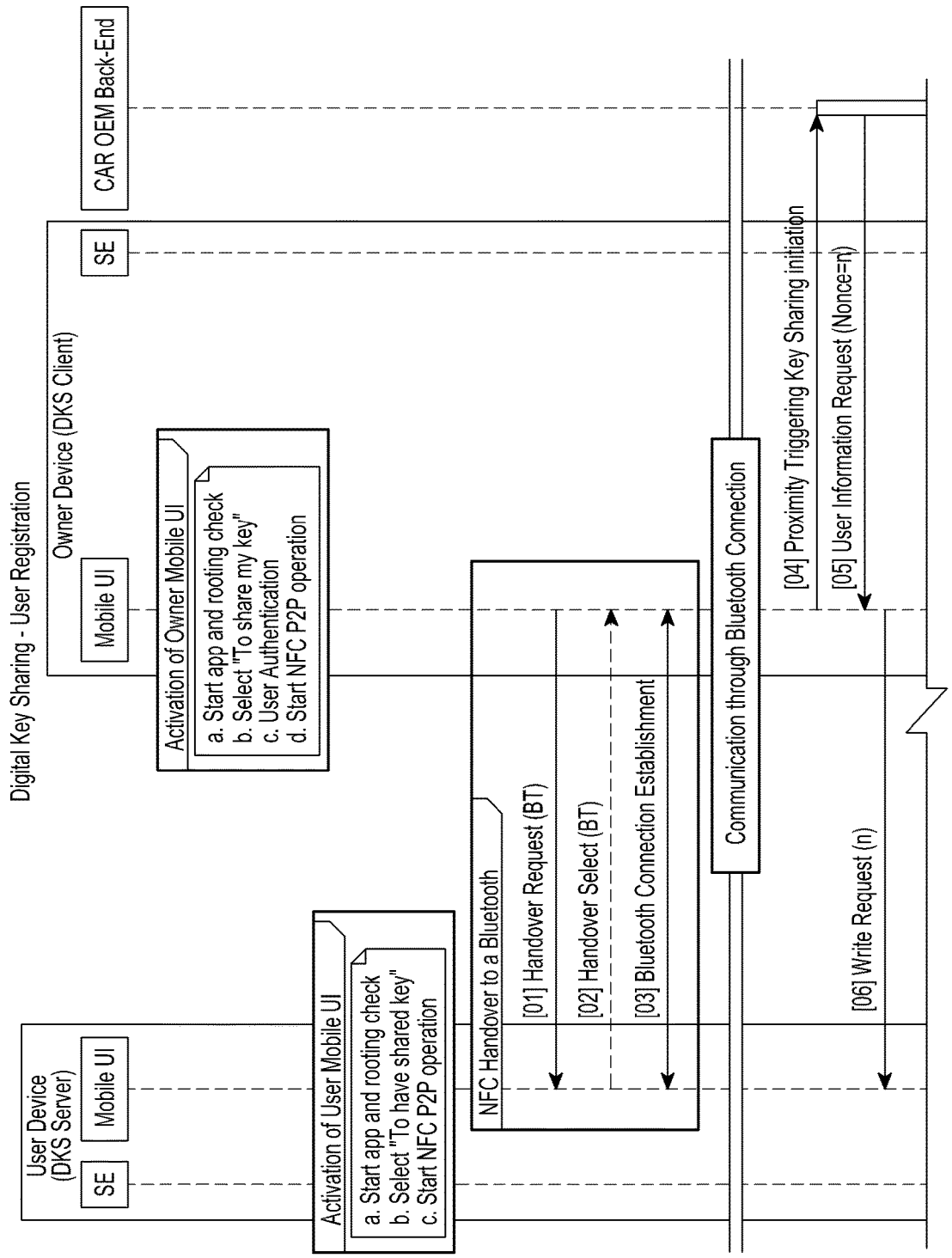
FIGS. 41A to 41C are signal flow diagrams illustrating a secondary device registration process included in a process of providing a DK in a communication system according to an embodiment of the present disclosure.
Figure 41B:
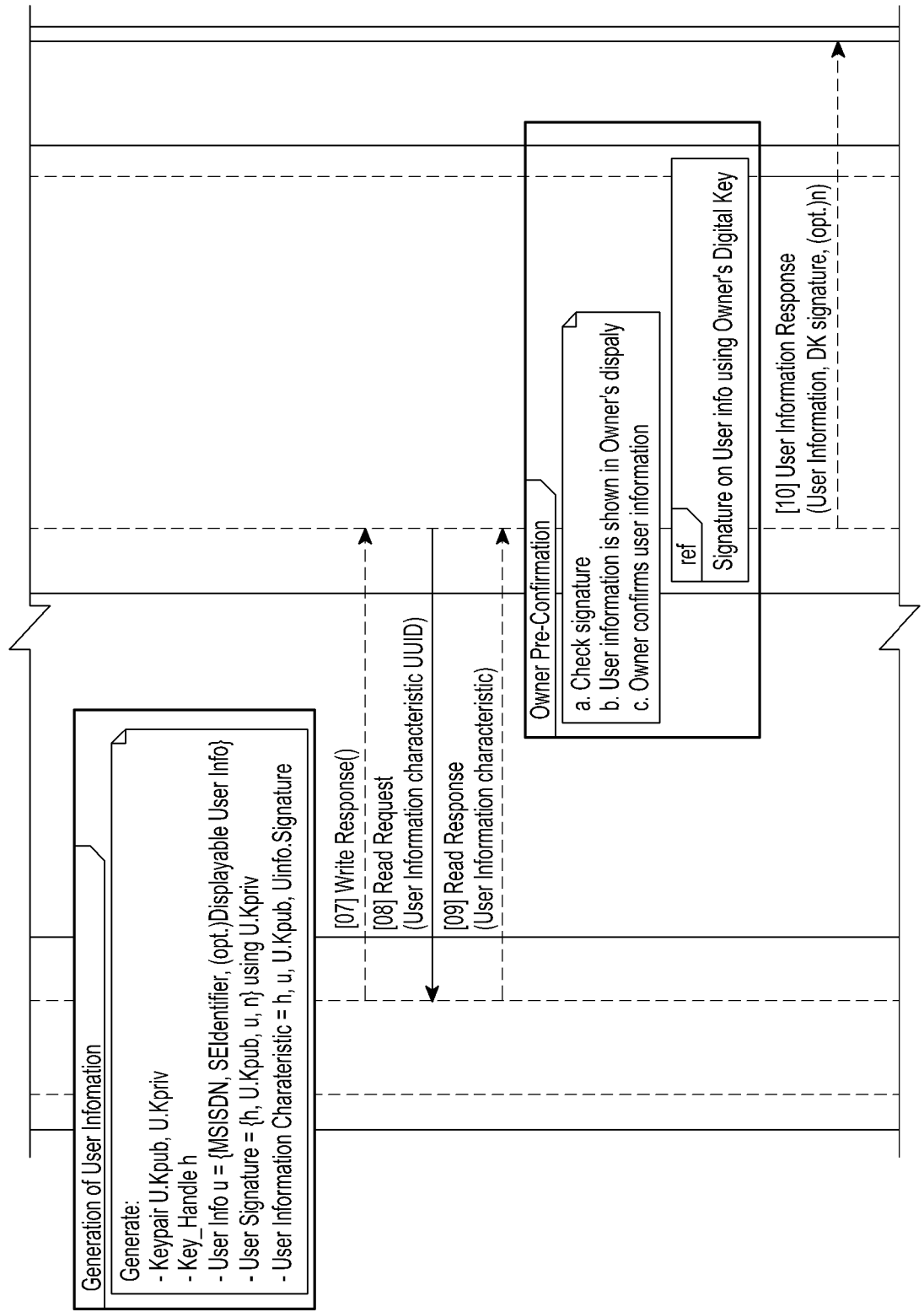
Figure 41C:
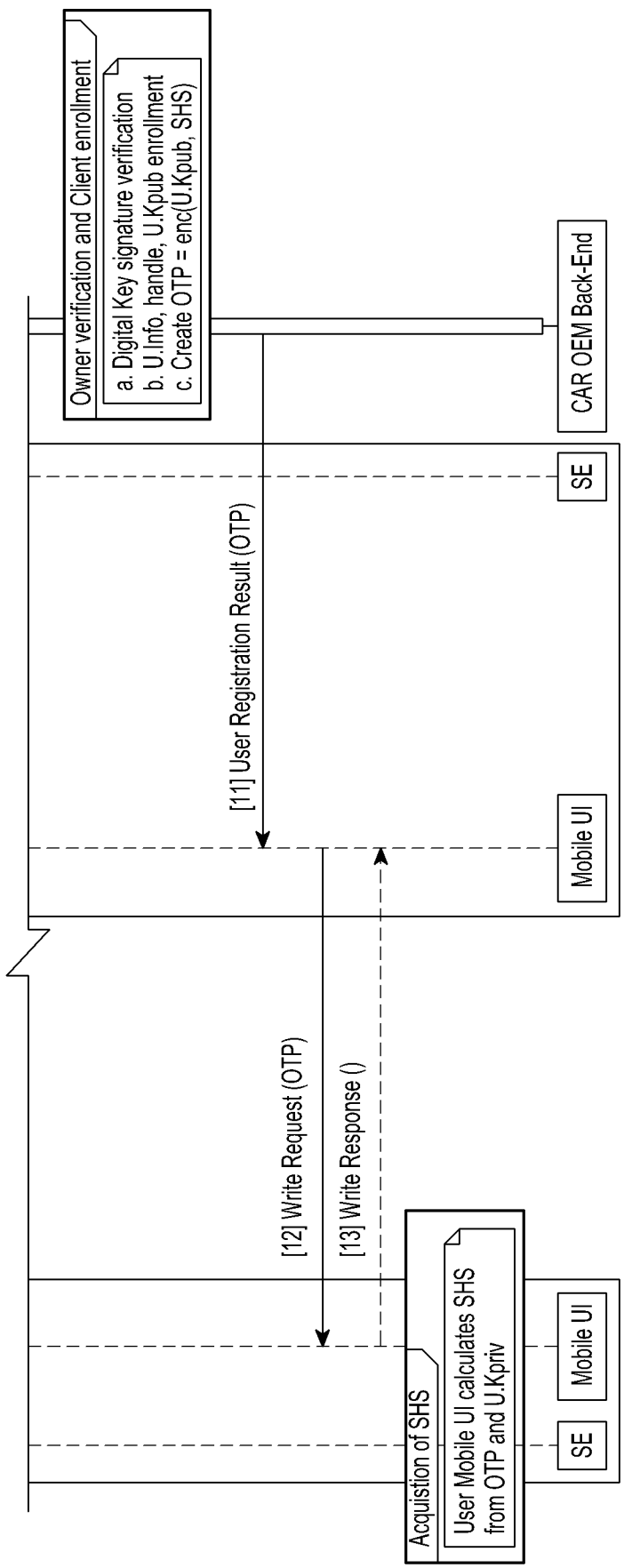

FIGS. 41A to 41C are signal flow diagrams illustrating a secondary device registration process included in a process of providing a DK in a communication system according to an embodiment of the present disclosure. Specifically, FIGS. 41A to 41C illustrate how a secondary device and information of the secondary device are registered at a service provider.

In FIGS. 41A to 41C, it will be noted that a service provider is shown "Car OEM Back-End", a primary device is shown as "Owner Device (DKS Client)", and a secondary device is shown as "User Device (DKS Server)". Further, it will be noted that FIGS. 41A to 41C are shown as a form in which the terms "Car OEM Back-End", "Owner Device (DKS Client)", and "User Device (DKS Server)" are interchangeable with the terms "service provider", "primary device", and "secondary device".

The secondary device includes an SE and a Mobile UI, and the primary device includes a Mobile UI and an SE. In FIGS. 41A to 41C, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively. Each of the Mobile UI-A and the Mobile UI-B enables a P2P communication with other device. The Mobile UI-A and the Mobile UI-B may access the SE-A and the SE-B, respectively. That is, a Mobile UI denotes an entity which enables a P2P communication with other device, and may access an SE.

Firstly, the Mobile UI-B included in the primary device is activated (Activation of Owner Mobile UI), and this will be described below.

The Mobile UI-B is run according to application start, rooting check, and/or the like (a. Start app and rooting check), and a menu such as key transferring, key sharing, and/or the like is selected (b. Select "to share my Key"). The application rooting check may be performed when the application is run or when a specific function is required according to service development.

A user authentication process may be performed if necessary according to a policy of a provider of the Mobile UI-B or a service provider (c. User Authentication), and the user authentication process may be performed based on a PIN which has been registered at the primary device in advance, biometrics, and/or the like. The Mobile UI-B starts operating in an NFC P2P mode (d. Start NFC P2P operation).

In the activation process of the Mobile UI-B, remaining operations except for the rooting check may be optional, so the remaining operations may be performed or omitted according to implementation of the provider of the Mobile UI-B. The Mobile UI-B supports one or more application rooting check mechanisms (Mobile UI shall support one or more app rooting check mechanism).

Further, the Mobile UI-A included in the secondary device is activated (Activation of User Mobile UI), this will be described below. In FIGS. 41A to 41C, it will be noted that it is assumed that the secondary device installs at least one Mobile UI.

The Mobile UI-A is run according to application start, rooting check, and/or the like (a. Start app and rooting check), and a menu such as key sharing, and/or the like is selected (b. Select "to have shared key"). The application rooting check may be performed when the application is run or when a specific function is required according to service development. The Mobile UI-A starts operating in an NFC P2P mode (c. Start NFC P2P operation).

In the activation process of the Mobile UI-A, remaining operations except for the rooting check may be optional, so the remaining operations may be performed or omitted according to implementation of the provider of the Mobile UI-A. The Mobile UI-A supports one or more application rooting check mechanisms (Mobile UI shall support one or more app rooting check mechanism).

A handover from the NFC to another scheme, e.g., Bluetooth, Wi-Fi, and/or the like is performed between the secondary device and the primary device (NFC Handover to a Bluetooth). This will be described below.

The Mobile UI-B transmits, to the Mobile UI-A, a message for requesting handover from the NFC to Bluetooth, e.g., a handover request message ([01] Handover Request (BT)). Upon receiving the handover request message from the Mobile UI-B, the Mobile UI-A selects handover to Bluetooth, and transmits, to the Mobile UI-B, a message indicating that the Mobile UI-A selects handover to Bluetooth, e.g., a handover select message ([02]Handover Select (BT)). That is, the primary device becomes a handover requester, and the secondary device becomes a handover selector. It will be noted that the more specific parameters and situations for the handover from the NFC to Bluetooth are the same as described in an NFC Connection Handover Technical Specification [xx] and Bluetooth Secure Simple Pairing specification [xx]. For example, "3cbb4363-dd09-4856-94e4-416605fa8fcb" will be used as a universally unique identifier (UUID) upon handover.

According to the exchange of the handover request message and the handover select message, a Bluetooth connection is established between the Mobile UI-B and the Mobile UI-A ([03] Bluetooth Connection Establishment).

According that the Bluetooth connection is established between the Mobile UI-B and the Mobile UI-A, a communication is performed among the secondary device, the primary device, and the service provider through the Bluetooth connection (Communication through Bluetooth Connection).

The Mobile UI-B transmits, to the service provider, a message indicating that proximity triggering key sharing will be initiated, that is, indicating that a key sharing process which is a proximity touch will be initiated, for example, a proximity triggering key sharing initiation message ([04] Proximity Triggering Key Sharing initiation). An interface between the Mobile UI-B and the service provider may be implemented with various forms, and a detailed description thereof will be omitted herein.

Upon receiving the proximity triggering key sharing initiation message from the Mobile UI-B, the service provider generates a nonce as a random variable. The nonce is used for receiving and verifying information of the secondary device, this is for preventing reuse of the information of the secondary device by using the nonce when generating the information of the secondary device. The nonce is newly generated whenever a key sharing process is started, so unique information for the secondary device may be generated.

In FIGS. 41A to 41C, it is assumed that the nonce is generated in the service provider, however, the nonce may be generated in the primary device. If the nonce is generated in the primary device, the nonce generated in the primary device will be generated to the service provider at operation [08] to be described, so the service provider may verify the secondary device based on the nonce generated in the primary device.

The service provider transmits, to the Mobile UI-B, a message for requesting information of the secondary device, e.g., a user information request message ([05] User Information Request(Nonce=n)). Here, the user information request message includes the nonce generated by the service provider. In FIGS. 41A to 41C, it will be assumed that the nonce is generated as "n" (nonce=n).

Upon receiving the user information request message from the service provider, the Mobile UI-B transmits, to the Mobile UI-A, a write request message for requesting user information for the secondary device ([06] Write Request (n)). The write request message is used for a message for requesting user information for key sharing, and includes the nonce received through the user information request message.

Upon receiving the write request message from the Mobile UI-B, the Mobile UI-A identifies that the user information is requested for key sharing. So, the Mobile UI-A performs a user information generating operation for generating the user information of the secondary device (Generation of User Information). The user information generating operation will be described below.

The Mobile UI-A generates a public/private key pair (U.Kpub, U.Kpriv) including a public key and a private key. The U.Kpub denotes a public key generated by the secondary device, i.e., a user device, and the U.Kpriv denotes a private key generated by the secondary device, i.e., the user device. The Mobile UI-A generates a handle h as an ID for the public/private key pair. In FIGS. 41A to 41C, the handle h is used as the ID for the public/private key pair, however, the handle h may be an ID which represents the secondary device.

The Mobile UI-A generates user information based on the public/private key pair (U.Kpub, U.Kpriv) and the handle h. The user information includes an SE ID and an MSISDN. The MSISDN is a unique number for identifying a subscriber terminal in a GSM or UMTS mobile network, and denotes a phone number allocated to an SIM in a mobile phone or cellular phone. If necessary, the user information may further include SE Issuer information of the secondary device, an App version, an IMEI of the secondary device, a credential of an SE of the secondary device, a model name of the secondary device, a manufacturer name of the secondary device, an S/N of the secondary device, and/or the like. The user information is used for identifying the secondary device and a user of the secondary device. For example, an SE Identifier, IMEI, and/or the like is used for identifying the secondary device, and the MSISDN, and/or the like is used for identifying the user of the secondary device.

The Mobile UI-A signs the user information (n), the handle h, the U.Kpub as the public key of the secondary device, and the nonce, i.e., n with the U.Kpriv as the private key of the secondary device to generate a user signature, i.e., Uinfo.Signature. In FIGS. 41A to 41C, a user information characteristic includes the handle h, user information (n), U.Kpub as the public key of the secondary device, and the user signature of the secondary device Uinfo.Signature.

After the user information is generated, the Mobile UI-A transmits, to the Mobile UI-B, a response message to the write request message, e.g., a write response ([07] Write Response( )). Here, the write response message indicates that the secondary device successfully has generated based on the nonce generated by the service provider.

Upon receiving the write response message from the Mobile UI-A, the Mobile UI-B transmits, to the Mobile UI-A, a message for requesting to read the user information, e.g., a read request message ([08] Read Request (User Information characteristic UUIC)). The read request message includes the user information characteristic and a UUID of the primary device.

Upon receiving the read request message from the Mobile UI-B, the Mobile UI-A transmits, to the Mobile UI-B, a response to the read request message, e.g., a read response message ([09] Read Response (User Information characteristic)). Here, the read response message includes the user information characteristic of the secondary device.

Upon receiving the read response message from the Mobile UI-A, the Mobile UI-B performs a pre-confirmation operation ([Owner pre-confirmation]). Here, the pre-confirmation operation will be described below.

The Mobile UI-B verifies the user signature Uinfo.Signature of the secondary device based on the public key U.Kpub of the secondary device received from the Mobile UI-A. If the verification result for the user signature Uinfo.Signature of the secondary device is successful, the Mobile UI-B outputs the user information of the primary device. If the output user information of the primary device is confirmed, the Mobile UI-B signs the user information of the primary device using a digital key stored at the primary device, i.e., an SE-B or a key which has authority equivalent to the digital key. If primary device uses a digital key stored at the SE-B, the primary device uses an APDU for digital key signature. The APDU for the digital key signature has been described with reference to FIG. 32, and a detailed description thereof will be omitted herein.

The Mobile UI-B transmits, to the service provider, a response message to the user information request message, e.g., a user information response message ([10] User Information Response (User Information, DK. signature, (opt) n)). The user information response message includes the user information of the secondary device and the digital key signature. The user information response may include the nonce, i.e., n, if necessary.

Upon receiving the user information response message from the Mobile UI-B, the service provider performs a verification operation for the primary device and a registration operation for the secondary device (Owner verification and User enrollment). The verification operation for the primary device and the registration operation for the secondary device will be described below.

The service provider determined whether the primary device is an owner device which practically owns a digital key or the primary device owns appropriate authority as the owner device by performing a verification operation on the digital key of the primary device. The service provider stores the user information of the secondary device which is signed with the user information of the secondary device received from the Mobile UI-B, i.e., the digital key of the primary device. The service provider may temporally store the user information of the secondary device, and the user information of the secondary device may include an SE ID, an MSISDN, a U.Kpub, a handle h, and/or the like (b. U.Info, handle, $U.K_{pub}$ enrollment). The service provider generates SHS to be shared between the secondary device and the service provider, and generates an OTP by encrypting the SHS with the public key of the secondary device U.Kpub (c. Create OTP=enc($U.K_{pub}$, SHS). Here, the SHS is a value used for verifying the secondary device. That is, the service provider may verify the secondary device by checking whether the secondary device owns the SHS, and/or the like. The service provider transfers the SHS to the secondary device through the primary device, and the OTP is used for preventing another device other than the secondary device from obtaining the SHS.

After performing the verification operation for the primary device and the registration operation for the secondary device, the service provider transmits, to the Mobile UI-B, a message indicating a registration result for the secondary device, e.g., a user registration result message ([11] User Registration Result (OTP)). If the user registration result message indicates that the secondary device is successfully registered, the user registration result message includes the OTP.

Upon receiving the user registration result message from the service provider, the Mobile UI-B transmits, to the Mobile UI-A, a write request message for requesting to store an OTP ([12] Write Request (OTP)). The write request message includes the OTP included in the user registration result message. Upon receiving the write request message from the Mobile UI-B, the Mobile UI-A stores the OTP and transmits a message indicating that the OTP has been stored, i.e., a write response message as a response message to the write request message ([13] Write Response ( )).

The Mobile UI-A acquires the SHS by decoding the OTP using the U.Kpriv as the private key of the secondary device (Acquisition of SHS; User Mobile UI calculates SHS from OTP and $U.K_{Priv}$).

Although FIGS. 41A to 41C illustrate a secondary device registration process as a series of operations, various operations in FIGS. 41A to 41C could overlap, occur in parallel, occur in a different order, or occur multiple times.

Figure 42A:
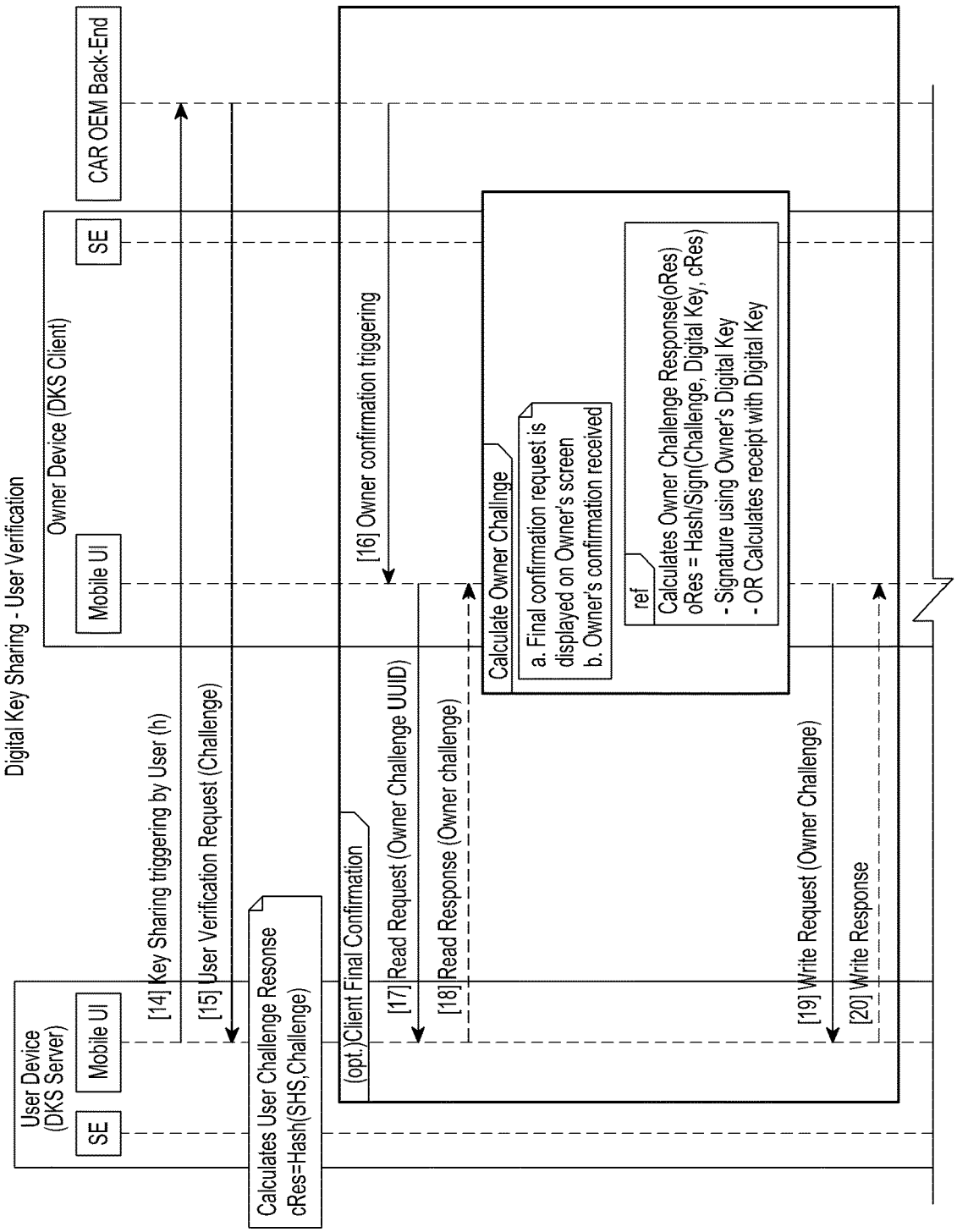
FIGS. 42A and 42B are signal flow diagrams illustrating a secondary device verification process included in a process of providing a DK in a communication system according to an embodiment of the present disclosure.
Figure 42B:
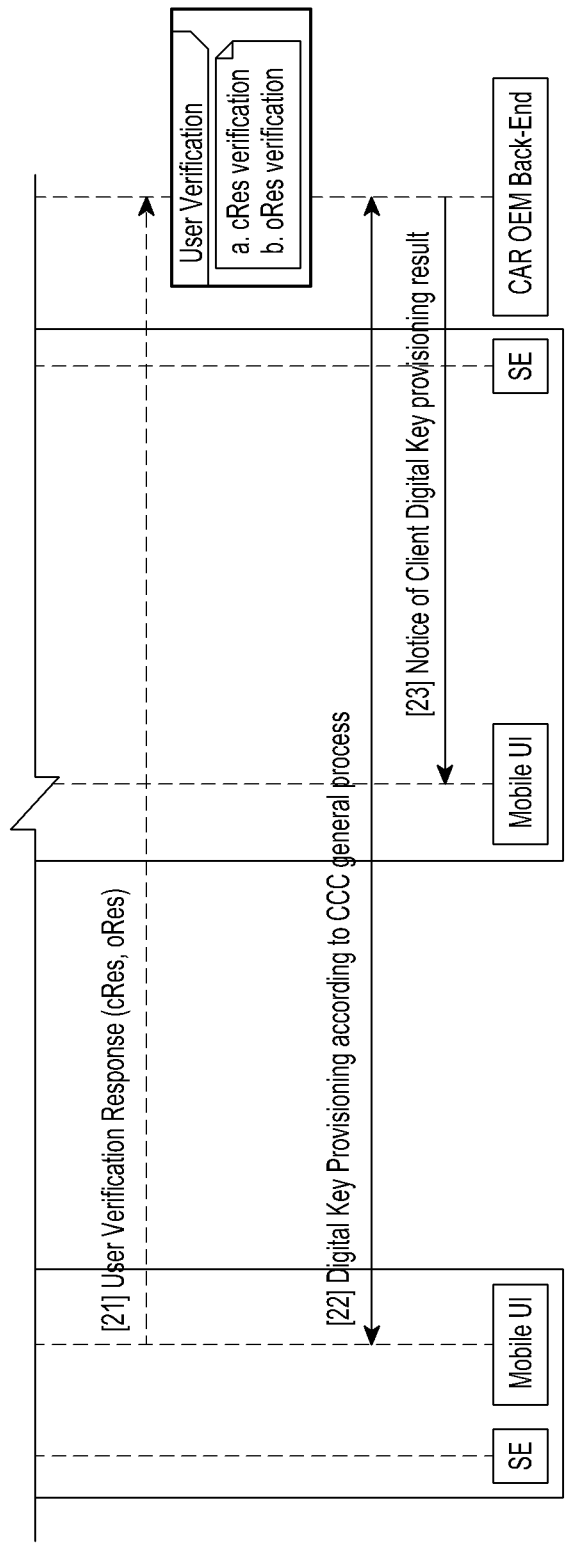

FIGS. 42A and 42B are signal flow diagrams illustrating a secondary device verification process included in a process of providing a DK in a communication system according to an embodiment of the present disclosure. Specifically, FIGS. 42A and 42B illustrate a secondary device verification process for checking whether a secondary device owns an SHS, confirming the secondary device through a primary device, and sharing a DK with the secondary device before provisioning the DK to the secondary device.

In FIGS. 42A and 42B, it will be noted that a service provider is shown "Car OEM Back-End", a primary device is shown as "Owner Device (DKS Client)", and a secondary device is shown as "User Device (DKS Server)". Further, it will be noted that FIGS. 42A and 42B are shown as a form in which the terms "Car OEM Back-End", "Owner Device (DKS Client)", and "User Device (DKS Server)" are interchangeable with the terms "service provider", "primary device", and "secondary device".

The secondary device includes an SE and a Mobile UI, and the primary device includes a Mobile UI and an SE. In FIGS. 42A and 42B, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively.

A Mobile UI-A included in a secondary device which obtains SHS requests a key sharing service as a service which shares a digital key from the service provider That is, the secondary device transmits, to the service provider, a key sharing triggering message for requesting a key sharing service ([14] Key Sharing triggering by User(h)). The key sharing triggering message includes a handle h, so the service provider may know which secondary device requests a key sharing service based on the handle h. In order to identify clearly the secondary device, the key sharing triggering message may further include an MSISDN, an SE ID, an IMEI, and/or the like as well as the handle h.

Upon receiving the key sharing triggering message from the Mobile UI-A, the service provider transmits, to the Mobile UI-A of the secondary device, a user verification request message for requesting the secondary device ([15] User Verification Request (Challenge)). The user verification request message include challenge.

If the Mobile UI-A generates response which the service provider predicts based on the challenge included in the user verification request message to transmit the response to the service provider, the service provider may determine that the secondary device is normally verified.

The user verification request message may include challenge for the primary device and challenge for the secondary device.

For transferring information about a user ID to only the primary device, the service provider may encrypt the user information of the primary device using the public key of the primary device and include the encrypted user information into the user verification request message. In this case, even though the user information of the primary device is transferred through the secondary device, only the primary device may decode the user information using the public key of the primary device, so security performance may be enhanced. In this case, the service provider owns a public key which corresponds to the private key of the primary device in advance, and the public key which corresponds to the private key of the primary device may be provisioned, for example, in an initial key provisioning process between the primary device and the service provider.

FIGS. 42A and 42B will describe a case that the user verification request message includes one challenge, and each of the secondary device and the primary device generates response for the one challenge based on the challenge.

Upon receiving the user verification request message from the service provider, the Mobile UI-A performs a user challenge response calculating operation (Calculate User Challenge Response, cRes=Hash (SHS, Challenge)). The user challenge response calculating operation will be described below.

The Mobile UI-A calculates challenge response based on the challenge included in the user verification request message. The challenge response may be calculated as expressed in Equation (1).

$$cRes = Hash(SHS, Challenge) \quad \text{Equation (1)}$$

In Equation (1), cRes denotes challenge response, and it will be understood that the challenge response is generated based on SHS and challenge as expressed in Equation (1).

An additional signature may be generated using the challenge response and the private key of the secondary device $U.K_{priv}$.

Meanwhile, a primary device final confirmation operation is performed among the secondary device, the primary device, and the service provider ((opt.) Owner Final Confirmation). The primary device final confirmation operation will be described below.

The service provider triggers the primary device final confirmation operation ([16] Owner confirmation triggering). According to triggering of the service provider, the Mobile UI-B transmits, to the Mobile UI-A, a message for requesting challenge of the primary device, e.g., a read request ([17] Read Request (Owner Challenge UUID)). The read request message includes a UUID of the primary device.

Upon receiving the read request message from the Mobile UI-B, the Mobile UI-A calculates challenge response, and transmits a read response message as a response message to the read request to the Mobile UI-B ([18] Read Response (Owner Challenge)). The read response message includes the challenge included in the user verification request message and the calculated challenge response. If the user verification request message includes the challenge for the primary device and the challenge for the secondary device, not the one challenge, the read response message may include the challenge for the primary device. If the user verification request message includes the user information of the primary device which is encrypted using the public key of the primary device, the read response message may include the user information of the primary device which is encrypted using the public key of the primary device.

Upon receiving the read response message from the Mobile UI-A, the Mobile UI-B outputs confirmation parameters for final confirmation for the primary device and identifies the final confirmation for the confirmation parameters (a. Final confirmation request is displayed on Owner's screen; b. Owner's confirmation received). The Mobile UI-B may output the confirmation parameters for the final confirmation for the primary device by displaying the confirmation parameters for the final confirmation for the primary device on a screen included in the primary device. If the read response message includes the user information of the primary device which is encrypted using the public key of the primary device, the user information of the primary device is decoded using the public key of the primary device and the decoded result is displayed on the screen included in the primary device. If the information displayed on the screen included in the primary device is different from the information displayed in the pre-confirmation operation as described in FIGS. 41A to 41C, it is expected that a security attack such as man in the middle attack, and/or the like occurs, so sharing key provisioning for the secondary device may be stopped.

Upon detecting the final confirmation for the confirmation parameters, the Mobile UI-B finally confirms the secondary device based on a digital key stored at the primary device or a key which owns authority equivalent to the digital key. Here, the final confirmation is generated as a form of a challenge response (oRes) of the primary device and transferred to the service provider through the secondary device, and the service provider verifies the challenge response (oRes). For example, the challenge response(oRes) may be calculated as expressed in Equation (2).

$$oRes = Sign(Challenge, Digital Key, cRes) \quad \text{Equation (2)}$$

In a case that primary device uses a digital key stored at an SE-B included in the primary device, the primary device generates a challenge response (oRes) of the primary device by signing the challenge and the user information using an APDU for a digital key signature. The APDU for the digital key signature has been described with reference to FIG. 32, and a detailed description thereof will be omitted herein.

The challenge response may be generated using a hash, and/or the like, not the signature. In this case, the challenge response(oRes) may be calculated, for example, as expressed in Equation (3).

$$oRes=Hash(Challenge, Digital Key, cRes) \qquad \text{Equation (3)}$$

The Mobile UI-B of the primary device transmits the generated challenge response(oRes) to the Mobile UI-A through the write request message ([19] Write Request (Owner Challenge)]). Upon detecting the write request message including the challenge response(oRes), the Mobile UI-A stores the challenge response(oRes), and transmits a response message to the write request message, e.g., a write response message ([20] Write Response).

As described above, after the primary device final confirmation operation is performed, the Mobile UI-A transmits a response message to the user verification request message, e.g., a user verification response message ([21] User Verification Response(cRes, oRes)). Here, the user verification response message includes the challenge response (cRes) generated by the Mobile UI-A and the challenge response (oRes) received from the Mobile UI-B. If there is no challenge response(oRes), the user verification response may include only the challenge response(cRes) generated by the Mobile UI-A.

Upon receiving the user verification response message from the Mobile UI-A, the service provider performs a verification operation on challenge responses included in the user verification response message, i.e., the cRes and the oRes (User Verification: a. cRes verification; b. oRes verification). If the verification result for the cRes and the oRes is successful, the service provider provisions a digital key to the secondary device. That is, a digital key provisioning process is performed between the service provider and the secondary device ([22] Digital Key Provisioning according to CCC general process).

The service provider may cause the primary device to recognize that the digital key is provisioned to the secondary device by transmitting a message indicating the digital key provisioning result for the secondary device to the primary device ([23] Notice of Client Digital Key provisioning result).

Although FIGS. 42A and 42B illustrate a secondary device verification process as a series of operations, various operations in FIGS. 42A and 42B could overlap, occur in parallel, occur in a different order, or occur multiple times.

DK sharing service characteristics for a DK sharing service may be expressed as shown in Table 26.

TABLE 26

| Characteristic Name | Mandatory Properties | Characteristic UUID | Requirement | Section |
|---|---|---|---|---|
| Nonce | Write | 128 bit UUID or 16 bit BT UUID | M | 2.3.3.1 |
| User Information | Read | 128 bit UUID or 16 bit BT UUID | M | 2.3.3.2 |
| Sharing OTP | Write | 128 bit UUID or 16 bit BT UUID | M | 2.3.3.3 |

TABLE 26-continued

| Characteristic Name | Mandatory Properties | Characteristic UUID | Requirement | Section |
|---|---|---|---|---|
| DKS Challenge | Read | 128 bit UUID or 16 bit BT UUID | M | 2.3.3.4 |
| DKS Challenge Result | Write | 128 bit UUID or 16 bit BT UUID | M | 2.3.3.5 |

Each characteristic in Table 26 will be described below. A Nonce characteristic in Table 26 may be expressed as shown in Table 27 below.

TABLE 27

| Attribute Type (Attribute ID) | Definition (Name) | Attribute Value Type | Description | Status |
|---|---|---|---|---|
| 0x0100 | Nonce | uint8 | Random value | M |

A User Information characteristic may be used for describing information of a secondary device, i.e., a user smart device, and a DKSC may read the User Information characteristic from a DKSS. For example, the User Information characteristic may be used for a primary device to read user information from a secondary device. The User Information characteristic may be used to indicate user information of a secondary device, which will receive a DK.

The User Information characteristic may be expressed as shown in Table 28 below.

| Attribute Type (Attribute ID) | Definition (Name) | Attribute Value Type | Description | Status |
|---|---|---|---|---|
| 0x0200 | MSISDN | Text String | Up to 15 decimal digits, as defined in ITU E.164[xx] | C1 |
| 0x0201 | SE Identifier | uint32? 64? | The Secure Element identifier | C2 |
| 0x0202 | IMEI | | | C3 |
| 0x0203 | Device Serial Number | | | C4 |
| 0x0204 | Displayable User Info | Text String | Displayable Text name e.g. 'Amy's smart phone & phone number is xxxx' | O |
| 0x0205 | User Public Key | uint32~uint64 or 521-bit | | M |
| 0x0206 | User Key Handle | uint32 | | M |
| 0x0207 | User Signature | 160 bit | | M |

At least one of C1 to C4 will be used as a User ID

In Table 28, an SE Identifier may be implemented with unit 32 or unit 64.

In Table 28, although the status of an MSISDN and an SE Identifier is expressed as "Conditional", the status of the MSISDN and the SE Identifier may be "Mandatory".

In Table 28, "C" indicates that a corresponding Attribute Type may be implemented as "Conditional", "O" indicates that a corresponding Attribute Type may be implemented as "Optional", and "M" indicates that a corresponding Attribute Type may be implemented as "Mandatory".

The User Public Key may be implemented similar to GPCS ECC Key Length, the User Signature may be implemented similar to GPCS and B.3.1.1, and Signature scheme=RSASSA-PKCS-v1_5 as defined in PKCS #1, hash function is SHA-1.

At least one of the MSISDN, the SE Identifier, the IMEI, and the Device Serial Number may be used as a User ID.

A DKS OTP characteristic is used for a DKS Client (owner device) to write an OTP to a DKS Server (user device). The DKS OTP characteristic may be expressed as shown in Table 29 below.

TABLE 29

| Attribute Type (Attribute ID) | Definition (Name) | Attribute Value Type | Description | Status |
|---|---|---|---|---|
| 0x0300 | Sharing OTP | uint16 | Shared Secret encrypted with User's Public Key by the Car OEM Server | M |

An Owner Challenge characteristic is used for a DKS Client (owner device) to read challenge from a DKS Server (user device). The Owner Challenge characteristic may be expressed as shown in Table 30 below.

TABLE 30

| Attribute Type (Attribute ID) | Definition (Name) | Attribute Value Type | Description | Status |
|---|---|---|---|---|
| 0x0400 | Challenge | uint8 | Challenge created by the Car OEM Server, and forwarded from User device to Owner device | M |
| 0x0401 | Client Challenge Result | 160 bit | Calculated Client Challenge Response | M |

An Owner Challenge Result characteristic is used for a DKS Client (owner device) to write an Owner Challenge result to a DKS Server (user device). The Owner Challenge Result characteristic may be expressed as shown in Table 31 below.

TABLE 31

| Attribute Type (Attribute ID) | Definition (Name) | Attribute Value Type | Description | Status |
|---|---|---|---|---|
| 0x0500 | Owner Challenge Result | 160 bit | Owner Challenge Response Calculation result of signature using Digital Key | M |

Figure 43:
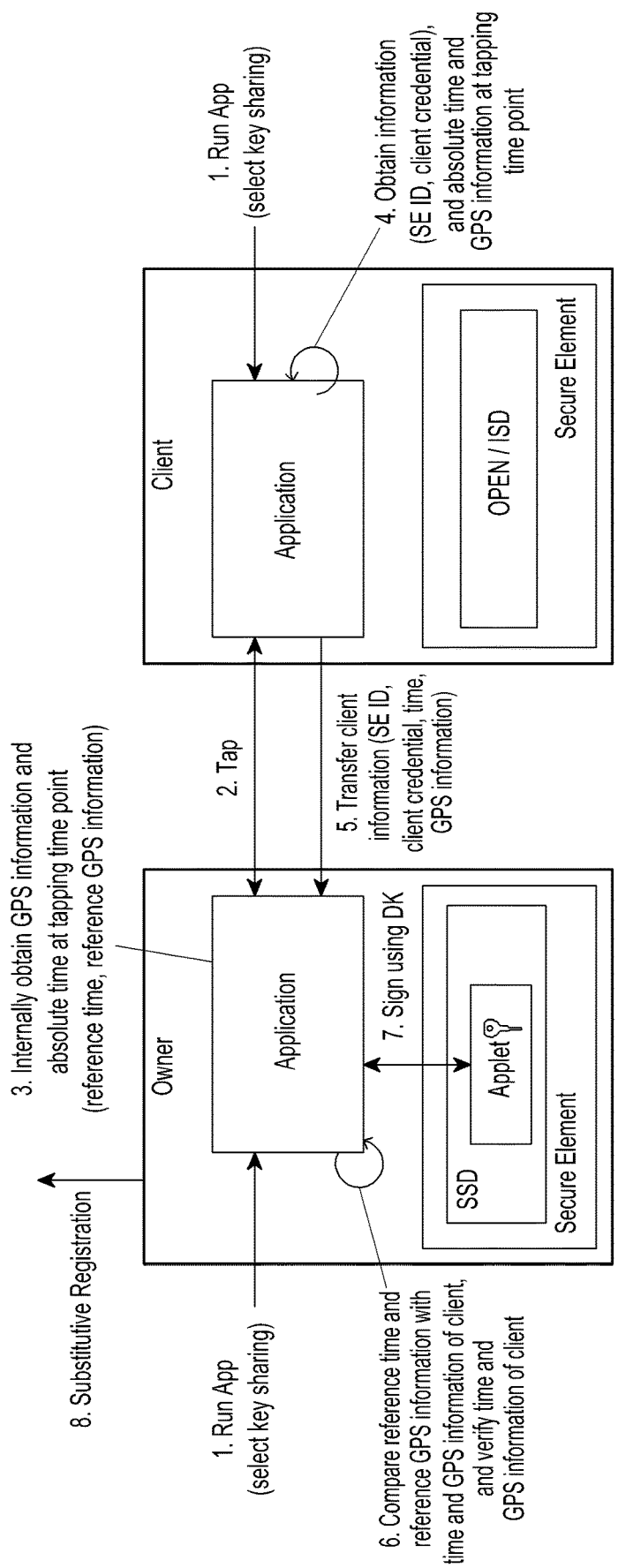
FIG. 43 illustrates a process of registering a secondary device in a communication system according to an embodiment of the present disclosure.

FIG. 43 illustrates a process of registering a secondary device in a communication system according to an embodiment of the present disclosure. Specifically, FIG. 43 illustrates a process in which additional information, such as GPS information, a time stamp, etc., as well as a secondary device are registered during a DK sharing process, a primary device and the secondary device check whether the primary device and the secondary device exist in the same area and share a DK, so it is possible to provide a DK sharing service that is more robust against a security attack.

In FIG. 43, it will be noted that a primary device is shown as "Owner", and a secondary device is shown as "Client". Further, it will be noted that FIG. 43 is shown as a form in which the terms "Owner" and "Client" are interchangeable with the terms "primary device" and "secondary device".

As shown in FIG. 43, if a primary device and a secondary device selects a key sharing serve (1. Run App (select key sharing)), a tap procedure is performed (2. Tap), and the primary device internally obtains GPS information and absolute time at a tapping time point (3. Internally obtain GPS information and absolute time at tapping time point (reference time, reference GPS information))

The secondary device obtains user information of the secondary device, and absolute time and GPS information of the tapping time point (4. Obtain Info (SE ID, client credential)+GPS information and absolute time at tapping time point). The secondary device transmits the user information of the secondary device to the primary device, the absolute time and GPS information are transmitted together (5. Transfer client information (SE ID, client credential, time, GPS information)).

The primary device compares the reference time and reference GPS information of the primary device with the time and GPS information received from the secondary device (6. Compare reference time and reference GPS information with time and GPS information of client, and verify time and GPS information of client). If the secondary device and the primary device exist in the same area, the primary device signs the user information of the primary device using a digital key of the primary device (7. Sign using DK), and registers the signed user information at a service provider (8. Substitutive Registration).

In order for the secondary device to transmit GPS information and time information, e.g., a time stamp to the primary, an embodiment of the present disclosure adds a parameter to a GetUserInformation Function as expressed in Table 20. There is a function similar to the GetUserInformation Function, not the GetUserInformation Function, a parameter indicating GPS information and time information may be added to the function.

TABLE 32

| Field/Header | Name | Value | Status |
|---|---|---|---|
| Field | Response Code | 0x90 or 0xA0 or Error Code | M |
| Field | Packet Length | Varies | M |
| Header | Single Response Mode | 0x01 | C1 |
| Header | Single Response Mode Param | 0x01 | C2 |
| Header | Application Parameters | | |
| | MSISDN | Varies | C3 |
| | SEIdentifier | Varies | C3 |
| | IMEI | Varies | C4 |
| | DeviceSerialNumber | Varies | C4 |
| | DisplayableUserInfo | Varies | C3 |
| | UserPublicKey | Varies | C3 |
| | KeyHandle | Varies | C3 |
| | GPSInfo | varies | O |
| | TappingTime | varies | O |
| | UserSignature | varies | C3 |

C1: The Single Response Mode header is mandatory (M) if: GOEP 2.0 or later is used AND an SRM header has been received in the previous GET request AND the response code is success (0x90 or 0xA0) otherwise excluded(X).
C2: The Single Response Mode Param header is optional if Single Response Mode is used, otherwise excluded (X).
C3: Mandatory if the response code is success (0x90 or 0xA0).
C4: The DKSS may support parameters of the C4-labelled parameters if the response code is success(0x90 or 0xA0)

Figure 44:
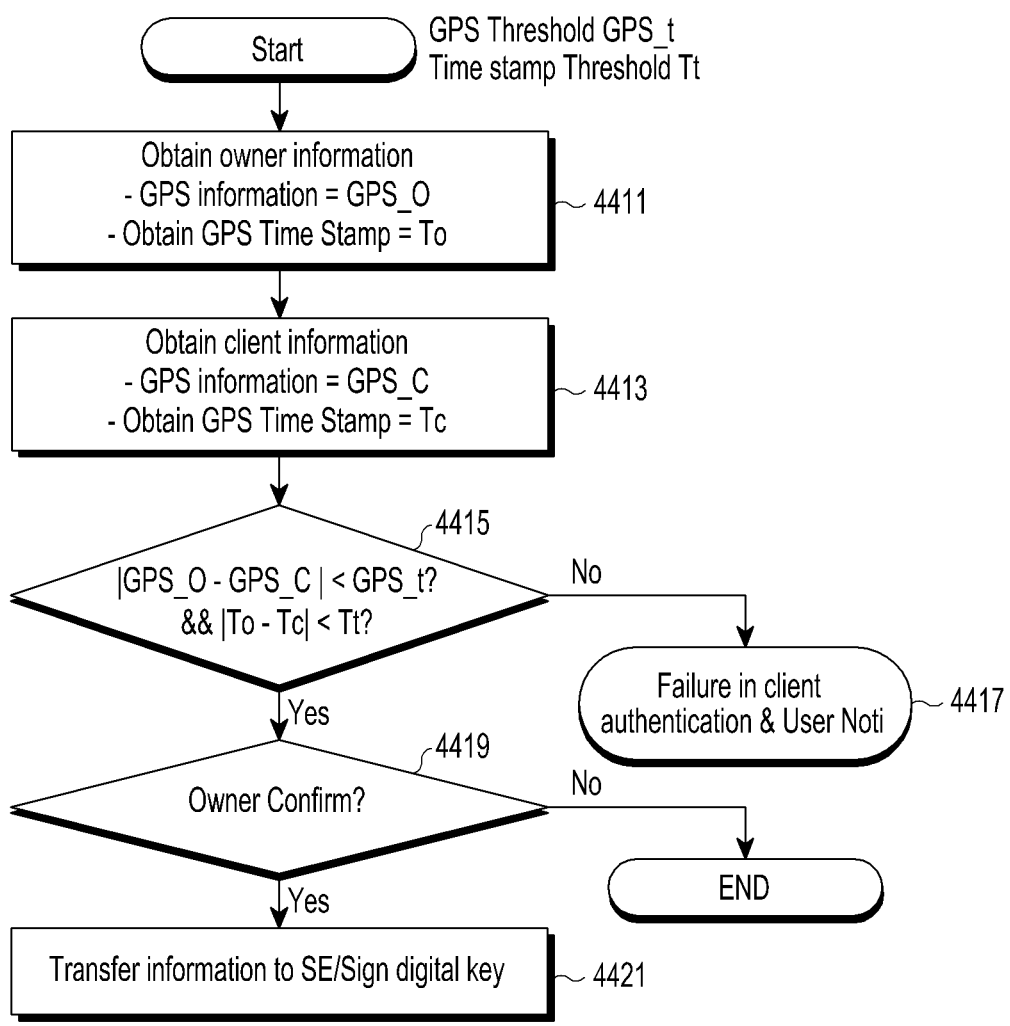
FIG. 44 is a flowchart illustrating an operating process of a primary device in a communication system according to an embodiment of the present disclosure.

FIG. 44 is a flowchart illustrating an operating process of a primary device in a communication system according to an embodiment of the present disclosure. Specifically, FIG. 44 illustrates an operation of verifying GPS information and a time stamp at an owner pre-confirmation operation in a secondary device registration process performed in a DK providing process.

Referring to FIG. 44, it will be noted that a primary device is shown as "Owner", and a secondary device is shown as "Client". Further, it will be noted that FIG. 44 is shown as a form in which the terms "Owner" and "Client" are interchangeable with the terms "primary device" and "secondary device".

In FIG. 44, an operation of verifying GPS information and a time stamp may be performed, for example, at an owner pre-confirmation operation in a secondary device registration process performed in a digital key providing process.

A primary device obtains information of the primary device, e.g., GPS information and a GPS time stamp, in step 4411. The GPS information of the primary device is indicated as "GPS_O", and the GPS time stamp of the primary device is indicated as "To".

In step 4413, the primary device obtains information of the secondary device, e.g., GPS information and a GPS time stamp. The GPS information of the secondary device is indicated as "GPS_C", and the GPS time stamp of the secondary device is indicated as "Tc".

In step 4415, the primary device determines whether a difference between the GPS information of the primary device and the GPS information of the secondary device is less than a first threshold difference value, e.g., GSP_t, and whether difference between the GPS time stamp of the primary device and the GPS time stamp of the secondary device is less than a second threshold difference value, e.g., Tt. If the difference between the GPS information of the primary device and the GPS information of the secondary device is not less than GSP_t, or the difference between the GPS time stamp of the primary device and the GPS time stamp of the secondary device is not less than Tt, the primary device determines that authentication for the secondary device has failed in step 4417.

However, if the difference between the GPS information of the primary device and the GPS information of the secondary device is less than GSP_t, and the difference between the GPS time stamp of the primary device and the GPS time stamp of the secondary device is less than Tt, the primary device determines whether the primary device confirmation is performed in step 4419. If the primary device confirmation is performed in step 4419, the primary device transmits the information of the secondary device to a secure element, and signs the information of the secondary device using a DK in step 4421.

However, if the primary device confirmation is not performed in step 4419, the process ends.

Figure 45:
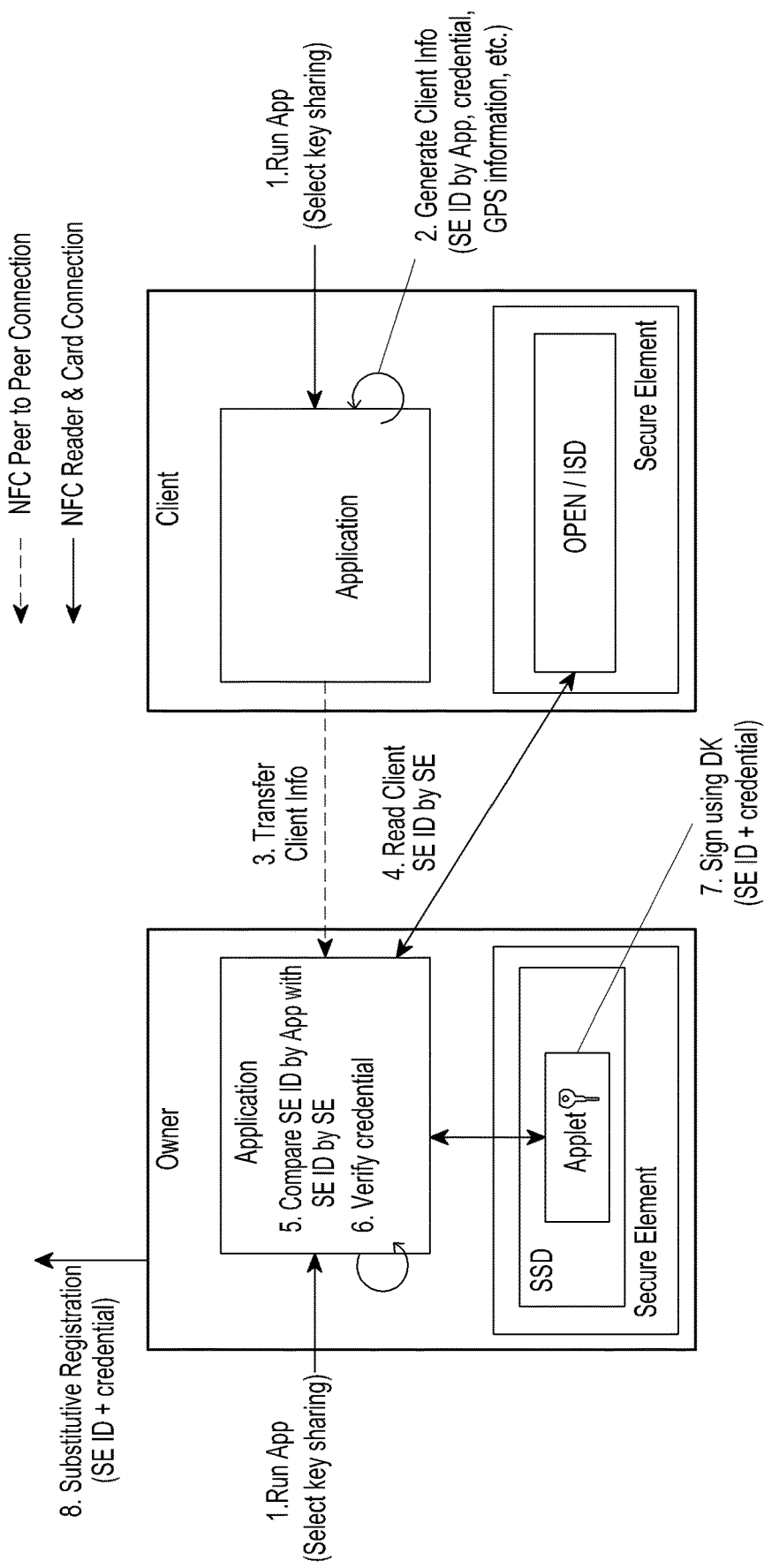
FIG. 45 illustrates a process of verifying a user application in a communication system according to an embodiment of the present disclosure.

FIG. 45 illustrates a process of verifying a user application in a communication system according to an embodiment of the present disclosure. Specifically, in FIG. 45, user information is obtained through a mobile UI (=application) which exists in an OS region in a process of sharing a DK. Therefore, if rooting is made on the OS or the application is infected with a hacking attack, the reliability of the user information transmitted from the application may be low.

Accordingly, a user secure element may directly obtain important information which is not through the mobile UI, and use the important information for additional verification of a user application by comparing the important information with information obtained through the user application.

Referring to FIG. 45, it will be noted that a primary device is shown as "Owner", and a secondary device is shown as "Client". Further, it will be noted that FIG. 45 is shown as a form in which the terms "Owner" and "Client" are interchangeable with the terms "primary device" and "secondary device".

In FIG. 45, user information is obtained through a mobile UI (=application) which exists in an OS region in a process of sharing a digital key, so if rooting is made on the OS or the application is infected with a hacking attack, and/or the like, reliability of the user information transferred from the application may be low.

So, a user secure element may directly obtain important information which is not through the mobile UI, and use the important information for additional verification of a user application by comparing the important information with information obtained through the user application.

A primary device and a secondary device run an application to select key sharing (1. Run App (Select key sharing)), and the secondary device generates secondary device information (Generate Client Info (SE ID by App, credential, GPS information, etc.)) The secondary device transmits the generated secondary device information to the primary device (3. Transfer Client Info), and the primary device reads an SE ID of the secondary device stored at a secure element of the secondary device (4. Read Client SE ID by SE).

The application of the primary device compares an SE ID by the primary device with the SE ID by the secure element (5. Compare SE ID by App with SE ID by SE). The application of the primary device verifies a credential of the secondary device (6. Verify credential), and the secure element of the primary device signs the SE ID and the credential based on a digital key (7. Sign using DK (SE ID+credential)). The primary device registers the SE ID and the credential of the secondary device at a service provider (not shown in FIG. 45) instead of the secondary device.

Figure 46:
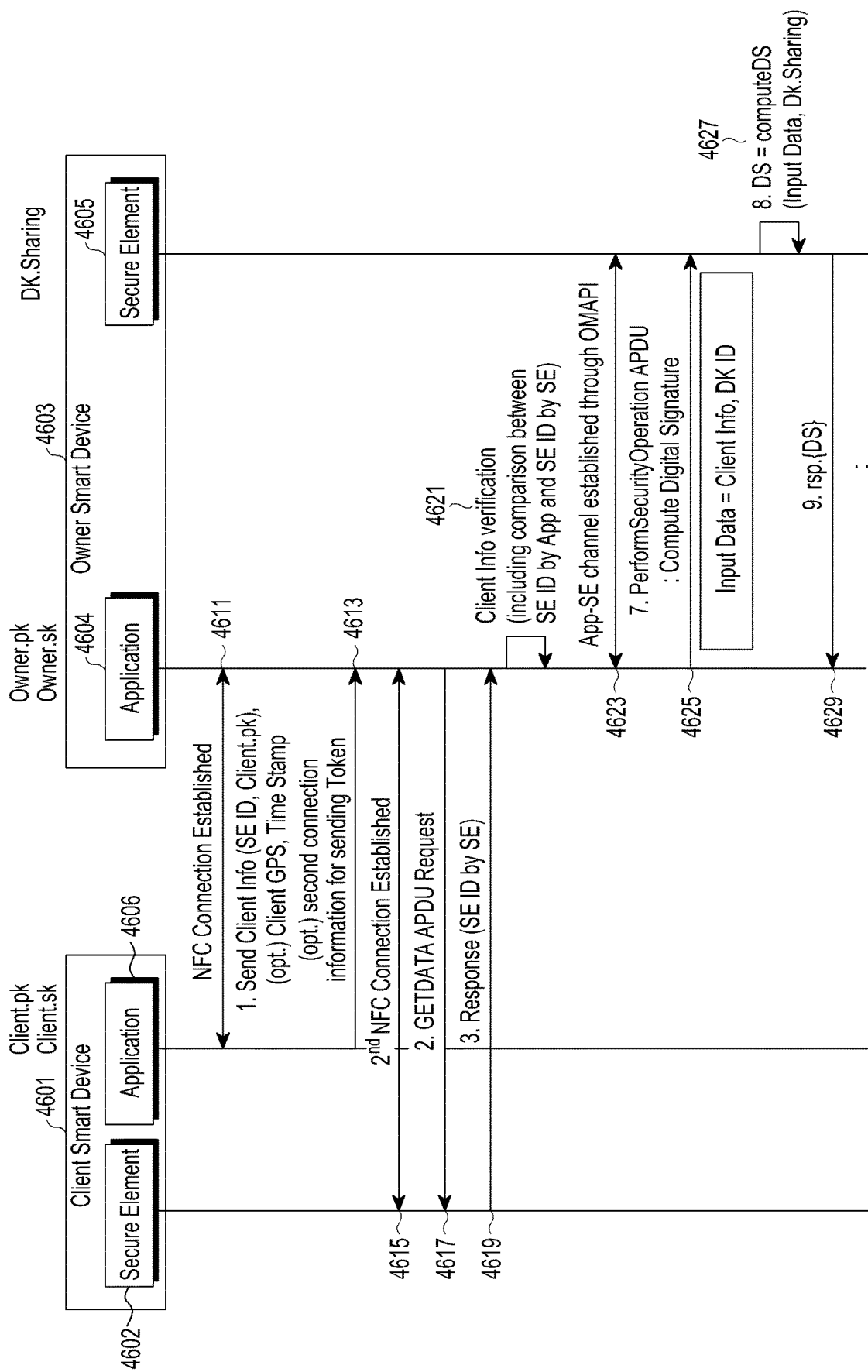
FIG. 46 is a signal flow diagram illustrating a process of verifying a user application in a communication system according to an embodiment of the present disclosure.

FIG. 46 is a signal flow diagram illustrating a process of verifying a user application in a communication system according to an embodiment of the present disclosure.

Referring to FIG. 46, it will be noted that a service provider is shown "OEM", a primary device is shown as "Owner Smart Device", and a secondary device is shown as "Client Smart Device". Further, it will be noted that FIG. 46 is shown as a form in which the terms "OEM", "Owner Smart Device", and "Client Smart Device" are interchangeable with the terms "service provider", "primary device", and "secondary device".

In FIG. 46, an owner terminal request client information. A client terminal obtains information such as an SE ID and a Client.PK (including a public key of the client terminal), and prepares the second NFC connection to perform tapping again. Here, the owner terminal operates as an NFC reader, and an SE of the client terminal operates as an NFC tag. An application of the owner terminal directly generates an APDU command to transmit the APDU to the client terminal through an NFC. The APDU command transferred by the owner terminal is directly transferred to the SE through an NFC Controller (that is, the APDU command is not transferred to an OS). According to the APDU command (e.g., GETDATA), an SE identification (SE ID) is responded as APDU Response. The application of the owner compares the SE ID obtained through the application of the client terminal and the SE ID directly read from the Client SE. If the obtained SE ID is identical to the read SE ID, the subsequent procedure will be performed. The subsequent procedure may include a procedure of verifying and signing other information such as a credential transmitted by the application of the client terminal, a public key, and/or the like, and registering the verified and signed information at a server, and/or the like.

Firstly, for example, an NFC connection is established between a secondary device 4601 and a primary device 4603

(4611). An application 4606 of the secondary device 4601 transmits information of the secondary device 4601, e.g., an SE ID, a PK of the secondary device 4601, i.e., Client.pk to an application 4604 of the primary device 4603 (4613). The application 4606 of the secondary device 4601 may optionally transmit, to the application 4604 of the primary device 4603, GPS information, a time stamp, and information about the second connection used for transmitting a token.

The second connection is established between a secure element 4602 of the secondary device 4601 and the application 4604 of the primary device 4603 (4615), and the application 4604 of the primary device 4603 transmits GETDATA APDU request to the secure element 4602 of the secondary device 4601 (4617). The secure element 4602 of the secondary device 4601 transmits response to the GET-DATA APDU request to the application 4604 of the primary device 4603 (4619). The response may include an SE ID of the secure element 4602 of the secondary device 4601.

The application 4604 of the primary device 4603 performs a verification operation on the secondary device information and the SE ID transferred from the secure element 4602 of the secondary device 4601 (4621). Then a channel is established between the application 4604 of the primary device 4603 and a secure element 4605 of the primary device 4603 through an OMAPI (4623), and the application 4604 of the primary device 4603 transfers a PerformSecurityOperationAPDU command to the secure element 4605 of the primary device 4603 (4625). The PerformSecurityOperationAPDU command may include a command for requesting to compute a digital signature.

The secure element 4605 of the primary device 4603 computes a digital signature (DS) based on input data and a shared digital key (DK.Sharing) (4627). The input data may be information of the secondary device 4601 and a digital key identifier (DK ID). The secure element 4605 of the primary device 4603 transfers response including the computed digital signature to the application 4604 of the primary device 4603 (4629).

Although FIG. 46 illustrates a signal transmitting/receiving operation as a series of operations, various operations in FIG. 46 could overlap, occur in parallel, occur in a different order, or occur multiple times.

Figure 47:
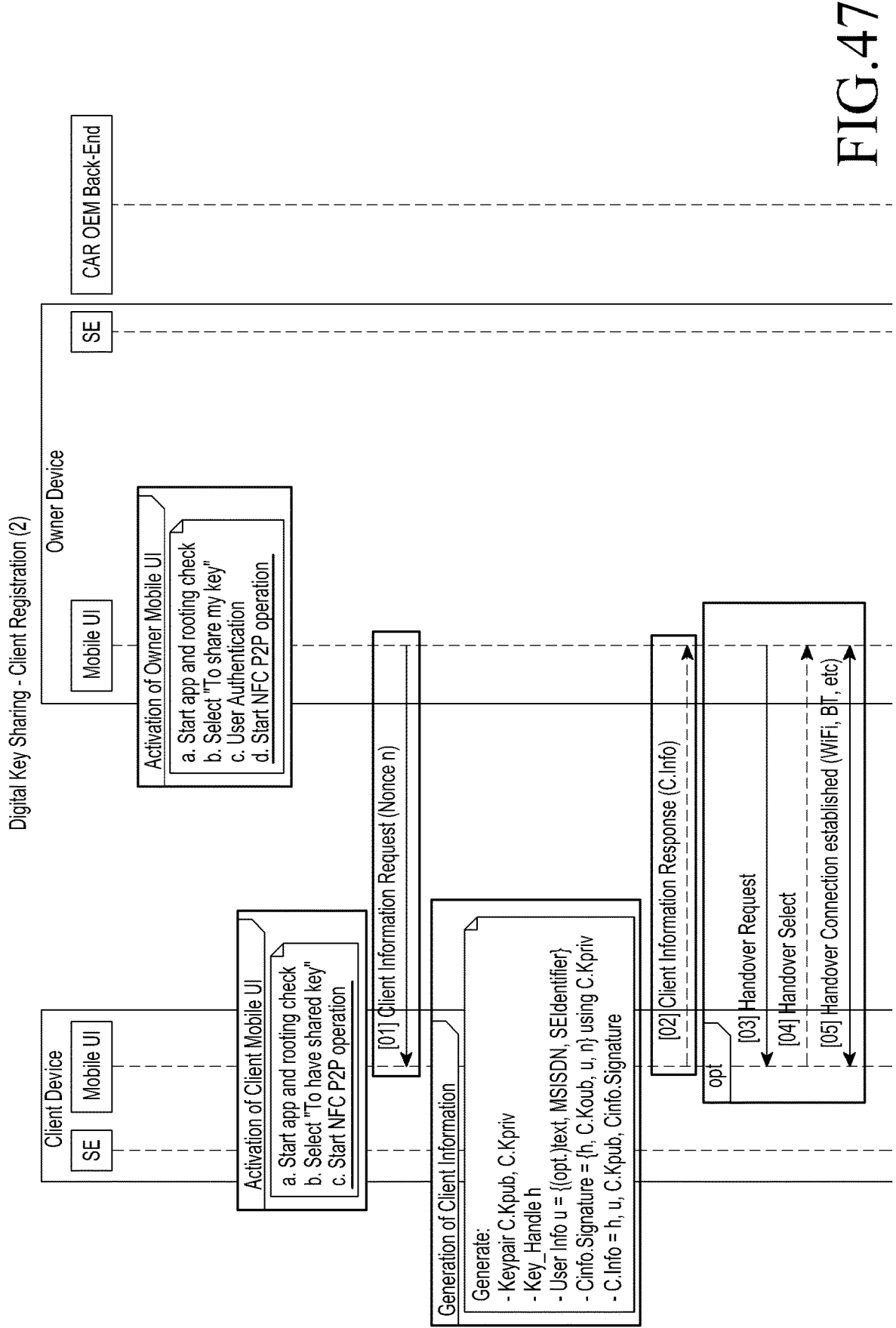
FIG. 47 is a signal flow diagram illustrating a secondary device registration process included in a process of providing a DK in a communication system according to an embodiment of the present disclosure.

FIG. 47 is a signal flow diagram illustrating a secondary device registration process included in a process of providing a DK in a communication system according to an embodiment of the present disclosure. Specifically, FIG. 47 illustrates how the secondary device and the information of the secondary device are registered at a service provider.

Referring to FIG. 47, a secondary device registering process in FIG. 47 is different from examples of other secondary device registering process as described above in the following aspect. That is, the examples of the secondary device registering process as described above uses an NFC in only easy setup, and transmits and receives main data through the second connection such as BT, and/or the like. However, in the secondary device registering process in FIG. 47, client registration and obtainment of client information are performed through an NFC, and the subsequent procedure is performed through the second connection such as BT, and/or the like.

Two devices, e.g., a client device, i.e., a secondary device and an owner device, i.e., a primary device start operating in an NFC P2P mode.

It will be understood that nonce and client information are exchanged using an NFC forum data exchange format (NDEF) protocol.

The secondary device registering process in FIG. 47 indicates how the secondary device and the information of the secondary device are registered at a service provider.

In FIG. 47, it will be noted that a service provider is shown "Car OEM Back-End", a primary device is shown as "Owner Device", and a secondary device is shown as "Client Device". Further, it will be noted that FIG. 47 is shown as a form in which the terms "Car OEM Back-End", "Owner Device", and "Client Device" are interchangeable with the terms "service provider", "primary device", and "secondary device".

The secondary device includes an SE and a Mobile UI, and the primary device includes a Mobile UI and an SE. In FIG. 47, for convenience, the SE and Mobile UI included in the secondary device will be referred to as "SE-A" and "Mobile UI-A", respectively, and the SE and Mobile UI included in the primary device will be referred to as "SE-B" and "Mobile UI-B", respectively. The Mobile UI-A and the Mobile UI-B may access the SE-A and the SE-B, respectively. That is, a Mobile UI denotes an entity which enables a P2P communication with other device, and may access an SE.

It will be noted that the secondary device registering process in FIG. 47 is similar to a secondary device registering process in FIGS. 33A and 33B, however, the secondary device registering process in FIG. 47 is different from the secondary device registering process in FIGS. 33A and 33B in the following aspects.

Firstly, a primary device does not receive a nonce from a service provider before obtaining user information of a secondary device.

Secondly, the primary device does not receive a nonce in advance, a Mobile UI-B included in the primary device generates a nonce value to transfer the nonce value to a Mobile UI-A included in the primary device, and transfers the nonce value along with user information of the secondary device to the service provider when transferring the user information to the service provider thereby the service provider may verify the user information.

Although FIG. 47 illustrates a secondary device registration process as a series of operations, various operations in FIG. 47 could overlap, occur in parallel, occur in a different order, or occur multiple times.

Figure 48:
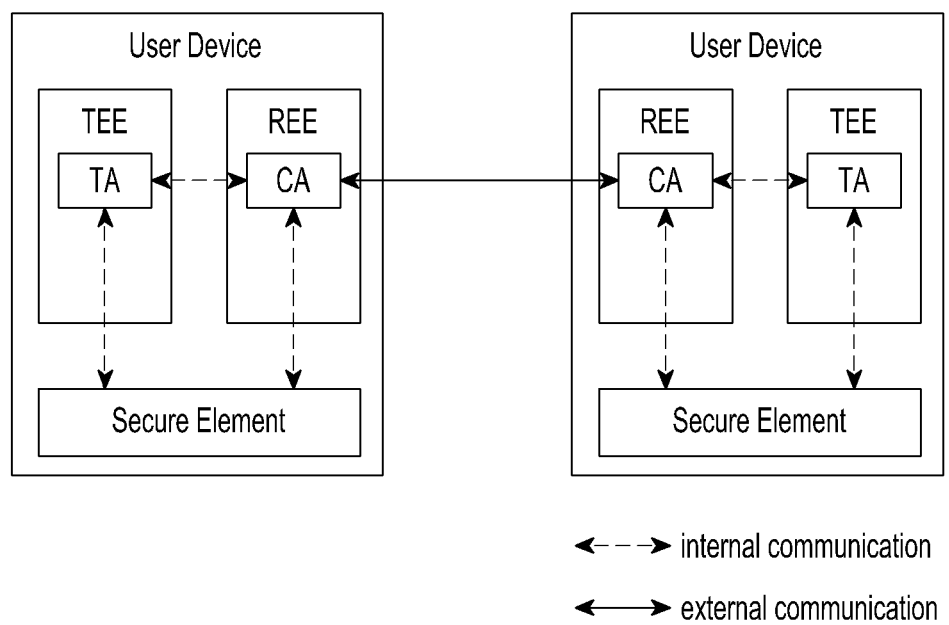
FIG. 48 illustrates a trusted execution environment (TEE) in a communication system according to an embodiment of the present disclosure.

FIG. 48 illustrates a TEE in a communication system according to an embodiment of the present disclosure.

Referring to FIG. 48, a part of a main processor is divided into a TEE as a secure area and a rich execution environment as a general area. The secure area performs storage and processing relatively sensitive information. A TEE may be configured by running a separate secure OS on a secure area, which is separated from a main OS within a chip. Access from the REE to the TEE is impossible, and a limited access to a security resource is possible through an API defined in the TEE.

In FIG. 48, a TA is installed and runs on the TEE, and a client application (CA) is installed and runs on the REE and uses functions provided in the TA.

Figure 49:
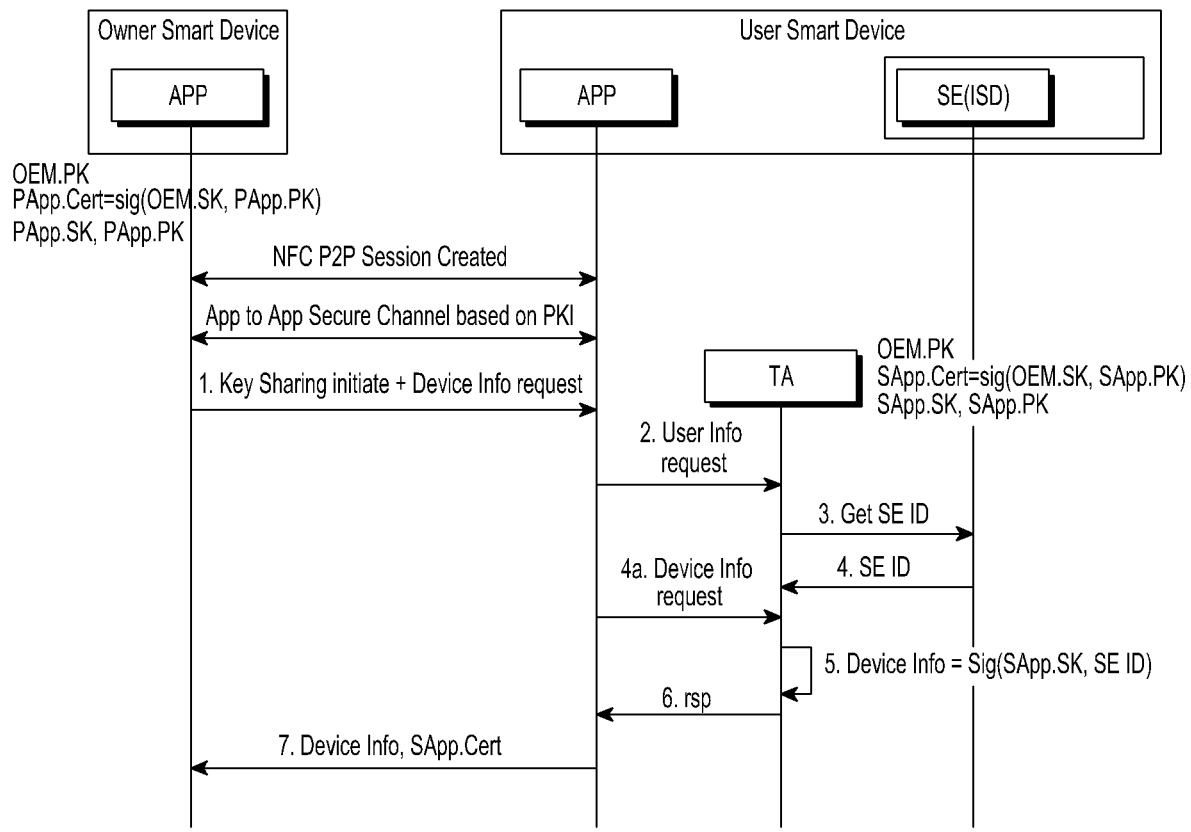
FIG. 49 is a signal flow diagram illustrating a process of generating user information in a TEE in a communication system according to an embodiment of the present disclosure.

FIG. 49 is a signal flow diagram illustrating a process of generating user information in a TEE in a communication system according to an embodiment of the present disclosure.

Referring to FIG. 49, it will be noted that a primary device is shown as "Owner Smart Device", and a secondary device is shown as "User Smart Device". Further, it will be noted that FIG. 49 is shown as a form in which the terms "Owner Smart Device" and "User Smart Device" are interchangeable with the terms "primary device" and "secondary device".

Firstly, an NFC P2P session is generated between an owner device and a user device (NFC P2P Session Created), an App to App secure channel is set up based on a PKI, and the owner device transmits key sharing initiation and device information request to the user device (1. Key Sharing initiate+Device Info request). A user App requests user information from a TA within a TEE area using a TEE client (2. User Info Request). The TA directly accesses an SE to get an SE ID (3. Get SE ID; 4. SE ID). The TA signs the generated device information (5. Device Info=Sig (SApp.SK, SE ID). The TA may generate a key pair to be used for signature and encryption in real time, or use a key of a credential installed by a TA developer for signature and encryption. The TA transfers the signature to a client App (CA) (6. rsp). In this case, user information is generated in a TEE which is safer than an REE, so reliability of the user information may be enhanced.

Although FIG. 49 illustrates a process of generating user information in a TEE as a series of operations, various operations in FIG. 49 could overlap, occur in parallel, occur in a different order, or occur multiple times.

Figure 50:
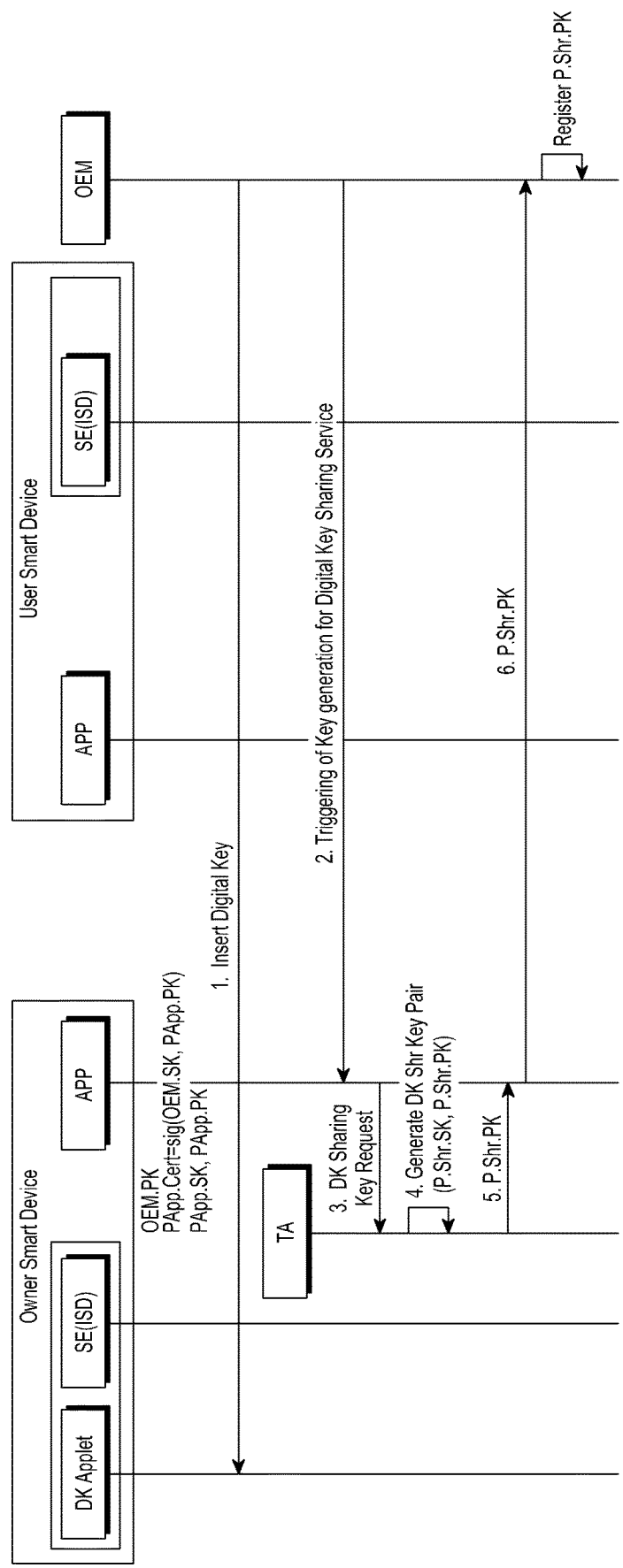
FIG. 50 is a signal flow diagram illustrating a process of performing an assuring operation using a TEE in a primary device in a communication system according to an embodiment of the present disclosure.

FIG. 50 is a signal flow diagram illustrating a process of performing an assuring operation using a TEE in a primary device in a communication system according to an embodiment of the present disclosure.

Referring to FIG. 50, it will be noted that a service provider is shown "OEM", a primary device is shown as "Owner Smart Device", and a secondary device is shown as "User Smart Device". Further, it will be noted that FIG. 50 is shown as a form in which the terms "OEM", "Owner Smart Device", and "User Smart Device" are interchangeable with the terms "service provider", "primary device", and "secondary device".

Firstly, a key for assuring a key sharing service with a level similar to a digital key is obtained in a TEE. In FIG. 50, a service provider, i.e., an OEM stores a digital key at an SE based on a CCC standard (1. Insert Digital Key). An OEM causes a TA to generate a key pair for assuring a DK sharing service through an Owner App. (2. Triggering of Key generation for Digital Key Sharing Service). The TA generates a key pair for a DK sharing service, and registers a public key at an OEM server (3. DK Sharing Key Request; 4. Generate DK Shr Key Pair (P.Shr.SK, P.Shr.PK); 5. P.Shr.PK). There may be various schemes for installing and inserting a key for assuring a DK sharing service. For example, the OEM may directly insert the key to the TA when inserting a digital key.

Although FIG. 50 illustrates a process of performing an assuring operation using a TEE as a series of operations, various operations in FIG. 50 could overlap, occur in parallel, occur in a different order, or occur multiple times.

Figure 51:
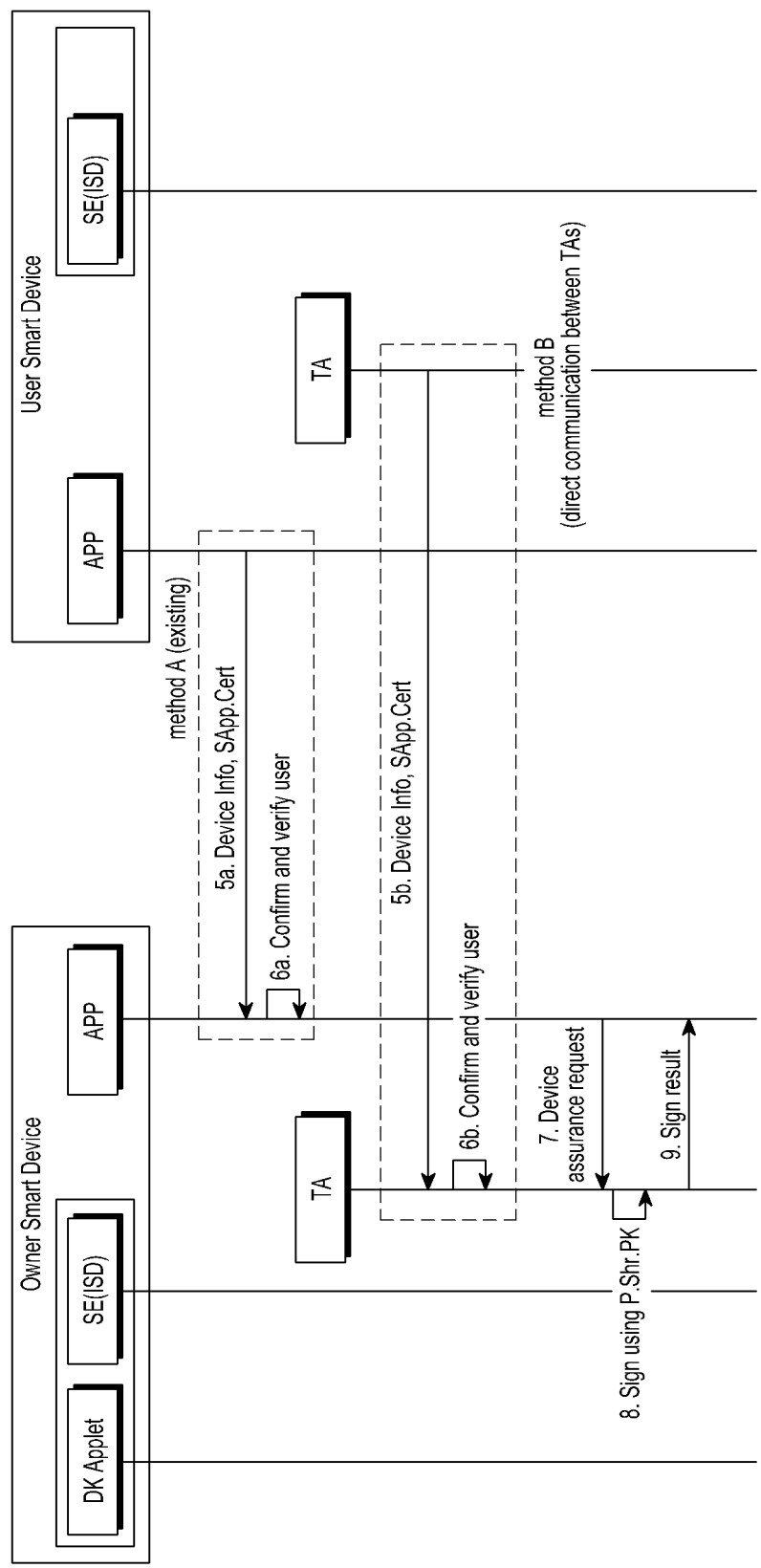
FIG. 51 is a signal flow diagram illustrating a process of performing a signing operation using a key for assuring a DK sharing service stored at a trusted application (TA) in a communication system according to an embodiment of the present disclosure.

FIG. 51 is a signal flow diagram illustrating a process of performing a signing operation using a key for assuring a DK sharing service stored at a TA in a communication system according to an embodiment of the present disclosure. Specifically, in FIG. 51, a TA, instead of an SE performs, performs a signing operation for Client info.

Referring to FIG. 51, it will be noted that a primary device is shown as "Owner Smart Device", and a secondary device is shown as "User Smart Device". Further, it will be noted that FIG. 51 is shown as a form in which the terms "Owner Smart Device" and "User Smart Device" are interchangeable with the terms "primary device" and "secondary device".

Firstly, a TEE has a better computation processing capability compared to an SE, so the TEE may add faster and more various functions compared to the SE.

In FIG. 51, a method A shows a method of obtaining User Info from a general application on an REE, and a method B shows a method of obtaining User Info directly from a TA of a user terminal by connecting a connectivity such as BT, and/or the like between TAs.

In a digital key sharing process proposed in various embodiments of the present disclosure as described above, an SE performs a signing operation for sharing, however, in FIG. 51, a Ta performs a signing operation for Client info.

In this case, at [6b] operation, the TA has a faster computation speed compared to the SE, so it may be implemented that the TA directly performs verification for User Info.

The above-described embodiments of the present disclosure are able to provide and manage security information in a communication system, share security information in a communication system, enhance authentication for devices sharing security information in a communication system, obtain security information without registering an account at a server in a communication system, and enhance reliability of security information in a communication system.

The above-described embodiments of the present disclosure may also be embodied as computer readable code on a non-transitory computer readable recording medium. A non-transitory computer readable recording medium may include any data storage device that can store data, which can be thereafter read by a computer system. Examples of the non-transitory computer readable recording medium include read only memory (ROM), random access memory (RAM), compact disc (CD)-ROMs, magnetic tapes, floppy disks, optical data storage devices, and carrier waves (such as data transmission through the Internet). A non-transitory computer readable recording medium can also be distributed over a network coupled to computer systems so that the computer readable code is stored and executed in a distributed fashion. In addition, functional programs, code, and code segments for accomplishing the present disclosure can be construed by programmers skilled in the art to which the present disclosure pertains.

Methods and apparatuses according to the above-described embodiments of the present disclosure may be implemented by hardware, software, and/or a combination thereof. The software may be stored in a non-volatile storage, e.g., an erasable or re-writable ROM, a memory, e.g., a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, etc.).

Methods and apparatuses according to the above-described embodiments of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transmitted via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, etc., a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A method of a first device in a communication system, the method comprising:
   receiving, from a second device, a first message requesting to share security information of the first device, the first message including information of the second device;
   generating assurance information for the second device using information shared between the first device and a service provider;
   transmitting, to the service provider, a second message requesting to register the second device, the second message including the assurance information;
   receiving, from the service provider, a third message including authentication information for the second device to share the security information of the first device; and
   transmitting, to the second device, a fourth message including the authentication information.

2. The method of claim 1, further comprising verifying the second device based on the information of the second device.

3. A method of a first device in a communication system, the method comprising:
   transmitting, to a service provider, a first message requesting to share security information of the first device;
   receiving, from the service provider, a second message including first authentication information for a second device to share the security information of the first device;
   generating second authentication information for the second device to share the security information of the first device, based on the first authentication information and the security information of the first device; and
   transmitting, to the second device, a third message including the second authentication information,
   wherein the second authentication information is configured to perform an authentication operation with the service provider.

4. The method of claim 3, wherein transmitting, to the second device, the third message including the second authentication information comprises:
   setting up a connection with the second device; and
   transmitting the second authentication information to the second device through the set up connection.

5. A method of a second device in a communication system, the method comprising:
   transmitting, to a first device, a first message to share security information of the first device, the first message including information of the second device;
   receiving, from the first device, a second message including authentication information for the second device to share the security information of the first device;
   performing an authentication operation with a service provider, based on the authentication information; and
   receiving, from the service provider, a third message including the security information of the first device.

6. The method of claim 5, further comprising requesting the service provider to share the security information of the first device, after performing the authentication operation with the service provider.

7. A method of a second device in a communication system, the method comprising:
   setting up a connection with a first device;
   receiving, from the first device, a first message including second authentication information for the second device to share security information of the first device, based on first authentication information and the security information of the first device;
   transmitting, to a service provider, a second message requesting to share the security information of the first device; and
   receiving, from the service provider, the security information of the first device,
   wherein the second authentication information is configured to perform an authentication operation with the service provider.

8. A method of a service provider in a communication system, the method comprising:
   receiving, from a first device, a first message requesting to register the second device, the first message including assurance information for the second device;
   registering the second device based on the assurance information;
   generating authentication information for the second device to share security information of the first device;
   transmitting, to the first device, a second message including the authentication information for the second device to share the security information of the first device;
   performing an authentication operation with the second device, based on the authentication information; and
   transmitting, to the second device, a third message including the security information of the first device.

9. A method of a service provider in a communication system, the method comprising:
   receiving, from a first device, a first message requesting to share security information of a first device;
   generating first authentication information for the second device to share security information of the first device;
   transmitting, to the first device, a second message including the first authentication information for a second device to share the security information of the first device;
   receiving, from the second device, a third message requesting;
   to share the security information of the first device, based on the second authentication information; and
   transmitting, to the second device, the security information of the first device, wherein the second authentication information is configured to perform an authentication operation with the service provider.

10. A first device in a communication system, the first device comprising:
   a transceiver; and
   a processor configured to:
      receive, from a second device, a first message requesting to share security information of the first device, the first message including information of the second device,
      generate assurance information for the second device using information shared between the first device and a service provider,
      transmit, to the service provider, a second message requesting to register the second device, the second message including the assurance information,
      receive, from the service provider, a third message including authentication information for the second device to share the security information of the first device, and
      transmit, to the second device, a fourth message including the authentication information.

11. The first device of claim 10, wherein the processor is further configured to verify the second device based on the information of the second device.

12. A first device in a communication system, the first device comprising:
   a transceiver; and
   a processor configured to:
      transmit, to a service provider, a first message requesting to share security information of the first device,
      receive, from the service provider, a second message including first authentication information for a second device to share the security information of the first device,
      generate second authentication information for the second device to share the security information of the first device, based on the first authentication information and the security information of the first device, and
      transmit, to the second device, a third message including the second authentication information,
      wherein the second authentication information is configured to perform an authentication operation with the service provider.

13. The first device of claim 12, wherein the processor is further configured to:
   set up a connection with the second device, and
   transmit the second authentication information to the second device through the set up connection.

14. A second device in a communication system, the second device comprising:
   a transceiver; and
   a processor configured to:
      transmit, to a first device, a first message to share security information of the first device, the first message including information of the second device,
      receive, from the first device, a second message including, via the transceiver, authentication information for the second device to share the security information of the first device,
      perform an authentication operation with a service provider based on the authentication information, and
      receive, from the service provider, via the transceiver, a third message including the security information of the first device.

15. The second device of claim 14, wherein the processor is further configured to request the service provider to share the security information of the first device, after performing the authentication operation with the service provider.

16. A second device in a communication system, the second device comprising:
   a transceiver; and
   a processor configured to:
      set up a connection with a first device,
      receive, from the first device, via the transceiver, a first message including second authentication information for the second device to share security information of the first device, based on first authentication information and the security information of the first device,
      transmit, to a service provider, a second message requesting to share the security information of the first device, and
      receive, from the service provider, via the transceiver, the security information of the first device,
      wherein the second authentication information is configured to perform an authentication operation with the service provider.

17. A service provider in a communication system, the service provider comprising:
   a transceiver; and
   a processor configured to:
      receive, from a first device, via the transceiver, a first message requesting to register the second device, the first message including assurance information for the second device,
      register the second device based on the assurance information,
      generate authentication information for the second device to share security information of the first device,
      transmit, to the first device, via the transceiver, a second message including the authentication information for the second device to share the security information of the first device,
      perform an authentication operation with the second device, based on the authentication information, and
      transmit, to the second device, via the transceiver, a third message including the security information of the first device.

18. A service provider in a communication system, the service provider comprising:
   a transceiver; and
   a processor configured to:
      receiving, from a first device, a first message requesting to share security information of the first device,
      generate first authentication information for the second device to share security information of the first device,
      transmit, to the first device, via the transceiver, a second message including the first authentication information for the second device to share the security information of the first device, wherein the first authentication information is used for preventing re-use of second authentication information to be generated, receive, from a second device, a third message requesting to share the security information of the first device, based on the second authentication information, and transmit, to the second device, via the transceiver, the security information of the first device, wherein the second authentication information is configured to perform an authentication operation with the service provider.

\* \* \* \* \*